United States Patent
Goryunov et al.

(10) Patent No.: US 11,254,763 B2
(45) Date of Patent: *Feb. 22, 2022

(54) TRANSITION METAL BIS(PHENOLATE) COMPLEXES AND THEIR USE AS CATALYSTS FOR OLEFIN POLYMERIZATION

(71) Applicant: ExxonMobil Chemical Patents Inc., Baytown, TX (US)

(72) Inventors: Georgy P. Goryunov, Moscow (RU); Mikhail I. Sharikov, Moscow (RU); Vladislav A. Popov, Moscow (RU); Dmitry V. Uborsky, Moscow (RU); Alexander Z. Voskoboynikov, Moscow (RU); John R. Hagadorn, Houston, TX (US); Michelle E. Titone, Houston, TX (US); Alex E. Carpenter, Houston, TX (US); Catherine A. Faler, Houston, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/787,909

(22) Filed: Feb. 11, 2020

(65) Prior Publication Data

US 2020/0255553 A1  Aug. 13, 2020

Related U.S. Application Data

(60) Provisional application No. 62/804,372, filed on Feb. 12, 2019.

(51) Int. Cl.
| | |
|---|---|
| *C08F 210/16* | (2006.01) |
| *C08F 10/02* | (2006.01) |
| *C08F 10/06* | (2006.01) |
| *C08F 110/06* | (2006.01) |
| *C08F 110/02* | (2006.01) |
| *C07F 7/00* | (2006.01) |
| *B01J 31/22* | (2006.01) |
| *C08F 4/64* | (2006.01) |

(52) U.S. Cl.
CPC ......... *C08F 210/16* (2013.01); *B01J 31/2295* (2013.01); *C07F 7/00* (2013.01); *C08F 4/64158* (2013.01); *C08F 10/02* (2013.01); *C08F 10/06* (2013.01); *B01J 2531/0225* (2013.01); *B01J 2531/0244* (2013.01); *B01J 2531/48* (2013.01); *B01J 2531/49* (2013.01)

(58) Field of Classification Search
CPC ........ C08F 210/16; C08F 10/02; C08F 10/06; C08F 110/06; C08F 110/02; C07F 7/00
See application file for complete search history.

(56) References Cited

U.S. PATENT DOCUMENTS

| | | | |
|---|---|---|---|
| 6,825,296 B2 | 11/2004 | Chi-Wang Chan et al. | . 526/161 |
| 7,030,256 B2 | 4/2006 | Boussie et al. | ................. 556/54 |
| 7,847,099 B2 | 12/2010 | Agapie et al. | ..................... 546/2 |
| 2020/0254431 A1 | 8/2020 | Goryunov et al. | |
| 2020/0255555 A1 | 8/2020 | Goryunov et al. | |
| 2020/0255556 A1 | 8/2020 | Goryunov et al. | |
| 2020/0255561 A1 | 8/2020 | Harlan et al. | |

FOREIGN PATENT DOCUMENTS

| | | | |
|---|---|---|---|
| KR | 1020180022137 | 6/2020 | ........... C07D 213/06 |
| WO | 2016/172110 | 10/2016 | ................ C07F 7/00 |

OTHER PUBLICATIONS

U.S. Appl. No. 62/972,936, filed Feb. 11, 2020, Jiang, P. et al.
U.S. Appl. No. 62/972,943, filed Feb. 11, 2020, Jiang, P. et al.
U.S. Appl. No. 62/972,953, filed Feb. 11, 2020, Canich, J. et al.

(Continued)

*Primary Examiner* — Catherine S Branch

(57) ABSTRACT

This invention relates to transition metal complexes of a dianionic, tridentate ligand that features a central neutral heterocyclic Lewis base and two phenolate donors, where the tridentate ligand coordinates to the metal center to form two eight-membered rings. Preferably the bis(phenolate) complexes are represented by Formula (I):

(I)

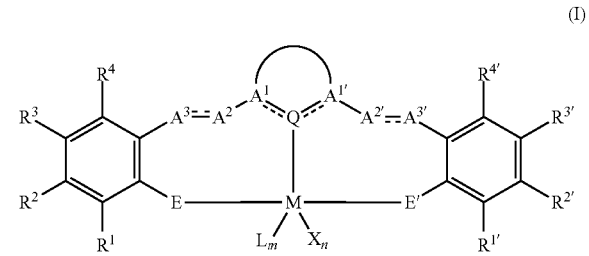

where M, L, X, m, n, E, E', Q, $R^1$, $R^2$, $R^3$, $R^4$, $R^{1'}$, $R^{2'}$, $R^{3'}$, $R^{4'}$, $A^1$, $A^{1'}$, $A^3 \!=\! A^2$, and $A^{2'} \!=\! A^{3'}$ are as defined herein, where $A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge.

35 Claims, No Drawings

(56) References Cited

OTHER PUBLICATIONS

U.S. Appl. No. 62/972,962, filed Feb. 11, 2020, Xie, R et al.
U.S. Appl. No. 63/064,392, filed Aug. 11, 2020, Holtcamp, M. et al.
Baier, M. C. (2014) "Post-Metallocenes in the Industrial Production of Polyolefins," *Angew. Chem. Int. Ed.* 2014, v.53, pp. 9722-9744.
Golisz, S. et al. (2009) "Synthesis of Early Transition Metal Bisphenolate Complexes and Their Use as Olefin Polymerization Catalysts," *Macromolecules*, v.42(22), pp. 8751-8762.
Zeng, C. et al. (2015) "Highly Enantioselective Epoxidation of α,β-Unsaturated Ketones Catalyzed by Rare-Earth Amides [(Me$_3$Si)$_2$N]$_3$RE(μ-Cl)Li(THF)$_3$ with Phenoxy-Functionalized Chiral Prolinols," *Organic Letters*, v.17(9), pp. 2242-2245.

TRANSITION METAL BIS(PHENOLATE) COMPLEXES AND THEIR USE AS CATALYSTS FOR OLEFIN POLYMERIZATION

PRIORITY

This invention claims the benefit of and priority to U.S. Ser. No. 62/804,372, filed Feb. 12, 2019, the disclosure of which is incorporated in its entirety.

CROSS REFERENCE TO RELATED APPLICATIONS

This invention is related to:
1) concurrently filed U.S. Ser. No. 16/788,022, entitled "Lewis Base Catalysts and Methods Thereof", which claims priority to 62/804,353, filed Feb. 12, 2019;
2) concurrently filed U.S. Ser. No. 16/788,088, entitled "Bis(Aryl Phenolate) Lewis Base Catalysts and Methods Thereof", which claims priority to 62/804,372, filed Feb. 12, 2019;
3) concurrently filed U.S. Ser. No. 16/788,124, entitled "Lewis Base Catalysts and Methods Thereof", which claims priority to 62/804,389, filed Feb. 12, 2019;
4) concurrently filed U.S. Ser. No. 16/787,837, entitled "Supported Transition Metal Bis(Phenolate) Complexes and Their Use as Catalysts for Olefin Polymerization", which claims priority to 62/804,372, filed Feb. 12, 2019;
5) concurrently filed U.S. Ser. No. 62/972,962 entitled "Propylene Copolymers Obtained Using Transition Metal Bis(Phenolate) Catalyst Complexes and Homogeneous Process for Production Thereof";
6) concurrently filed U.S. Ser. No. 62/972,953 entitled "Propylene Polymers Obtained Using Transition Metal Bis (Phenolate) Catalyst Complexes and Homogeneous Process for Production Thereof";
7) concurrently filed U.S. Ser. No. 62/972,943 entitled "Ethylene-Alpha-Olefin-Diene Monomer Copolymers Obtained Using Transition Metal Bis(Phenolate) Catalyst Complexes and Homogeneous Process for Production Thereof"; and
8) concurrently filed U.S. Ser. No. 62/972,936 entitled "Polyethylene Compositions Obtained Using Transition Metal Bis(Phenolate) Catalyst Complexes and Homogeneous Process for Production Thereof".

FIELD OF THE INVENTION

This invention relates to novel catalyst compounds comprising group 4 bis(phenolate) complexes, catalyst systems comprising such, and uses thereof.

BACKGROUND OF THE INVENTION

Olefin polymerization catalysts are of great use in industry. Hence there is interest in finding new catalyst systems that increase the commercial usefulness of the catalyst and allow the production of polymers having improved properties.

Catalysts for olefin polymerization can be based on bis (phenolate) complexes as catalyst precursors, which are activated typically by an alumoxane or an activator containing a non-coordinating anion.

KR 2018022137 (LG Chem.) describes transition metal complexes of bis(methylphenyl phenolate)pyridine.

U.S. Pat. No. 7,030,256 B2 (Symyx Technologies, Inc.) describes bridged bi-aromatic ligands, catalysts, processes for polymerizing and polymers therefrom.

U.S. Pat. No. 6,825,296 (University of Hong Kong) describes transition metal complexes of bis(phenolate) ligands that coordinate to metal with two 6-membered rings.

U.S. Pat. No. 7,847,099 (California Institute of Technology) describes transition metal complexes of bis(phenolate) ligands that coordinate to metal with two 6-membered rings.

WO 2016/172110—(Univation Technologies) describes complexes of tridentate bis(phenolate) ligands that feature a non-cyclic ether or thioether donor.

Other references of interest include: Baier, M. C. (2014) "Post-Metallocenes in the Industrial Production of Polyolefins," Angew. Chem. Int. Ed. 2014, v. 53, pp. 9722-9744; and Golisz, S. et al. (2009) "Synthesis of Early Transition Metal Bisphenolate Complexes and Their Use as Olefin Polymerization Catalysts," Macromolecules, v. 42(22), pp. 8751-8762.

New catalysts capable of polymerizing olefins to yield high molecular weight and/or high tacticity polymers at high process temperatures are desirable for the industrial production of polyolefins. There is still a need in the art for new and improved catalyst systems for the polymerization of olefins, in order to achieve specific polymer properties, such as high molecular weight and/or high tacticity polymers, preferably at high process temperatures.

It is therefore an object of the present invention to provide novel catalyst compounds, catalysts systems comprising such compounds, and processes for the polymerization of olefins using such compounds and systems.

SUMMARY OF THE INVENTION

This invention relates to transition metal complexes of a dianionic, tridentate ligand that features a central neutral heterocyclic Lewis base and two phenolate donors, where the tridentate ligand coordinates to the metal center to form two eight-membered rings.

This invention relates to bis(phenolate) complexes represented by Formula (I):

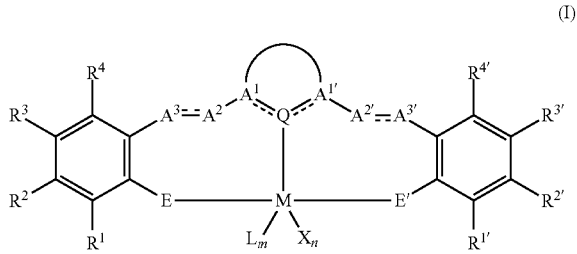

wherein:
M is a group 3-6 transition metal or Lanthanide;
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;
Q is group 14, 15, or 16 atom that forms a dative bond to metal M;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$$A^3 = A^2$$

is a divalent group containing 2 to 40 non-hydrogen atoms that links $A^1$ to the E-bonded aryl group via a 2-atom bridge;

$$A^{2'} = A^{3'}$$

is a divalent group containing 2 to 40 non-hydrogen atoms that links $A^{1'}$ to the E'-bonded aryl group via a 2-atom bridge;

L is a neutral Lewis base;
X is an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

This invention also relates to a method to polymerize olefins comprising contacting a catalyst compound as described herein with an activator and one or more monomers. This invention further relates to polymer compositions produced by the methods described herein.

Definitions

For the purposes of this invention and the claims thereto, the following definitions shall be used.

The new numbering scheme for the Periodic Table Groups is used as described in *Chemical and Engineering News*, v. 63(5), pg. 27 (1985). Therefore, a "group 4 metal" is an element from group 4 of the Periodic Table, e.g. Hf, Ti, or Zr.

"Catalyst productivity" is a measure of the mass of polymer produced using a known quantity of polymerization catalyst. Typically, "catalyst productivity" is expressed in units of (g of polymer)/(g of catalyst) or (g of polymer)/(mmols of catalyst) or the like. If units are not specified then the "catalyst productivity" is in units of (g of polymer)/(grams of catalyst). For calculating catalyst productivity only the weight of the transition metal component of the catalyst is used (i.e. the activator and/or co-catalyst is omitted). "Catalyst activity" is a measure of the mass of polymer produced using a known quantity of polymerization catalyst per unit time for batch and semi-batch polymerizations. For calculating catalyst productivity only the weight of the transition metal component of the catalyst is used (i.e. the activator and/or co-catalyst is omitted). Typically, "catalyst activity" is expressed in units of (g of polymer)/(mmol of catalyst)/hour or (kg of polymer)/(mmols of catalyst)/hour or the like. If units are not specified then the "catalyst activity" is in units of (g of polymer)/(mmol of catalyst)/hour.

"Conversion" is the percentage of a monomer that is converted to polymer product in a polymerization, and is reported as % and is calculated based on the polymer yield, the polymer composition, and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

Ethylene shall be considered an α-olefin.

Unless otherwise specified, the term "$C_n$," means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthalenyl, and the like.

Unless otherwise indicated, (e.g., the definition of "substituted hydrocarbyl", etc.), the term "substituted" means that at least one hydrogen atom has been replaced with at least one non-hydrogen group, such as a hydrocarbyl group, a heteroatom or heteroatom-containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring (typically made of 6 carbon atoms) and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

The term "substituted aromatic," means an aromatic group having 1 or more hydrogen groups replaced by a hydrocarbyl, substituted hydrocarbyl, heteroatom or heteroatom containing group.

A "substituted phenolate" is a phenolate group where at least one, two, three, four or five hydrogen atoms in the 2, 3, 4, 5, and/or 6 positions has been replaced with at least one non-hydrogen group, such as a hydrocarbyl group, a heteroatom or heteroatom-containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), where the 1 position is the phenolate group (Ph-O—, Ph-S—, and Ph-N(R^)— groups, where R^ is hydrogen, C$_1$-C$_{40}$ hydrocarbyl, C$_1$-C$_{40}$ substituted hydrocarbyl, a heteroatom or a heteroatom-containing group). Preferably, a "substituted phenolate" group in the catalyst compounds described herein is represented by the formula:

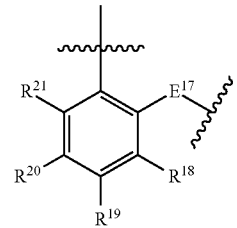

where R$^{18}$ is hydrogen, C$_1$-C$_{40}$ hydrocarbyl (such as C$_1$-C$_{40}$ alkyl) or C$_1$-C$_{40}$ substituted hydrocarbyl, a heteroatom or a heteroatom-containing group, E$^{17}$ is oxygen, sulfur, or NR$^{17}$, and each of R$^{17}$, R$^{18}$, R$^{19}$, R$^{20}$, and R$^{21}$ is independently selected from hydrogen, C$_1$-C$_{40}$ hydrocarbyl (such as C$_1$-C$_{40}$ alkyl) or C$_1$-C$_{40}$ substituted hydrocarbyl, a heteroatom or a heteroatom-containing group, or two or more of R$^{18}$, R$^{19}$, R$^{20}$, and R$^{21}$ are joined together to form a C$_4$-C$_{62}$ cyclic or polycyclic ring structure, or a combination thereof, and the wavy lines show where the substituted phenoate group forms bonds to the rest of the catalyst compound.

An "alkyl substituted phenolate" is a phenolate group where at least one, two, three, four or five hydrogen atoms in the 2, 3, 4, 5, and/or 6 positions has been replaced with at least one alkyl group, such as a C$_1$ to C$_{40}$, alternately C$_2$ to C$_{20}$, alternately C$_3$ to C$_{12}$ alkyl, such as methyl, ethyl, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, adamantanyl and the like including their substituted analogues.

An "aryl substituted phenolate" is a phenolate group where at least one, two, three, four or five hydrogen atoms in the 2, 3, 4, 5, and/or 6 positions has been replaced with at least one aryl group, such as a C$_1$ to C$_{40}$, alternately C$_2$ to C$_{20}$, alternately C$_3$ to C$_{12}$ aryl group, such as phenyl, 4-fluorophenyl, 2-methylphenyl, 2-propylphenyl, 2,6-dimethylphenyl, mesityl, 2-ethylphenyl, naphthalenyl and the like including their substituted analogues.

The term "ring atom" means an atom that is part of a cyclic ring structure. By this definition, a benzyl group has six ring atoms and tetrahydrofuran has 5 ring atoms.

A heterocyclic ring, also referred to as a heterocyclic, is a ring having a heteroatom in the ring structure as opposed to a "heteroatom-substituted ring" where a hydrogen on a ring atom is replaced with a heteroatom. For example, tetrahydrofuran is a heterocyclic ring and 4-N,N-dimethyl-amino-phenyl is a heteroatom substituted ring. A substituted heterocyclic ring means a heterocyclic ring having 1 or more hydrogen groups replaced by a hydrocarbyl, substituted hydrocarbyl, heteroatom or heteroatom containing group.

A substituted hydrocarbyl ring means a ring comprised of carbon and hydrogen atoms having 1 or more hydrogen groups replaced by a hydrocarbyl, substituted hydrocarbyl, heteroatom or heteroatom containing group.

For purposes of the present disclosure, in relation to catalyst compounds (e.g., substituted bis(phenolate) catalyst compounds), the term "substituted" means that a hydrogen group has been replaced with a hydrocarbyl group, a heteroatom or heteroatom-containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

A tertiary hydrocarbyl group possesses a carbon atom bonded to three other carbon atoms. When the hydrocarbyl group is an alkyl group, tertiary hydrocarbyl groups are also referred to as tertiary alkyl groups. Examples of tertiary hydrocarbyl groups include tert-butyl, 2-methylbutan-2-yl, 2-methylhexan-2-yl, 2-phenylpropan-2-yl, 2-cyclohexylpropan-2-yl, 1-methylcyclohexyl, 1-adamantyl, bicyclo[2.2.1]heptan-1-yl and the like. Tertiary hydrocarbyl groups can be illustrated by Formula A:

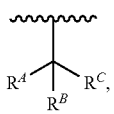

wherein $R^A$, $R^B$ and $R^C$ are hydrocarbyl groups or substituted hydrocarbyl groups that may optionally be bonded to one another, and the wavy line shows where the tertiary hydrocarbyl group forms bonds to other groups.

A cyclic tertiary hydrocarbyl group is defined as a tertiary hydrocarbyl group that forms at least one alicyclic (non-aromatic) ring. Cyclic tertiary hydrocarbyl groups are also referred to as alicyclic tertiary hydrocarbyl groups. When the hydrocarbyl group is an alkyl group, cyclic tertiary hydrocarbyl groups are also referred to as cyclic tertiary alkyl groups or alicyclic tertiary alkyl groups. Examples of cyclic tertiary hydrocarbyl groups include 1-adamantanyl, 1-methylcyclohexyl, 1-methylcyclopentyl, 1-methylcyclooctyl, 1-methylcyclodecyl, 1-methylcyclododecyl, bicyclo[3.3.1]nonan-1-yl, bicyclo[2.2.1]heptan-1-yl, bicyclo[2.3.3]hexan-1-yl, bicyclo[1.1.1]pentan-1-yl, bicyclo[2.2.2]octan-1-yl, and the like. Cyclic tertiary hydrocarbyl groups can be illustrated by Formula B:

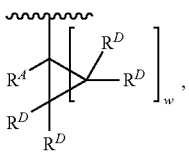

wherein $R^A$ is a hydrocarbyl group or substituted hydrocarbyl group, each $R^D$ is independently hydrogen or a hydrocarbyl group or substituted hydrocarbyl group, w is an integer from 1 to about 30, and $R^A$, and one or more $R^D$, and or two or more $R^D$ may optionally be bonded to one another to form additional rings.

When a cyclic tertiary hydrocarbyl group contains more than one alicyclic ring, it can be referred to as polycyclic tertiary hydrocarbyl group or if the hydrocarbyl group is an alkyl group, it may be referred to as a polycyclic tertiary alkyl group.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom or heteroatom-containing group, such as halogen (such as Br, $C_1$, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tertbutyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, MAO is methylalumoxane, dme is 1,2-dimethoxyethane, p-tBu is para-tertiary butyl, TMS is trimethylsilyl, TIBAL is triisobutylaluminum, TNOA and TNOAL are tri(n-octyl)aluminum, p-Me is para-methyl, Bn is benzyl (i.e., CH$_2$Ph), THF (also referred to as thf) is tetrahydrofuran, RT is room temperature (and is 23° C. unless otherwise indicated), tol is toluene, EtOAc is ethyl acetate, Cbz is Carbazole, and Cy is cyclohexyl.

A "catalyst system" is a combination comprising at least one catalyst compound and at least one activator. When "catalyst system" is used to describe such a pair before activation, it means the unactivated catalyst complex (pre-catalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. The term "anionic donor" is used interchangeably with "anionic ligand". Examples of anionic donors in the context of the present invention include, but are not limited to, methyl, chloride, fluoride, alkoxide, aryloxide, alkyl, alkenyl, thiolate, carboxylate, amido, methyl, benzyl, hydrido, amidinate, amidate, and phenyl. Two anionic donors may be joined to form a dianionic group.

A "neutral Lewis base or "neutral donor group" is an uncharged (i.e. neutral) group which donates one or more pairs of electrons to a metal ion. Non-limiting examples of neutral Lewis bases include ethers, thioethers, amines, phosphines, ethyl ether, tetrahydrofuran, dimethylsulfide, triethylamine, pyridine, alkenes, alkynes, alenes, and carbenes. Lewis bases may be joined together to form bidentate or tridentate Lewis bases.

For purposes of this invention and the claims thereto, phenolate donors include Ph-O—, Ph-S—, and Ph-N(R^)— groups, where R^ is hydrogen, $C_1$-$C_{40}$ hydrocarbyl, $C_1$-$C_{40}$ substituted hydrocarbyl, a heteroatom or a heteroatom-containing group, and Ph is optionally substituted phenyl.

DETAILED DESCRIPTION

This invention relates to a new catalyst family comprising transition metal complexes of a dianionic, tridentate ligand that features a central neutral donor group and two phenolate donors, where the tridentate ligands coordinate to the metal center to form two eight-membered rings. In complexes of this type it is advantageous for the central neutral donor to be a heterocyclic group. It is particularly advantageous for the heterocyclic group to lack hydrogens in the position alpha to the heteroatom. In complexes of this type it is also advantageous for the phenolates to be substituted with one or more cyclic tertiary alkyl substituents. The use of cyclic tertiary alkyl substituted phenolates is demonstrated to improve the ability of these catalysts to produce high molecular weight polymer.

Complexes of substituted bis(phenolate) ligands (such as adamantanyl-substituted bis(phenolate) ligands) have been prepared and characterized herein. These complexes form active olefin polymerization catalysts when combined with activators, such as non-coordinating anion or alumoxane activators. Useful bis(aryl phenolate)pyridine complexes comprise a tridentate bis(aryl phenolate)pyridine ligand that is coordinated to a group 4 transition metal with the formation of two eight-membered rings.

This invention also relates to a metal complex comprising: a metal selected from groups 3-6 or Lanthanide metals, and a tridentate, dianionic ligand containing two anionic donor groups and a neutral Lewis base donor, wherein the neutral Lewis base donor is covalently bonded between the two anionic donors, and wherein the metal-ligand complex features a pair of 8-membered metallocycle rings.

This invention relates to catalyst systems comprising activator and one or more catalyst compounds as described herein.

This invention also relates to process to polymerize olefins using the catalyst compounds described herein comprising contacting one or more olefins with a catalyst system comprising an activator and a catalyst compound described herein.

The present disclosure also relates to a catalyst system comprising a transition metal compound and an activator compound as described herein, to the use of such activator compounds for activating a transition metal compound in a catalyst system for polymerizing olefins, and to processes for polymerizing olefins, the process comprising contacting under polymerization conditions one or more olefins with a catalyst system comprising a transition metal compound and activator compounds, where aromatic solvents, such as toluene, are absent (e.g. present at zero mol % relative to the moles of activator, alternately present at less than 1 mol %, preferably the catalyst system, the polymerization reaction and/or the polymer produced are free of "detectable aromatic hydrocarbon solvent," such as toluene). For purposes of the present disclosure, "detectable aromatic hydrocarbon solvent" means 0.1 mg/m$^2$ or more as determined by gas phase chromatography. For purposes of the present disclosure, "detectable toluene" means 0.1 mg/m$^2$ or more as determined by gas phase chromatography.

The polyalpha-olefins produced herein preferably contain 0 ppm (alternately less than 1 ppm, alternately less than 2 ppm, alternately less than 5 ppm) of residual aromatic hydrocarbon. Preferably, the polyalpha-olefins produced herein contain 0 ppm (alternately less than 1 ppm) of residual toluene.

The catalyst systems used herein preferably contain 0 ppm (alternately less than 1 ppm) of residual aromatic hydrocarbon. Preferably, the catalyst systems used herein contain 0 ppm (alternately less than 1 ppm) of residual toluene.

The polyalpha-olefins produced herein preferably contain 5 wt % or less of aromatic hydrocarbon, such as toluene, (alternately 4 wt % or less, alternately 3 wt % or less, alternately 2 wt % or less, alternately 1 wt 5 or less, alternately 0.5 wt % or less, alternately less than 50 ppm, alternately less than 5 ppm) of residual aromatic hydrocarbon, such as toluene.

Catalyst Compounds

The terms "catalyst", "compound", "catalyst compound", and "complex" may be used interchangeably to describe a transition metal or Lanthanide metal complex that forms an olefin polymerization catalyst when combined with a suitable activator.

The catalyst complexes of the present invention comprise a metal selected from groups 3, 4, 5 or 6 or Lanthanide metals of the Periodic Table of the Elements, a tridentate dianionic ligand containing two anionic donor groups and a neutral heterocyclic Lewis base donor, wherein the heterocyclic donor is covalently bonded between the two anionic donors. Preferably the dianionic, tridentate ligand features a central heterocyclic donor group and two phenolate donors and the tridentate ligand coordinates to the metal center to form two eight-membered rings.

The metal is preferably selected from group 3, 4, 5, or 6 elements. Preferably the metal, M, is a group 4 metal. Most preferably the metal, M, is zirconium or hafnium.

Preferably the heterocyclic Lewis base donor features a nitrogen or oxygen donor atom. Preferred heterocyclic groups include derivatives of pyridine, pyrazine, pyrimidine, triazine, thiazole, imidazole, thiophene, oxazole, thiazole, furan, and substituted variants of thereof. Preferably the heterocyclic Lewis base lacks hydrogen(s) in the position alpha to the donor atom. Particularly preferred heterocyclic Lewis base donors include pyridine, 3-substituted pyridines, and 4-substituted pyridines.

The anionic donors of the tridentate dianionic ligand may be arylthiolates, phenolates, or anilides. Preferred anionic donors are phenolates. It is preferred that the tridentate dianionic ligand coordinates to the metal center to form a complex that lacks a mirror plane of symmetry. It is preferred that the tridentate dianionic ligand coordinates to the metal center to form a complex that has a two-fold rotation axis of symmetry; when determining the symmetry of the bis(phenolate) complexes only the metal and dianionic tridentate ligand are considered (i.e. ignore remaining ligands).

The bis(phenolate) ligands useful in the present invention are preferably tridentate dianionic ligands that coordinate to the metal M in such a fashion that a pair of 8-membered metallocycle rings are formed. The bis(phenolate) ligands wrap around the metal to form a complex with a 2-fold rotation axis, thus giving the complexes $C_2$ symmetry. The $C_2$ geometry and the 8-membered metallocycle rings are features of these complexes that make them effective catalyst components for the production of polyolefins, particularly isotactic poly(alpha olefins). If the ligands were coordinated to the metal in such a manner that the complex had mirror-plane ($C_s$) symmetry, then the catalyst would be expected to produce only atactic poly(alpha olefins); these symmetry-reactivity rules are summarized by Bercaw, J. E. (2009) in *Macromolecules*, v. 42, pp. 8751-8762. The pair of 8-membered metallocycle rings of the inventive complexes is also a notable feature that is advantageous for catalyst activity, temperature stability, and isoselectivity of monomer enchainment. Related group 4 complexes featuring smaller 6-membered metallocycle rings are known (*Macromolecules* 2009, 42, 8751-8762) to form mixtures of $C_2$ and $C_s$ symmetric complexes when used in olefin polymerizations and are thus not well suited to the production of highly isotactic poly(alpha olefins).

Bis(phenolate) ligands that contain oxygen donor groups (i.e. E=E'=oxygen in Formula (I)) in the present invention are preferably substituted with alkyl, substituted alkyl, aryl, or other groups. It is advantageous that each phenolate group be substituted in the ring position that is adjacent to the oxygen donor atom. It is preferred that substitution at the position adjacent to the oxygen donor atom be an alkyl group containing 1-20 carbon atoms. It is preferred that substitution at the position next to the oxygen donor atom be a non-aromatic cyclic alkyl group with one or more five- or six-membered rings. It is preferred that substitution at the position next to the oxygen donor atom be a cyclic tertiary alkyl group. It is highly preferred that substitution at the position next to the oxygen donor atom be adamantan-1-yl or substituted adamantan-1-yl.

The neutral heterocyclic Lewis base donor is covalently bonded between the two anionic donors via "linker groups" that join the heterocyclic Lewis base to the phenolate groups. The "linker groups" are indicated by ($A^3A^2$) and ($A^{2'}A^{3'}$) in Formula (I). The choice of each linker group may affect the catalyst performance, such as the tacticity of the poly(alpha olefin) produced. Each linker group is typically a $C_2$-$C_{40}$ divalent group that is two-atoms in length. One or both linker groups may independently be phenylene, substituted phenylene, heteroaryl, vinylene, or a non-cyclic two-carbon long linker group. When one or both linker groups are phenylene, the alkyl substituents on the phenylene group may be chosen to optimize catalyst performance. Typically, one or both phenylenes may be unsubstituted or may be independently substituted with $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as isopropyl, etc.

This invention further relates to catalyst compounds, and catalyst systems comprising such compounds, represented by the Formula (I):

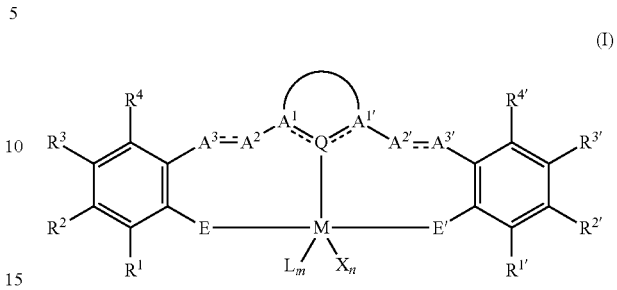

wherein:

M is a group 3, 4, 5, or 6 transition metal or a Lanthanide (such as Hf, Zr or Ti);

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;

Q is group 14, 15, or 16 atom that forms a dative bond to metal M, preferably Q is C, O, S or N, more preferably Q is C, N or O, most preferably Q is N;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge ($A^1QA^{1'}$ combined with the curved line joining $A^1$ and $A^{1'}$ represents the heterocyclic Lewis base), $A^1$ and $A^{1'}$ are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are C;

$$A^3 = A^2$$

is a divalent group containing 2 to 40 non-hydrogen atoms that links $A^1$ to the E-bonded aryl group via a 2-atom bridge, such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene (—$CH_2CH_2$—), substituted 1,2-ethylene, 1,2-vinylene (—HC=CH—), or substituted 1,2-vinylene, preferably $$A^3 = A^2$$

is a divalent hydrocarbyl group;

$$A^{2'} = A^{3'}$$

is a divalent group containing 2 to 40 non-hydrogen atoms that links $A^{1'}$ to the E'-bonded aryl group via a 2-atom bridge such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene (—CH₂CH₂—), substituted 1,2-ethylene, 1,2-vinylene (—HC═CH—), or substituted 1,2-vinylene, preferably $$A^{2'} = A^{3'}$$

is a divalent hydrocarbyl group;
each L is independently a Lewis base;
each X is independently an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group (preferably $R^{1'}$ and $R^1$ are independently a cyclic group, such as a cyclic tertiary alkyl group), or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;
any two X groups may be joined together to form a dianionic ligand group.

This invention is further related to catalyst compounds, and catalyst systems comprising such compounds, represented by the Formula (II):

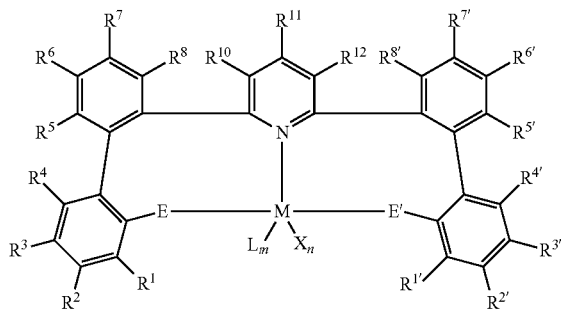

(II)

wherein:
M is a group 3, 4, 5, or 6 transition metal or a Lanthanide (such as Hf, Zr or Ti);
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;
each L is independently a Lewis base;
each X is independently an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;
any two X groups may be joined together to form a dianionic ligand group;
each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

The metal, M, is preferably selected from group 3, 4, 5, or 6 elements, more preferably group 4. Most preferably the metal, M, is zirconium or hafnium.

The donor atom Q of the neutral heterocyclic Lewis base (in Formula (I)) is preferably nitrogen, carbon, or oxygen. Preferred Q is nitrogen.

Non-limiting examples of neutral heterocyclic Lewis base groups include derivatives of pyridine, pyrazine, pyrimidine, triazine, thiazole, imidazole, thiophene, oxazole, thiazole, furan, and substituted variants of thereof. Preferred heterocyclic Lewis base groups include derivatives of pyridine, pyrazine, thiazole, and imidazole.

Each $A^1$ and $A^{1'}$ of the heterocyclic Lewis base (in formula I) are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are carbon. When Q is carbon, it is preferred that $A^1$ and $A^{1'}$ be selected from nitrogen and $C(R^{22})$. When Q is nitrogen, it is preferred that $A^1$ and $A^{1'}$ be carbon. It is preferred that Q=nitrogen, and $A^1$=$A^{1'}$=carbon. When Q is nitrogen or oxygen, is preferred that the heterocyclic Lewis base in Formula (I) not have any hydrogen atoms bound to the $A^1$ or $A^{1'}$ atoms. This is preferred because it is thought that hydrogens in those positions may undergo unwanted decomposition reactions that reduce the stability of the catalytically active species.

The heterocyclic Lewis base (of formula I) represented by $A^1QA^{1'}$ combined with the curved line joining $A^1$ and $A^{1'}$ is preferably selected from the following, with each $R^{23}$ group selected from hydrogen, heteroatoms, $C_1$-$C_{20}$ alkyls, $C_1$-$C_{20}$ alkoxides, $C_1$-$C_{20}$ amides, and $C_1$-$C_{20}$ substituted alkyls.

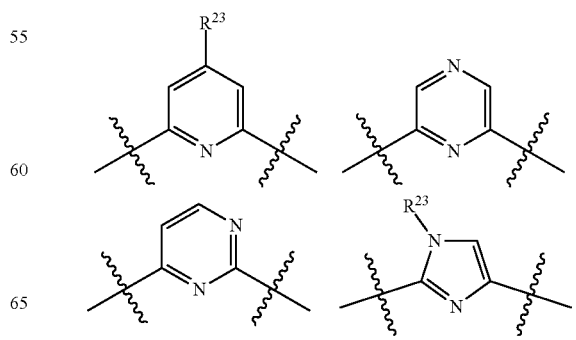

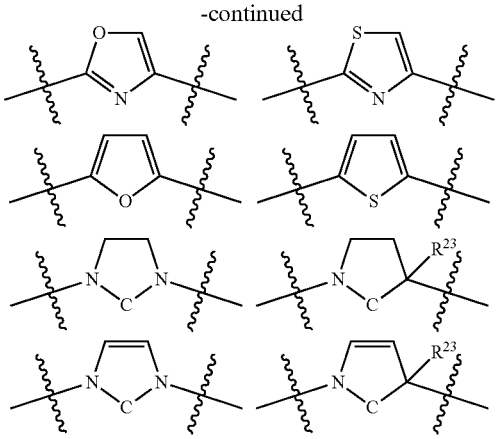

In some embodiments, the heterocyclic Lewis base (of Formula (I)) represented by $A^1QA^{1'}$ combined with the curved line joining $A^1$ and $A^{1'}$ is a six membered ring containing one ring heteroatom with Q being the ring heteroatom, or a five membered ring containing one or two ring heteroatoms but with Q being a ring carbon. Alternately, the heterocyclic Lewis base (of Formula (I)) represented by $A^1QA^{1'}$ combined with the curved line joining $A^1$ and $A^{1'}$ is not a five membered ring containing one or more ring heteroatoms with Q being a ring heteroatom.

In Formula (I) or (II), E and E' are each selected from oxygen or $NR^9$, where $R^9$ is independently hydrogen, $C_1$-$C_{40}$ hydrocarbyl, $C_1$-$C_{40}$ substituted hydrocarbyl, or a heteroatom-containing group. It is preferred that E and E' are oxygen. When E and/or E' are $NR^9$ it is preferred that $R^9$ be selected from $C_1$ to $C_{20}$ hydrocarbyls, alkyls, or aryls. In one embodiment E and E' are each selected from O, S, or N(alkyl) or N(aryl), where the alkyl is preferably a $C_1$ to $C_{20}$ alkyl, such as methyl, ethyl, propyl, butyl, pentyl, hexyl, octyl, nonyl, decyl, undecyl, dodceyl and the like, and aryl is a $C_6$ to $C_{40}$ aryl group, such as phenyl, naphthalenyl, benzyl, methylphenyl, and the like.

In embodiments,

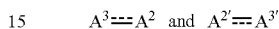

are independently a divalent hydrocarbyl group, such as $C_1$ to $C_{12}$ hydrocarbyl group.

In complexes of Formula (I) or (II), when E and E' are oxygen it is advantageous that each phenolate group be substituted in the position that is next to the oxygen atom (i.e. $R^1$ and $R^{1'}$ in Formula (I) or (II)). Thus, when E and E' are oxygen it is preferred that each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, more preferably, each of $R^1$ and $R^{1'}$ is independently a non-aromatic cyclic alkyl group with one or more five- or six-membered rings (such as cyclohexyl, cyclooctyl, adamantanyl, or 1-methylcyclohexyl, or substituted adamantanyl), most preferably a non-aromatic cyclic tertiary alkyl group (such as 1-methylcyclohexyl, adamantanyl, or substituted adamantanyl).

In some embodiments of the invention of Formula (I) or (II), each of $R^1$ and $R^{1'}$ is independently a tertiary hydrocarbyl group. In other embodiments of the invention of Formula (I) or (II), each of $R^1$ and $R^{1'}$ is independently a cyclic tertiary hydrocarbyl group. In other embodiments of the invention of Formula (I) or (II), each of $R^1$ and $R^{1'}$ is independently a polycyclic tertiary hydrocarbyl group.

In some embodiments of the invention of Formula (I) or (II), each of $R^1$ and $R^{1'}$ is independently a tertiary hydrocarbyl group. In other embodiments of the invention of Formula (I) or (II), each of $R^1$ and $R^{1'}$ is independently a cyclic tertiary hydrocarbyl group. In other embodiments of the invention of Formula (I) or (II), each of $R^1$ and $R^{1'}$ is independently a polycyclic tertiary hydrocarbyl group.

The linker groups (i.e.

in Formula (I)) are each preferably part of an ortho-phenylene group, preferably a substituted ortho-phenylene group. It is preferred for the $R^7$ and $R^{7'}$ positions of Formula (II) to be hydrogen, or $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as iospropyl, etc. For applications targeting polymers with high tacticity it is preferred for the $R^7$ and $R^{7'}$ positions of Formula (II) to be a $C_1$ to $C_{20}$ alkyl, most preferred for both $R^7$ and $R^{7'}$ to be a $C_1$ to $C_3$ alkyl.

In embodiments of Formula (I) herein, Q is C, N or O, preferably Q is N.

In embodiments of Formula (I) herein, $A^1$ and $A^{1'}$ are independently carbon, nitrogen, or $C(R^{22})$, with $R^{22}$ selected from hydrogen, $C_1$-$C_{20}$ hydrocarbyl, $C_1$-$C_{20}$ substituted hydrocarbyl. Preferably $A^1$ and $A^{1'}$ are carbon.

In embodiments of Formula (I) herein, $A^1QA^{1'}$ in Formula (I) is part of a heterocyclic Lewis base, such as a pyridine, pyrazine, pyrimidine, triazine, thiazole, imidazole, thiophene, oxazole, thiazole, furan, or a substituted variant of thereof.

In embodiments of Formula (I) herein, $A^1QA^{1'}$ are part of a heterocyclic Lewis base containing 2 to 20 non-hydrogen atoms that links $A^2$ to $A^{2'}$ via a 3-atom bridge with Q being the central atom of the 3-atom bridge. Preferably each $A^1$ and $A^{1'}$ is a carbon atom and the $A^1QA^{1'}$ fragment forms part of a pyridine, pyrazine, pyrimidine, triazine, thiazole, imidazole, thiophene, oxazole, thiazole, furan, or a substituted variant of thereof group, or a substituted variant thereof.

In one embodiment of Formula (I) herein, Q is carbon, and each $A^1$ and $A^{1'}$ is N or $C(R^{22})$, where $R^{22}$ is selected from hydrogen, $C_1$-$C_{20}$ hydrocarbyl, $C_1$-$C_{20}$ substituted hydrocarbyl, a heteroatom or a heteroatom-containing group. In this embodiment, the $A^1QA^{1'}$ fragment forms part of a cyclic carbene, N-heterocyclic carbene, cyclic amino alkyl carbene, or a substituted variant of thereof group, or a substituted variant thereof.

In embodiments of Formula (I) herein,

is a divalent group containing 2 to 20 non-hydrogen atoms that links $A^1$ to the E-bonded aryl group via a 2-atom bridge, where the $A^3 \equiv A^2$ is a linear alkyl or forms part of a cyclic group (such as an optionally substituted ortho-phenylene group, or ortho-arylene group) or a substituted variant thereof.

$A^{2'} \equiv A^{3'}$ is a divalent group containing 2 to 20 non-hydrogen atoms that links $A^{1'}$ to the E'-bonded aryl group via a 2-atom bridge, where the $A^{2'} \equiv A^{3'}$ is a linear alkyl or forms part of a cyclic group (such as an optionally substituted ortho-phenylene group, or ortho-arylene group or, or a substituted variant thereof.

In embodiments of the invention herein, in Formula (I) and (II), M is a group 4 metal, such as Hf or Zr.

In embodiments of the invention herein, in Formula (I) and (II), E and E' are O.

In embodiments of the invention herein, in Formula (I) and (II), $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, preferably hydrogen, methyl, ethyl, propyl, butyl, pentyl, hexyl, or an isomer thereof.

In embodiments of the invention herein, in Formula (I) and (II), $R^1$, $R^2$, $R^3$, $R^4$, $R^{1'}$, $R^{2'}$, $R^{3'}$, $R^{4'}$, and $R^9$ are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (I) and (II), $R^4$ and $R^{4'}$ is independently hydrogen or a $C_1$ to $C_3$ hydrocarbyl, such as methyl, ethyl or propyl.

In embodiments of the invention herein, in Formula (I) and (II), $R^9$ is hydrogen, $C_1$-$C_{40}$ hydrocarbyl, $C_1$-$C_{40}$ substituted hydrocarbyl, or a heteroatom-containing group, preferably hydrogen, methyl, ethyl, propyl, butyl, pentyl, hexyl, or an isomer thereof. Preferably $R^9$ is methyl, ethyl, propyl, butyl, $C_1$ to $C_6$ alkyl, phenyl, 2-methylphenyl, 2,6-dimethylphenyl, or 2,4,6-trimethylphenyl.

In embodiments of the invention herein, in Formula (I) and (II), each X is, independently, selected from the group consisting of hydrocarbyl radicals having from 1 to 20 carbon atoms (such as alkyls or aryls), hydrides, amides, alkoxides, sulfides, phosphides, halides, alkyl sulfonates, and a combination thereof, (two or more X's may form a part of a fused ring or a ring system), preferably each X is independently selected from halides, aryls, and $C_1$ to $C_5$ alkyl groups, preferably each X is independently a hydrido, dimethylamido, diethylamido, methyltrimethylsilyl, neopentyl, phenyl, benzyl, methyl, ethyl, propyl, butyl, pentyl, fluoro, iodo, bromo, or chloro group.

Alternatively, each X may be, independently, a halide, a hydride, an alkyl group, an alkenyl group or an arylalkyl group.

In embodiments of the invention herein, in Formula (I) and (II), each L is a Lewis base, independently, selected from the group consisting of ethers, thio-ethers, amines, nitriles, imines, pyridines, halocarbons, and phosphines, preferably ethers and thioethers, and a combination thereof, optionally two or more L's may form a part of a fused ring or a ring system, preferably each L is independently selected from ether and thioether groups, preferably each L is a ethyl ether, tetrahydrofuran, dibutyl ether, or dimethylsulfide group.

In embodiments of the invention herein, in Formula (I) and (II), R1 and R1' are independently cyclic tertiary alkyl groups.

In embodiments of the invention herein, in Formula (I) and (II), n is 1, 2 or 3, typically 2.

In embodiments of the invention herein, in Formula (I) and (II), m is 0, 1 or 2, typically 0.

In embodiments of the invention herein, in Formula (I) and (II), $R^1$ and $R^{1'}$ are not hydrogen.

In embodiments of the invention herein, in Formula (I) and (II), M is Hf or Zr, E and E' are O; each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, each $R^2$, $R^3$, $R^4$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; each X is, independently, selected from the group consisting of hydrocarbyl radicals having from 1 to 20 carbon atoms (such as alkyls or aryls), hydrides, amides, alkoxides, sulfides, phosphides, halides, and a combination thereof, (two or more X's may form a part of a fused ring or a ring system); each L is, independently, selected from the group consisting of ethers, thioethers, and halo carbons (two or more L's may form a part of a fused ring or a ring system).

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, $C_1$-$C_{40}$ hydrocarbyl, $C_1$-$C_{40}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, methyl, ethyl, propyl, butyl, pentyl, hexyl, or an isomer thereof.

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (II), M is Hf or Zr, E and E' are O; each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, each $R^1$, $R^2$, $R^3$, $R^4$, $R^{1'}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; $R^9$ is hydrogen, $C_1$-$C_{20}$ hydrocarbyl, $C_1$-$C_{20}$ substituted hydrocarbyl, or a heteroatom-containing group, such as hydrogen, methyl, ethyl, propyl, butyl, pentyl, hexyl, or an isomer thereof;

each X is, independently, selected from the group consisting of hydrocarbyl radicals having from 1 to 20 carbon atoms (such as alkyls or aryls), hydrides, amides, alkoxides, sulfides, phosphides, halides, dienes, amines, phosphines, ethers, and a combination thereof, (two or more X's may form a part of a fused ring or a ring system); n is 2; m is 0; and each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, $C_1$-$C_{20}$ hydrocarbyl, $C_1$-$C_{20}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, such as each of $R^5$, $R^6$, $R^7$, $R^8$, $R^{5'}$, $R^{6'}$, $R^{7'}$, $R^{8'}$, $R^{10}$, $R^{11}$ and $R^{12}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthyl, cyclohexyl, cyclohexenyl, methylcyclohexyl, and isomers thereof.

Preferred embodiment of Formula (I) is M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

Preferred embodiment of Formula (I) is M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

Preferred embodiment of Formula (I) is M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

Preferred embodiment of Formula (II) is M is Zr or Hf, both E and E' are oxygen, and both $R^1$ and $R^{1'}$ are $C_4$-$C_{20}$ cyclic tertiary alkyls.

Preferred embodiment of Formula (II) is M is Zr or Hf, both E and E' are oxygen, and both $R^1$ and $R^{1'}$ are adamantan-1-yl or substituted adamantan-1-yl.

Preferred embodiment of Formula (II) is M is Zr or Hf, both E and E' are oxygen, and each of $R^1$, $R^{1'}$, $R^3$ and $R^{3'}$ are adamantan-1-yl or substituted adamantan-1-yl.

Preferred embodiment of Formula (II) is M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

Catalyst compounds that are particularly useful in this invention include one or more of: dimethylzirconium[2',2'''-(pyridine-2,6-diyl)bis(3-adamantan-1-yl)-5-(tert-butyl)-[1,1'-biphenyl]-2-olate)], dimethylhafnium[2',2'''-(pyridine-2,6-diyl)bis(3-adamantan-1-yl)-5-(tert-butyl)-[1,1'-biphenyl]-2-olate)], dimethylzirconium[6,6'-(pyridine-2,6-diylbis(benzo[b]thiophene-3,2-diyl))bis(2-adamantan-1-yl)-4-methylphenolate)], dimethylhafnium[6,6'-(pyridine-2,6-diylbis(benzo[b]thiophene-3,2-diyl))bis(2-adamantan-1-yl)-4-methylphenolate)], dimethylzirconium[2',2'''-(pyridine-2,6-diyl)bis(3-((3r,5r,7r)-adamantan-1-yl)-5-methyl-[1,1'-biphenyl]-2-olate)], dimethylhafnium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)], dimethylhafnium[2',2'''-(pyridine-2,6-diyl)bis(3-((3r,5r,7r)-adamantan-1-yl)-4',5-dimethyl-[1,1'-biphenyl]-2-olate)].

Catalyst compounds that are particularly useful in this invention include those represented by one or more of the formulas:

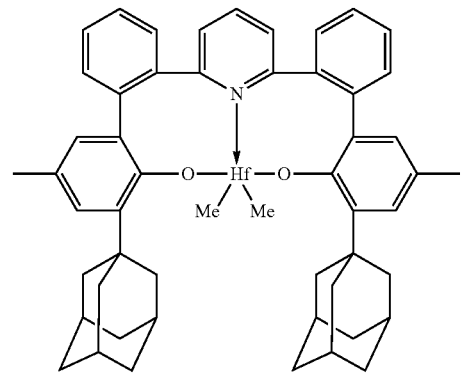

Complex 1

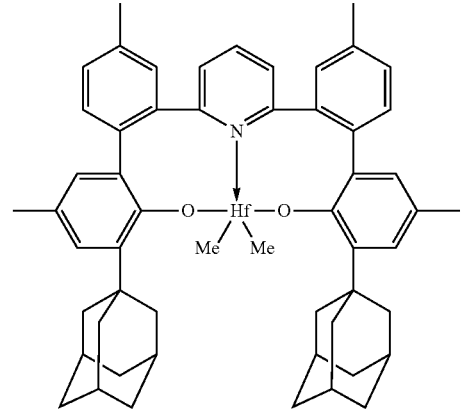

Complex 2

Complex 3
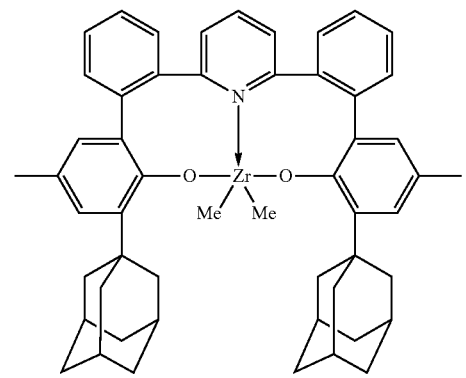
Complex 4
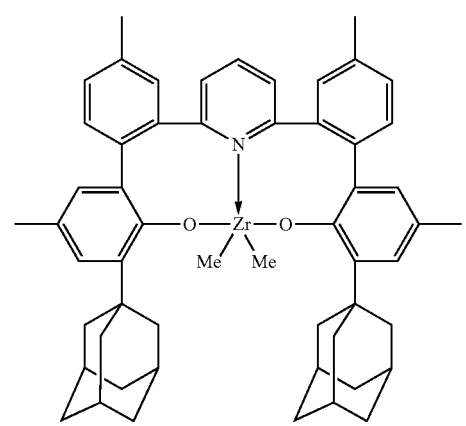
Complex 5
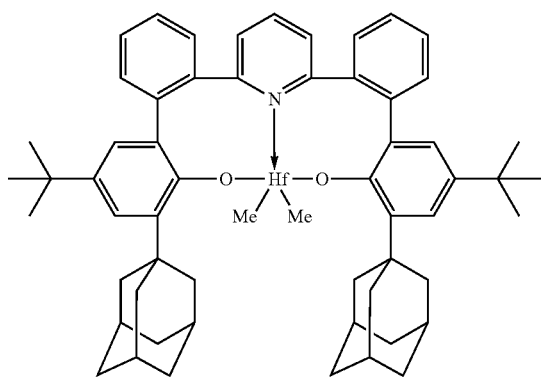
Complex 6
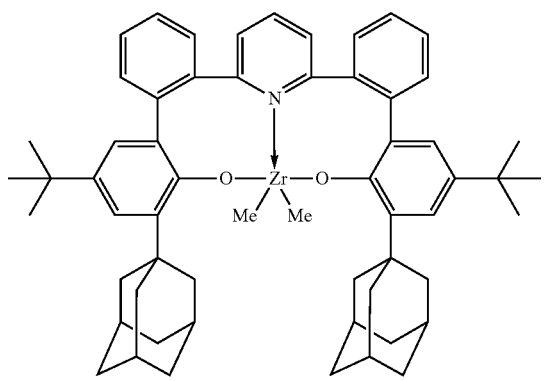
Complex 7
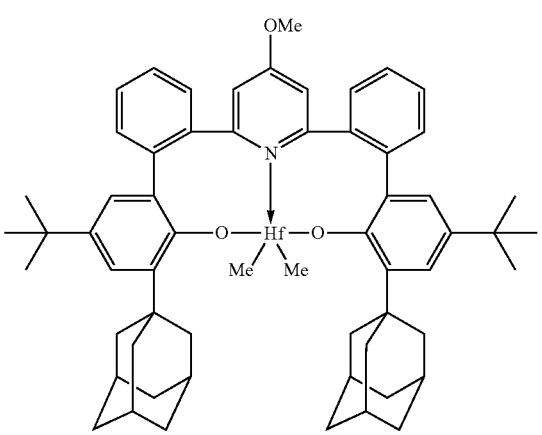
Complex 8
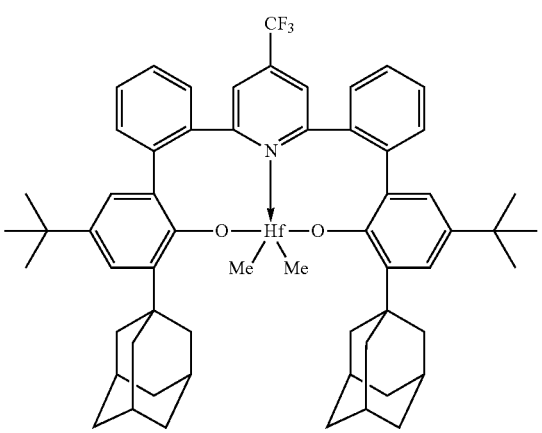
Complex 9
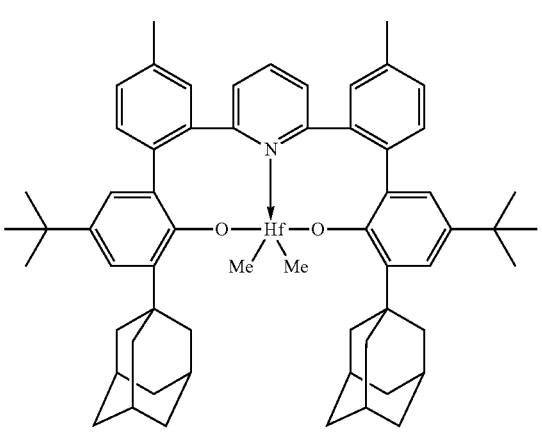

Complex 10
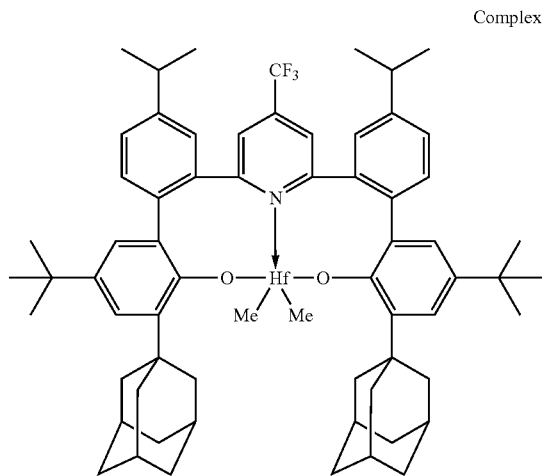
Complex 11
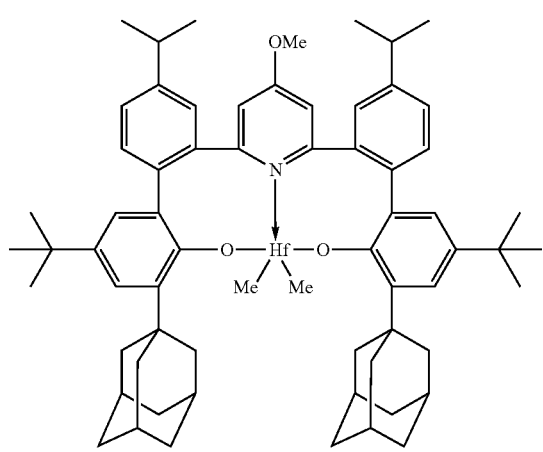
Complex 12
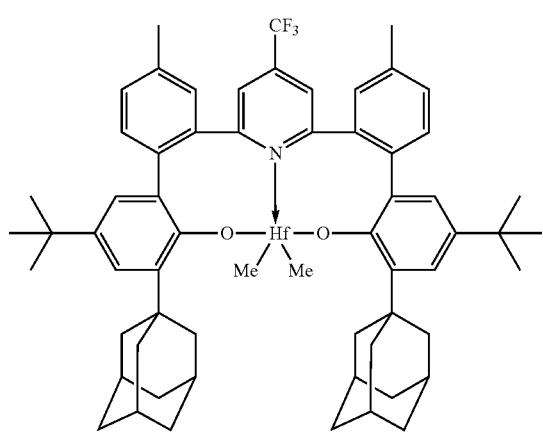
Complex 13
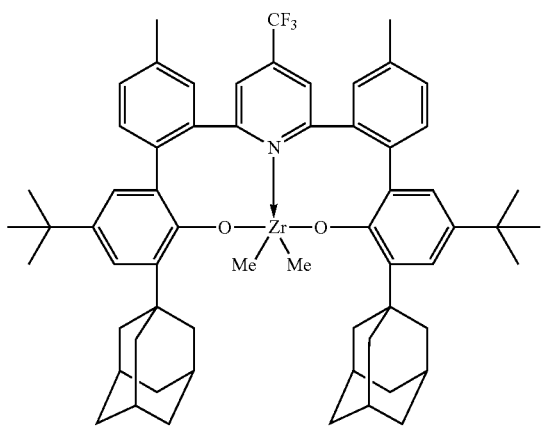
Complex 14
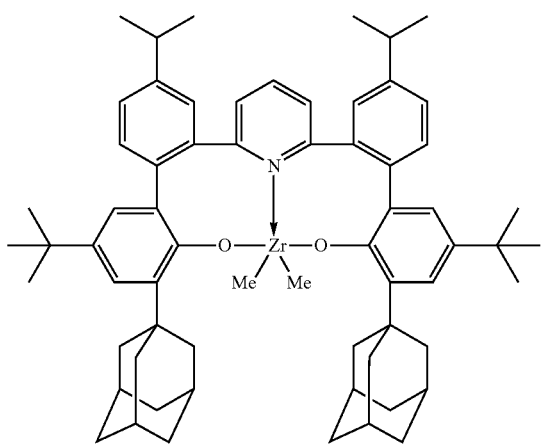
Complex 15
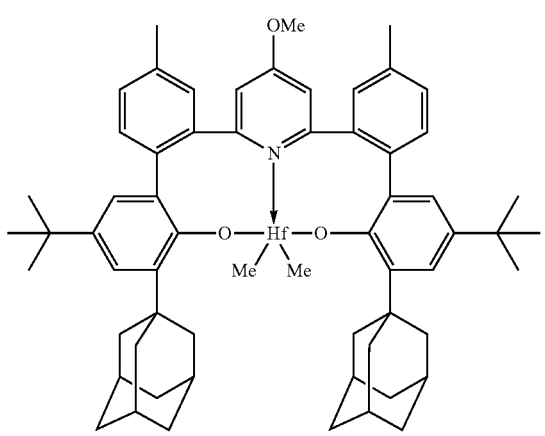

-continued
Complex 16
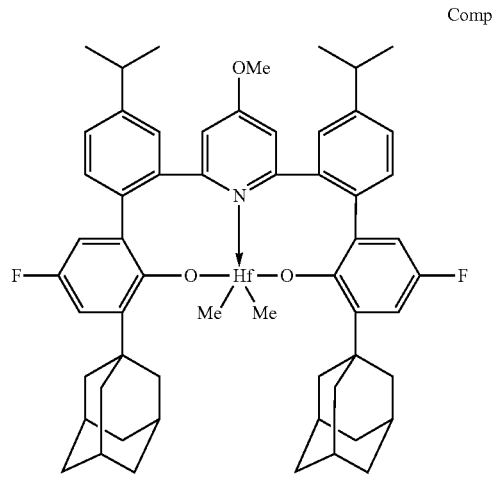
Complex 17
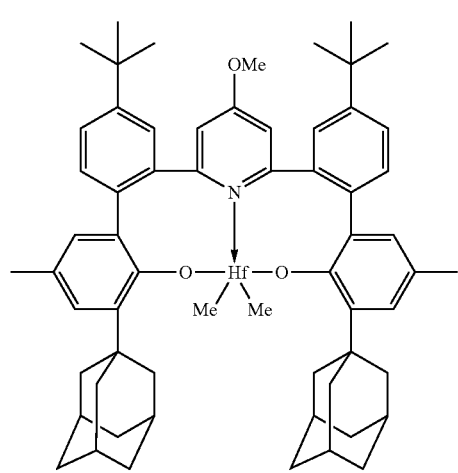
Complex 18
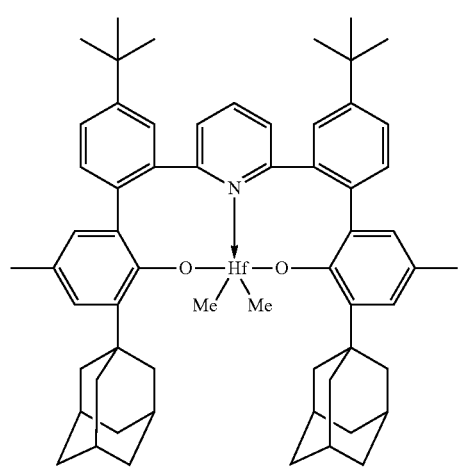
Complex 19
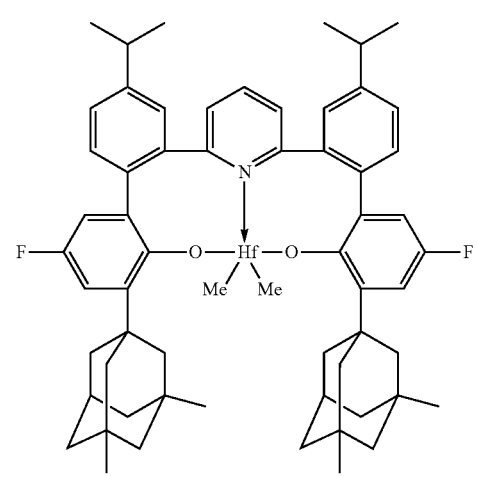
Complex 20
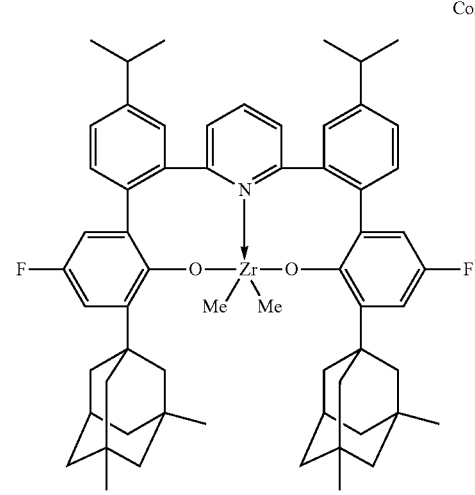
Complex 21
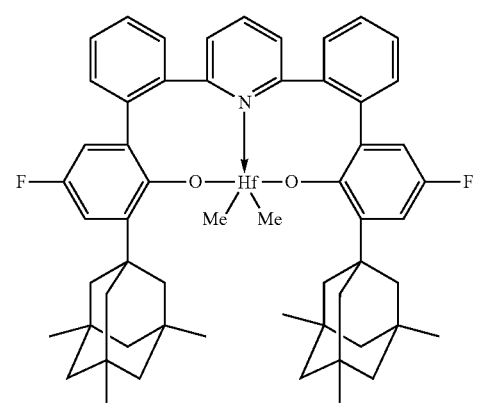

Complex 22
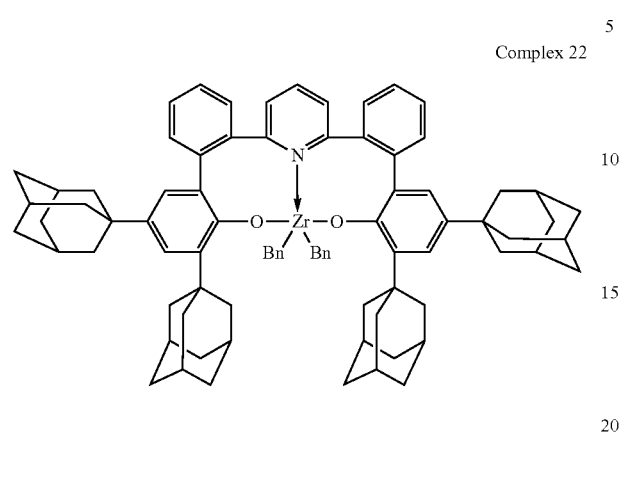
Complex 23
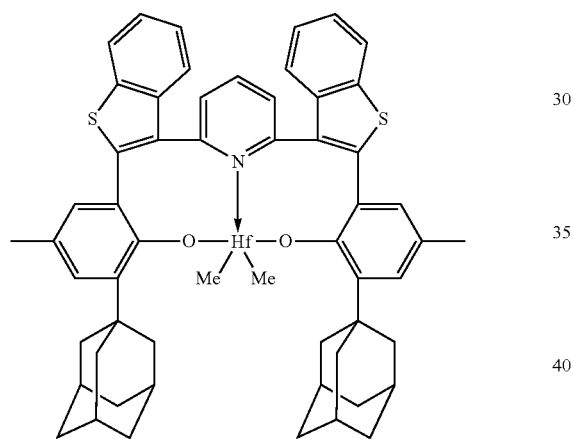
Complex 24
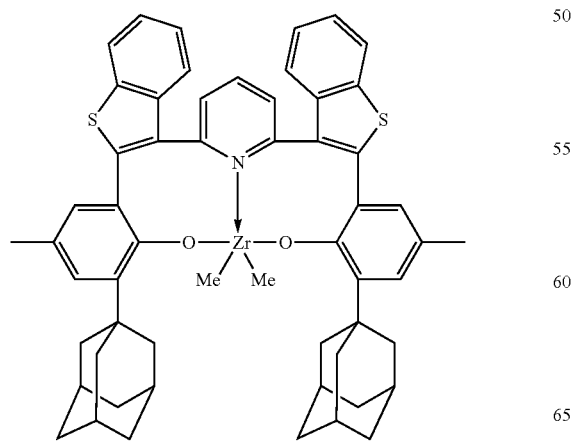
Complex 25
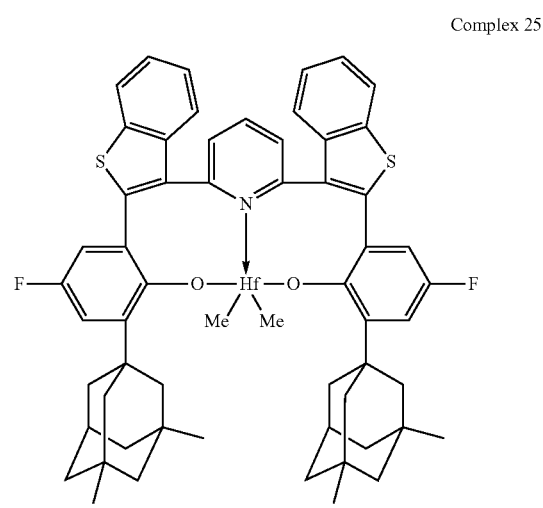
Complex 26
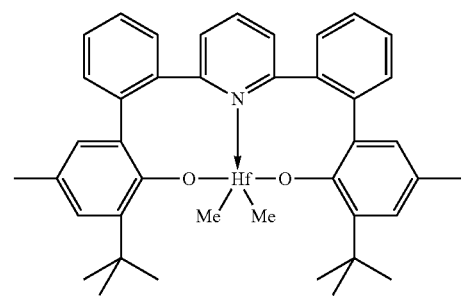
Complex 27
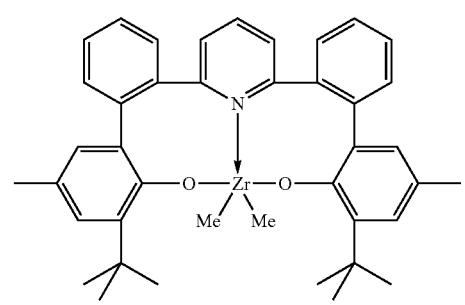
Complex 29
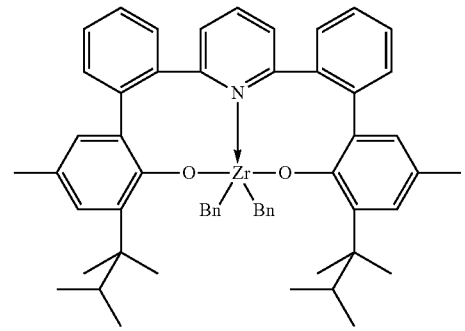

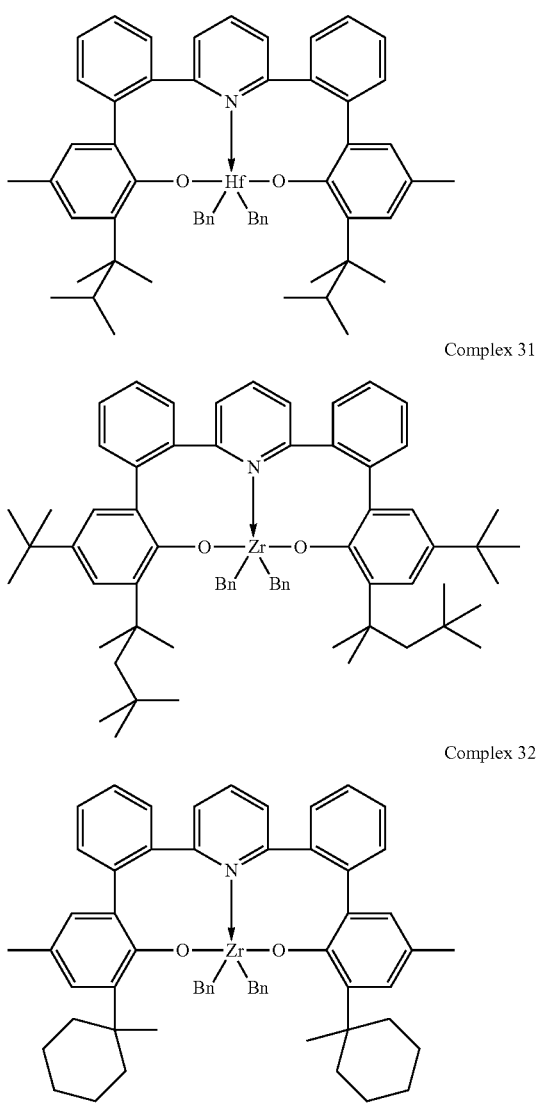

Complex 30

Complex 31

Complex 32

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an X group which is not a hydride, hydrocarbyl, or substituted hydrocarbyl, then the alumoxane can be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds
Ligand Synthesis

The bis(phenol) ligands may be prepared using the general methods shown in Scheme 1. The formation of the bis(phenol) ligand by the coupling of compound A with compound B (method 1) may be accomplished by known Pd- and Ni-catalyzed couplings, such as Negishi, Suzuki, or Kumada couplings. The formation of the bis(phenol) ligand by the coupling of compound C with compound D (method 2) may also be accomplished by known Pd- and Ni-catalyzed couplings, such as Negishi, Suzuki, or Kumada couplings. Compound D may be prepared from compound E by reaction of compound E with either an organolithium reagent or magnesium metal, followed by optional reaction with a main-group metal halide (e.g. ZnCl$_2$) or boron-based reagent (e.g. B(O$^i$Pr)$_3$, $^i$PrOB(pin)). Compound E may be prepared in a non-catalyzed reaction from by the reaction of an aryllithium or aryl Grignard reagent (compound F) with a dihalogenated arene (compound G), such as 1-bromo-2-chlorobenzene. Compound E may also be prepared in a Pd- or Ni-catalyzed reaction by reaction of an arylzinc or arylboron reagent (compound F) with a dihalogenated arene (compound G).

Scheme 1

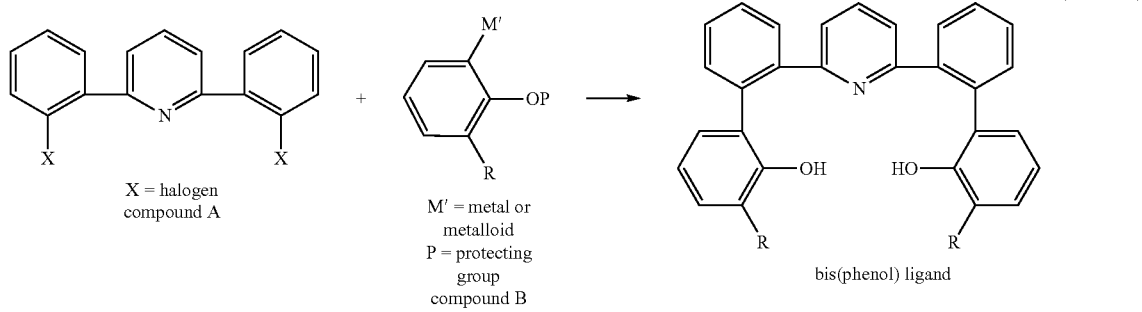

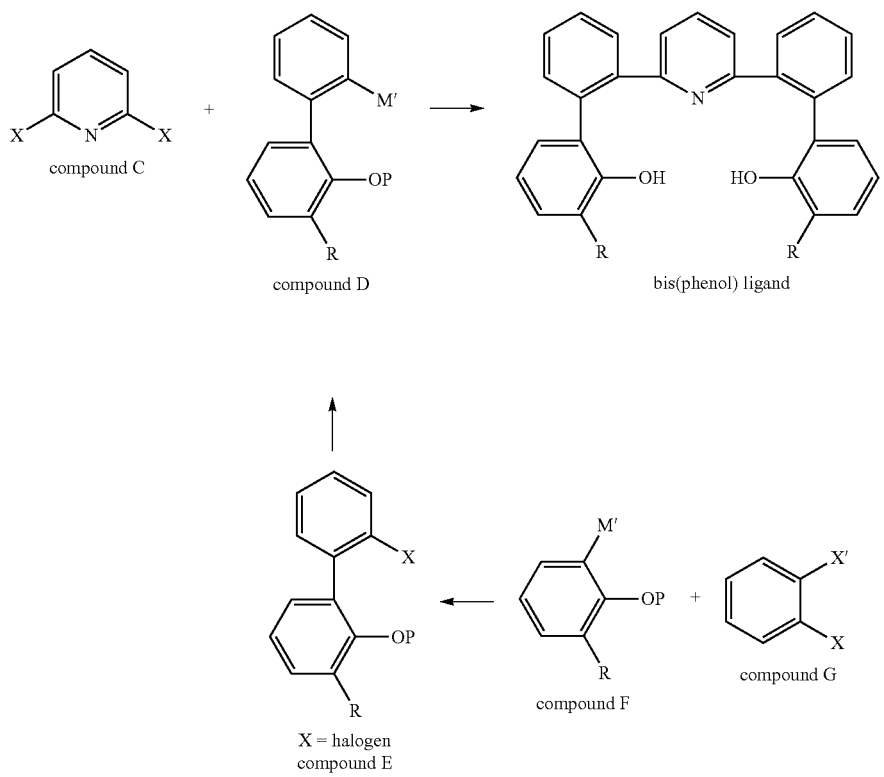

compound C + compound D → bis(phenol) ligand (method 2)

compound E (X = halogen) ← compound F + compound G where M' is a group 1, 2, 12, or 13 element or substituted element such as Li, MgCl, MgBr, ZnCl, B(OH)$_2$, B(pinacolate), P is a protective group such as methoxymethyl (MOM), tetrahydropyranyl (THP), t-butyl, allyl, ethoxymethyl, trialkylsilyl, t-butyldimethylsilyl, or benzyl, R is a $C_1$-$C_{40}$ alkyl, substituted alkyl, aryl, tertiary alkyl, cyclic tertiary alkyl, adamantanyl, or substituted adamantanyl and each X' and X is halogen, such as Cl, Br, F or I. It is preferred that the bis(phenol) ligand and intermediates used for the preparation of the bis(phenol) ligand are prepared and purified without the use of column chromatography. This may be accomplished by a variety of methods that include distillation, precipitation and washing, formation of insoluble salts (such as by reaction of a pyridine derivative with an organic acid), and liquid-liquid extraction. Preferred methods include those described in Practical Process Research and Development—A Guide for Organic Chemists by Neal C. Anderson (ISBN: 1493300125X).

Synthesis of Carbene bis(phenol) Ligands

The general synthetic method to produce carbene bis(phenol) ligands is shown in Scheme 2. A substituted phenol can be ortho-brominated then protected by a known phenol protecting group, such as MOM, THP, t-butyldimethylsilyl (TBDMS), benzyl (Bn), etc. The bromide is then converted to a boronic ester (compound I) or boronic acid which can be used in a Suzuki coupling with bromoaniline. The biphenylaniline (compound J) can be bridged by reaction with dibromoethane or condensation with oxalaldehyde, then deprotected (compound K). Reaction with triethyl orthoformate forms an iminium salt that is deprotonated to a carbene.

Scheme 2

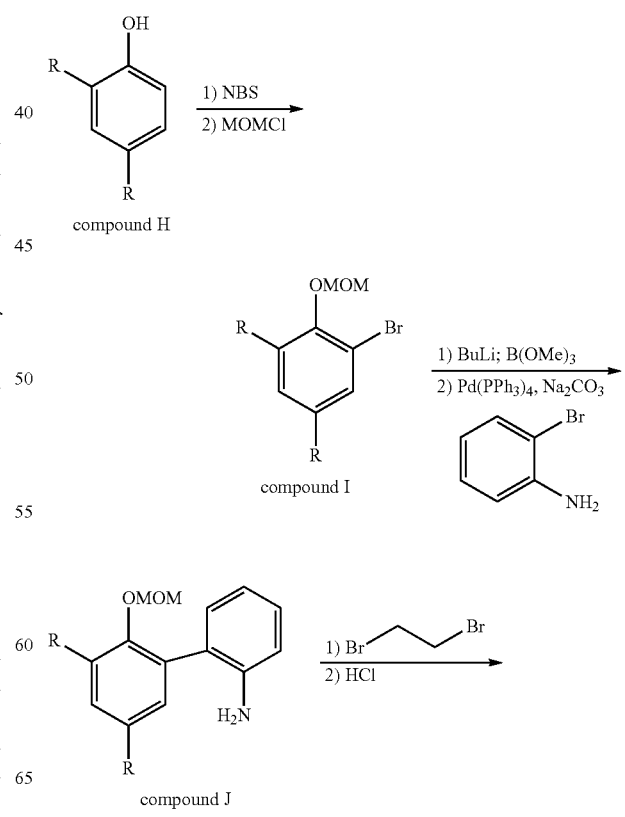

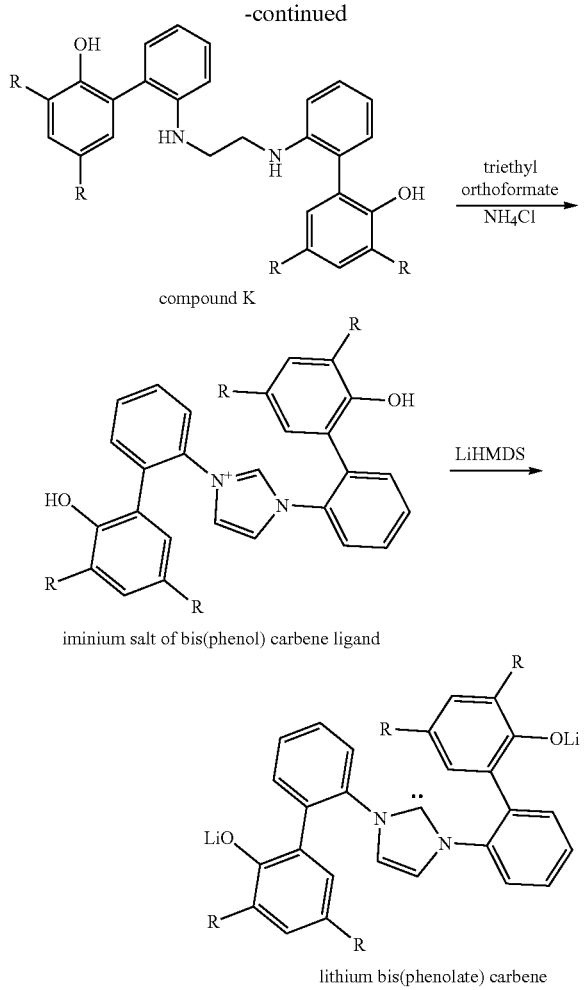

compound K iminium salt of bis(phenol) carbene ligand lithium bis(phenolate) carbene The substituted phenol (compound H) dissolved in methylene chloride, is added an equivalent of N-bromosuccinimide and 0.1 equivalent of diisopropylamine. After stirring at ambient temperature until completion, the reaction is quenched with a 10% solution of HCl. The organic portion is washed with brine, dried over magnesium sulfate, filtered, and concentrated under reduced pressure to give a bromophenol, typically as a solid. The substituted bromophenol, methoxymethylchloride, and potassium carbonate are dissolved in dry acetone and stirred at ambient temperature until completion of the reaction. The solution is filtered and the filtrate concentrated to give protected phenol (compound I). Alternatively, the substituted bromophenol and an equivalent of dihydropyran is dissolved in methylene chloride and cooled to 0° C. A catalytic amount of para-toluenesulfonic acid is added and the reaction stirred for 10 minutes, then quenched with trimethylamine. The mixture is washed with water and brine, then dried over magnesium sulfate, filtered, and concentrated under reduced pressure to give a tetrahydropyran-protected phenol.

Aryl bromide (compound I) is dissolved in THF and cooled to −78° C. n-Butyllithium is added slowly, followed by trimethoxy borate. The reaction is allowed to stir at ambient temperature until completion. The solvent is removed and the solid boronic ester washed with pentane. A boronic acid can be made from the boronic ester by treatment with HCl. The boronic ester or acid is dissolved in toluene with an equivalent of ortho-bromoaniline and a catalytic amount of palladium tetrakistriphenylphosphine. An aqueous solution of sodium carbonated is added and the reaction heated at reflux overnight. Upon cooling, the layers are separated and the aqueous layer extracted with ethyl acetate. The combined organic portions are washed with brine, dried (MgSO4), filtered, and concentrated under reduced pressure. Column chromatography is typically used to purify the coupled product (compound J).

The aniline (compound J) and dibromoethane (0.5 equiv.) are dissolved in acetonitrile and heated at 60° C. overnight. The reaction is filtered and concentrated to give an ethylene bridged dianiline. The protected phenol is deprotected by reaction with HCl to give a bridged bisamino(biphenyl)ol (compound K).

The diamine (compound K) is dissolved in triethylorthoformate. Ammonium chloride is added and the reaction heated at reflux overnight. A precipitate is formed which is collected by filtration and washed with ether to give the iminium salt. The iminium chloride is suspended in THF and treated with lithium or sodium hexamethyldisilylamide. Upon completion, the reaction is filtered and the filtrate concentrated to give the carbene ligand.

Preparation of bis(phenolate) Complexes

Transition metal or Lanthanide metal bis(phenolate) complexes are used as catalyst components for olefin polymerization in the present invention. The terms "catalyst" and "catalyst complex" are used interchangeably. The preparation of transition metal or Lanthanide metal bis(phenolate) complexes may be accomplished by reaction of the bis(phenol) ligand with a metal reactant containing anionic basic leaving groups. Typical anionic basic leaving groups include dialkylamido, benzyl, phenyl, hydrido, and methyl. In this reaction, the role of the basic leaving group is to deprotonate the bis(phenol) ligand. Suitable metal reactants for this type of reaction include, but are not limited to, HfBn$_4$ (Bn=CH$_2$Ph), ZrBn$_4$, TiBn$_4$, ZrBn$_2$Cl$_2$(OEt$_2$), HfBn$_2$Cl$_2$(OEt$_2$)$_2$, Zr(NMe$_2$)$_2$Cl$_2$(dimethoxyethane), Hf(NMe$_2$)$_2$Cl$_2$(dimethoxyethane), Hf(NMe$_2$)$_4$, Zr(NMe$_2$)$_4$, and Hf(NEt$_2$)$_4$. Suitable metal reagents also include ZrMe$_4$, HfMe$_4$, and other group 4 alkyls that may be formed in situ and used without isolation.

A second method for the preparation of transition metal or Lanthanide bis(phenolate) complexes is by reaction of the bis(phenol) ligand with an alkali metal or alkaline earth metal base (e.g., Na, BuLi, $^i$PrMgBr) to generate deprotonated ligand, followed by reaction with a metal halide (e.g., HfCl$_4$, ZrCl$_4$) to form a bis(phenolate) complex. Bis(phenoate) metal complexes that contain metal-halide, alkoxide, or amido leaving groups may be alkylated by reaction with organolithium, Grignard, and organoaluminum reagents. In the alkylation reaction the alkyl groups are transferred to the bis(phenolate) metal center and the leaving groups are removed. Reagents typically used for the alkylation reaction include, but are not limited to, MeLi, MeMgBr, AlMe$_3$, Al($^i$Bu)$_3$, AlOct$_3$, and PhCH$_2$MgCl. Typically 2 to 20 molar equivalents of the alkylating reagent are added to the bis(phenolate) complex. The alkylations are generally performed in etherial or hydrocarbon solvents or solvent mixtures at temperatures typically ranging from −80° C. to 120° C.

Activators

The terms "cocatalyst" and "activator" are used herein interchangeably.

The catalyst systems described herein typically comprises a catalyst complex, such as the transition metal or Lanthanide bis(phenolate) complexes described above, and an activator such as alumoxane or a non-coordinating anion.

These catalyst systems may be formed by combining the catalyst components described herein with activators in any manner known from the literature. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, ionizing activators, which may be neutral or ionic, and conventional-type cocatalysts. Preferred activators typically include alumoxane compounds, modified alumoxane compounds, and ionizing anion precursor compounds that abstract a reactive metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), typically the maximum amount of activator is at up to a 5,000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl) boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (III):

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3 (such as 1, 2 or 3), preferably Z is (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl. The anion component $A^{d-}$ includes those having the formula [$M^{k+}Q_n$]$^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable $A^{d-}$ also include diboron compounds as disclosed in U.S. Pat. No. 5,447,895, which is fully incorporated herein by reference.

When Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_{d+}[Mt^{k+}Q_n]^{d-} \quad (V)$$

wherein:
E is nitrogen or phosphorous;
d is 1, 2 or 3; k is 1, 2, or 3; n is 1, 2, 3, 4, 5, or 6; n−k=d (preferably d is 1, 2 or 3; k is 3; n is 4, 5, or 6);
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups,
wherein $R^{1'}$, $R^{2'}$, and $R^{3'}$ together comprise 15 or more carbon atoms;
Mt is an element selected from group 13 of the Periodic Table of the Elements, such as B or Al; and
each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

$$[R^{1'}R^{2'}R^{3'}EH]^+[BR^{4'}R^{5'}R^{6'}R^{7'}] \quad (VI)$$

wherein: E is nitrogen or phosphorous; $R^{1'}$ is a methyl group; $R^{2'}$ and $R^{3'}$ are independently is $C_4$-$C_{50}$ hydrocarbyl group optionally substituted with one or more alkoxy groups, silyl groups, a halogen atoms, or halogen containing groups wherein $R^{2'}$ and $R^{3'}$ together comprise 14 or more carbon atoms; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

(VII)

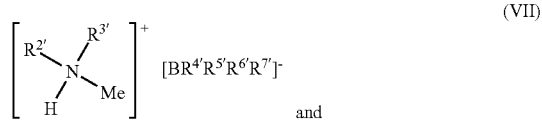

and

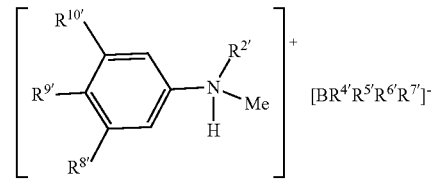

(VIII)

wherein:
N is nitrogen;
$R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms;
$R^{8'}$, $R^{9'}$, and $R^{10'}$ are independently a $C_4$-$C_{30}$ hydrocarbyl or substituted $C_4$-$C_{30}$ hydrocarbyl group;
B is boron;
and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII), or (VIII) herein, $R^{4'}$, $R^{5'}$, $R^{6'}$, and $R^{7'}$ are pentafluorophenyl.

Optionally, in any of Formulas (V), (VI), (VII), or (VIII) herein, $R^{4'}$, $R^{5'}$, $R^{6'}$, and $R^{7'}$ are pentafluoronaphthalenyl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternately when Q is a substituted phenyl group, then $R^{2'}$ is not a $C_1$-$C_{40}$ linear alkyl group, preferably $R^{2'}$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$ is not methyl, $R^{2'}$ is not $C_{18}$ alkyl and $R^{3'}$ is not $C_{18}$ alkyl, alternately $R^{1'}$ is not methyl, $R^{2'}$ is not $C_{18}$ alkyl and $R^{3'}$ is not Cis alkyl and at least one Q is not substituted phenyl, optionally all Q are not substituted phenyl.

Useful cation components in Formulas (III) and (V) to (VIII) include those represented by the formula:

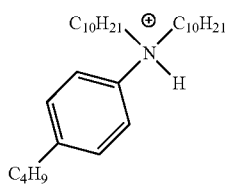

10

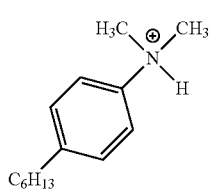

11

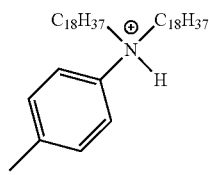

12

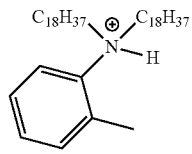

13

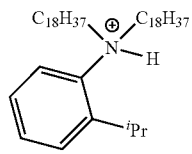

14

15

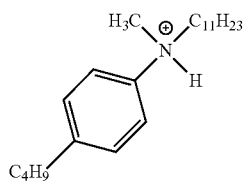

16

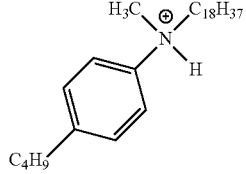

17

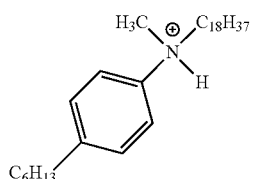

18

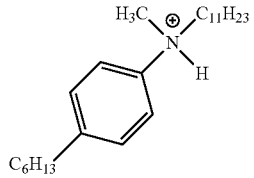

19

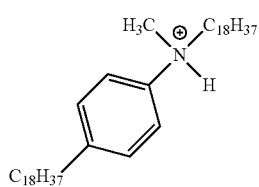

20

-continued
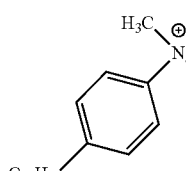 21
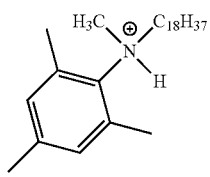 22
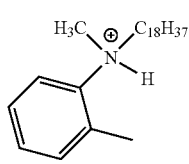 23
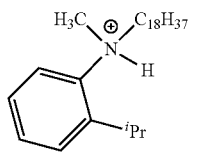 24
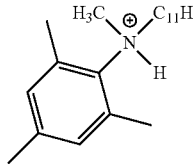 25
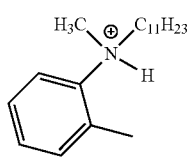 26
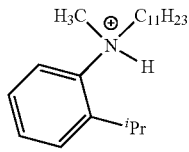 27
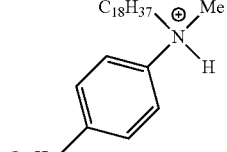 28
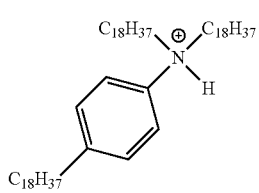 29
-continued
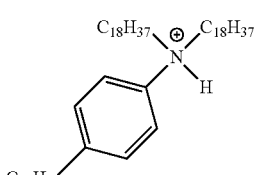 30
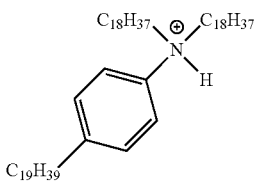 31
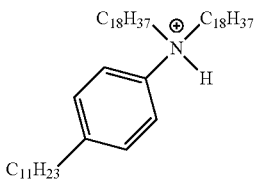 32
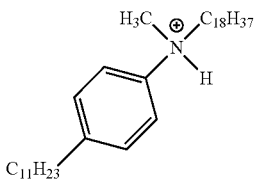 33
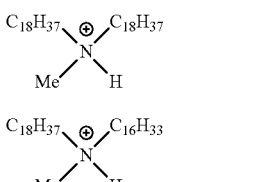 34
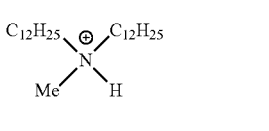 35
36
Useful cation components in Formulas (III) and (V) to (VIII) include those represented by the formulas:
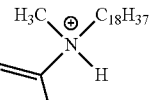 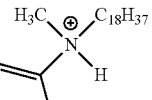,
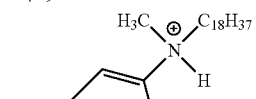, 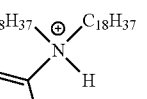,
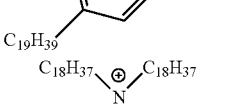  and
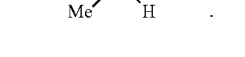 .

The anion component of the activators described herein includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the provision that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphth-2-yl)borate.

In one embodiment, the borate activator comprises tetrakis(pentafluorophenyl)borate.

Anions for use in the non-coordinating anion activators described herein also include those represented by formula 7, below:

Formula 7

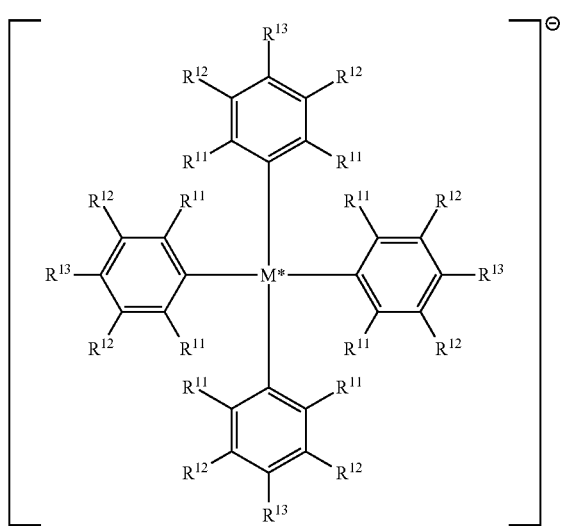

wherein:

M* is a group 13 atom, preferably B or Al, preferably B;

each $R^{11}$ is, independently, a halide, preferably a fluoride;

each $R^{12}$ is, independently, a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{12}$ is a fluoride or a perfluorinated phenyl group;

each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;

wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE A

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | MV Per subst. $V_s$ (Å³) | Calculated Total MV (Å³) |
|---|---|---|---|---|
| tetrakis(perfluorophenyl)borate | 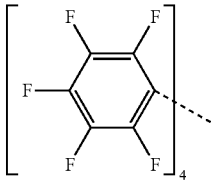 | $C_6F_5$ | 22 | 183 | 732 |
| tris(perfluorophenyl)(perfluoronaphthalenyl)borate | 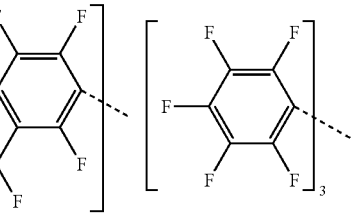 | $C_6F_5$<br>$C_{10}F_7$ | 22<br>34 | 183<br>261 | 810 |
| (perfluorophenyl)tris(perfluoronaphthalenyl)borate | 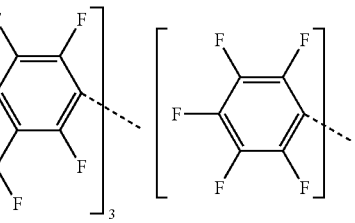 | $C_6F_5$<br>$C_{10}F_7$ | 22<br>34 | 183<br>261 | 966 |
| tetrakis(perfluoronaphthalenyl)borate | 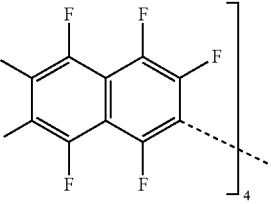 | $C_{10}F_7$ | 34 | 261 | 1044 |
| tetrakis(perfluorobiphenyl)borate | 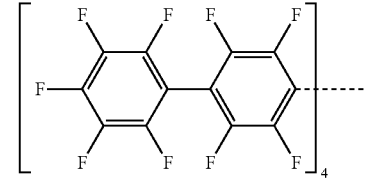 | $C_{12}F_9$ | 42 | 349 | 1396 |
| $[(C_6F_3(C_6F_5)_2)_4B]$ | 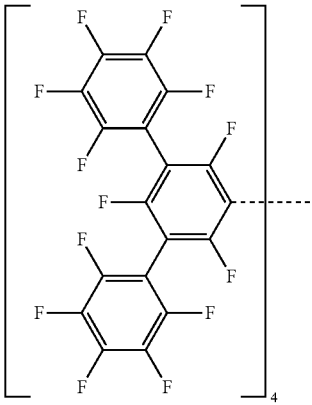 | $C_{18}F_{13}$ | 62 | 515 | 2060 |

The activators may be added to a polymerization in the form of an ion pair using, for example, [M2HTH]+ [NCA]– in which the di(hydrogenated tallow)methylamine ("M2HTH") cation reacts with a basic leaving group on the transition metal complex to form a transition metal complex cation and [NCA]–. Alternatively, the transition metal complex may be reacted with a neutral NCA precursor, such as $B(C_6F_5)_3$, which abstracts an anionic group from the complex to form an activated species. Useful activators include di(hydrogenated tallow)methylammonium[tetrakis(pentafluorophenyl)borate] (i.e., [M2HTH]$B(C_6F_5)_4$) and di(octadecyl)tolylammonium [tetrakis(pentafluorophenyl)borate] (i.e., [DOdTH]$B(C_6F_5)_4$).

Activator compounds that are particularly useful in this invention include one or more of:

N,N-di(hydrogenated tallow)methylammonium [tetrakis (perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl) borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl) borate],
N-methyl-N-hexadecylanilinium [tetrakis(perfluorophenyl) borate],
N-methyl-N-tetradecylanilinium [tetrakis(perfluorophenyl) borate],
N-methyl-N-dodecylanilinium [tetrakis(perfluorophenyl) borate],
N-methyl-N-decylanilinium [tetrakis(perfluorophenyl)borate], and
N-methyl-N-octylanilinium [tetrakis(perfluorophenyl)borate].

Additional useful activators and the synthesis non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred activators for use herein also include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalenyl)borate, N,N-dimethylanilinium tetrakis(perfluoronaphthalenyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl) phenyl)borate, triphenylcarbenium tetrakis(perfluoronaphthalenyl)borate, triphenylcarbenium tetrakis(perfluorobiphenyl)borate, triphenylcarbenium tetrakis(3,5-bis (trifluoromethyl)phenyl)borate, triphenylcarbenium tetrakis (perfluorophenyl)borate, [Me$_3$NH$^+$][B(C$_6$F$_5$)$_4^-$]; 1-(4-(tris (pentafluorophenyl)borate)-2,3,5,6-tetrafluorophenyl) pyrrolidinium; and tetrakis(pentafluorophenyl)borate, 4-(tris (pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthalenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthalenyl)borate, N,N-dialkylanilinium tetrakis(perfluoronaphthalenyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 (the disclosures of which are incorporated herein by reference in their entirety) which discuss the use of an alumoxane in combination with an ionizing activator).

Optional Scavengers, Co-Activators, Chain Transfer Agents

In addition to activator compounds, scavengers or co-activators may be used. A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Co-activators can include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used as scavengers to deactivate impurities in feed or reactors.

Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and dialkyl zinc, such as diethyl zinc.

Chain transfer agents may be used in the compositions and or processes described herein. Useful chain transfer agents are typically hydrogen, alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, trimethylaluminum, triisobutylaluminum, trioctylaluminum, or a combination thereof.

Polymerization Processes

For the polymerization processes described herein, the term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira et al. (2000) *Ind. Eng. Chem. Res.*, v. 29, page 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

In embodiments herein, the invention relates to polymerization processes where monomer (such as propylene), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, cyclopentene, cycloheptene, cyclooctene, cyclododecene, substituted derivatives thereof, and isomers thereof, preferably hexene, heptene, octene, nonene, decene, dodecene, cyclooctene, 5-methylcyclopentene, cyclopentene, norbornene, 5-ethylidene-2-norbornene, and their respective homologs and derivatives.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_5$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from non-conjugated diene monomers. More preferably, the diolefin monomers are linear di-vinyl monomers, most preferably those containing from 5 to 30 carbon atoms. Examples of preferred dienes include pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, divinylbenzene, and low molecular weight polybutadienes (Mw less than 1000 g/mol). Preferred cyclic dienes include cyclopentadiene, vinylnorbornene, norbornadiene, and dicyclopentadiene.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is preferably a process where at least 90 wt % of the product is soluble in the reaction media.) A bulk homogeneous process is particularly preferred. (A bulk process is preferably a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In a some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the catalyst activity is at least 10,000 g/mmol/hour, preferably 100,000 or more g/mmol/hour, preferably 500,000 or more g/mmol/hr, preferably 1,000,000 or more g/mmol/hr, preferably 2,000,000 or more g/mmol/hr, preferably 5,000,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C., preferably 60 to 160° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1; 5) the polymerization preferably occurs in one reaction zone; 6) the catalyst activity is at least 10,000 g/mmol/hr (preferably at least 100,000 g/mmol/hr, preferably at least 200,000 g/mmol/hr, preferably at least 500,000 g/mmol/hr, preferably at least 1,000,000 g/mmol/hr, preferably at least 2,000,000 g/mmol/hr, preferably at least 5,000,000 g/mmol/hr); 7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof).

Polyolefin Products

This invention also relates to compositions of matter produced by the methods described herein. The processes described herein may be used to produce polymers of olefins or mixtures of olefins. Polymers that may be prepared include polyethylene, polypropylene, homopolymers of $C_4$-$C_{20}$ olefins, copolymers of $C_4$-$C_{20}$ olefins, copolymers of ethylene with $C_3$-$C_{20}$ olefins, copolymers of propylene with $C_4$-$C_{20}$ olefins, terpolymers of $C_4$-$C_{20}$ olefins, terpolymers of ethylene and propylene with $C_4$-$C_{20}$ olefins, and terpolymers of ethylene and propylene with 5-ethylidene-2-norbornene.

In a preferred embodiment, the process described herein produces propylene homopolymers or propylene copolymers, such as propylene-ethylene and/or propylene-alphaolefin (preferably $C_4$ to $C_{20}$) copolymers (such as propylene-hexene copolymers or propylene-octene copolymers) having a Mw/Mn of between 1 to 10 (preferably 2-5, preferably 2-4, preferably 2-3).

In a preferred embodiment, the polymers produced herein are copolymers of ethylene preferably having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mole % (alternately from 0.5 to 20 mole %, alternately from 1 to 15 mole %, preferably from 3 to 10 mole %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 to 15 mole % hexene, alternately 1 to 10 mole %.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Any of the foregoing polymers and compositions in combination with optional additives (see, for example, U.S. Patent Application Publication No. 2016/0060430, paragraphs [0082]-[0093]) may be used in a variety of end-use applications. Such end uses may be produced by methods known in the art. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags.

Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

In another embodiment, this invention relates to:
1. A catalyst compound represented by the Formula (I):

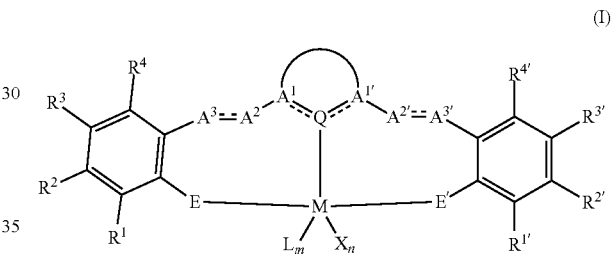

wherein:
M is a group 3, 4, 5, or 6 transition metal or a Lanthanide;
E and E' are each independently O, S, or NR$^9$ where R$^9$ is independently hydrogen, a C$_1$-C$_{40}$ hydrocarbyl, a C$_1$-C$_{40}$ substituted hydrocarbyl or a heteroatom-containing group;
Q is group 14, 15, or 16 atom that forms a dative bond to metal M;
A$^1$QA$^{1'}$ are part of a heterocyclic Lewis base containing 4 to 40 non-hydrogen atoms that links A$^2$ to A$^{2'}$ via a 3-atom bridge with Q being the central atom of the 3-atom bridge, A$^1$ and A$^{1'}$ are independently C, N, or C(R$^{22}$), where R$^{22}$ is selected from hydrogen, C$_1$-C$_{20}$ hydrocarbyl, C$_1$-C$_{20}$ substituted hydrocarbyl;

is a divalent group containing 2 to 40 non-hydrogen atoms that links A$^1$ to the E-bonded aryl group via a 2-atom bridge;

is a divalent group containing 2 to 40 non-hydrogen atoms that links A$^{1'}$ to the E'-bonded aryl group via a 2-atom bridge;
L is a Lewis base;
X is an anionic ligand;

n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, a $C_1$-$C_{40}$ hydrocarbyl, a $C_1$-$C_{40}$ substituted hydrocarbyl, a heteroatom or a heteroatom-containing group, and one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;
any two X groups may be joined together to form a dianionic ligand group.

2. The catalyst compound of formula 1 where the catalyst compound represented by the Formula (II):

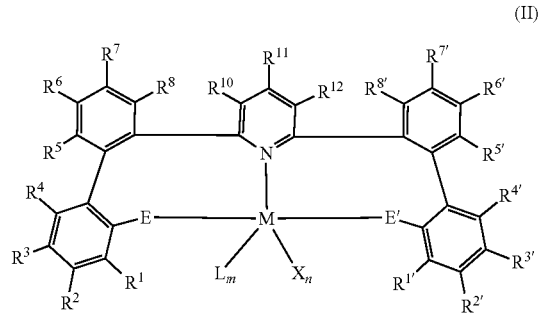

(II)

wherein:
M is a group 3, 4, 5, or 6 transition metal or a Lanthanide;
E and E' are each independently O, S, or $NR^9$, where $R^9$ is independently hydrogen, a $C_1$-$C_{40}$ hydrocarbyl, a $C_1$-$C_{40}$ substituted hydrocarbyl, or a heteroatom-containing group;
each L is independently a Lewis base;
each X is independently an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; any two L groups may be joined together to form a bidentate Lewis base;
an X group may be joined to an L group to form a monoanionic bidentate group;
any two X groups may be joined together to form a dianionic ligand group;
each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, a $C_1$-$C_{40}$ hydrocarbyl, a $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

3. The catalyst compound of paragraph 1 or 2 wherein the M is Hf, Zr or Ti.

4. The catalyst compound of paragraph 1, 2, or 3 wherein E and E' are each O.

5. The catalyst compound of paragraph 1, 2, 3, or 4 wherein $R^1$ and $R^{1'}$ is independently a $C_4$-$C_{40}$ tertiary hydrocarbyl group.

6. The catalyst compound of paragraph 1, 2, 3, 4, or 5 wherein $R^1$ and $R^{1'}$ is independently a $C_4$-$C_{40}$ cyclic tertiary hydrocarbyl group.

7. The catalyst compound of paragraph 1, 2, 3, 4, 5, or 6 wherein $R^1$ and $R^{1'}$ is independently a $C_4$-$C_{40}$ polycyclic tertiary hydrocarbyl group.

8. The catalyst compound any of paragraphs 1 to 7 wherein each X is, independently, selected from the group consisting of substituted or unsubstituted hydrocarbyl radicals having from 1 to 20 carbon atoms, hydrides, amides, alkoxides, sulfides, phosphides, halides, and a combination thereof, (two X's may form a part of a fused ring or a ring system).

9. The catalyst compound any of paragraphs 1 to 8 wherein each L is, independently, selected from the group consisting of: ethers, thioethers, amines, phosphines, ethyl ether, tetrahydrofuran, dimethylsulfide, triethylamine, pyridine, alkenes, alkynes, alenes, and carbenes and a combinations thereof, optionally two or more L's may form a part of a fused ring or a ring system).

10. The catalyst compound of paragraph 1, wherein M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

11. The catalyst compound of paragraph 1, wherein M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

12. The catalyst compound of paragraph 1, wherein M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

13. The catalyst compound of paragraph 1, wherein Q is nitrogen, $A^1$ and $A^{1'}$ are both carbon, both $R^1$ and $R^{1'}$ are hydrogen, both E and E' are $NR^9$, where $R^9$ is selected from a $C_1$-$C_{40}$ hydrocarbyl, a $C_1$-$C_{40}$ substituted hydrocarbyl, or a heteroatom-containing group.

14. The catalyst compound of paragraph 1, wherein Q is carbon, $A^1$ and $A^{1'}$ are both nitrogen, and both E and E' are oxygen.

15. The catalyst compound of paragraph 1, wherein Q is carbon, $A^1$ is nitrogen, $A^{1'}$ is $C(R^{22})$, and both E and E' are oxygen, where $R^{22}$ is selected from hydrogen, $C_1$-$C_{20}$ hydrocarbyl, $C_1$-$C_{20}$ substituted hydrocarbyl.

16. The catalyst compound of paragraph 1, wherein the heterocyclic Lewis base is selected from the groups represented by the following formulas:

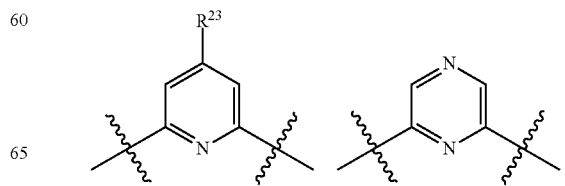

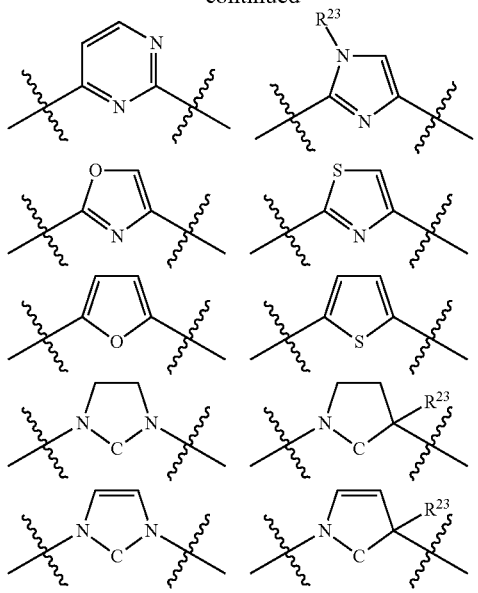

where each R²³ is independently selected from hydrogen, $C_1$-$C_{20}$ alkyls, and $C_1$-$C_{20}$ substituted alkyls.

17. The catalyst compound of paragraph 2, wherein M is Zr or Hf, both E and E' are oxygen, and both $R^1$ and $R^{1'}$ are $C_4$-$C_{20}$ cyclic tertiary alkyls.

18. The catalyst compound of paragraph 2, wherein M is Zr or Hf, both E and E' are oxygen, and both $R^1$ and $R^{1'}$ are adamantan-1-yl or substituted adamantan-1-yl.

19. The catalyst compound of paragraph 2, wherein M is Zr or Hf, both E and E' are oxygen, and each of $R^1$, $R^{1'}$, $R^3$ and $R^{3'}$ are adamantan-1-yl or substituted adamantan-1-yl.

20. The catalyst compound of paragraph 2, wherein M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

21. The catalyst compound of paragraph 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_{20}$ alkyls.

22. The catalyst compound of paragraph 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_3$ alkyls.

23. The catalyst compound of paragraph 1 wherein the catalyst compound is represented by one or more of the following formulas:

Complex 1

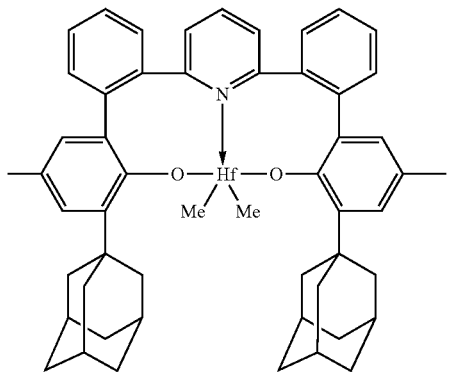

Complex 2

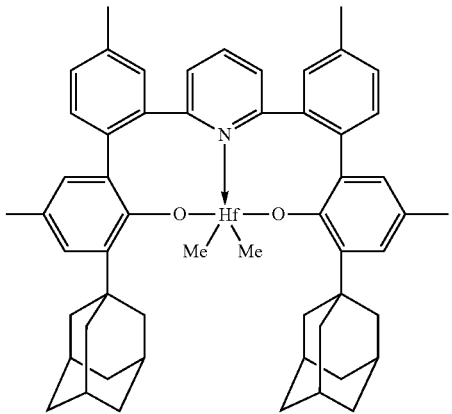

Complex 3

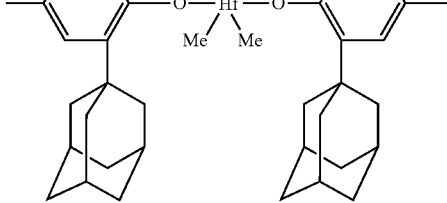

Complex 4

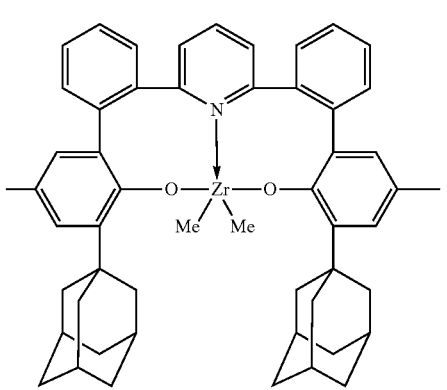

Complex 5

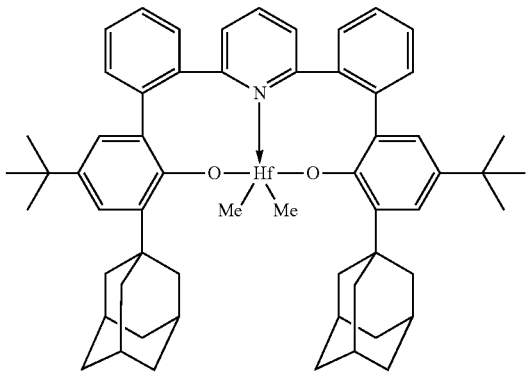

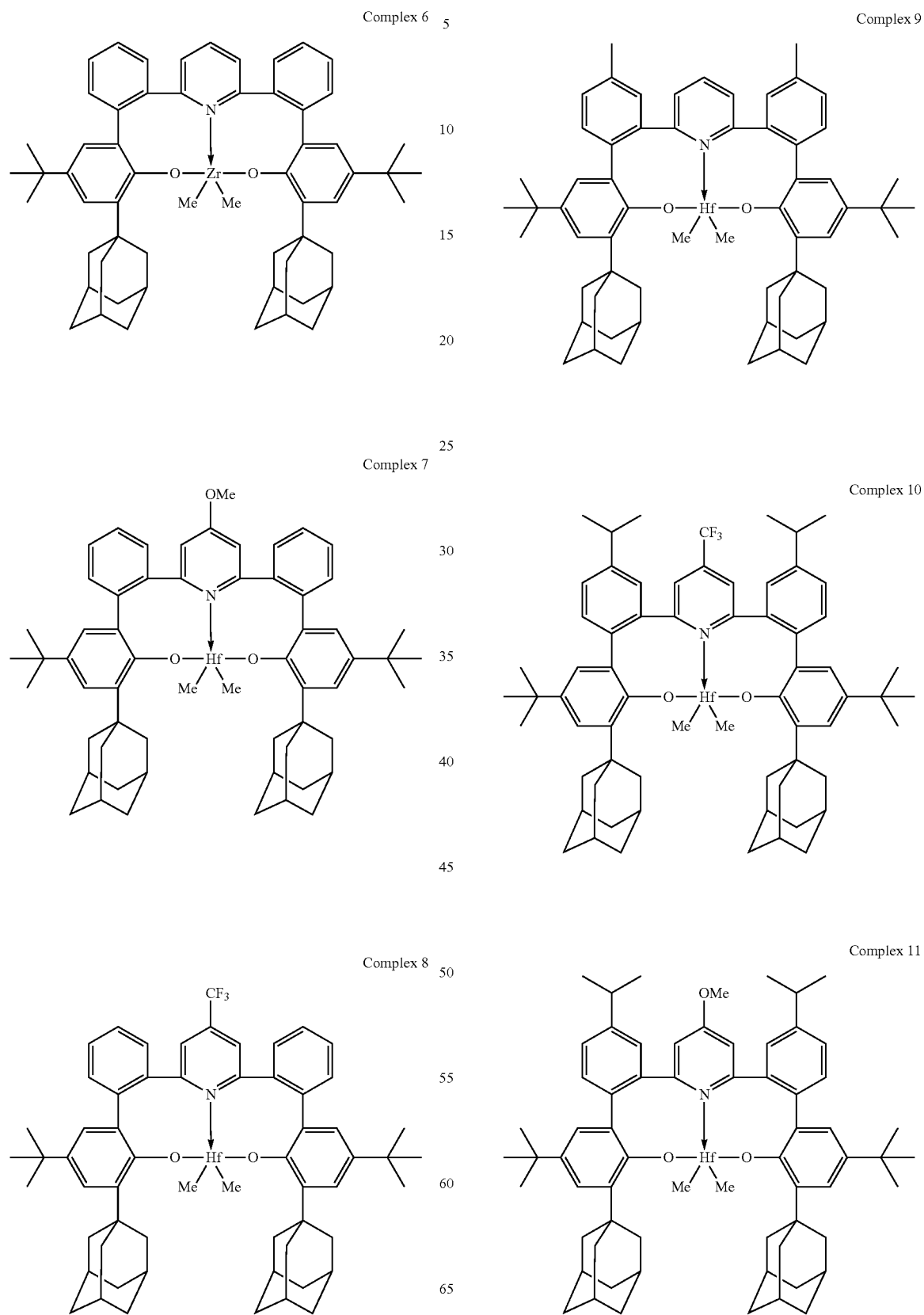

Complex 12
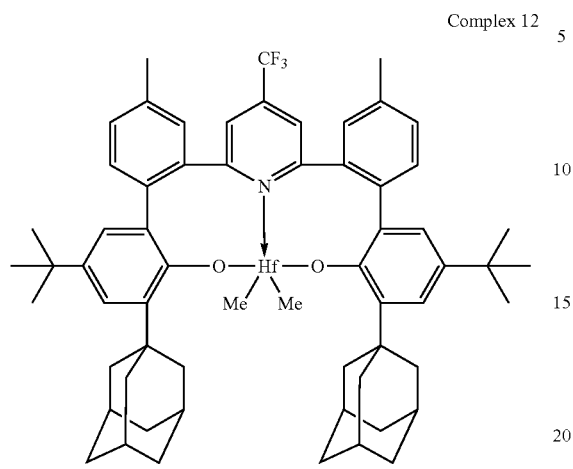
Complex 15
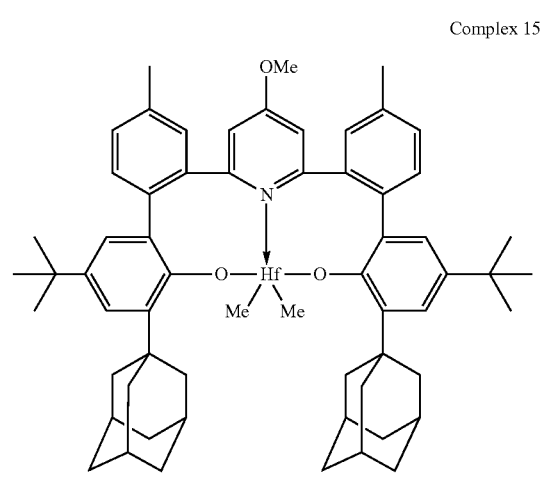
Complex 13
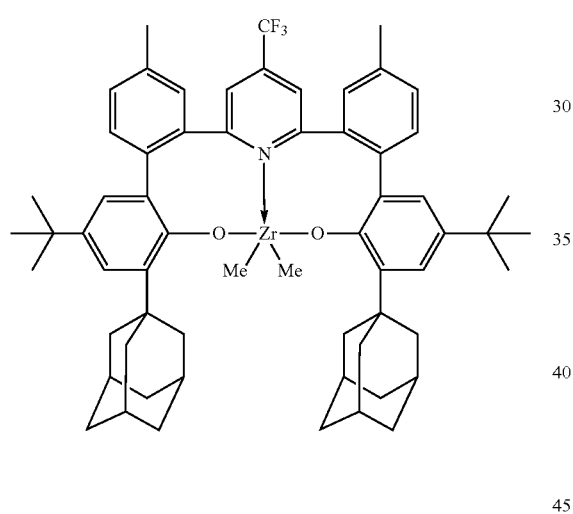
Complex 16
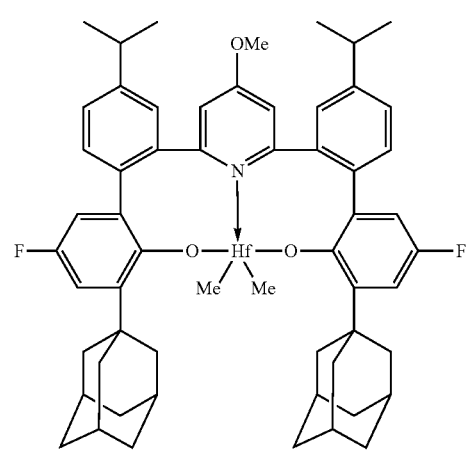
Complex 14
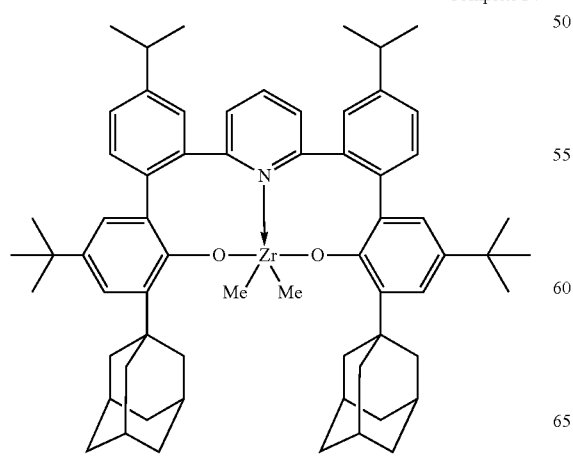
Complex 17
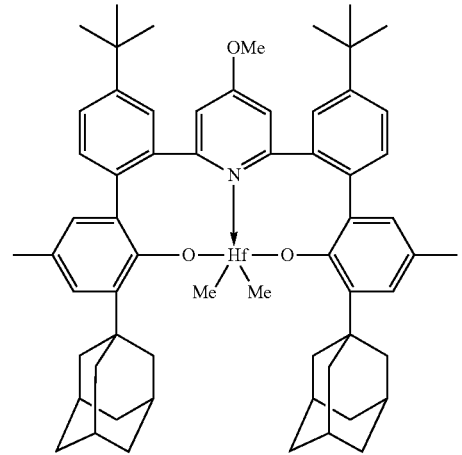

Complex 18
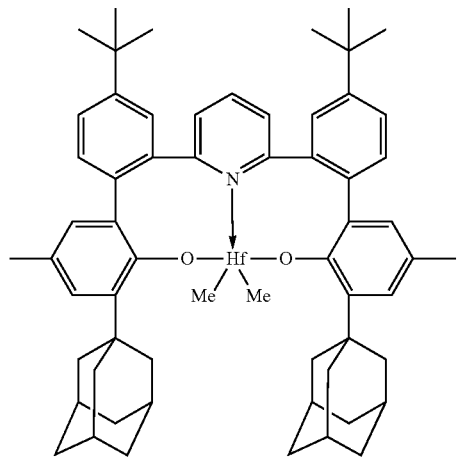
Complex 19
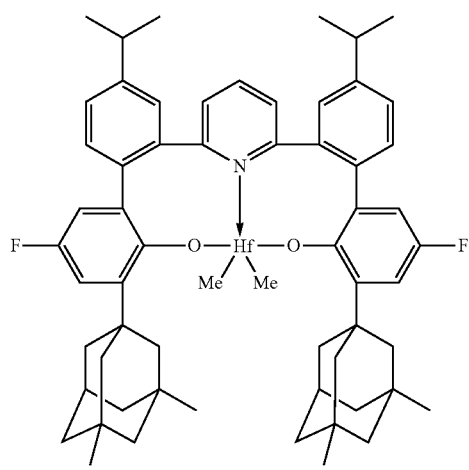
Complex 20
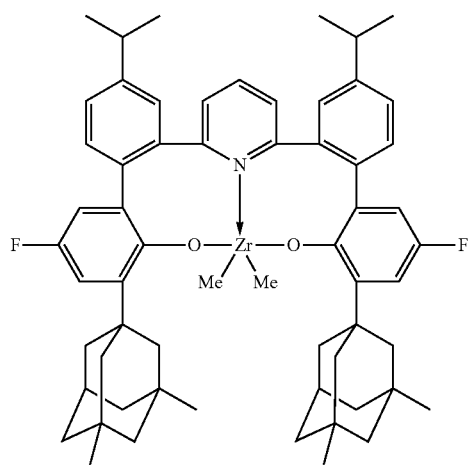
Complex 21
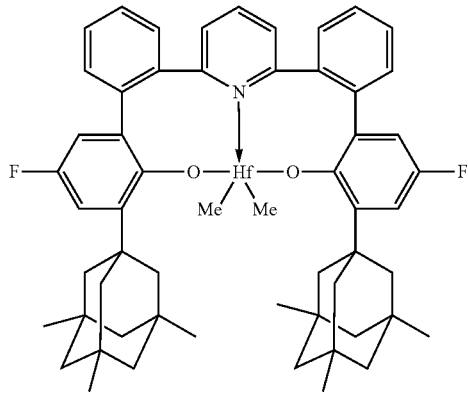
Complex 22
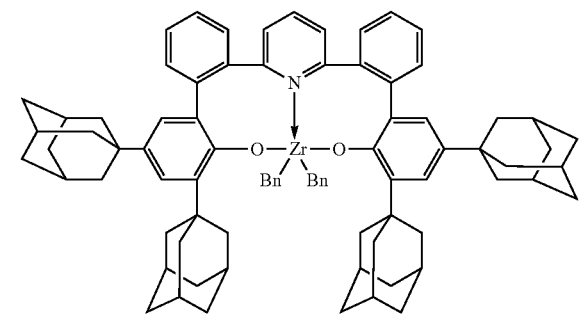
Complex 23
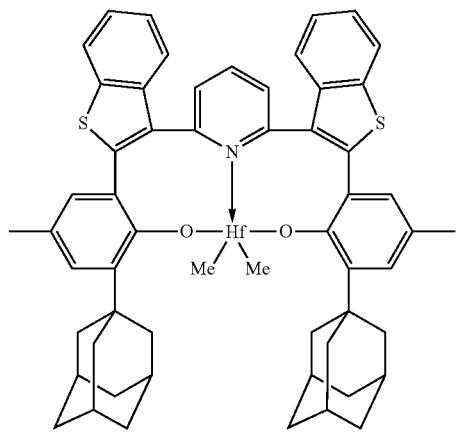
Complex 24
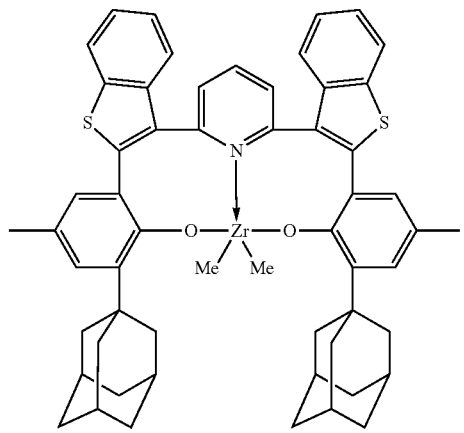

Complex 25
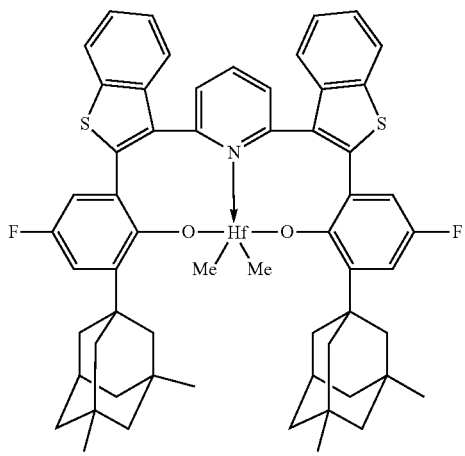

Complex 26
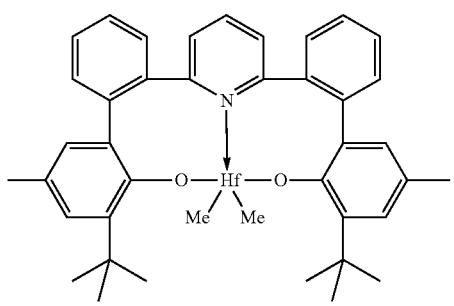

Complex 27
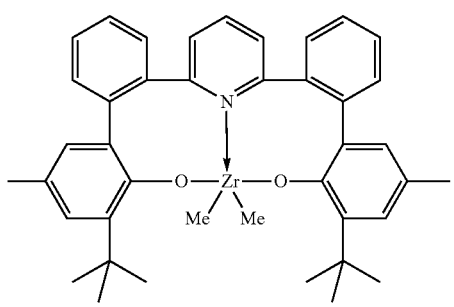

Complex 29
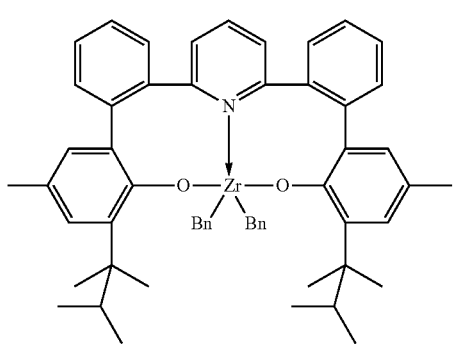

Complex 30
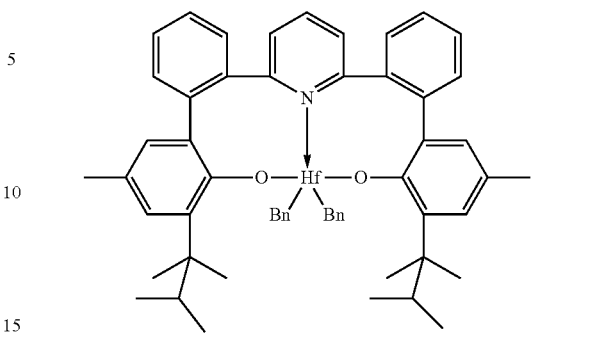

Complex 31
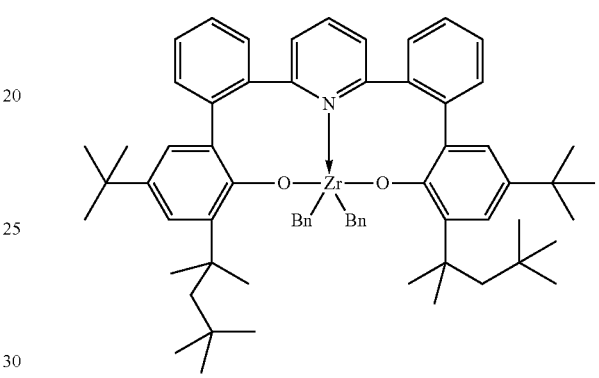

Complex 32
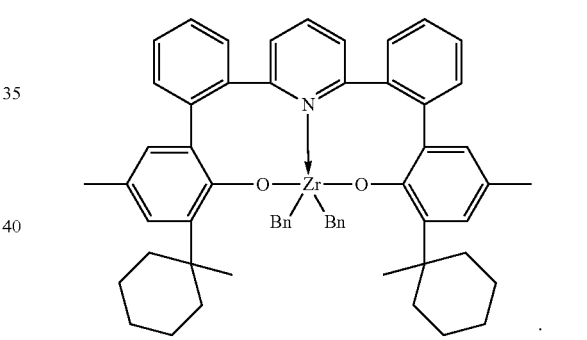

24. A catalyst system comprising activator and the catalyst compound of any of paragraphs 1 to 23.

25. The catalyst system of paragraph 24, wherein the activator comprises an alumoxane or a non-coordinating anion.

26. The catalyst system of paragraph 24, wherein the activator is soluble in non-aromatic-hydrocarbon solvent.

27. The catalyst system of paragraph 24, wherein the catalyst system is free of aromatic solvent.

28. The catalyst system of paragraph 24, wherein the activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3.

29. The catalyst system of paragraph 24, wherein the activator is represented by the formula:

$$[R^{1'}R^{2'}R^{3'}EH]_d{}^+[M t^{k+}Q_n]^{d-} \quad (V)$$

wherein: E is nitrogen or phosphorous; d is 1, 2 or 3; k is 1, 2, or 3; n is 1, 2, 3, 4, 5, or 6; n−k=d; R$^{1'}$, R$^{2'}$, and R$^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms; Mt is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

30. The catalyst system of paragraph 24, wherein the activator is represented by the formula:

$$(Z)_d^+(A^{d-})$$

wherein $A^{d-}$ is a non-coordinating anion having the charge d−; and d is an integer from 1 to 3 and $(Z)_d^+$ is represented by one or more of:

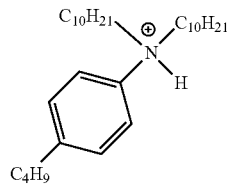

10

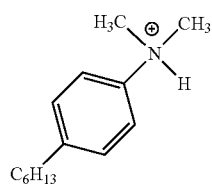

11

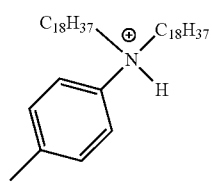

12

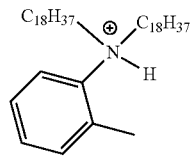

13

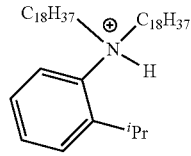

14

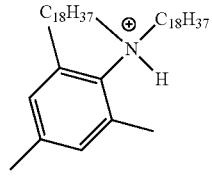

15

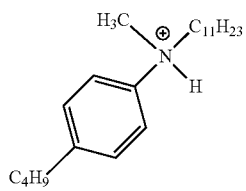

16

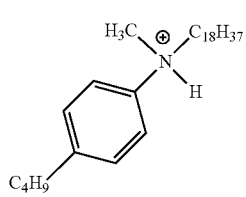

17

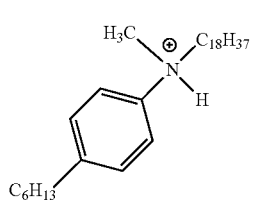

18

19

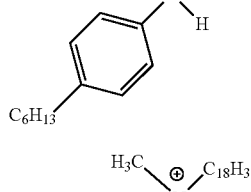

20

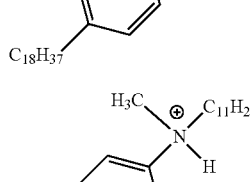

21

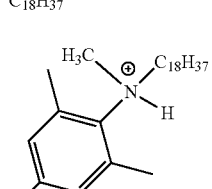

22

23

-continued

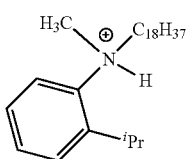

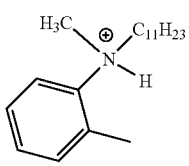

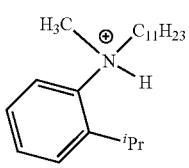

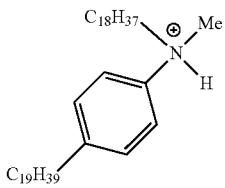

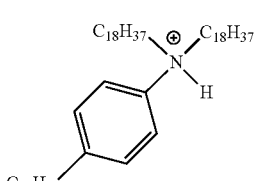

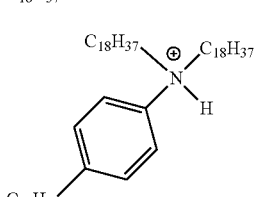

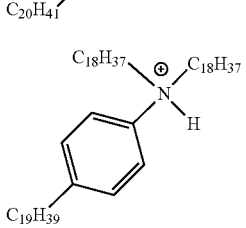

-continued

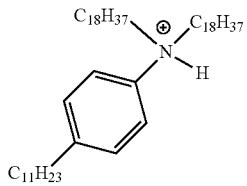

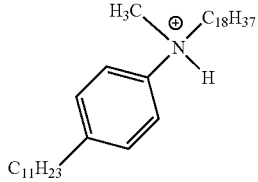

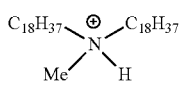

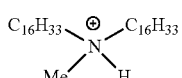

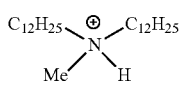

31. The catalyst system of paragraph 24, wherein the activator is one or more of:
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
dioctadecylmethylammonium tetrakis(pentafluorophenyl)borate,
dioctadecylmethylammonium tetrakis(perfluoronaphthalenyl)borate,
N,N-dimethylanilinium tetrakis(pentafluorophenyl)borate,
triphenylcarbenium tetrakis(pentafluorophenyl)borate,
trimethylammonium tetrakis(perfluoronaphthalenyl)borate,
triethylammonium tetrakis(perfluoronaphthalenyl)borate,
tripropylammonium tetrakis(perfluoronaphthalenyl)borate,
tri(n-butyl)ammonium tetrakis(perfluoronaphthalenyl)borate,
tri(t-butyl)ammonium tetrakis(perfluoronaphthalenyl)borate,
N,N-dimethylanilinium tetrakis(perfluoronaphthalenyl)borate,
N,N-diethylanilinium tetrakis(perfluoronaphthalenyl)borate,
N,N-dimethyl-(2,4,6-trimethylanilinium) tetrakis(perfluoronaphthalenyl)borate,
tropillium tetrakis(perfluoronaphthalenyl)borate,
triphenylcarbenium tetrakis(perfluoronaphthalenyl)borate,
triphenylphosphonium tetrakis(perfluoronaphthalenyl)borate,
triethylsilylium tetrakis(perfluoronaphthalenyl)borate,
benzene(diazonium) tetrakis(perfluoronaphthalenyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate, N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

32. A process to polymerize olefins comprising contacting one or more olefins with the catalyst system of any of paragraphs 23 to 31.

33. The process of paragraph 32 wherein the process occurs at a temperature of from about 0° C. to about 300° C., at a pressure in the range of from about 0.35 MPa to about 10 MPa, and at a time up to 300 minutes.

34. The process of paragraph 32 further comprising obtaining polymer.

35. The process of paragraph 32 wherein the olefins comprise one or more substituted or unsubstituted $C_2$ to $C_{40}$ alpha olefins.

EXPERIMENTAL

Shown in Scheme 3 are drawings of catalyst complexes 1-32. Complexes 26 and 27 were prepared as described in concurrently filed U.S. patent application Ser. No. 16/788,088, entitled "Lewis Base Catalysts and Methods Thereof" which claims priority to and the benefit of 62/804,372, filed Feb. 12, 2019. Complex 28 (comparative) was prepared as described by Golisz et al. (2009) *Macromolecules, v.* 42, pp. 8751-8762 and is a comparative complex. Complexes 31 and 32 were prepared using procedures analogous to that described for complex 29. 2-(Adamantan-1-yl)-4-(tert-butyl)phenol was prepared from 4-tert-butylphenol (Merck) and adamantanol-1 (Aldrich) as described in *Organic Letters* 2015, v. 17, pp. 2242-2245.

Scheme 3
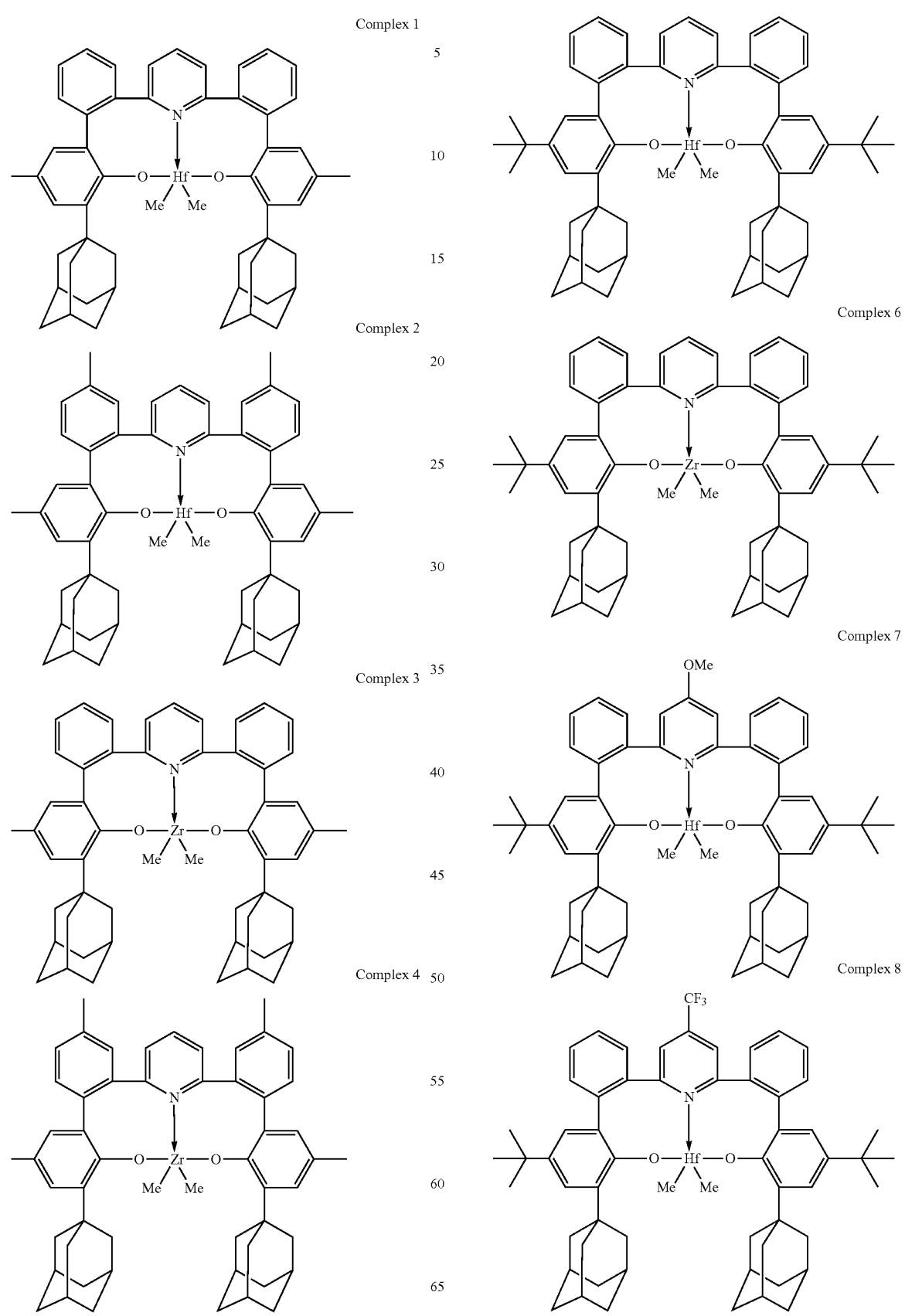

Complex 9
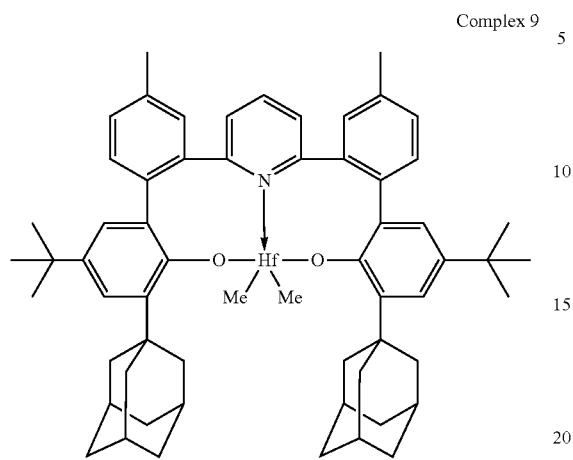
Complex 12
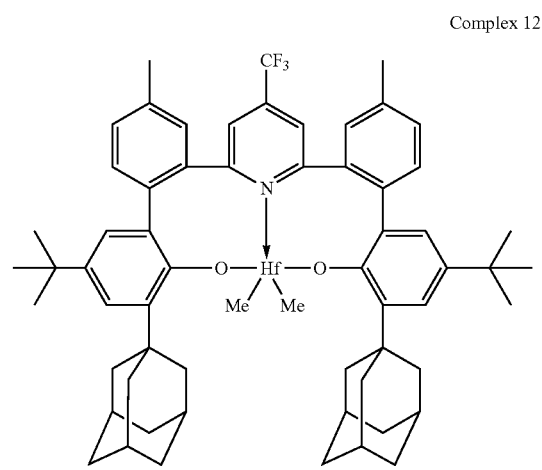
Complex 10
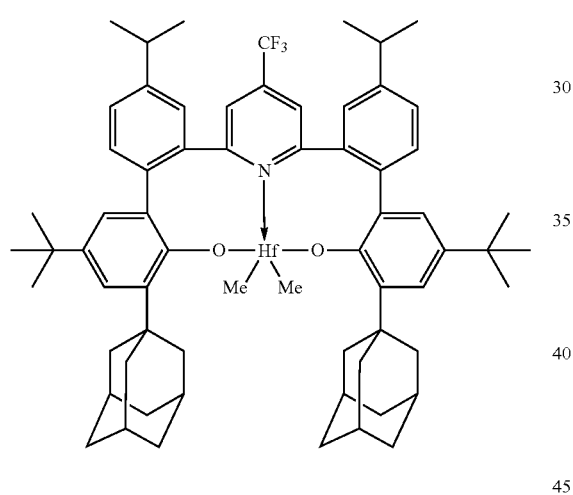
Complex 13
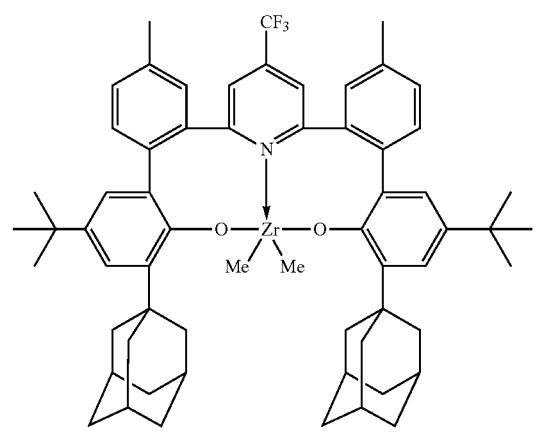
Complex 11
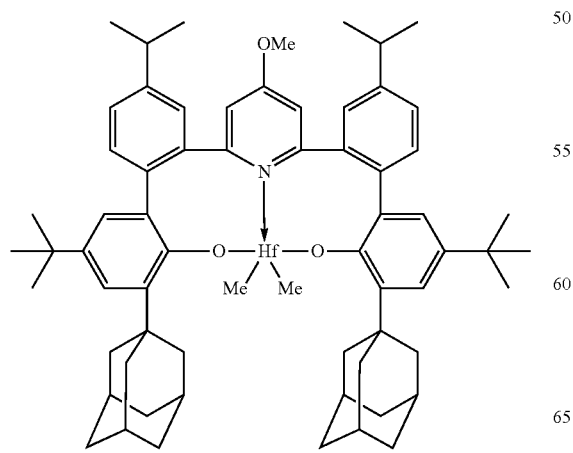
Complex 14
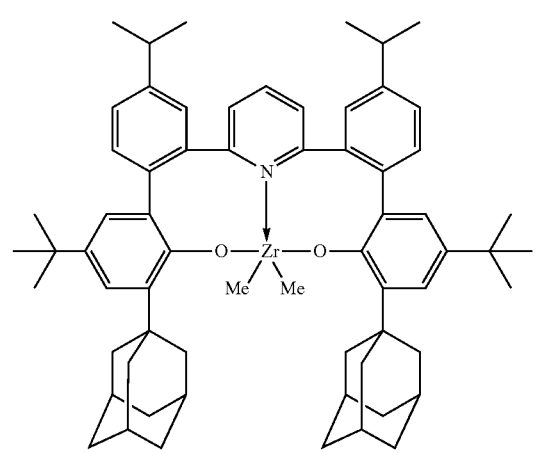

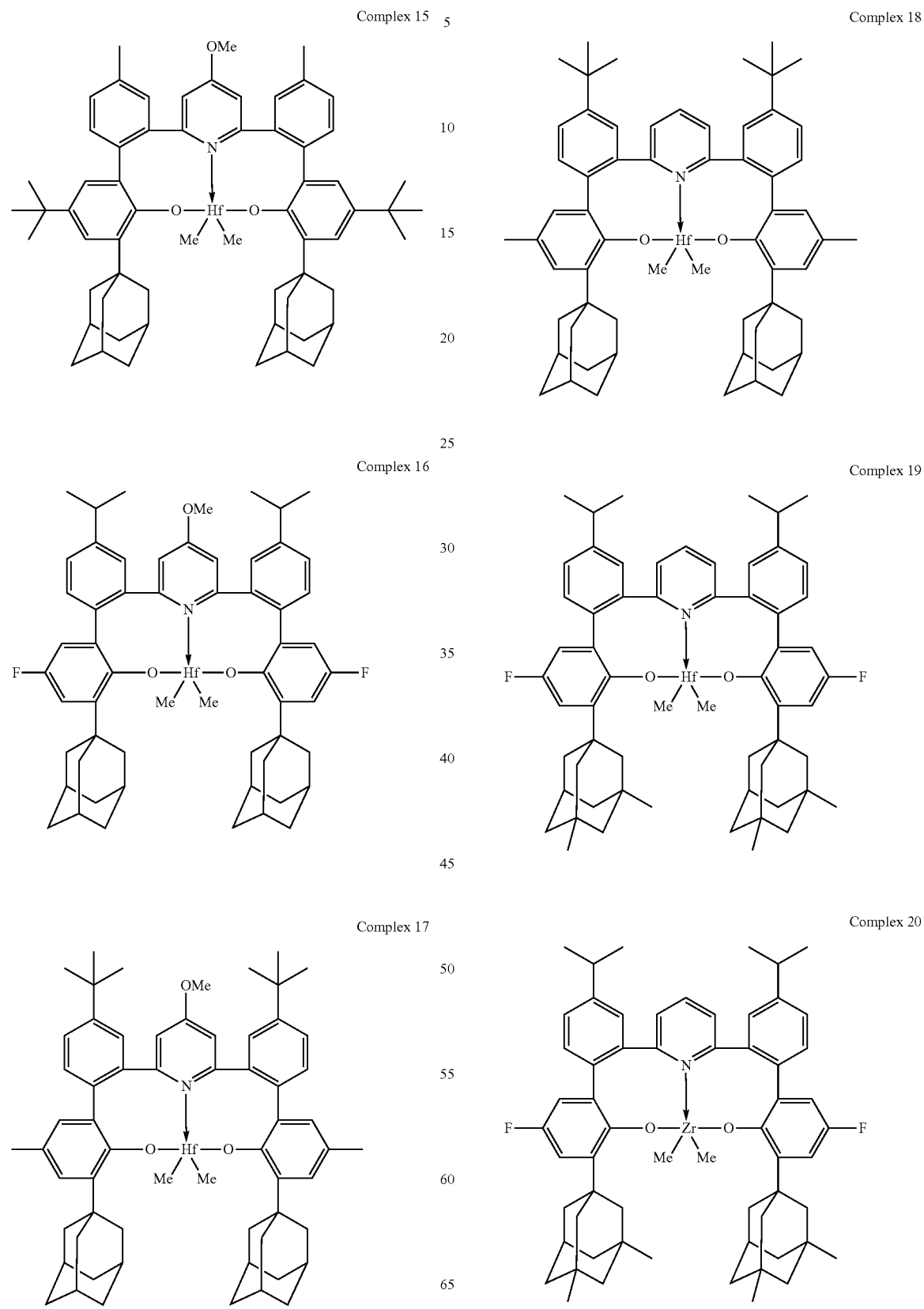

Complex 21
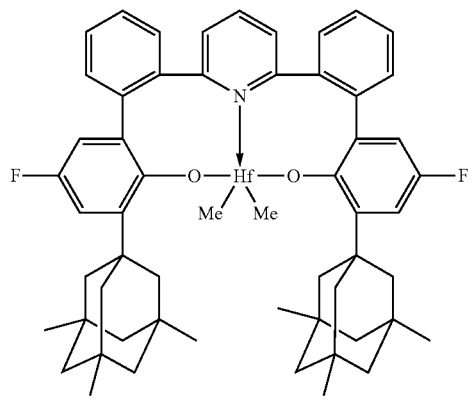
Complex 22
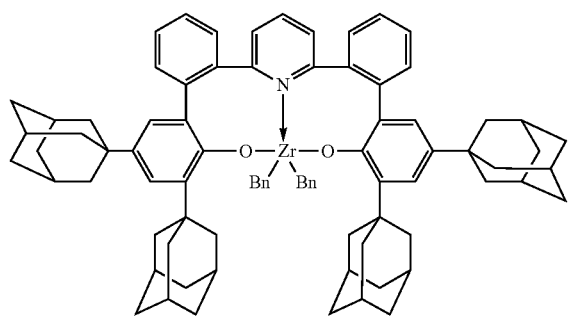
Complex 23
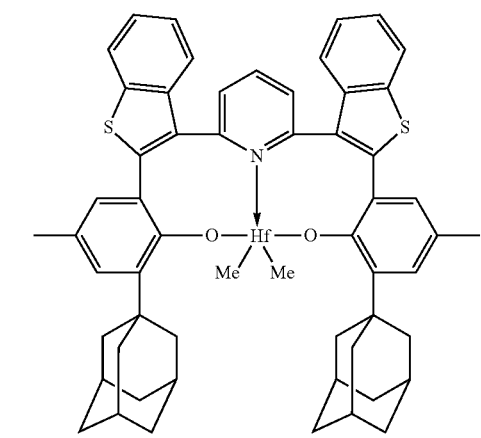
Complex 24
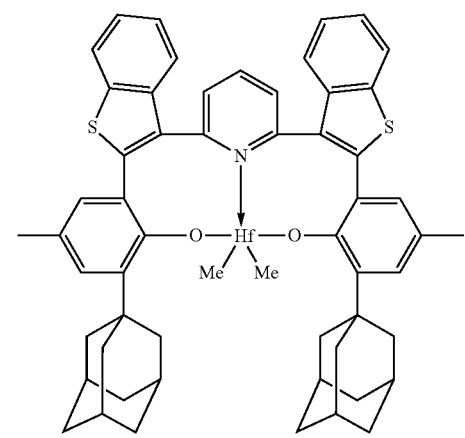
Complex 25
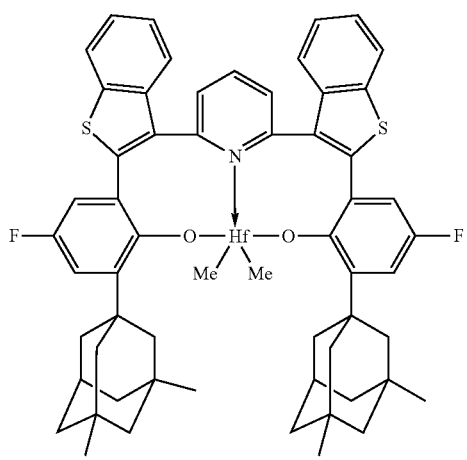
Complex 26
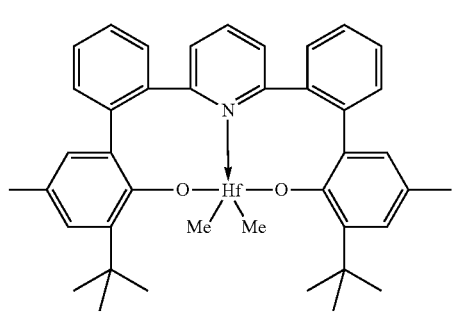
Complex 27
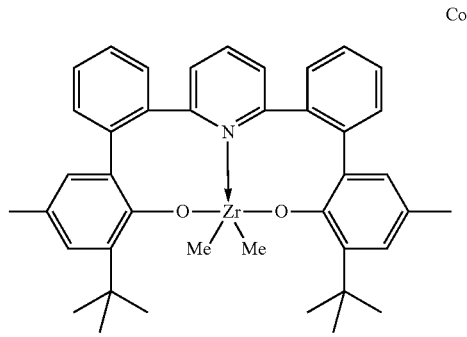
Complex 28
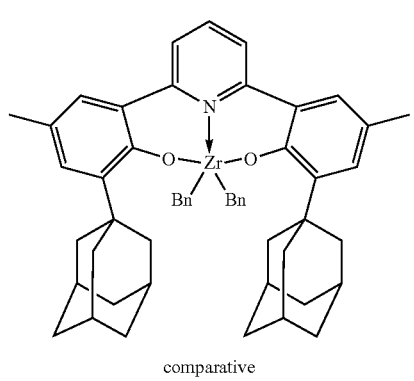
comparative Complex 29

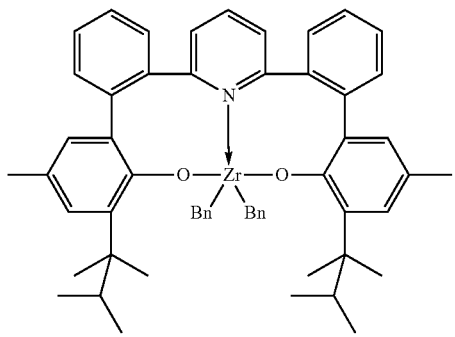

Complex 30

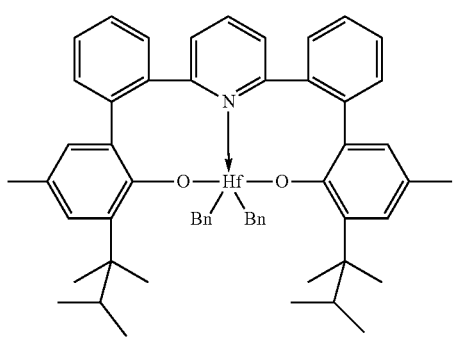

Complex 31

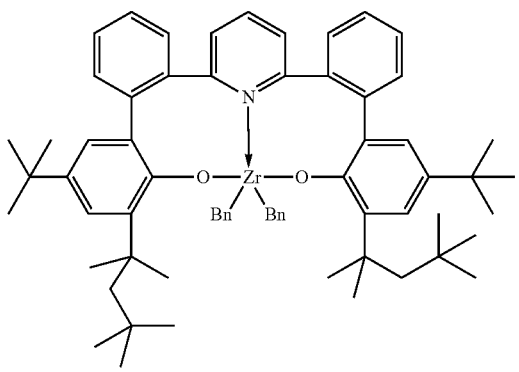

Complex 32

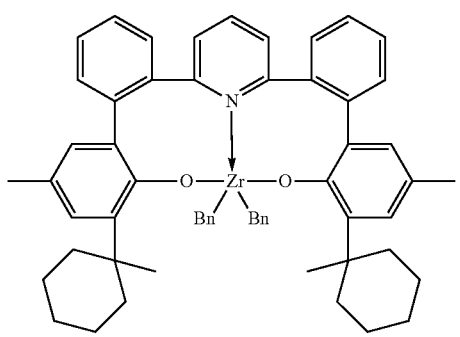

2-(Adamantan-1-yl)-6-bromo-4-(tert-butyl)phenol

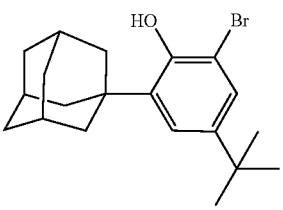 [SMILES: CC(C)(C)c1cc(Br)c(O)c(C23CC4CC(CC(C4)C2)C3)c1]

To a solution of 57.6 g (203 mmol) of 2-(adamantan-1-yl)-4-(tert-butyl)phenol in 400 ml of chloroform a solution of 10.4 ml (203 mmol) of bromine in 200 ml of chloroform was added dropwise for 30 minutes at room temperature. The resulting mixture was diluted with 400 ml of water. The obtained mixture was extracted with dichloromethane (3×100 ml), the combined organic extract was washed with 5% $NaHCO_3$, dried over $Na_2SO_4$, and then evaporated to dryness. Yield 71.6 g (97%) of a white solid. $^1$H NMR ($CDCl_3$, 400 MHz): δ 7.32 (d, J=2.3 Hz, 1H), 7.19 (d, J=2.3 Hz, 1H), 5.65 (s, 1H), 2.18-2.03 (m, 9H), 1.78 (m, 6H), 1.29 (s, 9H). $^{13}$C NMR ($CDCl_3$, 100 MHz): δ 148.07, 143.75, 137.00, 126.04, 123.62, 112.11, 40.24, 37.67, 37.01, 34.46, 31.47, 29.03.

(1-(3-Bromo-5-(tert-butyl)-2-(methoxymethoxy)phenyl)adamantine

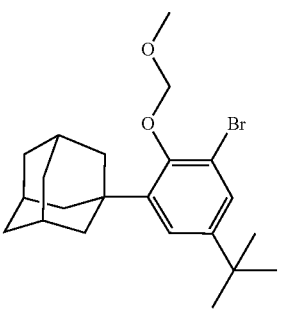 [SMILES: COCOc1c(Br)cc(C(C)(C)C)cc1C12CC3CC(CC(C3)C1)C2]

To a solution of 71.6 g (197 mmol) of 2-(adamantan-1-yl)-6-bromo-4-(tert-butyl)phenol in 1,000 ml of THF 8.28 g (207 mmol, 60% wt. in mineral oil) of sodium hydride was added portionwise at room temperature. To the resulting suspension 16.5 ml (217 mmol) of methoxymethyl chloride was added dropwise for 10 minutes at room temperature. The obtained mixture was stirred overnight, then poured into 1,000 ml of water. The obtained mixture was extracted with dichloromethane (3×300 ml), the combined organic extract was washed with 5% $NaHCO_3$, dried over $Na_2SO_4$ and then evaporated to dryness. Yield 80.3 g (~quant.) of a white solid. $^1$H NMR ($CDCl_3$, 400 MHz): δ 7.39 (d, J=2.4 Hz, 1H), 7.27 (d, J=2.4 Hz, 1H), 5.23 (s, 2H), 3.71 (s, 3H), 2.20-2.04 (m, 9H), 1.82-1.74 (m, 6H), 1.29 (s, 9H). $^{13}$C NMR ($CDCl_3$, 100 MHz): δ 150.88, 147.47, 144.42, 128.46, 123.72, 117.46, 99.53, 57.74, 41.31, 38.05, 36.85, 34.58, 31.30, 29.08.

2-(3-Adamantan-1-yl)-5-(tert-butyl)-2-(methoxymethoxy)phenyl)-4,4,5,5-tetramethyl-1,3,2-dioxaborolane

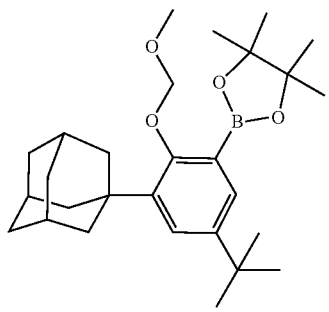 [SMILES: COCOc1c(B2OC(C)(C)C(C)(C)O2)cc(C(C)(C)C)cc1C12CC3CC(CC(C3)C1)C2]

To a solution of 22.5 g (55.0 mmol) of (1-(3-bromo-5-(tert-butyl)-2-(methoxymethoxy)phenyl)adamantine in 300 ml of dry THF 23.2 ml (57.9 mmol, 2.5 M) of ″BuLi in hexanes was added dropwise for 20 minutes at −80° C. The reaction mixture was stirred at this temperature for 1 hour followed by addition of 14.5 ml (71.7 mmol) of 2-isopropoxy-4,4,5,5-tetramethyl-1,3,2-dioxaborolane. The obtained suspension was stirred at room temperature for 1 hour, then poured into 300 ml of water. The obtained mixture was extracted with dichloromethane (3×300 ml), the combined organic extract was dried over $Na_2SO_4$, and then evaporated to dryness. Yield 25.0 g (~quant.) of a colorless viscous oil. $^1H$ NMR ($CDCl_3$, 400 MHz): δ 7.54 (d, J=2.5 Hz, 1H), 7.43 (d, J=2.6 Hz, 1H), 5.18 (s, 2H), 3.60 (s, 3H), 2.24-2.13 (m, 6H), 2.09 (br. s., 3H), 1.85-1.75 (m, 6H), 1.37 (s, 12H), 1.33 (s, 9H). $^{13}C$ NMR ($CDCl_3$, 100 MHz): δ 159.64, 144.48, 140.55, 130.58, 127.47, 100.81, 83.48, 57.63, 41.24, 37.29, 37.05, 34.40, 31.50, 29.16, 24.79.

1-(2′-Bromo-5-(tert-butyl)-2-(methoxymethoxy)-[1,1′-biphenyl]-3-yl)adamantine

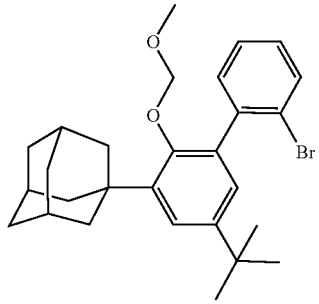 [SMILES: COCOc1c(-c2ccccc2Br)cc(C(C)(C)C)cc1C12CC3CC(CC(C3)C1)C2]

To a solution of 25.0 g (55.0 mmol) of 2-(3-adamantan-1-yl)-5-(tert-butyl)-2-(methoxymethoxy)phenyl)-4,4,5,5-tetramethyl-1,3,2-dioxaborolane in 200 ml of dioxane 15.6 g (55.0 mmol) of 2-bromoiodobenzene, 19.0 g (137 mmol) of potassium carbonate, and 100 ml of water were subsequently added. The mixture obtained was purged with argon for 10 min followed by addition of 3.20 g (2.75 mmol) of $Pd(PPh_3)_4$. Thus obtained mixture was stirred for 12 hours at 100° C., then cooled to room temperature and diluted with 100 ml of water. The obtained mixture was extracted with dichloromethane (3×100 ml), the combined organic extract was dried over $Na_2SO_4$ and then evaporated to dryness. The residue was purified by flash chromatography on silica gel 60 (40-63 um, eluent: hexane-dichloromethane=10:1, vol.). Yield 23.5 g (88%) of a white solid. $^1H$ NMR ($CDCl_3$, 400 MHz): δ 7.68 (dd, J=1.0, 8.0 Hz, 1H), 7.42 (dd, J=1.7, 7.6 Hz, 1H), 7.37-7.32 (m, 2H), 7.20 (dt, J=1.8, 7.7 Hz, 1H), 7.08 (d, J=2.5 Hz, 1H), 4.53 (d, J=4.6 Hz, 1H), 4.40 (d, J=4.6 Hz, 1H), 3.20 (s, 3H), 2.23-2.14 (m, 6H), 2.10 (br. s., 3H), 1.86-1.70 (m, 6H), 1.33 (s, 9H). $^{13}C$ NMR ($CDCl_3$, 100 MHz): δ 151.28, 145.09, 142.09, 141.47, 133.90, 132.93, 132.41, 128.55, 127.06, 126.81, 124.18, 123.87, 98.83, 57.07, 41.31, 37.55, 37.01, 34.60, 31.49, 29.17.

2-(3′-(Adamantan-1-yl)-5′-(tert-butyl)-2′-(methoxymethoxy)-[1,1′-biphenyl]-2-yl)-4,4,5,5-tetramethyl-1,3,2-dioxaborolane

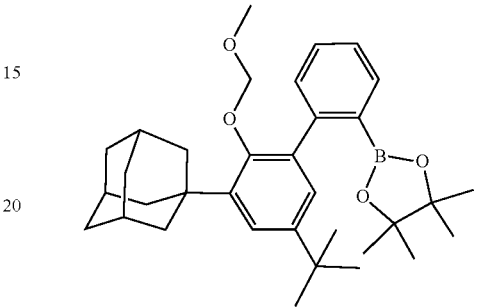

To a solution of 30.0 g (62.1 mmol) of 1-(2′-bromo-5-(tert-butyl)-2-(methoxymethoxy)-[1,1′-biphenyl]-3-yl)adamantine in 500 ml of dry THF 25.6 ml (63.9 mmol, 2.5 M) of ″BuLi in hexanes was added dropwise for 20 minutes at −80° C. The reaction mixture was stirred at this temperature for 1 hour followed by addition of 16.5 ml (80.7 mmol) of 2-isopropoxy-4,4,5,5-tetramethyl-1,3,2-dioxaborolane. The obtained suspension was stirred at room temperature for 1 hour, then poured into 300 ml of water. The obtained mixture was extracted with dichloromethane (3×300 ml), the combined organic extract was dried over $Na_2SO_4$ and then evaporated to dryness. Yield 32.9 g (~quant.) of a colorless glassy solid. $^1H$ NMR ($CDCl_3$, 400 MHz): δ 7.75 (d, J=7.3 Hz, 1H), 7.44-7.36 (m, 1H), 7.36-7.30 (m, 2H), 7.30-7.26 (m, 1H), 6.96 (d, J=2.4 Hz, 1H), 4.53 (d, J=4.7 Hz, 1H), 4.37 (d, J=4.7 Hz, 1H), 3.22 (s, 3H), 2.26-2.14 (m, 6H), 2.09 (br. s., 3H), 1.85-1.71 (m, 6H), 1.30 (s, 9H), 1.15 (s, 6H), 1.10 (s, 6H). $^{13}C$ NMR ($CDCl_3$, 100 MHz): δ 151.35, 146.48, 144.32, 141.26, 136.15, 134.38, 130.44, 129.78, 126.75, 126.04, 123.13, 98.60, 83.32, 57.08, 41.50, 37.51, 37.09, 34.49, 31.57, 29.26, 24.92, 24.21.

2′,2‴-(Pyridine-2,6-diyl)bis(3-adamantan-1-yl)-5-(tert-butyl)-[1,1′-biphenyl]-2-ol)

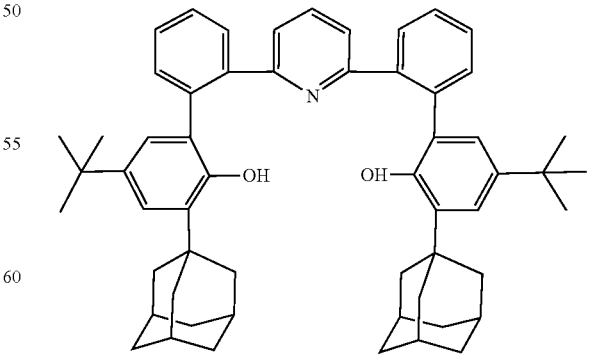

To a solution of 32.9 g (62.0 mmol) of 2-(3′-(adamantan-1-yl)-5′-(tert-butyl)-2′-(methoxymethoxy)-[1,1′-biphenyl]-2-yl)-4,4,5,5-tetramethyl-1,3,2-dioxaborolane in 140 ml of dioxane 7.35 g (31.0 mmol) of 2,6-dibromopyridine, 50.5 g (155 mmol) of cesium carbonate and 70 ml of water were subsequently added. The mixture obtained was purged with argon for 10 minutes followed by addition of 3.50 g (3.10 mmol) of Pd(PPh$_3$)$_4$. This mixture was stirred for 12 hours at 100° C., then cooled to room temperature and diluted with 50 ml of water. The obtained mixture was extracted with dichloromethane (3×50 ml), the combined organic extract was dried over Na$_2$SO$_4$ and then evaporated to dryness. To the resulting oil 300 ml of THF, 300 ml of methanol, and 21 ml of 12 N HCl were subsequently added. The reaction mixture was stirred overnight at 60° C. and then poured into 500 ml of water. The obtained mixture was extracted with dichloromethane (3×350 ml), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). The obtained glassy solid was triturated with 70 ml of n-pentane, the precipitate obtained was filtered off, washed with 2×20 ml of n-pentane, and dried in vacuo. Yield 21.5 g (87%) of a mixture of two isomers as a white powder. $^1$H NMR (CDCl$_3$, 400 MHz): δ 8.10+6.59 (2s, 2H), 7.53-7.38 (m, 10H), 7.09+7.08 (2d, J=2.4 Hz, 2H), 7.04+6.97 (2d, J=7.8 Hz, 2H), 6.95+6.54 (2d, J=2.4 Hz), 2.03-1.79 (m, 18H), 1.74-1.59 (m, 12H), 1.16+1.01 (2s, 18H). $^{13}$C NMR (CDCl$_3$, 100 MHz, minor isomer shifts labeled with *): δ 157.86, 157.72*, 150.01, 149.23*, 141.82*, 141.77, 139.65*, 139.42, 137.92, 137.43, 137.32*, 136.80, 136.67*, 136.29*, 131.98*, 131.72, 130.81, 130.37*, 129.80, 129.09*, 128.91, 128.81*, 127.82*, 127.67, 126.40, 125.65*, 122.99*, 122.78, 122.47, 122.07*, 40.48, 40.37*, 37.04, 36.89*, 34.19*, 34.01, 31.47, 29.12, 29.07*.

Dimethylhafnium[2',2'''-(pyridine-2,6-diyl)bis(3-adamantan-1-yl)-5-(tert-butyl)-[1,1'-biphenyl]-2-olate)] (Complex 5)

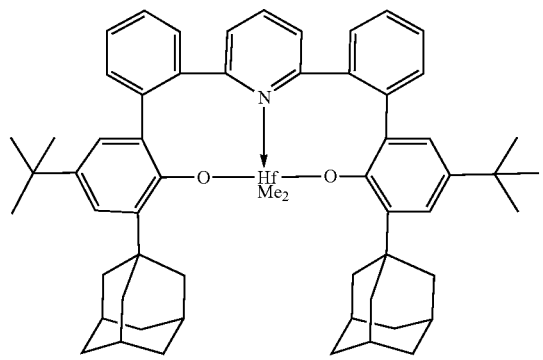

To a suspension of 3.22 g (10.05 mmol) of hafnium tetrachloride (<0.05% Zr) in 250 ml of dry toluene 14.6 ml (42.2 mmol, 2.9 M) of MeMgBr in diethyl ether was added in one portion via syringe at 0° C. The resulting suspension was stirred for 1 min, and 8.00 g (10.05 mmol) of 2',2'''-(pyridine-2,6-diyl)bis(3-adamantan-1-yl)-5-(tert-butyl)-[1, 1'-biphenyl]-2-ol) was added portionwise for 1 minute. The reaction mixture was stirred for 36 hours at room tempera-ture and then evaporated to near dryness. The solid obtained was extracted with 2×100 ml of hot toluene, and the combined organic extract was filtered through a thin pad of Celite 503. Next, the filtrate was evaporated to dryness. The residue was triturated with 50 ml of n-hexane, the obtained precipitate was filtered off (G3), washed with 20 ml of n-hexane (2×20 ml), and then dried in vacuo. Yield 6.66 g (61%, ~1:1 solvate with n-hexane) of a light-beige solid. Anal. Calc. for C$_{59}$H$_{69}$HfNO$_2$×1.0 (C$_6$H$_{14}$): C, 71.70; H, 7.68; N, 1.29. Found: C, 71.95; H, 7.83; N, 1.18. $^1$H NMR (C$_6$D$_6$, 400 MHz): δ 7.58 (d, J=2.6 Hz, 2H), 7.22-7.17 (m, 2H), 7.14-7.08 (m, 4H), 7.07 (d, J=2.5 Hz, 2H), 7.00-6.96 (m, 2H), 6.48-6.33 (m, 3H), 2.62-2.51 (m, 6H), 2.47-2.35 (m, 6H), 2.19 (br.s, 6H), 2.06-1.95 (m, 6H), 1.92-1.78 (m, 6H), 1.34 (s, 18H), −0.12 (s, 6H). $^{13}$C NMR (C$_6$D$_6$, 100 MHz): δ 159.74, 157.86, 143.93, 140.49, 139.57, 138.58, 133.87, 133.00, 132.61, 131.60, 131.44, 127.98, 125.71, 124.99, 124.73, 51.09, 41.95, 38.49, 37.86, 34.79, 32.35, 30.03.

Dimethylzirconium[2',2'''-(pyridine-2,6-diyl)bis(3-adamantan-1-yl)-5-(tert-butyl)-[1,1'-biphenyl]-2-olate)] (Complex 6)

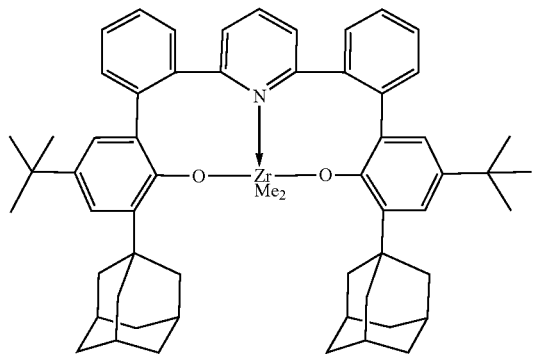

To a suspension of 2.92 g (12.56 mmol) of zirconium tetrachloride in 300 ml of dry toluene 18.2 ml (52.7 mmol, 2.9 M) of MeMgBr in diethyl ether was added in one portion via syringe at 0° C. To the resulting suspension 10.00 g (12.56 mmol) of 2',2'''-(pyridine-2,6-diyl)bis(3-adamantan-1-yl)-5-(tert-butyl)-[1,1'-biphenyl]-2-ol) was immediately added in one portion. The reaction mixture was stirred for 2 hours at room temperature and then evaporated to near dryness. The solid obtained was extracted with 2×100 ml of hot toluene, and the combined organic extract was filtered through a thin pad of Celite 503. Next, the filtrate was evaporated to dryness. The residue was triturated with 50 ml of n-hexane, the obtained precipitate was filtered off (G3), washed with n-hexane (2×20 ml), and then dried in vacuo. Yield 8.95 g (74%, ~1:0.5 solvate with n-hexane) of a beige solid. Anal. Calc. for C$_{59}$H$_{69}$ZrNO$_2$×0.5 (C$_6$H$_{14}$): C, 77.69; H, 7.99; N, 1.46. Found: C, 77.90; H, 8.15; N, 1.36. $^1$H NMR (C$_6$D$_6$, 400 MHz): δ 7.56 (d, J=2.6 Hz, 2H), 7.20-7.17 (m, 2H), 7.14-7.07 (m, 4H), 7.07 (d, J=2.5 Hz, 2H), 6.98-6.94 (m, 2H), 6.52-6.34 (m, 3H), 2.65-2.51 (m, 6H), 2.49-2.36 (m, 6H), 2.19 (br.s., 6H), 2.07-1.93 (m, 6H), 1.92-1.78 (m, 6H), 1.34 (s, 18H), 0.09 (s, 6H). $^{13}$C NMR (C$_6$D$_6$, 100

MHz): δ 159.20, 158.22, 143.79, 140.60, 139.55, 138.05, 133.77, 133.38, 133.04, 131.49, 131.32, 127.94, 125.78, 124.65, 124.52, 42.87, 41.99, 38.58, 37.86, 34.82, 32.34, 30.04.

1-adamantanol

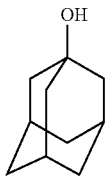 [SMILES: OC12CC3CC(CC(C3)C1)C2]

To a stirring solution of 1-bromoadamantane (5.00 g, 23.242 mmol) in dimethylformamide (25 mL) was added hydrochloric acid (8.7 mL of 0.67M HCl) followed by water (15 mL). The mixture was brought to 105° C. and stirred for 1 hour. After cooling to room temperature, water (150 mL) was added and the resulting precipitate was collected via vacuum filtration. The solid was taken up in dichloromethane (200 mL) and washed with water (3×100 mL). The organic layers were dried (MgSO4), filtered and concentrated under vacuum giving 3.512 g (23.069 mmol, 99% yield).

2,4-di(adamant-1-yl)phenol

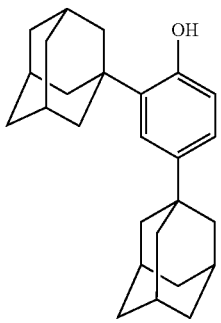 [SMILES: Oc1ccc(C23CC4CC(CC(C4)C2)C3)cc1C12CC3CC(CC(C3)C1)C2]

To a mixture of phenol (2.00 g, 21.252 mmol) and 1-adamantanol (6.794 g, 44.629 mmol, 2.10 eq) in dichloromethane (20 mL) was added concentrated sulfuric acid (2.5 mL), dropwise (over 10 minutes) at room temperature. This was stirred overnight at room temperature. Water (15 mL) was added to the reaction mixture and the pH was brought to 9-10 (2M aq. NaOH). Organics were extracted with dichloromethane (3×20 mL), washed with brine, dried (MgSO$_4$), filtered and concentrated under vacuum. The residue was purified via column chromatography (5-10% ethyl acetate/hexane) giving 1.29 g (17% yield) of white solid.

1,1'-(4-(methoxymethoxy)-1,3-phenylene)bis(adamantane)

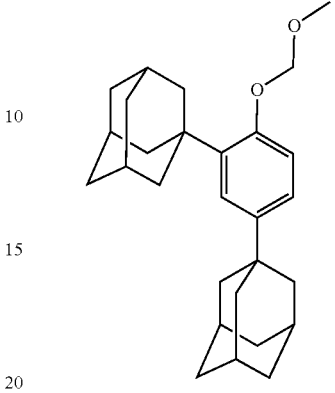

To a mixture of 2,4-di(adamantyl)phenol (1.29 g, 3.558 mmol) in tetrahydrofuran (3 mL) was slowly added sodium hydride, 60% in mineral oil (0.185 g, 4.625 mmol, 1.30 eq). This was stirred for 30 minutes at room temperature at which point chloromethyl methyl ether (0.459 mL, 6.049 mmol, 1.70 eq) was added incrementally. The reaction was allowed to stir at room temperature overnight. The reaction mixture was quenched with water (20 mL) and the pH was adjusted to 8-10 using potassium hydroxide. The product was extracted with diethyl ether (3×30 mL), dried (MgSO4), filtered and concentrated in vacuo giving 1.330 g (3.275 mmol, 92% yield).

(3,5-diadamantan-1-yl)-2-methoxymethoxy)phenyl) lithium (1,2-dimethoxyethane)

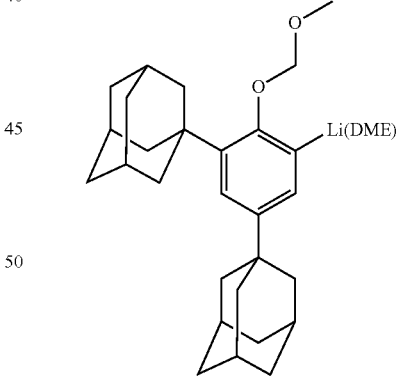

Pentane (20 mL) was added to 1,1'-(4-(methoxymethoxy)-1,3-phenylene)bis(adamantane) (1.38 g, 3.40 mmol) to form a solution. A 1.6 M hexane solution of BuLi (2.13 mL, 3.40 mmol) was added dropwise. 1,2-Dimethoxyethane (DME) was then added dropwise. Within a couple of minutes the yellow solution became murky, then precipitate began to form. The mixture was allowed to stir for 1.5 hours then the precipitate was isolated on a fritted disk, washed with pentane (3×15 mL), and dried under reduced pressure. Product was isolated as an off-white solid. Yield: 1.15 g, 67.2%.

1,1'-(2'-bromo-2-(methoxymethoxy)-[1,1'-biphenyl]-3,5-diyl)bis(adamantane)

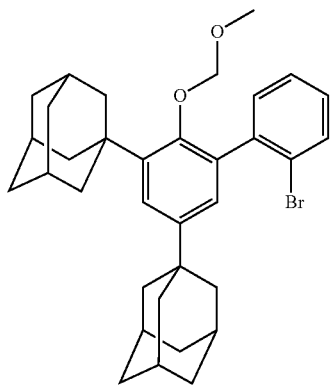 [SMILES: COCOc1c(-c2ccccc2Br)cc(C23CC4CC(CC(C4)C2)C3)cc1C12CC3CC(CC(C3)C1)C2]

Toluene (20 mL) was added to (3,5-diadamantan-1-yl)-2-(methoxymethoxy)phenyl)lithium (1,2-dimethoxyethane) (1.15 g, 2.29 mmol) to form a suspension. A toluene solution (10 mL) of 1-bromo-2-chlorobenzene (0.482 g, 2.52 mmol) was added dropwise over 1 hour to form a cloudy solution. The mixture was stirred for an additional hour then the volatiles were removed under reduced pressure. The residue was extracted with CH$_2$Cl$_2$ (8 mL) and filtered through Celite 503 on a Teflon filter. The volatiles were evaporated and pentane (3 mL) was added to the residue. The mixture was cooled to −20° C. overnight. Nothing crystallized so the volatiles were evaporated and the residue was dried under reduced pressure at 60° C. Yield: 1.32 g, 98.9%.

2',2'''-(pyridine-2,6-diyl)bis((3,5-diadamantan-1-yl)-[1,1'-biphenyl]-2-ol)

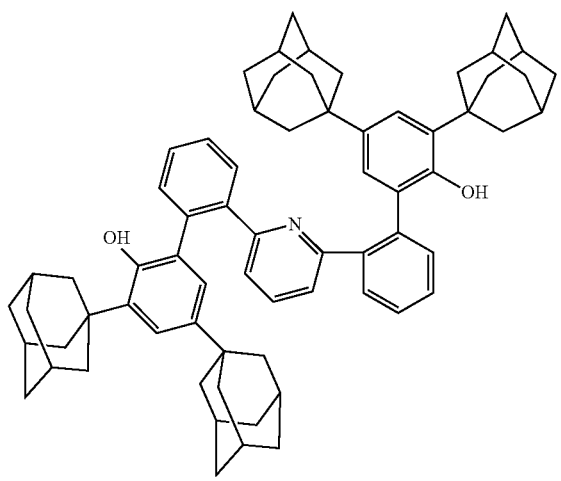 [SMILES: Oc1c(-c2ccccc2-c2cccc(-c3ccccc3-c3cc(C45CC6CC(CC(C6)C4)C5)cc(C45CC6CC(CC(C6)C4)C5)c3O)n2)cc(C23CC4CC(CC(C4)C2)C3)cc1C12CC3CC(CC(C3)C1)C2]

Tetrahydrofuran (15 mL) was added to 1,1'-(2'-bromo-2-(methoxymethoxy)-[1,1'-biphenyl]-3,5-diyl)bis(adamantane) (1.32 g, 2.26 mmol) to form a solution. The mixture was cooled to −45° C. and a 1.6 M solution of BuLi in hexanes (1.46 mL, 2.33 mmol) was added dropwise over a minute. The mixture was allowed to slowly warm to −25° C. over 45 minutes. Solid ZnCl$_2$ (0.216 g, 1.58 mmol) was added to the clear solution. The mixture was allowed to warm slowly to ambient temperature over 30 minutes. After 30 minutes at ambient temperature 2,6-dibromopyridine (0.260 g, 1.10 mmol) and Pd(P(tBu)$_3$)$_2$ (0.023 g, 0.045 mmol) were added to the clear colorless solution. The mixture was heated overnight on a metal block kept at 65° C. After stirring overnight the volatiles were evaporated with a rotary evaporator. To the residue were added methanol (20 mL), thf (20 mL), and concentrated HCl (1 mL). The mixture was heated to 60° C. for 5 hours. The volatiles were then evaporated with a rotary evaporator and the residue was extracted with CH$_2$Cl$_2$ (60 mL). The organics were washed with water (3×50 mL), and dilute NaHCO$_3$ to adjust pH to 7 (1×50 mL), then dried with brine (40 mL), and over MgSO$_4$. Filtration and removal of the volatiles afforded 1.2 g of crude product. Purified on silica gel by column chromatography using 2-8% EtOAc in isohexane. Evaporation of the isohexane-EtOAc afforded a white residue that contained some material that was insoluble in CH$_2$Cl$_2$. The solid was extracted with benzene (10 mL), filtered, and evaporated. The residue was dried at 60° C. under reduced pressure to afford a foamy solid. Yield: 0.322 g, 30.8%.

Dibenzylzirconium[2',2'''-(pyridine-2,6-diyl)bis(3,5-diadamantan-1-yl)-[1,1'-biphenyl]-2-olate)] (Complex 22)

Benzene (15 mL) was added to 2',2'''-(pyridine-2,6-diyl)bis((3,5-diadamantan-1-yl)-[1,1'-biphenyl]-2-ol) (0.315 g, 0.331 mmol) to form a solution. ZrBn$_4$ (0.151 g, 0.331 mmol) and benzene (2 mL) were added. The mixture was shaken to form a yellow-orange solution. After 30 minutes the mixture was filtered and evaporated to 1 mL. Hexane (3 mL) was added to form a murky mixture. The volatiles were evaporated to dryness. The yellow-orange solid was washed thoroughly with pentane (5 mL). The pentane extract was filtered and cooled to −20° C. for a couple hours. Some yellow solid was isolated from the pentane solution. The sample that had been washed with pentane was combined with methylcyclohexane (10 mL) and the mixture was heated to near boiling for a few minutes. Some crystalline solid separated from the orange solution. The mixture was allowed to sit at ambient temperature for 2 hours, then the colorless solid was isolated and dried under reduced pressure. HNMR spectroscopy indicated that the product cocrystallized with 1 equiv of methylcyclohexane. Yield: 0.092 g, 21%.

1-(3-Bromo-2-(methoxymethoxy)-5-methylphenyl)adamantine

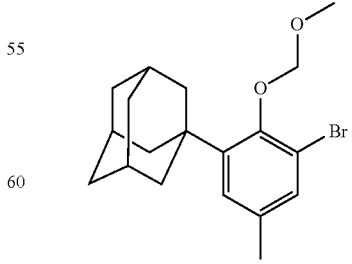

To a solution of 21.3 g (66.4 mmol) of 2-bromo-6-adamantyl-4-methylphenol in 300 ml of dry THF 2.79 g (69.7 mmol, 60% wt. in mineral oil) of sodium hydride was added portionwise at room temperature. After that, 5.55 ml (73.0 mmol) of MOMCl was added dropwise for 1 hour. The reaction mixture was heated at 60° C. for 24 hours and then poured into 300 ml of cold water. The crude product was extracted with 3×200 ml of dichloromethane. The combined organic extract was dried over Na$_2$SO$_4$ and then evaporated to dryness. Yield 24.3 g (quant.) of a colorless oil. $^1$H NMR (CDCl$_3$, 400 MHz): δ 7.24 (d, J=1.5 Hz, 1H), 7.05 (d, J=1.8 Hz, 1H), 5.22 (s, 2H), 3.71 (s, 3H), 2.27 (s, 3H), 2.07-2.15 (m, 9H), 1.78 (m, 6H). $^{13}$C NMR (CDCl$_3$, 100 MHz): δ 151.01, 144.92, 134.34, 131.80, 127.44, 117.57, 99.56, 57.75, 41.27, 37.71, 36.82, 29.03, 20.68.

2-(3-Adamantan-1-yl)-2-(methoxymethoxy)-5-methylphenyl)benzo[b]thiophene

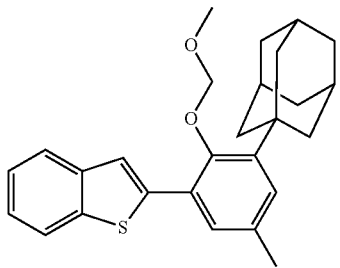 [SMILES: COCOc1c(-c2cc3ccccc3s2)cc(C)cc1C12CC3CC(CC(C3)C1)C2]

To a solution of 10.0 g (74.5 mmol) of benzo[b]thiophene in 250 ml of dry THF 29.8 ml (74.5 mmol, 2.5 M) of "BuLi in hexanes was added dropwise at −10° C. The reaction mixture was stirred for 1 hour at 0° C., followed by an addition of 11.2 g (82.0 mmol) of ZnCl$_2$. Next, the obtained solution was warmed to room temperature, 13.6 g (37.3 mmol) of 1-(3-bromo-2-(methoxymethoxy)-5-methylphenyl)adamantine and 1.52 g (2.98 mmol) of Pd[P$^t$Bu$_3$]$_2$ were subsequently added. The resulting mixture was stirred overnight at 60° C., then poured into 250 ml of water. The crude product was extracted with 3×150 ml of dichloromethane. The combined organic extract was dried over Na$_2$SO$_4$ and then evaporated to dryness. The residue was purified by flash chromatography on silica gel 60 (40-63 um; eluent: hexane-ethyl acetate=10:1, vol.). Yield 5.31 g (34%) of a light-yellow solid. $^1$H NMR (CDCl$_3$, 400 MHz): δ 7.88 (d, J=7.7 Hz, 1H), 7.81 (d, J=7.4 Hz, 1H), 7.54 (s, 1H), 7.32-7.42 (m, 2H), 7.18-7.23 (m, 2H), 4.79 (s, 2H), 3.49 (s, 3H), 2.38 (s, 3H), 2.24 (m, 6H), 2.16 (m, 3H), 1.85 (m, 6H).

3-Bromo-2-(3-adamantan-1-yl)-2-(methoxymethoxy)-5-methylphenyl)benzo[b]thiophene

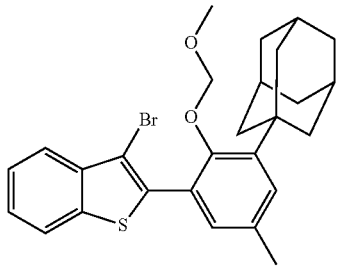 [SMILES: COCOc1c(-c2sc3ccccc3c2Br)cc(C)cc1C12CC3CC(CC(C3)C1)C2]

To a solution of 5.31 g (12.7 mmol) of 2-(3-adamantan-1-yl)-2-(methoxymethoxy)-5-methylphenyl)benzo[b]thiophene in 150 ml of chloroform 2.26 g (12.7 mmol) of N-bromosuccinimide was added at room temperature. The reaction mixture was stirred for 2 hours at this temperature, then poured into 100 ml of water. The crude product was extracted with 3×50 ml of dichloromethane. The combined organic extract was dried over Na$_2$SO$_4$ and then evaporated to dryness. The residue was recrystallized from 90 ml of n-hexane at −30° C. Yield 6.25 g (98%) of a light-yellow solid. $^1$H NMR (CDCl$_3$, 400 MHz): δ 7.90 (d, J=7.8 Hz, 1H), 7.84 (d, J=7.9 Hz, 1H), 7.49 (dt, J=0.9, 7.1 Hz, 1H), 7.43 (dt, J=1.2, 8.1 Hz, 1H), 7.24 (d, J=2.0 Hz, 1H), 7.12 (d, J=1.7 Hz, 1H), 4.66 (s, 2H), 3.33 (s, 3H), 2.38 (s, 3H), 2.22 (m, 6H), 2.14 (br.s, 3H), 1.83 (m, 6H). $^{13}$C NMR (CDCl$_3$, 100 MHz): δ 153.19, 143.13, 138.54, 138.19, 137.38, 132.48, 130.68, 129.30, 126.06, 125.38, 125.03, 123.42, 122.19, 107.76, 99.33, 57.38, 41.17, 37.30, 36.97, 29.10, 20.98.

6,6'-(Pyridine-2,6-diylbis(benzo[b]thiophene-3,2-diyl))bis(2-adamantan-1-yl)-4-methylphenol)

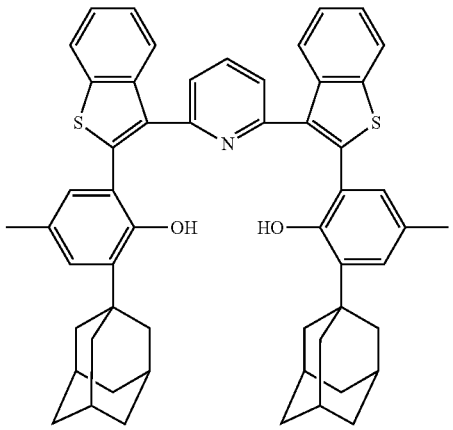

To a solution of 3.00 g (6.03 mmol) of 3-bromo-2-(3-adamantan-1-yl)-2-(methoxymethoxy)-5-methylphenyl) benzo[b]thiophene in 120 ml of dry THF 2.41 ml (6.03 mmol, 2.5 M) of "BuLi in hexanes was added dropwise at −80° C. The reaction mixture was stirred for 30 minutes at this temperature, then 2.32 g (17.1 mmol) of ZnCl$_2$ was added. The obtained mixture was warmed to room temperature, then 0.72 g (3.02 mmol) of 2,6-dibromopyridine and 245 mg (0.48 mmol) of Pd[P$^t$Bu$_3$]$_2$ were subsequently added. The obtained mixture was stirred overnight at 60° C., poured into 100 ml of water, and the crude product was extracted with dichloromethane (3×50 ml). The combined organic extract was dried over Na$_2$SO$_4$ and then evaporated to dryness. To the resulting oil 50 ml of THF, 50 ml of methanol, and 1 ml of 12 N HCl were subsequently added. The reaction mixture was stirred overnight at 60° C. and then poured into 200 ml of water. The obtained mixture was extracted with dichloromethane (3×50 ml), the combined organic extract was dried over Na$_2$SO$_4$ and then evaporated to dryness. The residue was purified by flash chromatography on silica gel 60 (40-63 um; eluent: hexane-ethyl acetate-triethylamine=100:10:1, vol.). Yield 0.78 g (31%) of a white foam. $^1$H NMR (CDCl$_3$, 400 MHz): δ 7.87-7.94 (m, 4H), 7.67 (t, J=7.8 Hz, 1H), 7.38-7.48 (m, 4H), 7.28 (d, J=7.8 Hz, 2H), 6.91-6.99 (m, 4H), 2.23 (s, 6H), 1.82 (br.s, 6H), 1.67

(br.s, 9H), 1.57-1.62 (m, 6H), 1.42-1.50 (m, 6H). $^{13}$C NMR (CDCl$_3$, 100 MHz): δ 153.56, 150.70, 140.51, 139.91, 138.86, 138.50, 137.87, 131.91, 129.49, 128.68, 128.49, 124.92, 124.77, 123.71, 122.82, 122.00, 40.02, 36.81, 36.60, 28.98, 20.73.

Dimethylhafnium[6,6'-(pyridine-2,6-diylbis(benzo[b]thiophene-3,2-diyl))bis(2-adamantan-1-yl)-4-methylphenolate)] (Complex 23)

To a suspension of 155 mg (0.485 mmol) of hafnium tetrachloride in 50 ml of dry toluene 0.75 ml (2.20 mmol, 2.9 M) of MeMgBr in diethyl ether was added in one portion at room temperature. The resulting suspension was stirred for 1 minute, and a solution of 400 mg (0.485 mmol) of 6,6'-(pyridine-2,6-diylbis(benzo[b]thiophene-3,2-diyl))bis(2-adamantan-1-yl)-4-methylphenol) in 10 ml of dry toluene was added dropwise for 1 minute. The reaction mixture was stirred overnight at room temperature and then evaporated to near dryness. The solid obtained was extracted with 2×20 ml of hot toluene, and the combined organic extract was filtered through a thin pad of Celite 503. Next, the filtrate was evaporated to dryness. The resulting solid was washed with 5 ml of n-hexane and dried in vacuo. Yield 303 mg (60%) of a beige solid as a hexane solvate. Anal. Calc. for C$_{57}$H$_{57}$HfNO$_2$S$_2$×2 (C$_6$H$_{14}$): C, 68.89; H, 7.12; N, 1.16. Found: C, 69.07; H, 7.33; N, 1.11. $^1$H NMR (C$_6$D$_6$, 400 MHz): δ 7.35 (dd, J=1.9, 6.9 Hz, 2H), 7.21 (d, J=2.1 Hz, 2H), 7.12 (d, J=2.1 Hz, 2H), 7.05-7.12 (m, 4H), 6.92 (dd, J=2.0, 6.5 Hz, 2H), 6.69 (t, J=7.8 Hz, 1H), 6.46 (d, J=7.8 Hz, 2H), 2.20 (s, 6H), 2.11-2.17 (m, 6H), 1.99-2.07 (m, 6H), 1.75-1.87 (m, 12H), 1.63-1.70 (m, 6H), 0.18 (s, 6H). $^{13}$C NMR (C$_6$D$_6$, 100 MHz): δ 160.12, 154.44, 150.43, 149.60, 147.46, 143.70, 141.40, 140.26, 134.21, 131.01, 130.32, 129.66, 127.31, 126.59, 125.59, 125.45, 124.83, 124.64, 122.98, 122.68, 114.02, 52.62, 41.19, 38.05, 37.67, 32.30, 29.73, 23.39, 14.69.

Dimethylzirconium[6,6'-(pyridine-2,6-diylbis(benzo[b]thiophene-3,2-diyl))bis(2-adamantan-1-yl)-4-methylphenolate)] (Complex 24)

To a suspension of 58 mg (0.247 mmol) of zirconium tetrachloride in 30 ml of dry toluene 0.38 ml (1.11 mmol, 2.9 M) of MeMgBr in diethyl ether was added in one portion at room temperature. The resulting suspension was stirred for 10 seconds, and a solution of 204 mg (0.247 mmol) of 6,6'-(pyridine-2,6-diylbis(benzo[b]thiophene-3,2-diyl))bis(2-adamantan-1-yl)-4-methylphenol) in 10 ml of dry toluene was added dropwise for 30 seconds. The reaction mixture was stirred overnight at room temperature and then evaporated to near dryness. The solids obtained were extracted with 2×20 ml of hot toluene, and the combined organic extract was filtered through a thin pad of Celite 503. Next, the filtrate was evaporated to dryness. The resulting solid was washed with 5 ml of n-hexane and then dried in vacuum. Yield 140 mg (60%) of a beige solid. Anal. Calc. for C$_{57}$H$_{57}$ZrNO$_2$S$_2$: C, 72.57; H, 6.09; N, 1.48. Found: C, 72.78; H, 6.29; N, 1.31. $^1$H NMR (C$_6$D$_6$, 400 MHz): δ 7.34 (dd, J=1.9, 6.7 Hz, 2H), 7.20 (d, J=2.2 Hz, 2H), 7.12 (d, J=2.5 Hz, 2H), 7.08 (m, 4H), 7.02 (m, 2H), 6.91 (dd, J=1.8, 6.4 Hz, 2H), 6.69 (t, J=7.6 Hz, 1H), 6.45 (d, J=7.8 Hz, 2H), 2.20 (s, 6H), 2.15-2.21 (m, 6H), 2.02-2.09 (m, 6H), 1.75-1.85 (m, 12H), 1.64-1.72 (m, 6H), 0.40 (s, 6H). $^{13}$C NMR (C$_6$D$_6$, 100 MHz): δ 160.18, 155.17, 149.57, 141.60, 140.66, 140.29, 139.81, 130.94, 130.24, 129.66, 128.88, 127.40, 126.54, 126.12, 126.02, 125.72, 125.45, 125.07, 122.93, 122.73, 44.72, 41.44, 38.36, 37.83, 29.99, 21.65, 21.18.

2-(3,5-Dimethyladamantan-1-yl)-4-fluorophenol

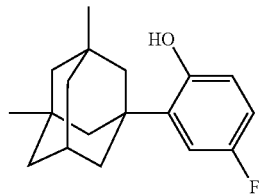 [SMILES: CC12CC3CC(C)(C1)CC(c1cc(F)ccc1O)(C3)C2]

To a solution of 8.40 g (75.0 mmol) of 4-fluorophenol and 13.5 g (75.0 mmol) of 3,5-dimethyladamantan-1-ol in 150 ml of dichloromethane a solution of 4.90 ml (75.0 mmol) of methanesulfonic acid and 5 ml of acetic acid in 100 ml of dichloromethane was added dropwise for 1 hour at room temperature. The resulting mixture was stirred at room temperature for 48 hours and then carefully poured into 300 ml of 5% NaHCO$_3$. The obtained mixture was extracted with dichloromethane (3×50 ml), the combined organic extract was dried over Na$_2$SO$_4$ and then evaporated to dryness. The residue was purified using Kugelrohr apparatus (1 mbar, 70° C.) yielding 14.2 g (68%) of the title product as a light-yellow oil. $^1$H NMR (CDCl$_3$, 400 MHz): δ 6.93 (dd, J=3.1, 11.2 Hz, 1H), 6.73 (ddd, J=3.1, 7.4, 8.6 Hz, 1H), 6.55 (dd, J=4.9, 8.6 Hz), 4.62 (s, 1H), 2.16 (dt, J=3.1, 6.3 Hz, 1H), 1.91 (m, 2H), 1.64-1.74 (m, 4H), 1.35-1.45 (m, 4H), 1.20 (br.s, 2H), 0.87 (s, 6H). $^{13}$C NMR (CDCl$_3$, 100 MHz): δ 158.49 (J$_F$=236 Hz), 150.19 (J$_F$=2.0 Hz), 137.69 (J$_F$=5.9 Hz), 117.12 (J$_F$=8.1 Hz), 114.13 (J$_F$=24.0 Hz), 112.57 (J$_F$=22.9 Hz), 50.92, 46.44, 43.05, 38.70, 38.48, 31.38, 30.84, 29.90.

2-Bromo-6-(3,5-dimethyladamantan-1-yl)-4-fluorophenol

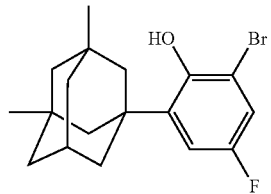

To a solution of 14.2 g (51.7 mmol) of 2-(3,5-dimethyladamantan-1-yl)-4-fluorophenol in 200 ml of dichloromethane a solution of 2.67 ml (51.7 mmol) of bromine in 100 ml of dichloromethane was added dropwise for 1 hour at room temperature. The resulting mixture was stirred at room temperature for 48 hours and then carefully poured into 200 ml of 5% NaHCO$_3$. The obtained mixture was extracted with dichloromethane (3×50 ml), the combined organic extract was dried over Na$_2$SO$_4$ and then evaporated to dryness. Yield 17.5 g (96%) of a light-yellow solid. $^1$H NMR (CDCl$_3$, 400 MHz): δ 7.06 (dd, J=3.0, 7.0 Hz, 1H), 6.93 (dd, J=2.9, 10.8 Hz, 1H), 5.59 (s, 1H), 2.16 (m, 1H), 1.89 (br.s, 2H), 1.63-1.73 (m, 4H), 1.34-1.44 (m, 4H), 1.19 (br.s, 2H), 0.86 (s, 6H). $^{13}$C NMR (CDCl$_3$, 100 MHz): δ 157.21

($J_F$=241 Hz), 146.61 ($J_F$=2.8 Hz), 137.97 ($J_F$=6.1 Hz), 115.34 ($J_F$=25.8 Hz), 113.64 ($J_F$=23.6 Hz), 110.83 ($J_F$=10.9 Hz), 54.77, 50.48, 45.71, 42.61, 38.96, 38.03, 31.02, 30.42, 29.49.

1-(3-Bromo-5-fluoro-2-(methoxymethoxy)phenyl)-3,5-dimethyladamantane

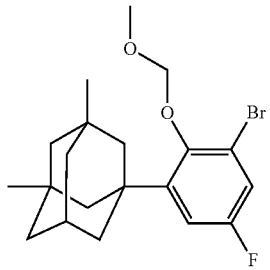 [SMILES: COCOc1c(Br)cc(F)cc1C12CC3CC(C)(CC(C)(C3)C1)C2]

To a solution of 17.5 g (49.5 mmol) of 2-bromo-6-(3,5-dimethyladamantan-1-yl)-4-fluorophenol in 200 ml of dry THF 2.17 g (54.4 mmol, 60% wt. in mineral oil) of sodium hydride was added portionwise at room temperature. After that, 4.53 ml (60.0 mmol) of MOMCl was added dropwise for 1 hour. The reaction mixture was heated at 60° C. for 24 hours and then poured into 300 ml of cold water. The crude product was extracted with 3×200 ml of dichloromethane. The combined organic extract was dried over $Na_2SO_4$ and then evaporated to dryness. Yield 19.6 g (quant.) of a white solid. $^1$H NMR (CDCl$_3$, 400 MHz): δ 7.13 (dd, J=3.1, 6.8 Hz, 1H), 6.98 (dd, J=3.1, 10.9 Hz, 1H), 5.19 (s, 2H), 3.68 (s, 3H), 2.16 (m, 1H), 1.89 (br.s, 2H), 1.64-1.74 (m, 4H), 1.34-1.44 (m, 4H), 1.19 (br.s, 2H), 0.87 (s, 6H). $^{13}$C NMR (CDCl$_3$, 100 MHz): δ 159.47 ($J_F$=245 Hz), 150.08 ($J_F$=3.3 Hz), 146.34 ($J_F$=6.4 Hz), 118.13 ($J_F$=25.4 Hz), 117.65 ($J_F$=10.7 Hz), 114.01 ($J_F$=23.4 Hz), 99.95, 57.89, 50.69, 47.13, 42.84, 39.78, 39.55, 31.50, 30.84, 29.94.

2-(3-(3,5-Dimethyladamantan-1-yl)-5-fluoro-2-(methoxymethoxy)phenyl)benzo[b]thiophene

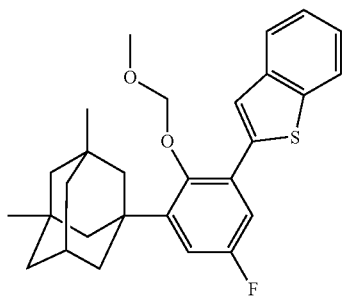 [SMILES: COCOc1c(-c2cc3ccccc3s2)cc(F)cc1C12CC3CC(C)(CC(C)(C3)C1)C2]

To a solution of 3.38 g (25.2 mmol) of benzo[b]thiophene in 200 ml of dry THF 9.50 ml (23.9 mmol, 2.5 M) of $^n$BuLi in hexanes was added dropwise at −10° C. The reaction mixture was stirred for 2 hours at 0° C., followed by an addition of 3.30 g (23.9 mmol) of ZnCl$_2$. Next, the obtained solution was warmed to room temperature, 5.00 g (12.6 mmol) of 1-(3-bromo-5-fluoro-2-(methoxymethoxy)phenyl)-3,5-dimethyladamantane and 643 mg (1.26 mmol) of Pd[P$^t$Bu$_3$]$_2$ were subsequently added. The resulting mixture was stirred overnight at 60° C., then poured into 250 ml of water. The crude product was extracted with 3×150 ml of dichloromethane. The combined organic extract was dried over $Na_2SO_4$ and then evaporated to dryness. The residue was purified by flash chromatography on silica gel 60 (40-63 um; eluent: hexane-ethyl acetate=10:1, vol.). Yield 4.52 g (80%) of a light-yellow oil. $^1$H NMR (CDCl$_3$, 400 MHz): δ 7.85 (dd, J=1.1, 7.3 Hz, 1H), 7.79 (dd, J=1.5, 7.0 Hz, 1H), 7.51 (s, 1H), 7.35 (qd, J=5.7, 7.2, 7.2, 7.2, 2H), 7.06 (s, 1H), 7.04 (m, 1H), 4.72 (s, 2H), 3.45 (s, 3H), 2.20 (m, 1H), 1.98 (br.s, 2H), 1.71-1.83 (m, 4H), 1.37-1.47 (m, 4H), 1.22 (br.s, 2H), 0.90 (s, 6H). $^{13}$C NMR (CDCl$_3$, 100 MHz): δ 159.72 ($J_F$=241 Hz), 150.30, 150.28, 145.71, 140.51 ($J_F$=2.0 Hz), 140.29, 139.92, 129.86, 129.78, 124.51 ($J_F$=3.5 Hz), 123.64 ($J_F$=3.5 Hz), 122.15, 115.46 ($J_F$=23.7 Hz), 114.68 ($J_F$=23.6 Hz), 99.29, 57.73, 50.84, 47.25, 42.97, 39.59, 39.47, 31.54, 30.92, 30.03.

3-Bromo-2-(3-(3,5-dimethyladamantan-1-yl)-5-fluoro-2-(methoxymethoxy)phenyl)benzo[b]thiophene

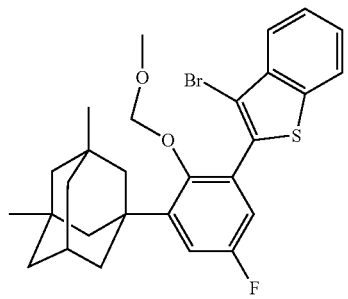 [SMILES: COCOc1c(-c2sc3ccccc3c2Br)cc(F)cc1C12CC3CC(C)(CC(C)(C3)C1)C2]

To a solution of 4.50 g (10.0 mmol) of 2-(3-(3,5-dimethyladamantan-1-yl)-5-fluoro-2-(methoxymethoxy)phenyl)benzo[b]thiophene in 150 ml of chloroform 1.82 g (10.2 mmol) of N-bromosuccinimide was added at room temperature. The reaction mixture was stirred for 12 hours at this temperature, then poured into 100 ml of water. The crude product was extracted with 3×50 ml of dichloromethane. The combined organic extract was dried over $Na_2SO_4$ and then evaporated to dryness. The residue was recrystallized from 110 ml of n-hexane. Yield 4.88 g (92%) of a beige solid. $^1$H NMR (CDCl$_3$, 400 MHz): δ 7.87 (d, J=7.4 Hz, 1H), 7.83 (d, J=8.0 Hz, 1H), 7.49 (dt, J=1.1, 7.1 Hz, 1H), 7.43 (dt, J=1.3, 7.3 Hz, 1H), 7.11 (dd, J=3.2, 10.9 Hz, 1H), 6.99 (dd, J=3.2, 7.6 Hz, 1H), 4.59 (s, 2H), 3.31 (s, 3H), 2.19 (m, 1H), 1.98 (br.s, 2H), 1.70-1.83 (m, 4H), 1.36-1.46 (m, 4H), 1.21 (br.s, 2H), 0.89 (s, 6H). $^{13}$C NMR (CDCl$_3$, 100 MHz): δ 159.24 ($J_F$=242 Hz), 151.76 ($J_F$=2.9 Hz), 145.29 ($J_F$=6.4 Hz), 138.60, 138.01, 135.93, 127.35 ($J_F$=9.0 Hz), 125.76, 125.22, 123.64, 122.29, 116.40 ($J_F$=23.4 Hz), 115.67 ($J_F$=23.6 Hz), 108.29, 99.65, 57.51, 50.86, 47.09, 42.98, 39.41, 39.36, 31.51, 30.92, 29.99.

6,6'-(Pyridine-2,6-diylbis(benzo[b]thiophene-3,2-diyl))bis(2-(3,5-dimethyladamantan-1-yl)-4-fluorophenol)

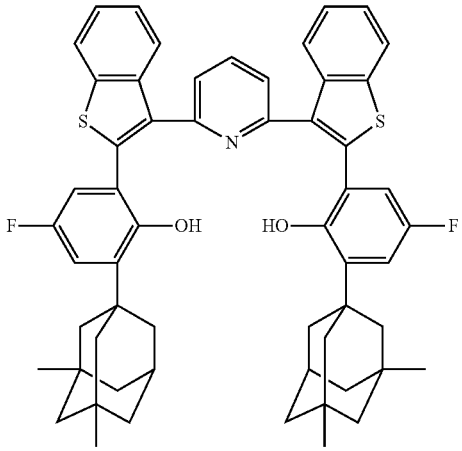 [SMILES: CC12CC3CC(C)(C1)CC(c1cc(F)cc(-c4sc5ccccc5c4-c4cccc(-c5c(-c6cc(F)cc(C78CC9CC(C)(CC(C)(C9)C7)C8)c6O)sc6ccccc56)n4)c1O)(C3)C2]

To a solution of 4.00 g (7.55 mmol) of 3-bromo-2-(3-(3,5-dimethyladamantan-1-yl)-5-fluoro-2-(methoxymethoxy)phenyl)benzo[b]thiophene in 50 ml of dry THF 3.08 ml (7.70 mmol, 2.5 M) of "BuLi in hexanes was added dropwise at −80° C. The reaction mixture was stirred for 30 minutes at this temperature, then 1.02 g (7.70 mmol) of $ZnCl_2$ was added. The obtained mixture was warmed to room temperature, then 0.86 g (3.63 mmol) of 2,6-dibromopyridine and 194 mg (0.38 mmol) of Pd[P'Bu$_3$]$_2$ were subsequently added. The obtained mixture was stirred overnight at 60° C., poured into 100 ml of water, and the crude product was extracted with dichloromethane (3×50 ml). The combined organic extract was dried over $Na_2SO_4$ and then evaporated to dryness. To the resulting oil 50 ml of THF, 50 ml of methanol, and 2 ml of 12 N HCl were subsequently added. The reaction mixture was stirred overnight at 60° C. and then poured into 200 ml of water. The obtained mixture was extracted with dichloromethane (3×50 ml), the combined organic extract was dried over $Na_2SO_4$ and then evaporated to dryness. The residue was purified by flash chromatography on silica gel 60 (40-63 um; eluent: hexane-ethyl acetate-triethylamine=100:10:1, vol.). Yield 1.80 g (56%, as a mixture of rotamers) of a light-yellow foam. $^1$H NMR (CDCl$_3$, 400 MHz): δ 7.85-7.91 (m, 4H), 7.71 (t, J=7.8 Hz, 1H), 7.43 (m, 4H), 7.27 (m, 2H), 6.82-6.87 (m, 4H), 0.91-2.15 (m, 26H), 0.69-0.87 (m, 12H). $^{13}$C NMR (CDCl$_3$, 100 MHz): δ 157.34, 154.97, 153.27, 148.98, 140.47 (J$_F$=5.9 Hz), 140.03, 138.96, 138.56, 138.09, 132.36, 125.19, 124.00, 122.91, 122.19, 119.08, 115.02 (J$_F$=11.0 Hz), 114.79 (J$_F$=10.7 Hz), 50.73, 46.35, 46.14, 43.07, 42.71, 38.59, 37.57, 31.39, 31.15, 30.87, 30.74, 30.03, 29.93.

Dimethylhafnium[6,6'-(pyridine-2,6-diylbis(benzo[b]thiophene-3,2-diyl))bis(2-(3,5-dimethyladamantan-1-yl)-4-fluorophenolate] (Complex 25)

To a suspension of 623 mg (1.94 mmol) of hafnium tetrachloride (<0.05% Zr) in 70 ml of dry toluene 3.01 ml (8.73 mmol, 2.9 M) of MeMgBr in diethyl ether was added in one portion at room temperature. The resulting suspension was stirred for 1 minute, and a solution of 1.73 g (1.94 mmol) of 6,6'-(pyridine-2,6-diylbis(benzo[b]thiophene-3,2-diyl))bis(2-(3,5-dimethyladamantan-1-yl)-4-fluorophenol) in 20 ml of dry toluene was added dropwise for 1 minute. The reaction mixture was stirred overnight at room temperature and then evaporated to near dryness. The solid obtained was extracted with 2×50 ml of hot toluene, and the combined organic extract was filtered through a thin pad of Celite 503. Next, the filtrate was evaporated to dryness. The resulting solid was washed with 15 ml of n-hexane and then dried in vacuo. Yield 1.40 g (66%) of a beige solid as a hexane solvate. Anal. Calc. for $C_{59}H_{59}F_2HfNO_2S_2$×0.5 ($C_6H_{14}$): C, 65.45; H, 5.85; N, 1.23. Found: C, 65.68; H, 6.07; N, 1.14. $^1$H NMR (C$_6$D$_6$, 400 MHz): δ 7.31 (m, 2H), 7.23 (dd, J=3.3, 11.1 Hz, 2H), 7.09 (dd, J=3.2, 7.7 Hz, 2H), 7.04 (m, 4H), 6.83 (m, 2H), 6.74 (t, J=7.8 Hz, 1H), 6.35 (d, J=7.8 Hz, 2H), 2.33 (d, J=12.1 Hz, 2H), 2.05 (d, J=11.7 Hz, 2H), 1.66 (br.s, 2H), 1.03-1.50 (m, 20H), 0.83 (s, 6H), 0.76 (s, 6H), −0.10 (s, 6H). $^{13}$C NMR (CD$_2$Cl$_2$, 100 MHz): (158.62, 156.35 (J$_F$=234 Hz), 154.17, 147.34 (J$_F$=1.8 Hz), 141.61, 141.52 (J$_F$=6.1 Hz), 141.02, 139.98, 127.11, 126.43, 126.18, 126.01, 124.23 (J$_F$=8.8 Hz), 122.81, 115.91 (J$_F$=16.8 Hz), 115.68 (J$_F$=16.8 Hz), 52.36, 51.64, 48.47, 45.29, 43.61, 42.34, 39.67, 37.98, 31.91, 31.44, 31.38, 30.79, 29.98, 27.47.

2,6-bis(2-Bromophenyl)pyridine

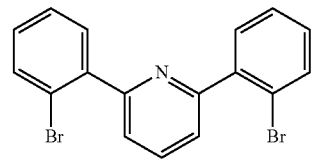 [SMILES: Brc1ccccc1-c1cccc(-c2ccccc2Br)n1]

2,6-Dibromopyridine (3.73 g, 15.7 mmol), 2-bromophenylboronic acid (6.26 g, 31.4 mmol), sodium carbonate (8.33 g, 78.6 mmol), dioxane (66 mL), and water (33 mL) were combined in a round-bottomed flask. The mixture was sparged with nitrogen for 1 hour then the Pd(PPh$_3$)$_4$ (1.82 g, 1.57 mmol) was quickly added. The mixture was sparged for 30 minutes, then heated to 100° C. overnight. The next day the mixture was poured into water (200 mL) and extracted with dichloromethane (4×60 mL). The combined organics were dried with brine, then Na$_2$SO$_4$. Evaporation afforded crude product as a yellow-orange oily solid that is purified by crystallization from hot toluene. Yield 3.42 g, 55.9%.

2-(3-(2,3-dimethylbutan-2-yl)-2-(methoxymethoxy)-5-methylphenyl)-4,4,5,5-tetramethyl-1,3,2-dioxaborolane

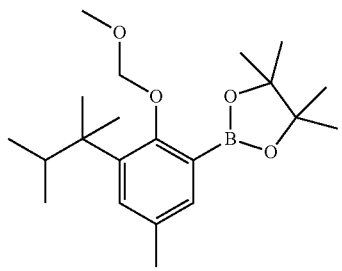 [SMILES: COCOc1c(B2OC(C)(C)C(C)(C)O2)cc(C)cc1C(C)(C)C(C)C]

Tetrahydrofuran (20 mL) was added to 1-bromo-3-(2,3-dimethylbutan-2-yl)-2-(methoxymethoxy)-5-methylbenzene (2.89 g, 9.17 mmol) to form a pale brown solution. At −50° C. a hexane solution of BuLi (6.30 mL, 10.1 mmol) was added dropwise over 5 minutes to form a brown suspension. The mixture was stirred for 45 minutes then the 2-isopropoxy-4,4,5,5-tetramethyl-1,3,2-dioxaborolane (2.22 g, 11.9 mmol) was added to form a clear brown solution. The mixture was allowed to slowly warm to ambient temperature. After stirring overnight the mixture was poured into water (100 mL) and shaken. The mixture was extracted with dichloromethane (5×50 mL). The combined organics were washed with water, brine, then dried over MgSO₄. Removal of volatiles afforded the product as a brown oil. Yield: 2.45 g, 73.7%.

2',2'''-(pyridine-2,6-diyl)bis(3-(2,3-dimethylbutan-2-yl)-5-methyl-[1,1'-biphenyl]-2-ol)

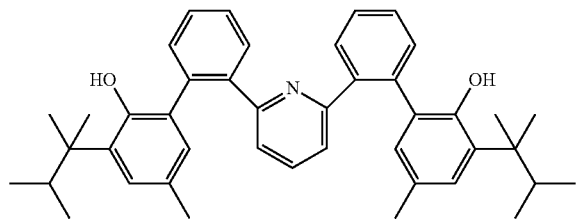 [SMILES: Cc1cc(-c2ccccc2-c2cccc(-c3ccccc3-c3cc(C)cc(C(C)(C)C(C)C)c3O)n2)c(O)c(C(C)(C)C(C)C)c1]

A 100 mL round-bottomed flask was loaded with 1-bromo-3-(2,3-dimethylbutan-2-yl)-2-(methoxymethoxy)-5-methylbenzene (2.45 g, 6.76 mmol), 2,6-bis(2-bromophenyl)pyridine (1.32 g, 3.38 mmol), Na₂CO₃ (1.79 g, 16.9 mmol), dioxane (20 mL) and water (10 mL). The mixture was sparged with nitrogen for 30 minutes then solid Pd(PPh₃)₄ (0.391 g, 0.340 mmol) was added. The mixture was sparged for an additional 15 minutes, then stirred and heated in an oil bath maintained at 100° C. After 17 hours the brown mixture was combined with water (100 mL) in a separatory funnel. The mixture was extracted with CH₂Cl₂ (6×25 mL). The combined organics were dried over brine, then MgSO4. Removal of the volatiles afforded 3.1 g of brown oil that was combined with tetrahydrofuran (20 mL), methanol (20 mL), and concentrated HCl (1.0 mL). The mixture was stirred and heated to 60° C. for 4 hours. The volatiles were then evaporated and the residue was extracted with CH₂Cl₂ (100 mL), washed with water (3×50 mL), and dried with brine (20 mL). The mixture was dried over MgSO₄, filtered, then evaporated to afford crude product that was purified on by column chromatography on silica gel, eluted with 2-8% ethyl acetate in hexanes. Yield: 0.87 g, 42%.

Dibenzylzirconium[2',2'''-(pyridine-2,6-diyl)bis(3-(2,3-dimethylbutan-2-yl)-5-methyl-[1,1'-biphenyl]-2-olate)] (Complex 29)

Toluene (5 mL) was added to 2',2'''-(pyridine-2,6-diyl)bis(3-(2,3-dimethylbutan-2-yl)-5-methyl-[1,1'-biphenyl]-2-ol) (0.260 g, 0.425 mmol) and tetrabenzylzirconinum (0.194 g, 0.425 mmol) to form a slightly cloudy orange solution. After stirring overnight the mixture was evaporated and the residue was extracted with methylcyclohexane (5 mL). The cloudy orange solution was filtered and evaporated to a residue and pentane (4 mL) was added. The mixture was triturated to form a divided yellow-orange solid. The mixture was cooled to −15° C. for 1 hour then the solid was collected on a fritted disk. The solid was washed with cold pentane (2×5 mL) and dried under reduced pressure. Product co-crystallized with 1 equiv. hexane. Yield: 0.233 g, 56.5%.

Dibenzylhafnium[2',2'''-(pyridine-2,6-diyl)bis(3-(2,3-dimethylbutan-2-yl)-5-methyl-[1,1'-biphenyl]-2-olate)] (Complex 30)

Toluene (5 mL) was added to 2',2'''-(pyridine-2,6-diyl)bis(3-(2,3-dimethylbutan-2-yl)-5-methyl-[1,1'-biphenyl]-2-ol) (0.208 g, 0.340 mmol) and tetrabenzylhafnium (0.185 g, 0.340 mmol) to form a clear yellow-orange solution. The mixture was stirred overnight. The mixture was filtered and evaporated to a residue. Pentane (3 mL) was added and the mixture was triturated until a divided solid formed. The mixture was cooled to −15° C. for 1 hour. Yellow solid was then collected on a fritted disk, washed with cold pentane (2×5 mL) and dried under reduced pressure. Product is co-crystallized with 1 equiv. of hexane. Yield: 0.160 g, 44.5%.

2-(Adamantan-1-yl)-6-bromo-4-methylphenol

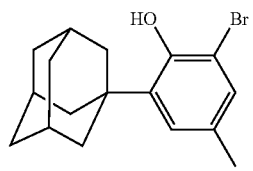 [SMILES: Cc1cc(Br)c(O)c(C23CC4CC(CC(C4)C2)C3)c1]

To a solution of 21.2 g (87.0 mmol) of 2-(adamantan-1-yl)-4-methylphenol in 200 mL of dichloromethane a solution of 4.50 mL (87.0 mmol) of bromine in 100 mL of dichloromethane was added dropwise for 10 minutes at room temperature. The resulting mixture was diluted with 400 mL of water. The crude product was extracted with dichloromethane (3×70 mL), the combined organic extract was washed with 5% NaHCO₃, dried over Na₂SO₄ and then evaporated to dryness. Yield 21.5 g (77%) of a white solid.
¹H NMR (CDCl₃, 400 MHz): δ 7.17 (s, 1H), 6.98 (s, 1H), 5.65 (s, 1H), 2.27 (s, 3H), 2.10-2.13 (m, 9H), 1.80 (m, 6H), ¹³C NMR (CDCl₃, 100 MHz): δ 148.18, 137.38, 130.24, 129.32, 127.26, 112.08, 40.18, 37.32, 36.98, 28.99, 20.55.

(1-(3-Bromo-5-methyl-2-(methoxymethoxy)phenyl)adamantine

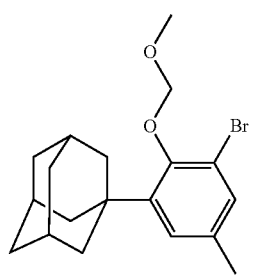 [SMILES: COCOc1c(Br)cc(C)cc1C12CC3CC(CC(C3)C1)C2]

To a solution of 21.3 g (66.4 mmol) of 2-(adamantan-1-yl)-6-bromo-4-methylphenol in 400 mL of THF 2.79 g (69.7 mmol, 60% wt. in mineral oil) of sodium hydride was added portionwise at room temperature. To the resulting suspension 5.55 mL (73.0 mmol) of methoxymethyl chloride was added dropwise for 10 minutes at room temperature. The obtained mixture was stirred overnight, then poured into 200 mL of water. Thus obtained mixture was extracted with dichloromethane (3×200 mL), the combined organic extract was washed with 5% NaHCO$_3$, dried over Na$_2$SO$_4$, and then evaporated to dryness. Yield 24.3 g (quant.) of a white solid. $^1$H NMR (CDCl$_3$, 400 MHz): δ 7.24 (d, J=1.5 Hz, 1H), 7.05 (d, J=1.8 Hz, 1H), 5.22 (s, 2H), 3.71 (s, 3H), 2.27 (s, 3H), 2.05-2.12 (m, 9H), 1.78 (m, 6H). $^{13}$C NMR (CDCl$_3$, 100 MHz): δ 151.01, 144.92, 134.34, 131.80, 127.44, 117.57, 99.56, 57.75, 41.27, 37.71, 36.82, 29.03, 20.68.

2-(3-Adamantan-1-yl)-5-methyl-2-(methoxymethoxy)phenyl)-4,4,5,5-tetramethyl-1,3,2-dioxaborolane

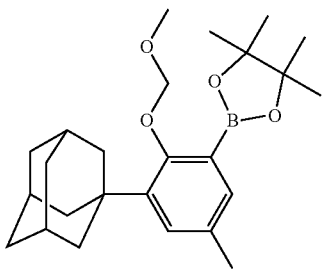 [SMILES: COCOc1c(B2OC(C)(C)C(C)(C)O2)cc(C)cc1C12CC3CC(CC(C3)C1)C2]

To a solution of 20.0 g (55.0 mmol) of (1-(3-bromo-5-methyl-2-(methoxymethoxy)phenyl)adamantine in 400 mL of dry THF 22.5 mL (56.4 mmol) of 2.5 M ″BuLi in hexanes was added dropwise for 20 minutes at −80° C. The reaction mixture was stirred at this temperature for 1 hour followed by addition of 16.7 mL (82.2 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×300 mL), the combined organic extract was dried over Na$_2$SO$_4$ and then evaporated to dryness. Yield 22.4 g (99%) of a colorless viscous oil. $^1$H NMR (CDCl$_3$, 400 MHz): δ 7.35 (d, J=2.3 Hz, 1H), 7.18 (d, J=2.3 Hz, 1H), 5.14 (s, 2H), 3.58 (s, 3H), 2.28 (s, 3H), 2.14 (m, 6H), 2.06 (m, 3H), 1.76 (m, 6H), 1.35 (s, 12H). $^{13}$C NMR (CDCl$_3$, 100 MHz): δ 159.68, 141.34, 134.58, 131.69, 131.14, 100.96, 83.61, 57.75, 41.25, 37.04, 29.14, 24.79, 20.83.

1-(2′-Bromo-5-methyl-2-(methoxymethoxy)-[1,1′-biphenyl]-3-yl)adamantine

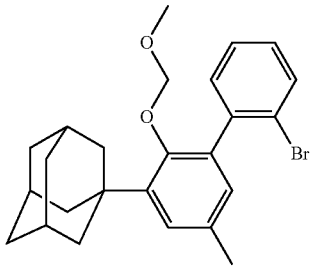 [SMILES: COCOc1c(-c2ccccc2Br)cc(C)cc1C12CC3CC(CC(C3)C1)C2]

To a solution of 10.0 g (24.3 mmol) of 2-(3-adamantan-1-yl)-5-methyl-2-(methoxymethoxy)phenyl)-4,4,5,5-tetramethyl-1,3,2-dioxaborolane in 100 mL of 1,4-dioxane 7.22 g (25.5 mmol) of 2-bromoiodobenzene, 8.38 g (60.6 mmol) of potassium carbonate, and 50 mL of water were subsequently added. The mixture obtained was purged with argon for 10 minutes followed by addition of 1.40 g (1.21 mmol) of Pd(PPh$_3$)$_4$. This mixture was stirred for 12 hours at 100° C., then cooled to room temperature, and diluted with 100 mL of water. The crude product was extracted with dichloromethane (3×150 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 10.7 g (quant.) of a white solid. $^1$H NMR (CDCl$_3$, 400 MHz): δ 7.72 (d, J=7.9 Hz, 1H), 7.35-7.44 (m, 3H), 7.19-7.26 (m, 1H), 6.94 (m, 1H), 4.53 (dd, J=20.0, 4.6 Hz, 2H), 3.24 (s, 3H), 2.38 (s, 3H), 2.23 (m, 6H), 2.15 (m, 3H), 1.84 (m, 6H). $^{13}$C NMR (CDCl$_3$, 100 MHz): δ 151.51, 142.78, 141.11, 134.63, 132.76, 132.16, 132.13, 129.83, 128.57, 127.76, 127.03, 124.05, 98.85, 56.95, 41.21, 37.18, 36.94, 29.07, 21.00.

2-(3′-(Adamantan-1-yl)-5′-methyl-2′-(methoxymethoxy)-[1,1′-biphenyl]-2-yl)-4,4,5,5-tetramethyl-1,3,2-dioxaborolane

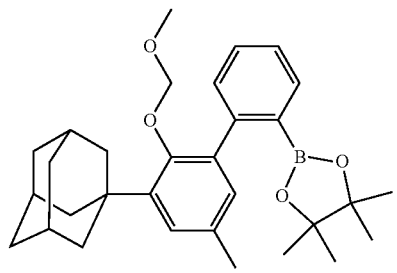 [SMILES: COCOc1c(-c2ccccc2B2OC(C)(C)C(C)(C)O2)cc(C)cc1C12CC3CC(CC(C3)C1)C2]

To a solution of 10.7 g (24.3 mmol) of 1-(2′-bromo-5-methyl-2-(methoxymethoxy)-[1,1′-biphenyl]-3-yl)adamantine in 250 mL of dry THF 11.6 mL (29.1 mmol) of 2.5 M ″BuLi in hexanes was added dropwise for 20 minutes at −80° C. The reaction mixture was stirred for 1 hour at this temperature followed by addition of 8.43 mL (41.3 mmol) of 2-isopropoxy-4,4,5,5-tetramethyl-1,3,2-dioxaborolane. The obtained suspension was stirred at room temperature for 1 hour, then poured into 300 mL of water. The crude product was extracted with dichloromethane (3×300 mL), the combined organic extract was dried over Na$_2$SO$_4$ and then evaporated to dryness. The residue was purified by flash chromatography on silica gel 60 (40-63 um, eluent: hexane-diethyl ether=10:1, vol.). Yield 8.60 g (72%) of a colorless glassy solid. $^1$H NMR (CDCl$_3$, 400 MHz): δ 7.75 (d, J=7.4 Hz, 1H), 7.33-7.44 (m, 2H), 7.29-7.33 (m, 1H), 7.07 (br.s, 1H), 6.84 (br.s, 1H), 4.50 (d, J=4.4 Hz, 1H), 4.40 (d, J=4.4 Hz, 1H), 3.27 (s, 3H), 2.30 (s, 3H), 2.21 (br.s, 6H), 2.11 (m, 3H), 1.80 (m, 6H), 1.21 (s, 6H), 1.15 (s, 6H). $^{13}$C NMR (CDCl$_3$, 100 MHz): δ 151.52, 145.68, 142.04, 136.74, 134.30, 131.47, 130.51, 130.23, 129.79, 126.69, 126.06, 98.73, 83.39, 57.22, 41.47, 37.20, 37.04, 29.19, 25.00, 24.16, 20.97.

2',2'''-(Pyridine-2,6-diyl)bis(3-adamantan-1-yl)-5-methyl-[1,1'-biphenyl]-2-ol)

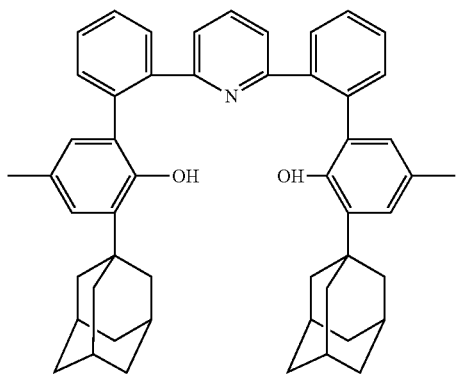

To a solution of 4.00 g (8.19 mmol) of 2-(3'-(adamantan-1-yl)-5'-methyl-2'-(methoxymethoxy)-[1,1'-biphenyl]-2-yl)-4,4,5,5-tetramethyl-1,3,2-dioxaborolane in 40 mL of 1,4-dioxane, 969 mg (4.09 mmol) of 2,6-dibromopyridine, 6.68 g (20.5 mmol) of cesium carbonate, and 20 mL of water were subsequently added. The mixture obtained was purged with argon for 10 minutes followed by addition of 470 mg (0.41 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). The obtained glassy solid was triturated with 30 mL of n-pentane, the precipitate thus obtained was filtered off (G3), washed with 2×10 mL of n-pentane, and dried in vacuo. Yield 2.10 g (72%) of a mixture of two isomers as a white powder. $^1$H NMR (CDCl$_3$, 400 MHz): δ 7.64 (s, 1H), 7.41-7.59 (m, 7H), 7.33-7.38 (m, 2H), 7.27 (br.s, 1H), 7.02 (d, J=7.9 Hz, 1H), 7.00 (d, J=7.8 Hz, 1H), 6.87-6.92 (m, 3H), 6.21 (d, J=1.7 Hz, 1H), 2.26 (s, 3H), 1.55-1.98 (m, 33H). $^{13}$C NMR (CDCl$_3$, 100 MHz) δ 157.91, 157.89, 150.24, 149.65, 139.70, 138.49, 137.93, 137.58, 137.54, 137.44, 137.06, 136.80, 132.39, 131.36, 130.48, 130.34, 130.17, 129.97, 129.36, 129.09, 128.90, 128.82, 128.70, 128.45, 127.78, 127.71, 126.90, 126.54, 122.30, 122.02, 40.35, 40.17, 37.00, 36.78, 36.66, 36.46, 29.09, 28.96, 20.85, 20.52.

(3r,5r,7r)-1-(2'-Bromo-2-(methoxymethoxy)-4',5-dimethyl-[1,1'-biphenyl]-3-yl)adamantine

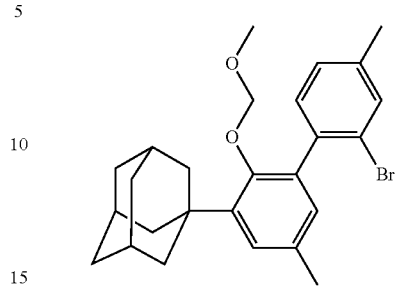

To a solution of 6.11 g (14.8 mmol) of 2-(3-adamantan-1-yl)-5-methyl-2-(methoxymethoxy)phenyl)-4,4,5,5-tetramethyl-1,3,2-dioxaborolane in 100 mL of 1,4-dioxane 4.62 g (15.6 mmol) of 2-bromo-4-methyliodobenzene, 5.12 g (37.0 mmol) of potassium carbonate, and 50 mL of water were subsequently added. The mixture obtained was purged with argon for 10 minutes followed by addition of 850 mg (0.741 mmol) of Pd(PPh$_3$)$_4$. This mixture was stirred for 12 hours at 100° C., then cooled to room temperature, and diluted with 100 mL of water. The crude product was extracted with dichloromethane (3×150 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 4.88 g (73%) of a white solid. $^1$H NMR (CDCl$_3$, 400 MHz): δ 7.53 (s, 1H), 7.27 (d, J=7.8 Hz, 1H), 7.16-7.19 (m, 2H), 6.90 (d, J=1.7 Hz, 1H), 4.40 (m, 2H), 3.27 (s, 3H), 2.40 (s, 3H), 2.35 (s, 3H), 2.20 (m, 6H), 2.12 (m, 3H), 1.81 (m, 6H). $^{13}$C NMR (CDCl$_3$, 100 MHz): δ 151.72, 142.67, 138.73, 138.09, 134.43, 133.20, 132.02, 131.82, 130.08, 127.94, 127.61, 123.70, 98.79, 57.06, 41.21, 37.19, 36.98, 29.11, 21.03, 20.75.

2-(3'-((3r,5r,7r)-Adamantan-1-yl)-2'-(methoxymethoxy)-4,5'-dimethyl-[1,1'-biphenyl]-2-yl)-4,4,5,5-tetramethyl-1,3,2-dioxaborolane

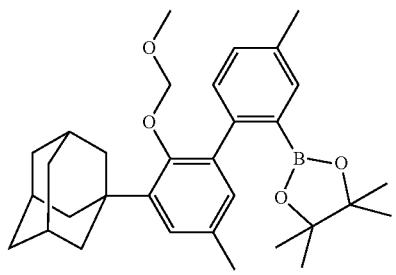 [SMILES: COCOc1c(-c2ccc(C)cc2B2OC(C)(C)C(C)(C)O2)cc(C)cc1C12CC3CC(CC(C3)C1)C2]

To a solution of 4.88 g (10.7 mmol) of (3r,5r,7r)-1-(2'-bromo-2-(methoxymethoxy)-4',5-dimethyl-[1,1'-biphenyl]-3-yl)adamantine in 120 mL of dry THF 5.20 mL (12.8 mmol) of 2.5 M "BuLi in hexanes was added dropwise for 20 minutes at −80° C. The reaction mixture was stirred for 1 hour at this temperature followed by addition of 4.43 mL (21.4 mmol) of 2-isopropoxy-4,4,5,5-tetramethyl-1,3,2-dioxaborolane. The obtained suspension was stirred at room temperature for 1 hour, then poured into 300 mL of water. The crude product was extracted with dichloromethane (3×300 mL), the combined organic extract was dried over Na₂SO₄ and then evaporated to dryness. The residue was purified by flash chromatography on silica gel 60 (40-63 um, eluent: hexane-diethyl ether=10:1, vol.). Yield 3.04 g (57%) of a colorless glassy solid. ¹H NMR (CDCl₃, 400 MHz): δ 7.53 (s, 1H), 7.19-7.23 (m, 2H), 7.02 (d, J=2.1 Hz, 1H), 6.79 (d, J=1.7 Hz, 1H), 4.43 (m, 2H), 3.27 (s, 3H), 2.37 (s, 3H), 2.26 (s, 3H), 2.17 (m, 6H), 2.08 (m, 6H), 1.77 (m, 6H), 1.18 (s, 6H), 1.13 (s, 6H). ¹³C NMR (CDCl₃, 100 MHz): δ 151.71, 142.84, 141.95, 136.61, 135.53, 134.91, 131.41, 130.65, 130.63, 130.21, 126.52, 98.73, 83.38, 57.28, 41.49, 37.20, 37.07, 29.22, 25.02, 24.20, 21.03, 20.99.

2',2'''-(Pyridine-2,6-diyl)bis(3-((3r,5r,7r)-adamantan-1-yl)-4',5-dimethyl-[1,1'-biphenyl]-2-ol)

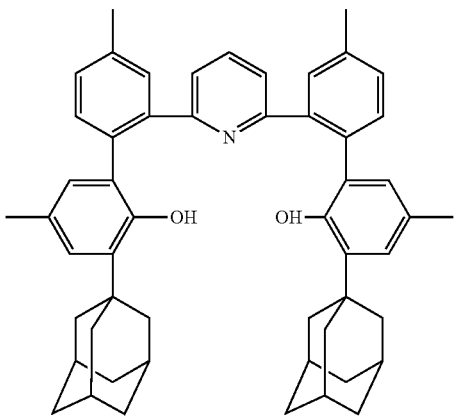

To a solution of 3.04 g (6.05 mmol) of 2-(3'-((3r,5r,7r)-adamantan-1-yl)-2'-(methoxymethoxy)-4,5'-dimethyl-[1,1'-biphenyl]-2-yl)-4,4,5,5-tetramethyl-1,3,2-dioxaborolane in 40 mL of 1,4-dioxane, 716 mg (3.02 mmol) of 2,6-dibromopyridine, 4.92 g (15.1 mmol) of cesium carbonate, and 20 mL of water were subsequently added. The mixture obtained was purged with argon for 10 minutes followed by addition of 350 mg (0.30 mmol) of Pd(PPh₃)₄. This mixture was stirred for 12 hours at 100° C., then cooled to room temperature, and diluted with 50 mL of water. Thus obtained mixture was extracted with dichloromethane (3×50 mL), the combined organic extract was dried over Na₂SO₄ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO₃, dried over Na₂SO₄, and then evaporated to dryness. The residue was purified by flash chromatography on silica gel 60 (40-63 um, eluent: hexane-ethyl acetate=10:1, vol.). Yield 0.74 g (33%) of a mixture of two isomers as a white foam. ¹H NMR (CDCl₃, 400 MHz): δ 7.66 (s, 1H), 7.39-7.42 (m, 3H), 7.22-7.35 (m, 5H), 6.96-7.01 (m, 2H), 6.85-6.91 (m, 3H), 6.16 (d, J=1.5 Hz, 1H), 2.49 (s, 3H), 2.47 (s, 3H), 2.26 (s, 3H), 1.58-2.04 (m, 33H). ¹³C NMR (CDCl₃, 100 MHz) δ 158.05, 157.98, 150.39, 149.80, 139.62, 138.29, 137.77, 137.61, 137.55, 136.94, 136.62, 134.64, 134.44, 132.31, 131.18, 130.90, 130.77, 130.39, 130.15, 129.95, 129.55, 129.13, 128.99, 128.62, 128.34, 126.74, 126.34, 122.22, 121.95, 40.35, 40.21, 37.07, 36.88, 36.65, 36.46, 29.15, 29.04, 21.09, 21.06, 20.86, 20.51.

(3r,5r,7r)-1-(2'-Bromo-4'-(tert-butyl)-2-(methoxymethoxy)-5-methyl-[1,1'-biphenyl]-3-yl)adamantine

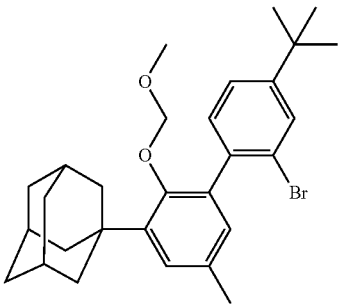 [SMILES: COCOc1c(-c2ccc(C(C)(C)C)cc2Br)cc(C)cc1C12CC3CC(CC(C3)C1)C2]

To a solution of 8.00 g (19.4 mmol) of 2-(3-adamantan-1-yl)-5-methyl-2-(methoxymethoxy)phenyl)-4,4,5,5-tetramethyl-1,3,2-dioxaborolane in 50 mL of 1,4-dioxane 7.22 g (21.3 mmol) of 2-bromo-4-(tert-butyl)iodobenzene, 6.70 g (48.5 mmol) of potassium carbonate, and 25 mL of water were subsequently added. The mixture obtained was purged with argon for 10 minutes followed by addition of 2.20 g (1.90 mmol) of Pd(PPh₃)₄. This mixture was stirred for 12 hours at 100° C., then cooled to room temperature, and diluted with 100 mL of water. The crude product was extracted with dichloromethane (3×150 mL), the combined organic extract was dried over Na₂SO₄ and then evaporated to dryness. The residue was purified by flash chromatography on silica gel 60 (40-63 um, eluent: hexane-dichloromethane=10:1, vol.). Yield 5.20 g (54%) of a white solid. ¹H NMR (CDCl₃, 400 MHz): δ 7.68 (s, 1H), 7.30-7.38 (m, 2H), 7.16 (s, 1H), 6.92 (s, 1H), 4.49 (m, 2H), 3.18 (s, 3H), 2.35 (s, 3H), 2.19 (m, 6H), 2.12 (m, 3H), 1.81 (m, 6H), 1.37 (s, 9H). ¹³C NMR (CDCl₃, 100 MHz): δ 152.30, 151.61, 142.80, 138.05, 134.67, 132.11, 131.74, 130.01, 129.70, 127.66, 124.22, 123.89, 98.83, 56.93, 41.29, 37.24, 37.00, 34.60, 31.22, 29.14, 21.05.

2-(3'-((3r,5r,7r)-Adamantan-1-yl)-4-(tert-butyl)-2'-(methoxymethoxy)-5'-methyl-[1,1'-biphenyl]-2-yl)-4,4,5,5-tetramethyl-1,3,2-dioxaborolane

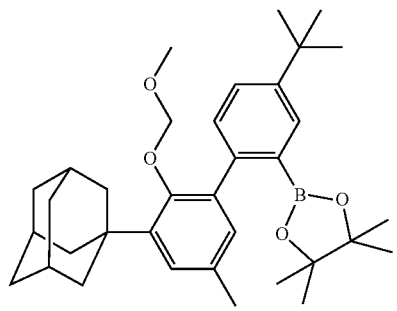 [SMILES: COCOc1c(-c2ccc(C(C)(C)C)cc2B2OC(C)(C)C(C)(C)O2)cc(C)cc1C12CC3CC(CC(C3)C1)C2]

To a solution of 5.12 g (10.3 mmol) of (3r,5r,7r)-1-(2'-bromo-4'-(tert-butyl)-2-(methoxymethoxy)-5-methyl-[1,1'-biphenyl]-3-yl)adamantine in 120 mL of dry THF 6.20 mL (15.4 mmol) of 2.5 M "BuLi in hexanes was added dropwise for 20 minutes at −80° C. The reaction mixture was stirred for 1 hour at this temperature followed by addition of 5.23 mL (25.6 mmol) of 2-isopropoxy-4,4,5,5-tetramethyl-1,3,2-dioxaborolane. The obtained suspension was stirred at room temperature for 1 hour, then poured into 300 mL of water. The crude product was extracted with dichloromethane (3×300 mL), the combined organic extract was dried over $Na_2SO_4$ and then evaporated to dryness. The residue was purified by flash chromatography on silica gel 60 (40-63 um, eluent: hexane-diethyl ether=10:1, vol.). Yield 3.30 g (59%) of a colorless glassy solid. $^1$H NMR (CDCl$_3$, 400 MHz): δ 7.72 (d, J=2.1 Hz, 1H), 7.44 (dd, J=8.1, 2.2 Hz, 1H), 7.29 (d, J=8.1 Hz, 1H), 7.05 (d, J=2.0 Hz, 1H), 6.83 (d, J=1.7 Hz, 1H), 4.45 (m, 2H), 3.24 (s, 3H), 2.28 (s, 3H), 2.20 (m, 6H), 2.10 (m, 3H), 1.79 (m, 6H), 1.37 (s, 9H), 1.20 (br.s, 6H), 1.14 (br.s, 6H). $^{13}$C NMR (CDCl$_3$, 100 MHz): δ 151.61, 148.72, 142.79, 141.98, 136.75, 131.35, 130.67, 130.64, 129.95, 126.89, 126.48, 98.70, 83.33, 57.20, 41.51, 37.22, 37.08, 34.45, 31.41, 29.22, 25.03, 24.22, 20.96.

2',2'''-(Pyridine-2,6-diyl)bis(3-((3r,5r,7r)-adamantan-1-yl)-4'-(tert-butyl)-5-methyl-[1,1'-biphenyl]-2-ol)

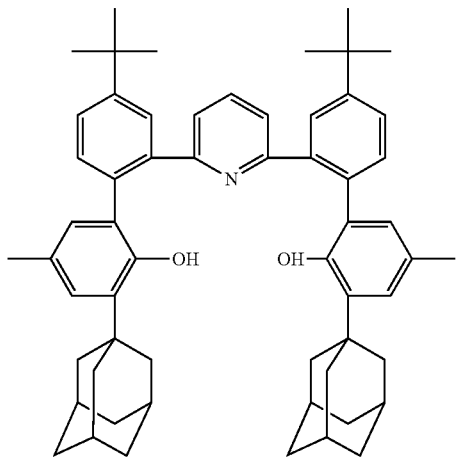

To a solution of 1.75 g (3.21 mmol) of 2-(3'-((3r,5r,7r)-adamantan-1-yl)-4-(tert-butyl)-2'-(methoxymethoxy)-5'-methyl-[1,1'-biphenyl]-2-yl)-4,4,5,5-tetramethyl-1,3,2-dioxaborolane in 40 mL of 1,4-dioxane, 381 mg (1.61 mmol) of 2,6-dibromopyridine, 2.62 g (8.03 mmol) of cesium carbonate, and 20 mL of water were subsequently added. The mixture obtained was purged with argon for 10 minutes followed by addition of 180 mg (0.16 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over $Na_2SO_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 0.60 g (45%) of a mixture of two isomers as a white foam. $^1$H NMR (CDCl$_3$, 400 MHz): δ 7.72 and 7.08 (2s, 2H), 7.40-7.53 (m, 5H), 7.21-7.26 (m, 2H), 6.94-7.00 (m, 2H), 6.80-6.86 and 6.09 (2m, 4H), 1.53-1.95 (m, 30H), 1.39 and 1.40 (2s, 18H). $^{13}$C NMR (CDCl$_3$, 100 MHz) (158.53, 150.71, 150.54, 149.85, 139.47, 137.94, 137.52, 136.66, 134.45, 132.05, 130.80, 130.68, 129.49, 129.04, 128.58, 128.41, 127.40, 127.24, 126.78, 126.36, 125.72, 122.26, 122.02, 40.38, 40.28, 37.05, 36.87, 36.70, 36.52, 34.67, 31.58, 31.39, 29.11, 28.98, 20.87, 20.52.

2',2'''-(4-Methoxypyridine-2,6-diyl)bis(3-((3r,5r,7r)-adamantan-1-yl)-4'-(tert-butyl)-5-methyl-[1,1'-biphenyl]-2-ol)

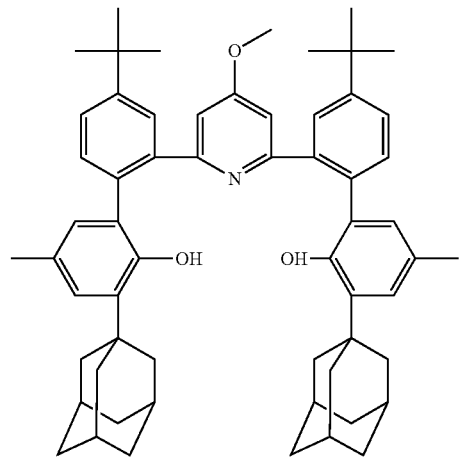

To a solution of 1.50 g (2.75 mmol) of 2-(3'-((3r,5r,7r)-adamantan-1-yl)-4-(tert-butyl)-2'-(methoxymethoxy)-5'-methyl-[1,1'-biphenyl]-2-yl)-4,4,5,5-tetramethyl-1,3,2-dioxaborolane in 40 mL of 1,4-dioxane, 367 mg (1.38 mmol) of 2,6-dibromo-4-methoxypyridine, 2.25 g (6.90 mmol) of cesium carbonate, and 20 mL of water were subsequently added. The mixture obtained was purged with argon for 10 minutes followed by addition of 160 mg (0.138 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over $Na_2SO_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.04 g (89%) of a mixture of two isomers as a white foam. $^1$H NMR (CDCl$_3$, 400 MHz): δ 7.88 and 7.31 (2s, 2H), 7.46-7.57 (m, 4H), 7.21-7.27 (m, 2H), 6.83 (m, 2H), 6.46-6.48 (m, 2H), 6.12 and 6.88 (2m, 2H), 3.50 and 3.41 (2s, 3H), 1.57-1.95 (m, 30H), 1.40 and 1.41 (2s, 18H). $^{13}$C NMR (CDCl$_3$, 100 MHz) δ 160.07, 150.75, 150.50, 139.59, 137.92, 134.48, 131.99, 130.84, 130.77, 129.49, 129.11, 128.53, 127.13, 126.42, 125.79, 108.64, 108.33, 55.22, 40.54, 40.29, 37.08, 36.92, 36.77, 34.69, 31.46, 31.42, 29.17, 29.06, 20.57.

2-(Adamantan-1-yl)-6-bromo-4-(tert-butyl)phenol

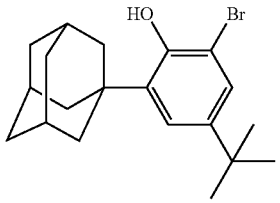 [SMILES: CC(C)(C)c1cc(Br)c(O)c(C23CC4CC(CC(C4)C2)C3)c1]

To a solution of 236 g (830 mmol) of 2-(adamantan-1-yl)-4-(tert-butyl)phenol in 2000 mL of dichloromethane a solution of 132 g (830 mmol) of bromine in 400 mL of dichloromethane was added dropwise for 1 hour at room temperature. The resulting mixture was diluted with 2,000 mL of water. The obtained mixture was extracted with dichloromethane (3×500 mL), the combined organic extract was washed with 5% NaHCO$_3$, dried over Na$_2$SO$_4$, and then evaporated to dryness. Yield 299 g (99%) of a white solid. $^1$H NMR (CDCl$_3$, 400 MHz): δ 7.32 (d, J=2.3 Hz, 1H), 7.19 (d, J=2.3 Hz, 1H), 5.65 (s, 1H), 2.18-2.03 (m, 9H), 1.78 (m, 6H), 1.29 (s, 9H). $^{13}$C NMR (CDCl$_3$, 100 MHz): δ 148.07, 143.75, 137.00, 126.04, 123.62, 112.11, 40.24, 37.67, 37.01, 34.46, 31.47, 29.03.

(1-(3-Bromo-5-(tert-butyl)-2-(methoxymethoxy)phenyl)adamantine

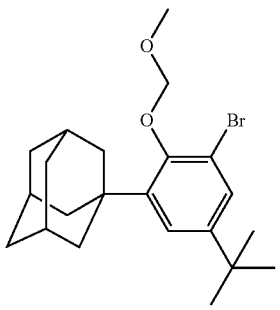 [SMILES: COCOc1c(Br)cc(C(C)(C)C)cc1C12CC3CC(CC(C3)C1)C2]

To a solution of 330 g (910 mmol) of 2-(adamantan-1-yl)-6-bromo-4-(tert-butyl)phenol in 3,000 mL of THF 40.0 g (1.00 mol, 60% wt. in mineral oil) of sodium hydride was added portionwise at room temperature. To the resulting suspension 76.0 mL (1.00 mol) of methoxymethyl chloride was added dropwise for 40 minutes at room temperature. The obtained mixture was stirred overnight, then poured into 2,000 mL of water. The desired product was extracted with dichloromethane (3×900 mL), the combined organic extract was washed with 5% NaHCO$_3$, dried over Na$_2$SO$_4$, and then evaporated to dryness. Yield 367 g (99%) of a white solid. $^1$H NMR (CDCl$_3$, 400 MHz): δ 7.39 (d, J=2.4 Hz, 1H), 7.27 (d, J=2.4 Hz, 1H), 5.23 (s, 2H), 3.71 (s, 3H), 2.20-2.04 (m, 9H), 1.82-1.74 (m, 6H), 1.29 (s, 9H). $^{13}$C NMR (CDCl$_3$, 100 MHz): δ 150.88, 147.47, 144.42, 128.46, 123.72, 117.46, 99.53, 57.74, 41.31, 38.05, 36.85, 34.58, 31.30, 29.08.

2-(3-Adamantan-1-yl)-5-(tert-butyl)-2-(methoxymethoxy)phenyl)-4,4,5,5-tetramethyl-1,3,2-dioxaborolane

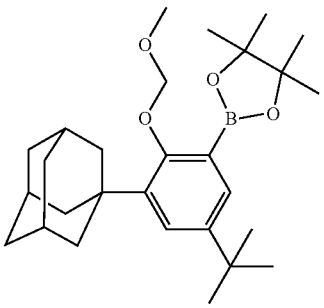 [SMILES: COCOc1c(B2OC(C)(C)C(C)(C)O2)cc(C(C)(C)C)cc1C12CC3CC(CC(C3)C1)C2]

To a solution of 183.5 g (450 mmol) of (1-(3-bromo-5-(tert-butyl)-2-(methoxymethoxy)phenyl)adamantine in 2,500 mL of dry THF 190 mL (473 mmol) of 2.5 M "BuLi in hexanes was added dropwise for 20 minutes at −80° C. The reaction mixture was stirred at this temperature for 1 hour, followed by addition of 120 mL (585 mmol) of 2-isopropoxy-4,4,5,5-tetramethyl-1,3,2-dioxaborolane. The obtained suspension was stirred for 1 hour at room temperature, then poured into 300 mL of water. The obtained mixture was evaporated to ca. 1 liter, the crude product was extracted with dichloromethane (3×800 mL), the combined organic extract was dried over Na$_2$SO$_4$ and then evaporated to dryness. Yield 204.7 g (quant.) of a colorless solid. $^1$H NMR (CDCl$_3$, 400 MHz): δ 7.54 (d, J=2.5 Hz, 1H), 7.43 (d, J=2.6 Hz, 1H), 5.18 (s, 2H), 3.60 (s, 3H), 2.24-2.13 (m, 6H), 2.09 (br. s., 3H), 1.85-1.75 (m, 6H), 1.37 (s, 12H), 1.33 (s, 9H). $^{13}$C NMR (CDCl$_3$, 100 MHz): δ 159.64, 144.48, 140.55, 130.58, 127.47, 100.81, 83.48, 57.63, 41.24, 37.29, 37.05, 34.40, 31.50, 29.16, 24.79.

1-(2'-Bromo-5-(tert-butyl)-2-(methoxymethoxy)-[1,1'-biphenyl]-3-yl)adamantine

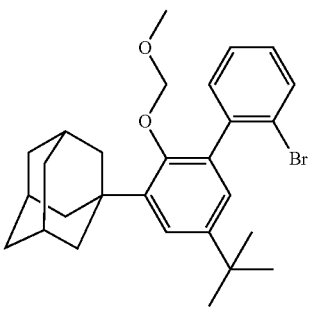 [SMILES: COCOc1c(-c2ccccc2Br)cc(C(C)(C)C)cc1C12CC3CC(CC(C3)C1)C2]

In a 2 l pressure vessel, 150 g (330 mmol) of 2-(3-adamantan-1-yl)-5-(tert-butyl)-2-(methoxymethoxy)phenyl)-4,4,5,5-tetramethyl-1,3,2-dioxaborolane, 1000 mL of dioxane, 93.4 g (330 mmol) of 2-bromoiodobenzene, 114 g (825 mmol) of potassium carbonate, and 500 mL of water were subsequently added. The mixture obtained was purged with argon for 10 minutes followed by addition of 19.1 g (17.0 mmol) of Pd(PPh$_3$)$_4$. This mixture was stirred for 12 hours at 115° C., then cooled to room temperature, and diluted with 500 mL of water. The crude product was extracted with dichloromethane (3×700 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 112 g (70%) of a white solid. $^1$H NMR (CDCl$_3$, 400 MHz): δ 7.68 (dd, J=1.0, 8.0 Hz, 1H), 7.42 (dd, J=1.7, 7.6 Hz, 1H), 7.37-7.32 (m, 2H), 7.20 (dt, J=1.8, 7.7 Hz, 1H), 7.08 (d, J=2.5 Hz, 1H), 4.53 (d, J=4.6 Hz, 1H), 4.40 (d, J=4.6 Hz, 1H), 3.20 (s, 3H), 2.23-2.14 (m, 6H), 2.10 (br. s., 3H), 1.86-1.70 (m, 6H), 1.33 (s, 9H). $^{13}$C NMR (CDCl$_3$, 100 MHz): (151.28, 145.09, 142.09, 141.47, 133.90, 132.93, 132.41, 128.55, 127.06, 126.81, 124.18, 123.87, 98.83, 57.07, 41.31, 37.55, 37.01, 34.60, 31.49, 29.17.

2-(3'-(Adamantan-1-yl)-5'-(tert-butyl)-2'-(methoxymethoxy)-[1,1'-biphenyl]-2-yl)-4,4,5,5-tetramethyl-1,3,2-dioxaborolane

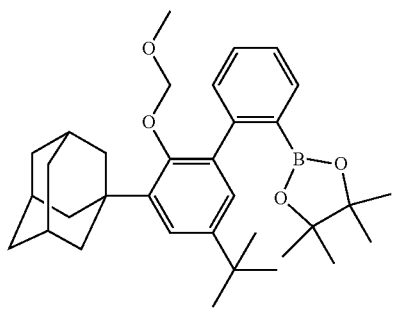 [SMILES: COCOc1c(-c2ccccc2B2OC(C)(C)C(C)(C)O2)cc(C(C)(C)C)cc1C12CC3CC(CC(C3)C1)C2]

To a solution of 223 g (462 mmol) of 1-(2'-bromo-5-(tert-butyl)-2-(methoxymethoxy)-[1,1'-biphenyl]-3-yl)adamantine in 3,000 mL of dry THF 194 mL (485 mmol) of 2.5 M "BuLi in hexanes was added dropwise for 20 minutes at −80° C. The reaction mixture was stirred at this temperature for 1 hour, followed by addition of 122 mL (600 mmol) of 2-isopropoxy-4,4,5,5-tetramethyl-1,3,2-dioxaborolane. The obtained suspension was stirred at room temperature for 1 hour, then poured into 300 mL of water. The obtained mixture was evaporated to ca. 1 liter, the crude product was extracted with dichloromethane (3×300 mL), the combined organic extract was dried over Na$_2$SO$_4$, and then evaporated to dryness. Yield 240.9 g (quant.) of a white solid. $^1$H NMR (CDCl$_3$, 400 MHz): δ 7.75 (d, J=7.3 Hz, 1H), 7.44-7.36 (m, 1H), 7.36-7.30 (m, 2H), 7.30-7.26 (m, 1H), 6.96 (d, J=2.4 Hz, 1H), 4.53 (d, J=4.7 Hz, 1H), 4.37 (d, J=4.7 Hz, 1H), 3.22 (s, 3H), 2.26-2.14 (m, 6H), 2.09 (br. s., 3H), 1.85-1.71 (m, 6H), 1.30 (s, 9H), 1.15 (s, 6H), 1.10 (s, 6H). $^{13}$C NMR (CDCl$_3$, 100 MHz): δ 151.35, 146.48, 144.32, 141.26, 136.15, 134.38, 130.44, 129.78, 126.75, 126.04, 123.13, 98.60, 83.32, 57.08, 41.50, 37.51, 37.09, 34.49, 31.57, 29.26, 24.92, 24.21.

2',2'''-(4-Methoxypyridine-2,6-diyl)bis(3-((3r,5r,7r)-adamantan-1-yl)-5-(tert-butyl)-[1,1'-biphenyl]-2-ol)

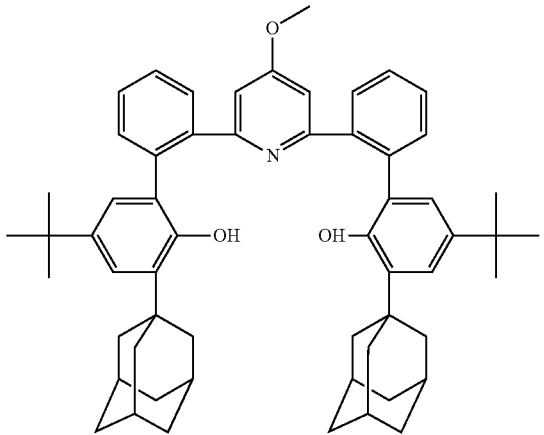 [SMILES: COc1cc(-c2ccccc2-c2cc(C(C)(C)C)cc(C34CC5CC(CC(C5)C3)C4)c2O)nc(-c2ccccc2-c2cc(C(C)(C)C)cc(C34CC5CC(CC(C5)C3)C4)c2O)c1]

To a solution of 2.00 g (3.77 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 40 mL of dioxane, 503 mg (1.88 mmol) of 2,6-dibromo-4-methoxypyridine, 3.07 g (9.42 mmol) of cesium carbonate, and 20 mL of water were subsequently added. The mixture obtained was purged with argon for 10 min followed by addition of 440 mg (0.380 mmol) of Pd(PPh$_3$)$_4$. This mixture was stirred for 12 h at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.33 g (86%) of a mixture of two isomers as a white foam. $^1$H NMR (CDCl$_3$, 400 MHz): δ 8.31 and 7.13 (2s, 2H), 7.37-7.60 (m, 8H), 7.09-7.11 (m, 2H), 6.55 and 6.98 (2m, 2H), 6.50 and 6.42 (2s, 2H), 3.37 and +3.36 (2s, 3H), 1.87-2.00 (m, 18H), 1.60-1.69 (m, 12H), 1.21 and 1.00 (2s, 18H). $^{13}$C NMR (CDCl$_3$, 100 MHz) δ 165.87, 159.18, 149.98, 141.89, 139.42, 137.80, 137.42, 131.50, 130.81, 129.86, 129.05, 127.75, 126.53, 122.80, 108.97, 55.12, 40.57, 40.32, 37.07, 37.01, 34.02, 31.58, 31.46, 29.11, 29.02.

2',2'''-(4-(Trifluoromethyl)pyridine-2,6-diyl)bis(3-((3r,5r,7r)-adamantan-1-yl)-5-(tert-butyl)-[1,1'-biphenyl]-2-ol)

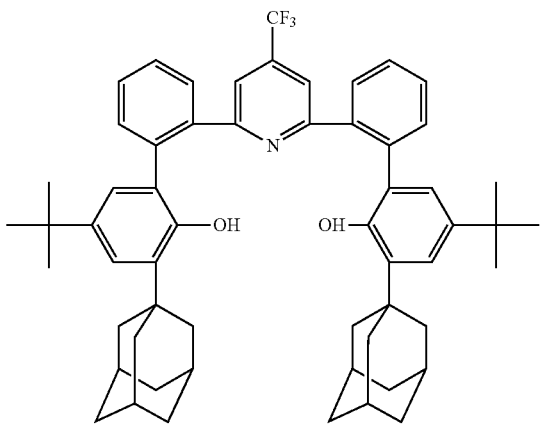 [SMILES: CC(C)(C)c1cc(-c2ccccc2-c2cc(C(F)(F)F)cc(-c3ccccc3-c3cc(C(C)(C)C)cc(C45CC6CC(CC(C6)C4)C5)c3O)n2)c(O)c(C23CC4CC(CC(C4)C2)C3)c1]

To a solution of 2.00 g (3.77 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 40 mL of dioxane, 406 mg (1.88 mmol) of 2,6-dichloro-4-trifluoromethylpyridine, 3.07 g (9.42 mmol) of cesium carbonate, and 20 mL of water were subsequently added. The mixture obtained was purged with argon for 10 minutes followed by addition of 440 mg (0.380 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.31 g (83%) of a mixture of two isomers as a white foam. $^1$H NMR (CDCl$_3$, 400 MHz): δ 7.40-7.55 (m, 8H), 7.04-7.14+5.62 (2m, 6H), 6.86+6.56 (2d, J=2.4 Hz, 2H), 1.90-2.02 (m, 18H), 1.60-1.74 (m, 12H), 1.16+1.01 (2s, 18H). $^{13}$C NMR (CDCl$_3$, 100 MHz) δ 159.29, 159.09, 149.57, 148.84, 142.43, 142.33, 139.45, 138.78, 138.45, 137.60, 137.22, 136.72, 136.24, 131.62, 131.51, 130.76, 130.52, 129.76, 129.71, 128.53, 128.39, 128.16, 127.42, 126.03, 125.28, 123.46, 123.34, 118.20 (q, J$_{C,F}$=3.5 Hz), 40.45, 40.34, 37.07, 37.03, 34.21, 34.06, 31.45, 31.42, 29.11, 29.06.

(3r,5r,7r)-1-(2'-Bromo-5-(tert-butyl)-2-(methoxymethoxy)-4'-methyl-[1,1'-biphenyl]-3-yl)adamantane

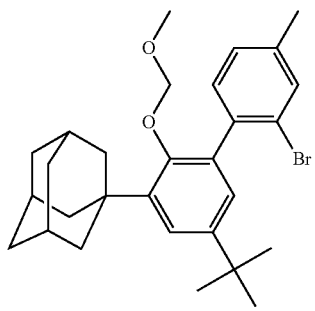 [SMILES: COCOc1c(-c2ccc(C)cc2Br)cc(C(C)(C)C)cc1C12CC3CC(CC(C3)C1)C2]

To a solution of 10.0 g (22.0 mmol) of 2-(3-adamantan-1-yl)-5-(tert-butyl)-2-(methoxymethoxy)phenyl)-4,4,5,5-tetramethyl-1,3,2-dioxaborolane in 100 mL of 1,4-dioxane 6.83 g (23.0 mmol) of 2-bromo-4-methyliodobenzene, 7.60 g (55.0 mmol) of potassium carbonate, and 50 mL of water were subsequently added. The mixture obtained was purged with argon for 10 minutes followed by addition of 1.27 g (1.10 mmol) of Pd(PPh$_3$)$_4$. This mixture was stirred for 12 hours at 100° C., then cooled to room temperature, and diluted with 100 mL of water. The crude product was extracted with dichloromethane (3×150 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 8.77 g (80%) of a white solid. $^1$H NMR (CDCl$_3$, 400 MHz): δ 7.56 (m, 1H), 7.32-7.39 (m, 2H), 7.19 (d, J=7.8 Hz, 1H), 7.11 (d, J=2.5 Hz, 1H), 4.59 (m, 1H), 4.47 (m, 1H), 3.29 (s, 3H), 2.41 (s, 3H), 2.25 (m, 6H), 2.15 (m, 3H), 1.84 (m, 6H), 1.37 (s, 9H). $^{13}$C NMR (CDCl$_3$, 100 MHz): δ 151.48, 144.93, 141.94, 138.66, 138.46, 133.66, 133.32, 132.02, 127.90, 127.02, 123.82, 123.66, 98.75, 57.09, 41.30, 37.53, 37.04, 34.56, 31.48, 29.19, 20.76.

4-((3r,5r,7r)-Adamantan-1-yl)-2-(tert-butyl)-6-isopropoxy-8-methyl-6H-dibenzo[c,e][1,2]oxaborinine

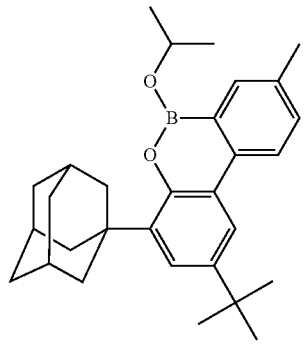 [SMILES: Cc1ccc2c(c1)B(OC(C)C)Oc1c-2cc(C(C)(C)C)cc1C12CC3CC(CC(C3)C1)C2]

To a solution of 8.75 g (17.6 mmol) of (3r,5r,7r)-1-(2'-bromo-5-(tert-butyl)-2-(methoxymethoxy)-4'-methyl-[1,1'-biphenyl]-3-yl)adamantane in 120 mL of dry THF 8.44 mL (21.1 mmol) of 2.5 M "BuLi in hexanes was added dropwise for 20 minutes at −80° C. The reaction mixture was stirred for 1 hour at this temperature followed by addition of 6.12 mL (30.0 mmol) of 2-isopropoxy-4,4,5,5-tetramethyl-1,3,2-dioxaborolane. The obtained suspension was stirred at room temperature for 1 hour, then poured into 300 mL of water. The crude product was extracted with dichloromethane (3×300 mL), the combined organic extract was dried over Na$_2$SO$_4$ and then evaporated to dryness. The residue was recrystallized from 20 mL of hot isopropanol, the obtained crystalline material was filtered off (G3), washed with 5 mL of cold isopropanol, and dried in vacuo. Yield 4.90 g (51%) of a white crystals. $^1$H NMR (CDCl$_3$, 400 MHz): δ 8.07 (d, J=8.3 Hz, 1H), 8.03 (d, J=2.0 Hz, 1H), 7.87 (m, 1H), 7.46 (d, J=8.2 Hz, 1H), 7.40 (d, J=2.0 Hz, 1H), 5.25 (sept, J=6.1 Hz, 1H), 2.46 (s, 3H), 2.30 (m, 6H), 2.16 (m, 3H), 1.85 (m, 6H), 1.42 (s, 9H), 1.42 (d, J=6.0 Hz, 6H). $^{13}$C NMR (CDCl$_3$, 100 MHz): δ 147.99, 143.84, 138.75, 138.38, 136.14, 133.08, 132.97, 123.55, 122.32, 121.59, 117.90, 65.66, 40.77, 37.45, 37.19, 34.75, 31.67, 29.17, 24.74, 21.21.

2',2'''-(Pyridine-2,6-diyl)bis(3-((3r,5r,7r)-adamantan-1-yl)-5-(tert-butyl)-4'-methyl-[1,1'-biphenyl]-2-ol)

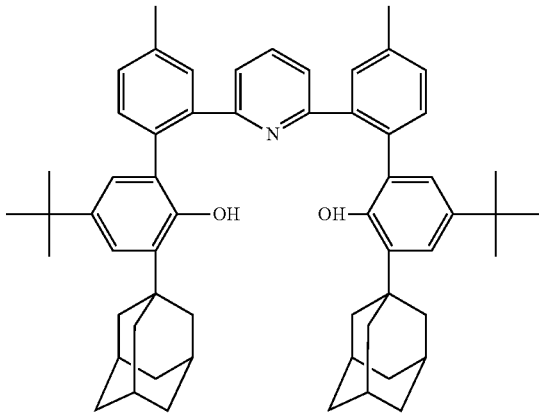 [SMILES: Cc1ccc(-c2cc(C(C)(C)C)cc(C34CC5CC(CC(C5)C3)C4)c2O)c(-c2cccc(-c3cc(C)ccc3-c3cc(C(C)(C)C)cc(C45CC6CC(CC(C6)C4)C5)c3O)n2)c1]

To a solution of 1.60 g (3.62 mmol) of 4-((3r,5r,7r)-adamantan-1-yl)-2-(tert-butyl)-6-isopropoxy-8-methyl-6H-dibenzo[c,e][1,2]oxaborinine in 40 mL of 1,4-dioxane, 429 mg (1.81 mmol) of 2,6-dibromopyridine, 2.95 g (9.10 mmol) of cesium carbonate, and 20 mL of water were subsequently added. The mixture obtained was purged with argon for 10 minutes followed by addition of 210 mg (0.180 mmol) of Pd(PPh$_3$)$_4$. This mixture was stirred for 12 hours at 100° C., then cooled to room temperature, and diluted with 50 mL of water. The crude product was extracted with dichloromethane (3×50 mL), the combined organic extract was dried over Na$_2$SO$_4$ and then evaporated to dryness. The residue was purified by flash chromatography on silica gel 60 (40-63 um, eluent: hexane-ethyl acetate=10:1, vol.). Yield 1.11 g (74%) of a mixture of two isomers as a white foam. $^1$H NMR (CDCl$_3$, 400 MHz): δ 8.15+6.81 (2s, 2H), 7.31-7.40 (m, 3H), 7.21-7.24 (m, 2H), 6.90-7.03+6.49 (2m, 6H), 2.42+2.41 (2s, 6H), 1.73-2.06 (m, 18H), 1.60-1.67 (m, 12H), 1.13+0.97 (2s, 18H). $^{13}$C NMR (CDCl$_3$, 100 MHz) δ 157.96, 157.77, 150.22, 149.45, 141.67, 139.30, 137.45, 137.40, 136.71, 135.04, 131.60, 131.43, 130.82, 129.84, 129.64, 126.50, 125.77, 122.58, 122.42, 40.52, 40.39, 37.11, 37.03, 36.85, 33.99, 31.48, 29.19, 29.11, 21.14.

2',2'''-(4-(Trifluoromethyl)pyridine-2,6-diyl)bis(3-((3r,5r,7r)-adamantan-1-yl)-5-(tert-butyl)-4'-methyl-[1,1'-biphenyl]-2-ol)

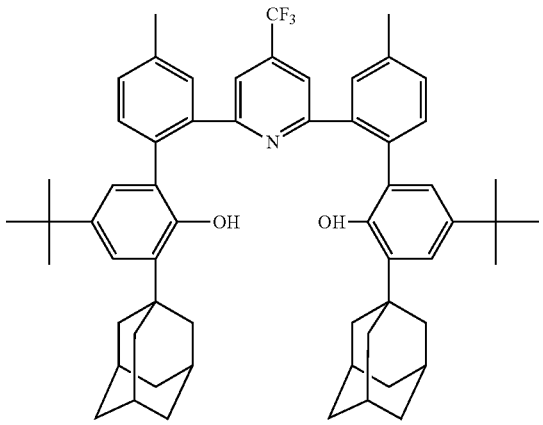

To a solution of 1.60 g (3.62 mmol) of 4-((3r,5r,7r)-adamantan-1-yl)-2-(tert-butyl)-6-isopropoxy-8-methyl-6H-dibenzo[c,e][1,2]oxaborinine in 40 mL of 1,4-dioxane, 391 mg (1.81 mmol) of 2,6-dichloro-4-trifluoromethylpyridine, 2.95 g (9.10 mmol) of cesium carbonate, and 20 mL of water were subsequently added. The mixture obtained was purged with argon for 10 minutes followed by addition of 210 mg (0.180 mmol) of Pd(PPh$_3$)$_4$. This mixture was stirred for 12 hours at 100° C., then cooled to room temperature, and diluted with 50 mL of water. The crude product was extracted with dichloromethane (3×50 mL), the combined organic extract was dried over Na$_2$SO$_4$ and then evaporated to dryness. The residue was purified by flash chromatography on silica gel 60 (40-63 um, eluent: hexane-ethyl acetate=10:1, vol.). Yield 1.01 g (62%) of a mixture of two isomers as a white foam. $^1$H NMR (CDCl$_3$, 400 MHz): δ 7.44 and 5.97 (2s, 2H), 7.34-7.38 (m, 6H), 7.12 (d, J=2.4 Hz, 2H), 7.07 (s, 2H), 6.92 and 6.56 (2m, 2H), 2.49 and 2.48 (2s, 6H), 1.85-2.04 (m, 18H), 1.65-1.75 (m, 12H), 1.18 and 1.03 (s, 18H). $^{13}$C NMR (CDCl$_3$, 100 MHz) (159.41, 159.19, 149.81, 149.80, 149.05, 142.20, 142.16, 139.08, 138.70, 138.57, 138.37, 138.10, 138.01, 137.26, 136.25, 134.77, 134.03, 131.51, 131.27, 130.91, 130.49, 130.41, 128.66, 127.64, 126.17, 125.43, 123.69, 123.31, 123.12, 118.23 (q, J$_{C,F}$=3.8 Hz), 117.88 (q, J$_{C,F}$=3.8 Hz), 40.47, 40.34, 37.08, 37.06, 34.02, 31.42, 29.17, 29.08, 26.91, 21.14.

2',2'''-(4-Methoxypyridine-2,6-diyl)bis(3-((3r,5r,7r)-adamantan-1-yl)-5-(tert-butyl)-4'-methyl-[1,1'-biphenyl]-2-ol)

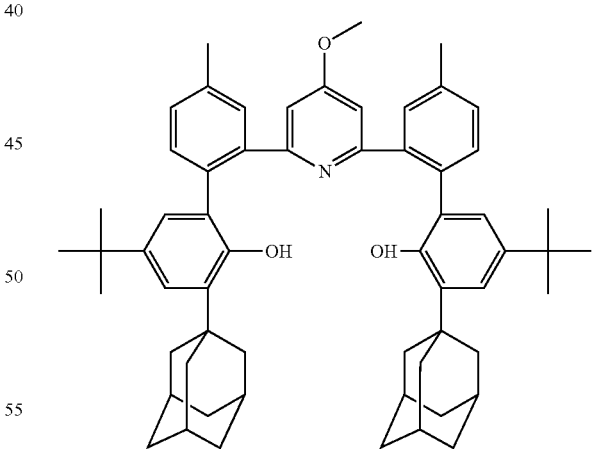

To a solution of 1.60 g (3.62 mmol) of 4-((3r,5r,7r)-adamantan-1-yl)-2-(tert-butyl)-6-isopropoxy-8-methyl-6H-dibenzo[c,e][1,2]oxaborinine in 40 mL of 1,4-dioxane, 483 mg (1.81 mmol) of 2,6-dibromo-4-methoxypyridine, 2.95 g (9.10 mmol) of cesium carbonate, and 20 mL of water were subsequently added. The mixture obtained was purged with argon for 10 minutes followed by addition of 210 mg (0.180 mmol) of Pd(PPh$_3$)$_4$. This mixture was stirred for 12 hours at 100° C., then cooled to room temperature, and diluted with 50 mL of water. The crude product was extracted with dichloromethane (3×50 mL), the combined organic extract was dried over $Na_2SO_4$ and then evaporated to dryness. The residue was purified by flash chromatography on silica gel 60 (40-63 um, eluent: hexane-ethyl acetate=10:1, vol.). Yield 910 mg (58%) of a mixture of two isomers as a white foam. $^1$H NMR (CDCl$_3$, 400 MHz): δ 8.39+6.52 (2s, 2H), 7.25-7.45 (m, 7H), 7.00-7.12 (m, 2H), 6.42-6.56 (m, 3H), 3.41+3.38 (2s, 3H), 2.47 (s, 6H), 1.87-2.02 (m, 18H), 1.62-1.75 (m, 12H), 1.24+1.02 (2s, 18H). $^{13}$C NMR (CDCl$_3$, 100 MHz) δ 165.79, 159.28, 159.22, 150.13, 149.66, 141.90, 141.78, 139.28, 138.72, 137.54, 137.36, 136.77, 134.89, 134.80, 132.26, 131.39, 131.37, 130.94, 130.08, 129.87, 129.75, 129.34, 126.60, 125.60, 123.01, 122.58, 108.92, 108.34, 55.09, 54.73, 40.61, 40.35, 37.08, 37.07, 36.87, 34.22, 33.99, 31.56, 31.46, 29.19, 29.07, 26.90, 22.65, 21.15.

(3r,5r,7r)-1-(2'-Bromo-5-(tert-butyl)-4'-isopropyl-2-(methoxymethoxy)-[1,1'-biphenyl]-3-yl)adamantine

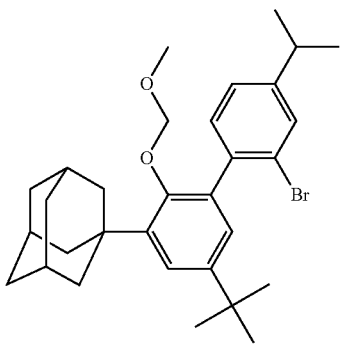 [SMILES: COCOc1c(-c2ccc(C(C)C)cc2Br)cc(C(C)(C)C)cc1C12CC3CC(CC(C3)C1)C2]

To a solution of 10.0 g (22.0 mmol) of 2-(3-adamantan-1-yl)-5-(tert-butyl)-2-(methoxymethoxy)phenyl)-4,4,5,5-tetramethyl-1,3,2-dioxaborolane in 100 mL of 1,4-dioxane 6.83 g (23.0 mmol) of 2-bromo-4-isopropyliodobenzene, 7.60 g (55.0 mmol) of potassium carbonate, and 50 mL of water were subsequently added. The mixture obtained was purged with argon for 10 minutes followed by addition of 1.27 g (1.10 mmol) of Pd(PPh$_3$)$_4$. This mixture was stirred for 12 hours at 100° C., then cooled to room temperature, and diluted with 100 mL of water. The crude product was extracted with dichloromethane (3×150 mL), the combined organic extract was dried over $Na_2SO_4$ and then evaporated to dryness. The residue was purified by flash chromatography on silica gel 60 (40-63 um, eluent: hexane-dichloromethane=10:1, vol.). Yield 11.5 g (95%) of a white solid. $^1$H NMR (CDCl$_3$, 400 MHz): δ 7.53 (d, J=1.7 Hz, 1H), 7.30-7.33 (m, 2H), 7.19 (dd, J=8.0, 1.7 Hz, 1H), 7.08 (d, J=2.5 Hz, 1H), 4.52 (m, 1H), 4.39 (m, 1H), 3.18 (s, 3H), 2.92 (sept, J=6.9 Hz, 1H), 2.14-2.20 (m, 6H), 2.10 (br.s, 3H), 1.74-1.84 (m, 6H), 1.32 (s, 9H), 1.28 (d, J=6.9 Hz, 6H). $^{13}$C NMR (CDCl$_3$, 100 MHz): δ 151.35, 149.85, 145.03, 142.04, 138.73, 133.91, 132.21, 130.79, 126.96, 125.33, 124.02, 123.71, 98.76, 57.03, 41.35, 37.57, 37.04, 33.63, 31.50, 29.20, 24.83, 23.90.

2-(3'-((3r,5r,7r)-Adamantan-1-yl)-5'-(tert-butyl)-4-isopropyl-2'-(methoxymethoxy)-[1,1'-biphenyl]-2-yl)-4,4,5,5-tetramethyl-1,3,2-dioxaborolane

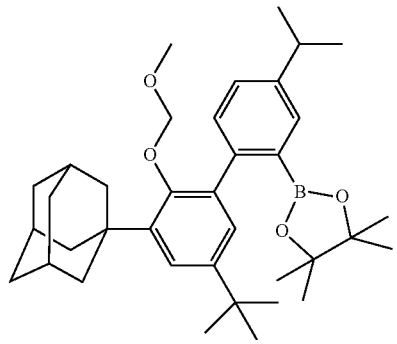 [SMILES: COCOc1c(-c2ccc(C(C)C)cc2B2OC(C)(C)C(C)(C)O2)cc(C(C)(C)C)cc1C12CC3CC(CC(C3)C1)C2]

To a solution of 11.3 g (21.5 mmol) of (3r,5r,7r)-1-(2'-bromo-5-(tert-butyl)-4'-isopropyl-2-(methoxymethoxy)-[1,1'-biphenyl]-3-yl)adamantine in 200 mL of dry THF 9.00 mL (22.6 mmol) of 2.5 M ″BuLi in hexanes was added dropwise for 20 minutes at –80° C. The reaction mixture was stirred at this temperature for 1 hour, followed by an addition of 6.98 mL (32.2 mmol) of 2-isopropoxy-4,4,5,5-tetramethyl-1,3,2-dioxaborolane. The obtained suspension was stirred at room temperature for 1 hour, then poured into 100 mL of water. The obtained mixture was evaporated to ca. 150 mL, then the crude product was extracted with dichloromethane (3×100 mL). The combined organic extract was dried over $Na_2SO_4$ and then evaporated to dryness. The residue was purified by flash chromatography on silica gel 60 (40-63 um, eluent: hexane-diethyl ether=10:1, vol.). Yield 6.80 g (56%) of a white solid. $^1$H NMR (CDCl$_3$, 400 MHz): δ 7.57 (s, 1H), 7.24-7.28 (m, 3H), 6.97 (d, J=2.4 Hz, 1H), 4.52 (m, 1H), 4.37 (m, 1H), 3.20 (s, 3H), 2.95 (sept, J=6.9 Hz, 1H), 2.17-2.21 (m, 6H), 2.09 (br.s, 3H), 1.73-1.84 (m, 6H), 1.29 (s, 9H), 1.28 (d, J=6.9 Hz, 6H), 1.15 (s, 6H), 1.10 (s, 6H). $^{13}$C NMR (CDCl$_3$, 100 MHz): δ 151.43, 146.50, 144.22, 143.92, 141.17, 136.17, 132.40, 130.45, 127.73, 126.84, 122.94, 98.52, 83.26, 57.06, 41.50, 37.49, 37.10, 34.48, 33.86, 31.58, 29.26, 24.94, 24.41, 24.13, 24.07.

2',2'''-(Pyridine-2,6-diyl)bis(3-((3r,5r,7r)-adamantan-1-yl)-5-(tert-butyl)-4'-isopropyl-[1,1'-biphenyl]-2-ol)

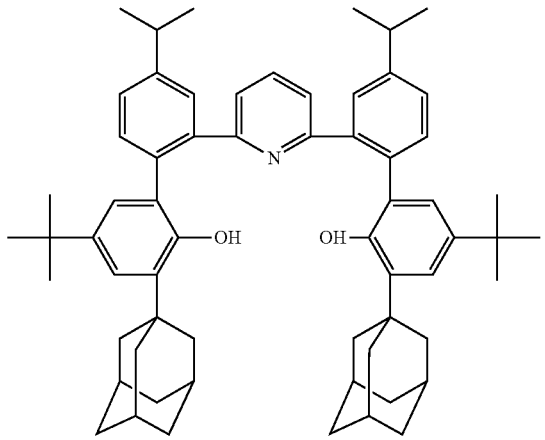 [SMILES: CC(C)c1ccc(-c2cc(C(C)(C)C)cc(C34CC5CC(CC(C5)C3)C4)c2O)c(-c2cccc(-c3cc(C(C)C)ccc3-c3cc(C(C)(C)C)cc(C45CC6CC(CC(C6)C4)C5)c3O)n2)c1]

To a solution of 3.20 g (5.66 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 40 mL of 1,4-dioxane, 609 mg (2.83 mmol) of 2,6-dibromopyridine, 5.00 g (14.2 mmol) of cesium carbonate, and 20 mL of water were subsequently added. The mixture obtained was purged with argon for 10 minutes followed by addition of 300 mg (0.260 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.34 g (54%) of a mixture of two isomers as a white foam. $^1$H NMR (CDCl$_3$, 400 MHz): δ 8.26+6.83 (2s, 2H), 6.95-7.58+6.52 (2m, 13H), 3.01 (sept, J=6.9 Hz, 2H), 1.85-2.02 (m, 18H), 1.62-1.68 (m, 12H), 1.33 (d, J=6.9 Hz, 6H), 1.32 (d, J=6.9 Hz, 6H), 1.13+1.00 (2s, 18H). $^{13}$C NMR (CDCl$_3$, 100 MHz) (158.28, 157.98, 150.28, 149.48, 148.14, 148.02, 141.61, 141.46, 139.28, 137.50, 136.74, 136.20, 135.43, 135.13, 132.10, 131.67, 130.07, 129.29, 128.97, 128.07, 127.18, 126.90, 126.58, 125.77, 122.74, 122.50, 122.44, 122.20, 40.51, 40.30, 37.08, 37.05, 36.81, 34.17, 34.00, 33.84, 33.78, 31.50, 31.40, 29.15, 29.10, 24.14, 23.81.

2',2'''-(4-(Trifluoromethyl)pyridine-2,6-diyl)bis(3-((3r,5r,7r)-adamantan-1-yl)-5-(tert-butyl)-4'-isopropyl-[1,1'-biphenyl]-2-ol)

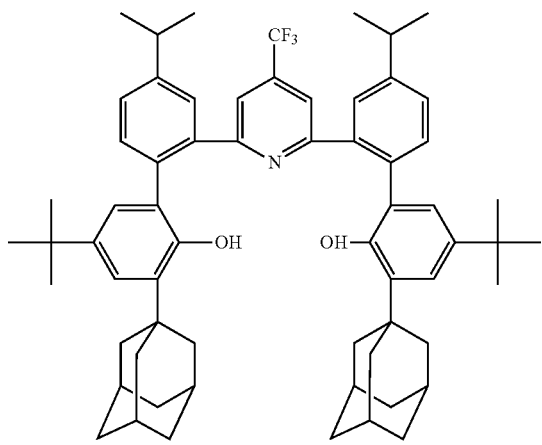 [SMILES: CC(C)c1ccc(-c2cc(C(C)(C)C)cc(C34CC5CC(CC(C5)C3)C4)c2O)c(-c2cc(C(F)(F)F)cc(-c3cc(C(C)C)ccc3-c3cc(C(C)(C)C)cc(C45CC6CC(CC(C6)C4)C5)c3O)n2)c1]

To a solution of 1.77 g (3.09 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 40 mL of dioxane, 325 mg (1.51 mmol) of 2,6-dichloro-4-trifluoromethylpyridine, 3.00 g (9.04 mmol) of cesium carbonate, and 20 mL of water were subsequently added. The mixture obtained was purged with argon for 10 minutes followed by addition of 200 mg (0.190 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.17 g (82%) of a mixture of two isomers as a white foam. $^1$H NMR (CDCl$_3$, 400 MHz): δ 7.35-7.46 and 5.99 (2m, 8H), 7.06-7.13 (m, 4H), 6.95 and 6.56 (2m, 2H), 3.05 (sept, J=6.9 Hz, 2H), 1.86-2.04 (m, 18H), 1.63-1.71 (m, 12H), 1.36 (d, J=6.9 Hz, 6H), 1.34 (d, J=6.9 Hz, 6H), 1.15 and 1.01 (2s, 18H). $^{13}$C NMR (CDCl$_3$, 100 MHz) δ 159.68, 149.86, 149.11, 148.81, 142.12, 138.59, 137.29, 136.18, 135.10, 131.67, 131.57, 128.98, 128.81, 127.66, 126.29, 125.43, 123.10, 118.27 (q, J$_{C,F}$=3.5 Hz), 40.48, 40.28, 37.06, 36.87, 34.02, 33.84, 31.43, 31.39, 29.12, 29.07, 24.07, 23.86.

2',2'''-(4-Methoxypyridine-2,6-diyl)bis(3-((3r,5r,7r)-adamantan-1-yl)-5-(tert-butyl)-4'-isopropyl-[1,1'-biphenyl]-2-ol)

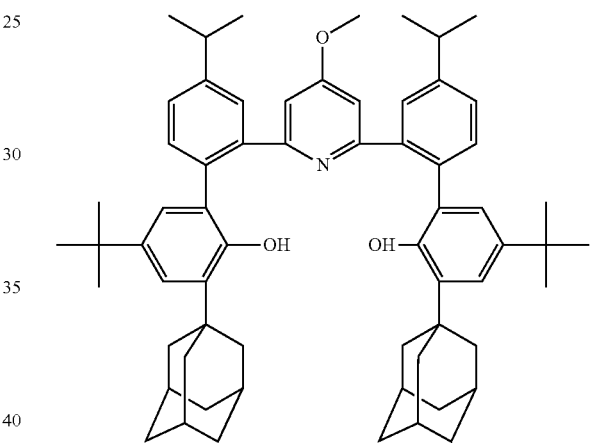

To a solution of 1.77 g (3.09 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 40 mL of dioxane, 400 mg (1.51 mmol) of 2,6-dibromo-4-methoxypyridine, 3.00 g (9.04 mmol) of cesium carbonate, and 20 mL of water were subsequently added. The mixture obtained was purged with argon for 10 minutes followed by addition of 200 mg (0.190 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.01 g (74%) of a mixture of two isomers as a white foam. $^1$H NMR (CDCl$_3$, 400 MHz): δ 8.40 and 7.02 (2s, 2H), 7.23-7.44 (m, 6H), 7.07 (m, 2H), 6.56-6.58 (m, 2H), 6.41 (m, 2H), 3.50 and 3.37 (2s, 3H), 3.02 (sept, J=6.9 Hz, 2H), 1.85-2.02 (m, 18H), 1.62-1.70 (m, 12H), 1.34 (d, J=6.9 Hz, 12H), 1.19+ 1.00 (2s, 18H). $^{13}$C NMR (CDCl$_3$, 100 MHz) δ 165.74, 159.62, 150.20, 148.30, 141.73, 139.35, 137.37, 135.18, 131.38, 129.99, 129.03, 127.34, 127.03, 126.71, 125.71, 122.56, 108.94, 55.12, 40.61, 37.08, 37.06, 34.01, 33.76, 31.48, 29.13, 24.12, 23.83.

2-(Adamantan-1-yl)-4-fluorophenol

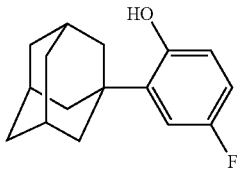 [SMILES: Oc1ccc(F)cc1C12CC3CC(CC(C3)C1)C2]

To a solution of 30.0 g (268 mmol) of 4-fluorophenol and 40.8 g (268 mmol) of adamantan-1-ol in 300 mL of dichloromethane a solution of 17.4 mL (268 mmol) of methanesulfonic acid and 20 mL of acetic acid in 100 mL of dichloromethane was added dropwise for 1 hour at room temperature. The resulting mixture was stirred for 48 hours at room temperature and then carefully poured into 300 mL of 5% NaHCO$_3$. The crude product was extracted with dichloromethane (3×50 mL), the combined organic extract was dried over Na$_2$SO$_4$ and then evaporated to dryness. The residue was purified using Kugelrohr apparatus (0.3 mbar, 95° C.) yielding 49.3 g (75%) of the title product as a light-yellow oil. $^1$H NMR (CDCl$_3$, 400 MHz): δ 6.92 (dd, J=11.2, 3.1 Hz, 1H), 6.73 (ddd, J=8.7, 7.4, 3.1 Hz, 1H), 6.60 (dd, J=8.7, 5.0 Hz, 1H), 4.34 (br.s, 1H), 2.08-2.11 (m, 9H), 1.75-1.80 (m, 9H), 1.58-1.67 (m, 3H), $^{13}$C NMR (CDCl$_3$, 100 MHz): δ 158.28 (d, J$_{C,F}$=236 Hz), 150.60 (d, J$_{C,F}$=2.0 Hz), 138.27 (d, J$_{C,F}$=5.9 Hz), 117.07 (d, J$_{C,F}$=8.1 Hz), 113.88 (d, J$_{C,F}$=23.9 Hz), 112.36 (d, J$_{C,F}$=23.0 Hz), 45.05, 40.13, 36.88, 35.90, 30.65, 28.88.

2-Bromo-6-(adamantan-1-yl)-4-fluorophenol

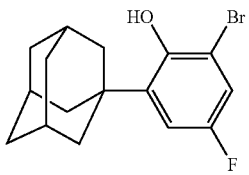 [SMILES: Oc1c(Br)cc(F)cc1C12CC3CC(CC(C3)C1)C2]

To a solution of 49.3 g (200 mmol) of 2-(adamantan-1-yl)-4-fluorophenol in 500 mL of dichloromethane a solution of 10.3 mL (200 mmol) of bromine in 100 mL of dichloromethane was added dropwise for 1 hour at room temperature. The resulting mixture was stirred for 48 hours at room temperature and then carefully poured into 200 mL of 5% NaHCO$_3$. The crude product was extracted with dichloromethane (3×150 mL), the combined organic extract was dried over Na$_2$SO$_4$ and then evaporated to dryness. Yield 65.0 g (quant.) of a light-yellow solid. $^1$H NMR (CDCl$_3$, 400 MHz): δ 7.07 (dd, J=7.0, 3.0 Hz, 1H), 6.92 (dd, J=10.8, 3.0 Hz, 1H), 5.60 (s, 1H), 2.07 (br.s, 9H), 1.77 (br.s, 6H). $^{13}$C NMR (CDCl$_3$, 100 MHz): δ 157.21 (d, J$_{C,F}$=241 Hz), 147.03 (d, J$_{C,F}$=3.0 Hz), 138.91 (d, J$_{C,F}$=5.9 Hz), 115.66 (d, J$_{C,F}$=25.8 Hz), 113.97 (d, J$_{C,F}$=23.6 Hz), 111.21 (d, J$_{C,F}$=10.9 Hz), 39.88, 37.60, 36.82, 28.86.

(3r,5r,7r)-1-(3-Bromo-5-fluoro-2-(methoxymethoxy)phenyl)adamantane

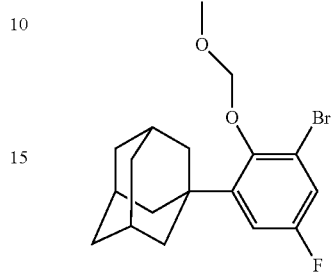

To a solution of 48.4 g (150 mmol) of 2-bromo-6-(adamantan-1-yl)-4-fluorophenol in 500 mL of dry THF 6.30 g (155 mmol, 60% wt. in mineral oil) of sodium hydride was added portionwise at room temperature. After that, 13.7 mL (180 mmol) of MOMCl was added dropwise for 1 hour. The reaction mixture was heated for 24 hours at 60° C. and then poured into 300 mL of cold water. The crude product was extracted with 3×200 mL of dichloromethane. The combined organic extract was dried over Na$_2$SO$_4$ and then evaporated to dryness. Yield 56.0 g (quant.) of a white solid. $^1$H NMR (CDCl$_3$, 400 MHz): δ 7.12 (dd, J=6.9, 3.1 Hz, 1H), 6.98 (dd, J=10.9, 3.1 Hz, 1H), 5.20 (s, 2H), 3.69 (s, 3H), 2.07 (br.s, 9H), 1.76 (br.s, 6H). $^{13}$C NMR (CDCl$_3$, 100 MHz): δ 159.51 (d, J$_{C,F}$=245 Hz), 149.86 (d, J$_{C,F}$=3.3 Hz), 146.93 (d, J$_{C,F}$=6.5 Hz), 118.09 (d, J$_{C,F}$=25.4 Hz), 117.67 (d, J$_{C,F}$=10.5 Hz), 113.99 (d, J$_{C,F}$=23.6 Hz), 99.72, 57.83, 40.99, 38.06, 36.67, 28.92.

2-((3r,5r,7r)-3-Adamantan-1-yl)-5-fluoro-2-(methoxymethoxy)phenyl)-4,4,5,5-tetramethyl-1,3,2-dioxaborolane

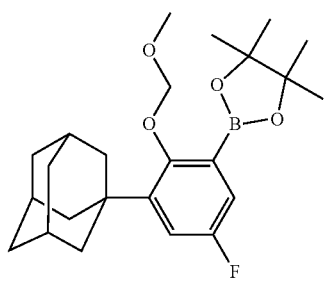 [SMILES: COCOc1c(B2OC(C)(C)C(C)(C)O2)cc(F)cc1C12CC3CC(CC(C3)C1)C2]

To a solution of 28.0 g (75.8 mmol) of (1-(3-bromo-5-fluoro-2-(methoxymethoxy)phenyl)adamantine in 400 mL of dry THF 30.3 mL (75.8 mmol) of 2.5 M $^n$BuLi in hexanes was added dropwise for 20 minutes at −80° C. The reaction mixture was stirred for 1 hour at this temperature followed by addition of 20.1 mL (98.5 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×300 mL), the combined organic extract was dried over Na$_2$SO$_4$ and then evaporated to dryness. The residue was recrystallized from isopropanol. Yield 27.8 g (88%) of a white solid. $^1$H NMR (CDCl$_3$, 400 MHz): δ 7.19 (dd, J=7.7, 3.3 Hz, 1H), 7.06 (dd, J=10.9, 3.3 Hz, 1H), 5.12 (s, 2H), 3.57 (s, 3H), 2.10 (br.s, 6H), 2.06 (br.s, 3H), 1.75 (br., s 6H), 1.34 (s, 12H). $^{13}$C NMR (CDCl$_3$, 100 MHz): δ 159.46 (d, J$_{C,F}$=241 Hz), 157.48 (d, J$_{C,F}$=2.0 Hz), 144.23 (d, J$_{C,F}$=5.7 Hz), 119.42 (d, J$_{C,F}$=21.0 Hz), 117.35 (d, J$_{C,F}$=24.0 Hz), 100.98, 83.96, 57.73, 40.97, 37.29, 36.87, 28.99, 24.79.

(3r,5r,7r)-1-(2'-Bromo-5-fluoro-4'-isopropyl-2-(methoxymethoxy)-[1,1'-biphenyl]-3-yl)adamantine

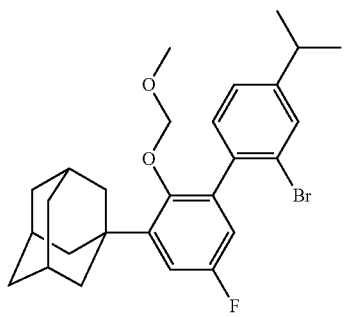 [SMILES: COCOc1c(-c2ccc(C(C)C)cc2Br)cc(F)cc1C12CC3CC(CC(C3)C1)C2]

To a solution of 8.00 g (19.21 mmol) of 2-((3r,5r,7r)-3-adamantan-1-yl)-5-fluoro-2-(methoxymethoxy)phenyl)-4,4,5,5-tetramethyl-1,3,2-dioxaborolane in 60 mL of 1,4-dioxane 6.24 g (19.2 mmol) of 2-bromo-4-isopropyliodobenzene, 6.63 g (48.0 mmol) of potassium carbonate, and 50 mL of water were subsequently added. The mixture obtained was purged with argon for 10 minutes followed by addition of 1.10 g (0.96 mmol) of Pd(PPh$_3$)$_4$. This mixture was stirred for 12 hours at 100° C., then cooled to room temperature, and diluted with 100 mL of water. The crude product was extracted with dichloromethane (3×150 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 4.70 g (50%) of a white solid. $^1$H NMR (CDCl$_3$, 400 MHz): δ 7.53 (d, J=1.6 Hz, 1H), 7.27 (d, J=7.9 Hz, 1H), 7.20 (dd, J=7.9, 1.6 Hz, 1H), 7.03 (dd, J=11.0, 3.2 Hz, 1H), 6.79 (dd, J=7.9, 3.2 Hz, 1H), 4.48 (m, 1H), 4.40 (m, 1H), 3.16 (s, 3H), 2.93 (sept, J=6.9 Hz, 1H), 2.13 (br.s, 6H), 2.10 (br.s, 3H), 1.78 (br.s, 6H), 1.28 (d, J=6.9 Hz, 6H). $^{13}$C NMR (CDCl$_3$, 100 MHz): δ 159.33 (d, J$_{C,F}$=240 Hz), 150.47, 145.50 (d, J$_{C,F}$=5.9 Hz), 137.28, 136.00 (d, J$_{C,F}$=8.8 Hz), 131.87, 130.86, 125.47, 123.65, 115.67 (d, J$_{C,F}$=23.6 Hz), 113.95 (d, J$_{C,F}$=23.6 Hz), 98.98, 57.03, 41.03, 37.57, 36.85, 33.66, 29.03, 23.84.

2-(3'-((3r,5r,7r)-Adamantan-1-yl)-5'-fluoro-4-isopropyl-2'-(methoxymethoxy)-[1,1'-biphenyl]-2-yl)-4,4,5,5-tetramethyl-1,3,2-dioxaborolane

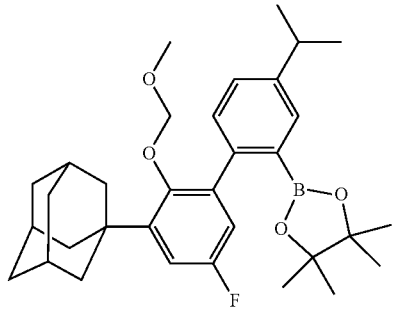 [SMILES: COCOc1c(-c2ccc(C(C)C)cc2B2OC(C)(C)C(C)(C)O2)cc(F)cc1C12CC3CC(CC(C3)C1)C2]

To a solution of 4.70 g (9.64 mmol) of (3r,5r,7r)-1-(2'-Bromo-5-fluoro-4'-isopropyl-2-(methoxymethoxy)-[1,1'-biphenyl]-3-yl)adamantine in 100 mL of dry THF 3.86 mL (9.64 mmol) of 2.5 M ″BuLi in hexanes was added dropwise for 20 minutes at −80° C. The reaction mixture was stirred for 1 hour at this temperature followed by addition of 2.33 mL (12.5 mmol) of 2-isopropoxy-4,4,5,5-tetramethyl-1,3,2-dioxaborolane. The obtained suspension was stirred at room temperature for 1 hour, then poured into 300 mL of water. The crude product was extracted with dichloromethane (3×300 mL), the combined organic extract was dried over Na$_2$SO$_4$ and then evaporated to dryness. The residue was purified by flash chromatography on silica gel 60 (40-63 um, eluent: hexane-diethyl ether=10:1, vol.). Yield 5.10 g (99%) of a colorless glassy solid. $^1$H NMR (CDCl$_3$, 400 MHz): δ 7.59 (d, J=1.9 Hz), 7.29 (dd, J=7.9, 1.9 Hz, 1H), 7.24 (d, J=7.9 Hz), 6.95 (dd, J=11.2, 3.2 Hz, 1H), 6.71 (dd, J=8.0, 3.2 Hz, 1H), 4.30-4.42 (m, 2H), 3.20 (s, 3H), 2.95 (sept, J=6.9 Hz, 1H), 2.14 (br.s, 6H), 2.08 (br.s, 6H), 1.74-1.80 (m, 6H), 1.28 (d, J=6.9 Hz, 6H), 1.17 (br.s, 12H). $^{13}$C NMR (CDCl$_3$, 100 MHz): δ 159.31 (d, J$_{C,F}$=240 Hz), 149.77 (d, J$_{C,F}$=2.4 Hz), 147.17, 144.55 (d, J$_{C,F}$=6.6 Hz), 142.17, 138.49 (d, J$_{C,F}$=8.1 Hz), 132.80, 130.14, 128.01, 115.90 (d, J$_{C,F}$=22.5 Hz), 112.61 (d, J$_{C,F}$=23.6 Hz), 98.69, 83.48, 57.23, 41.26, 37.52, 36.91, 33.86, 29.09, 25.07 (broad), 24.26 (broad), 24.04.

2',2'''-(4-Methoxypyridine-2,6-diyl)bis(3-((3r,5r,7r)-adamantan-1-yl)-5-fluoro-4'-isopropyl-[1,1'-biphenyl]-2-ol)

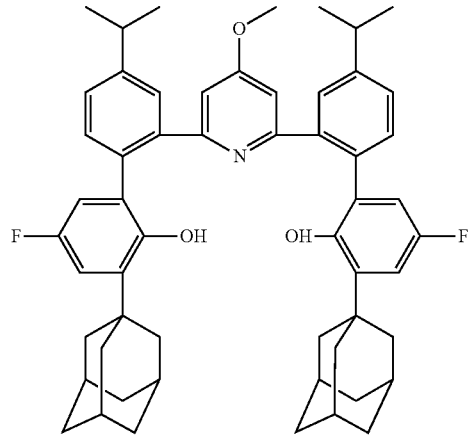 [SMILES: COc1cc(-c2cc(C(C)C)ccc2-c2cc(F)cc(C34CC5CC(CC(C5)C3)C4)c2O)nc(-c2cc(C(C)C)ccc2-c2cc(F)cc(C34CC5CC(CC(C5)C3)C4)c2O)c1]

To a solution of 2.00 g (3.74 mmol) of 2-(3'-((3r,5r,7r)-adamantan-1-yl)-5'-fluoro-4-isopropyl-2'-(methoxymethoxy)-[1,1'-biphenyl]-2-yl)-4,4,5,5-tetramethyl-1,3,2-dioxaborolane in 40 mL of 1,4-dioxane, 500 mg (1.87 mmol) of 2,6-dibromo-4-methoxypyridine, 3.04 g (9.35 mmol) of cesium carbonate, and 20 mL of water were subsequently added. The mixture obtained was purged with argon for 10 minutes followed by addition of 216 mg (0.187 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 1.31 g (83%) of a mixture of two isomers as a white foam. $^1$H NMR (CDCl$_3$, 400 MHz): δ 7.95 (s, 1H), 7.20-7.46 (m, 8H), 6.73-6.84 and 6.06-6.09 (2m, 3H), 6.59 and 6.51 (2s, 2H), 3.63 and 3.46 (2s, 3H), 2.95-3.10 (2sept, 2H), 1.57-2.15 (m, 30H), 1.28-1.37 (m, 12H). $^{13}$C NMR (CDCl$_3$, 100 MHz) δ 166.41, 166.10, 159.62, 159.46, 157.73 (d, J$_{C,F}$=237 Hz), 157.62 (d, J$_{C,F}$=237 Hz), 148.99, 148.74, 148.66, 148.29, 139.95, 139.89, 139.39, 138.30, 133.96, 131.90, 131.14, 129.34, 128.13, 128.03, 127.84, 127.59, 127.03, 114.54 (d, J$_{C,F}$=22.7 Hz), 114.19 (d, J$_{C,F}$=22.9 Hz), 113.01 (d, J$_{C,F}$=23.2 Hz), 112.70 (d, J$_{C,F}$=24.1 Hz), 108.57, 108.45, 55.25, 54.97, 40.16, 39.96, 37.00, 36.93, 36.89, 36.83, 36.68, 33.83, 33.65, 28.99, 28.90, 23.99, 23.93, 23.76.

2-(3,5-Dimethyladamantan-1-yl)-4-fluorophenol

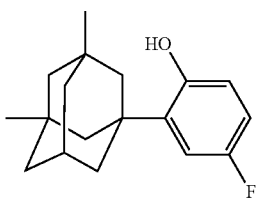 [SMILES: CC12CC3CC(C)(C1)CC(c1cc(F)ccc1O)(C3)C2]

To a solution of 8.40 g (75.0 mmol) of 4-fluorophenol and 13.5 g (75.0 mmol) of 3,5-dimethyladamantan-1-ol in 150 mL of dichloromethane a solution of 4.90 mL (75.0 mmol) of methanesulfonic acid and 5 mL of acetic acid in 100 mL of dichloromethane was added dropwise for 1 hour at room temperature. The resulting mixture was stirred for 48 hours at room temperature and then carefully poured into 300 mL of 5% NaHCO$_3$. The crude product was extracted with dichloromethane (3×50 mL), the combined organic extract was dried over Na$_2$SO$_4$ and then evaporated to dryness. The residue was purified using Kugelrohr apparatus (1 mbar, 70° C.) yielding 14.2 g (68%) of the title product as a light-yellow oil. $^1$H NMR (CDCl$_3$, 400 MHz): δ 6.93 (dd, J=3.1, 11.2 Hz, 1H), 6.73 (ddd, J=3.1, 7.4, 8.6 Hz, 1H), 6.55 (dd, J=4.9, 8.6 Hz), 4.62 (s, 1H), 2.16 (dt, J=3.1, 6.3 Hz, 1H), 1.91 (m, 2H), 1.64-1.74 (m, 4H), 1.35-1.45 (m, 4H), 1.20 (br.s, 2H), 0.87 (s, 6H). $^{13}$C NMR (CDCl$_3$, 100 MHz): δ 158.49 (J$_F$=236 Hz), 150.19 (J$_F$=2.0 Hz), 137.69 (J$_F$=5.9 Hz), 117.12 (J$_F$=8.1 Hz), 114.13 (J$_F$=24.0 Hz), 112.57 (J$_F$=22.9 Hz), 50.92, 46.44, 43.05, 38.70, 38.48, 31.38, 30.84, 29.90.

2-Bromo-6-(3,5-dimethyladamantan-1-yl)-4-fluorophenol

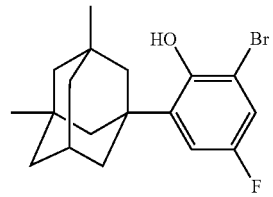 [SMILES: CC12CC3CC(C)(C1)CC(c1cc(F)cc(Br)c1O)(C3)C2]

To a solution of 14.2 g (51.7 mmol) of 2-(3,5-dimethyladamantan-1-yl)-4-fluorophenol in 200 mL of dichloromethane a solution of 2.67 mL (51.7 mmol) of bromine in 100 mL of dichloromethane was added dropwise for 1 hour at room temperature. The resulting mixture was stirred for 48 hours at room temperature and then carefully poured into 200 mL of 5% NaHCO$_3$. The crude product was extracted with dichloromethane (3×50 mL), the combined organic extract was dried over Na$_2$SO$_4$ and then evaporated to dryness. Yield 17.5 g (96%) of a light-yellow solid. $^1$H NMR (CDCl$_3$, 400 MHz): δ 7.06 (dd, J=3.0, 7.0 Hz, 1H), 6.93 (dd, J=2.9, 10.8 Hz, 1H), 5.59 (s, 1H), 2.16 (m, 1H), 1.89 (br.s, 2H), 1.63-1.73 (m, 4H), 1.34-1.44 (m, 4H), 1.19 (br.s, 2H), 0.86 (s, 6H). $^{13}$C NMR (CDCl$_3$, 100 MHz): δ 157.21 (J$_F$=241 Hz), 146.61 (J$_F$=2.8 Hz), 137.97 (J$_F$=6.1 Hz), 115.34 (J$_F$=25.8 Hz), 113.64 (J$_F$=23.6 Hz), 110.83 (J$_F$=10.9 Hz), 54.77, 50.48, 45.71, 42.61, 38.96, 38.03, 31.02, 30.42, 29.49.

1-(3-Bromo-5-fluoro-2-(methoxymethoxy)phenyl)-3,5-dimethyladamantane

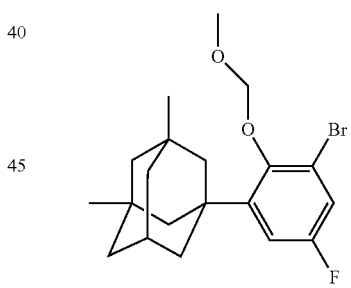

To a solution of 17.5 g (49.5 mmol) of 2-bromo-6-(3,5-dimethyladamantan-1-yl)-4-fluorophenol in 200 mL of dry THF 2.17 g (54.4 mmol, 60% wt. in mineral oil) of sodium hydride was added portionwise at room temperature. After that, 4.53 mL (60.0 mmol) of MOMCl was added dropwise for 1 hour. The reaction mixture was heated for 24 hours at 60° C. and then poured into 300 mL of cold water. The crude product was extracted with 3×200 mL of dichloromethane. The combined organic extract was dried over Na$_2$SO$_4$ and then evaporated to dryness. Yield 19.6 g (quant.) of a white solid. $^1$H NMR (CDCl$_3$, 400 MHz): δ 7.13 (dd, J=3.1, 6.8 Hz, 1H), 6.98 (dd, J=3.1, 10.9 Hz, 1H), 5.19 (s, 2H), 3.68 (s, 3H), 2.16 (m, 1H), 1.89 (br.s, 2H), 1.64-1.74 (m, 4H), 1.34-1.44 (m, 4H), 1.19 (br.s, 2H), 0.87 (s, 6H). $^{13}$C NMR (CDCl$_3$, 100 MHz): δ 159.47 (J$_F$=245 Hz), 150.08 (J$_F$=3.3 Hz), 146.34 (J$_F$=6.4 Hz), 118.13 (J$_F$=25.4 Hz), 117.65

($J_F$=10.7 Hz), 114.01 ($J_F$=23.4 Hz), 99.95, 57.89, 50.69, 47.13, 42.84, 39.78, 39.55, 31.50, 30.84, 29.94.

2-(3-((1r,3R,5S,7r)-3,5-dimethyladamantan-1-yl)-5-fluoro-2-(methoxymethoxy)phenyl)-4,4,5,5-tetramethyl-1,3,2-dioxaborolane

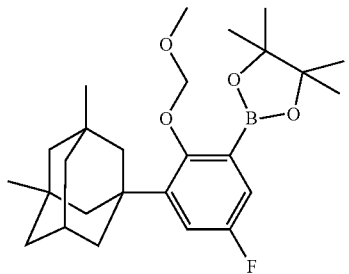

To a solution of 14.0 g (35.3 mmol) of 1-(3-bromo-5-fluoro-2-(methoxymethoxy)phenyl)-3,5-dimethyladamantane in 250 mL of dry THF 16.9 mL (42.3 mmol) of 2.5 M "BuLi in hexanes was added dropwise for 20 minutes at −80° C. The reaction mixture was stirred at this temperature for 1 hour followed by addition of 11.0 mL (52.9 mmol) of 2-isopropoxy-4,4,5,5-tetramethyl-1,3,2-dioxaborolane. The obtained suspension was stirred for 1 hour at room temperature, then poured into 300 mL of water. The crude product was extracted with dichloromethane (3×100 mL), the combined organic extract was dried over $Na_2SO_4$ and then evaporated to dryness. The residue was recrystallized from isopropanol. Yield 9.65 g (62%) of a white solid. $^1$H NMR (CDCl$_3$, 400 MHz): δ 7.19 (dd, J=7.7, 3.3 Hz, 1H), 7.08 (dd, J=11.0, 3.3 Hz, 1H), 5.11 (s, 2H), 3.57 (s, 3H), 2.13-2.16 (m, 1H), 1.92 (br.s, 2H), 1.66-1.77 (m, 4H), 1.34 (s, 12H), 1.33-1.44 (m, 4H), 1.18 (br.s, 2H), 0.85 (s, 6H). $^{13}$C NMR (CDCl$_3$, 100 MHz): δ 159.41 (d, $J_{C,F}$=240 Hz), 157.64, 143.65 (d, $J_{C,F}$=5.5 Hz), 119.53 (d, $J_{C,F}$=21.0 Hz), 117.42 (d, $J_{C,F}$=24.0 Hz), 101.19, 84.00, 57.86, 50.91, 47.15, 43.03, 39.51, 39.03, 31.48, 30.90, 30.00, 24.78.

(1r,3R,5S,7r)-1-(2'-Bromo-5-fluoro-4'-isopropyl-2-(methoxymethoxy)-[1,1'-biphenyl]-3-yl)-3,5-dimethyladamantane

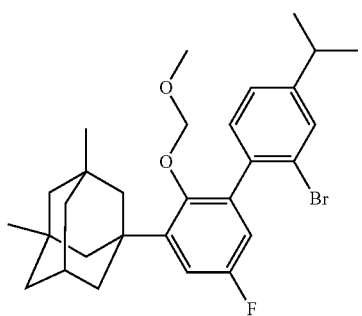 [SMILES: COCOc1c(-c2ccc(C(C)C)cc2Br)cc(F)cc1C12CC3CC(C)(CC(C)(C3)C1)C2]

To a solution of 4.02 g (9.09 mmol) of 2-((3r,5r,7r)-3-adamantan-1-yl)-5-fluoro-2-(methoxymethoxy)phenyl)-4,4,5,5-tetramethyl-1,3,2-dioxaborolane in 20 mL of 1,4-dioxane 3.55 g (10.9 mmol) of 2-bromo-4-isopropyliodobenzene, 7.40 g (22.7 mmol) of caesium carbonate, and 10 mL of water were subsequently added. The mixture obtained was purged with argon for 10 minutes followed by addition of 525 mg (0.48 mmol) of Pd(PPh$_3$)$_4$. This mixture was stirred for 12 hours at 100° C., then cooled to room temperature, and diluted with 100 mL of water. The crude product was extracted with dichloromethane (3×50 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 4.00 g (86%) of a white solid. $^1$H NMR (CDCl$_3$, 400 MHz): δ 7.52 (d, J=1.5 Hz, 1H), 7.26 (d, J=7.7 Hz, 1H), 7.20 (dd, J=7.8, 1.6 Hz, 1H), 7.03 (dd, J=11.1, 3.2 Hz, 1H), 6.78 (dd, J=7.9, 3.2 Hz, 1H), 4.47 (m, 1H), 4.36 (m, 1H), 3.18 (s, 3H), 2.92 (sept, J=6.9 Hz, 1H), 2.15-2.20 (m, 1H), 1.92-1.99 (m, 2H), 1.77-1.83 (m, 2H), 1.65-1.71 (m, 2H), 1.34-1.47 (m, 4H), 1.27 (d, J=6.9 Hz, 6H), 1.20 (br.s, 2H), 0.88 (s, 6H). $^{13}$C NMR (CDCl$_3$, 100 MHz): δ 159.24 (d, $J_{C,F}$=240 Hz), 150.45, 150.18 (d, $J_{C,F}$=2.6 Hz), 144.82 (d, $J_{C,F}$=6.5 Hz), 137.25, 135.86 (d, $J_{C,F}$=8.7 Hz), 131.90, 130.88, 125.50, 123.59, 115.76 (d, $J_{C,F}$=22.9 Hz), 113.96 (d, $J_{C,F}$=23.8 Hz), 99.13, 57.10, 50.89, 47.25, 47.20, 43.01, 39.47, 39.28, 33.65, 31.50, 30.95, 30.02, 23.86, 23.84.

2-(3'-((1r,3R,5S,7r)-3,5-Dimethyladamantan-1-yl)-5'-fluoro-4-isopropyl-2'-(methoxymethoxy)-[1,1'-biphenyl]-2-yl)-4,4,5,5-tetramethyl-1,3,2-dioxaborolane

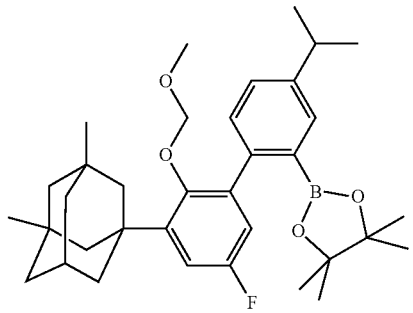

To a solution of 4.00 g (7.76 mmol) of (1r,3R,5S,7r)-1-(2'-bromo-5-fluoro-4'-isopropyl-2-(methoxymethoxy)-[1,1'-biphenyl]-3-yl)-3,5-dimethyladamantane in 50 mL of dry THF 3.17 mL (7.91 mmol) of 2.5 M "BuLi in hexanes was added dropwise for 20 minutes at −80° C. The reaction mixture was stirred for 1 hour at this temperature followed by an addition of 2.35 mL (11.6 mmol) of 2-isopropoxy-4,4,5,5-tetramethyl-1,3,2-dioxaborolane. The obtained suspension was stirred at room temperature for 1 hour, then poured into 300 mL of water. The crude product was extracted with dichloromethane (3×100 mL), the combined organic extract was dried over Na$_2$SO$_4$ and then evaporated to dryness. The residue was purified by flash chromatography on silica gel 60 (40-63 um, eluent: hexane-diethyl ether=10:1, vol.). Yield 3.97 g (91%) of a colorless glassy solid. $^1$H NMR (CDCl$_3$, 400 MHz): δ 7.59 (d, J=1.8 Hz, 1H), 7.29 (dd, J=7.9, 1.9 Hz, 1H), 7.24 (d, J=7.9 Hz, 1H), 6.95 (dd, J=11.2, 3.2 Hz, 1H), 6.72 (dd, J=8.1, 3.2 Hz, 1H), 4.34 (s, 2H), 3.22 (s, 3H), 2.95 (sept, J=6.9 Hz, 1H), 2.14-2.19 (m, 1H), 1.72-1.98 (m, 6H), 1.31-1.45 (m, 4H), 1.28 (d, J=6.9 Hz, 6H), 1.13-1.22 (m, 14H). $^{13}$C NMR (CDCl$_3$, 100 MHz): δ 159.29 (d, $J_{C,F}$=240 Hz), 150.01 (d, $J_{C,F}$=2.6 Hz), 147.15, 143.88 (d, $J_{C,F}$=6.5 Hz), 142.10 (d, $J_{C,F}$=1.7 Hz), 132.85, 130.16, 128.06, 115.85 (d, $J_{C,F}$=22.7 Hz), 112.63 (d, $J_{C,F}$=23.6 Hz), 98.83, 83.46, 57.24, 50.90, 47.44 (broad), 43.04, 39.69, 39.20, 33.85, 31.52, 30.94, 30.08, 25.20 (broad), 24.17 (broad), 24.04.

2',2'''-(Pyridine-2,6-diyl)bis(3-((1r,3R,5S,7r)-3,5-dimethyladamantan-1-yl)-5-fluoro-4'-isopropyl-[1,1'-biphenyl]-2-ol)

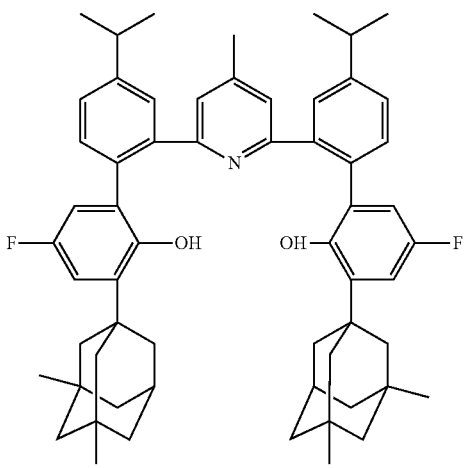 [SMILES: Cc1cc(-c2cc(C(C)C)ccc2-c2cc(F)cc(C34CC5CC(C)(CC(C)(C5)C3)C4)c2O)nc(-c2cc(C(C)C)ccc2-c2cc(F)cc(C34CC5CC(C)(CC(C)(C5)C3)C4)c2O)c1]

To a solution of 3.97 g (7.76 mmol) of 2-(3'-((1r,3R,5S,7r)-3,5-dimethyladamantan-1-yl)-5'-fluoro-4-isopropyl-2'-(methoxymethoxy)-[1,1'-biphenyl]-2-yl)-4,4,5,5-tetramethyl-1,3,2-dioxaborolane in 40 mL of 1,4-dioxane, 880 mg (3.72 mmol) of 2,6-dibromopyridine, 6.40 g (19.4 mmol) of cesium carbonate, and 20 mL of water were subsequently added. The mixture obtained was purged with argon for 10 minutes followed by addition of 400 mg (0.380 mmol) of Pd(PPh$_3$)$_4$. This mixture was stirred for 12 hours at 100° C., then cooled to room temperature, and diluted with 50 mL of water. Thus obtained mixture was extracted with dichloromethane (3×50 mL), the combined organic extract was dried over Na$_2$SO$_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). Yield 2.11 g (66%) of a mixture of two isomers as a white foam. $^1$H NMR (CDCl$_3$, 400 MHz): δ 7.87 and 7.04 (2s, 2H), 7.63 and 7.42 (2t, 1H), 7.21-7.38 (m, 7H), 7.15 and 6.98 (2d, J=7.8 Hz, 2H), 6.80 (dd, J=11.0, 3.0 Hz, 1H), 6.74 (dd, J=8.0, 3.0 Hz, 1H), 6.69 (dd, J=11.1, 3.0 Hz, 1H), 6.11 (dd, J=8.1, 3.1 Hz, 1H), 2.94-3.06 (2sept, 2H), 1.41-1.85 (m, 12H), 0.96-1.35 (m, 24H), 0.78 (s, 3H), 0.77 (s, 3H), 0.72 (s, 3H), 0.69 (s, 3H). $^{13}$C NMR (CDCl$_3$, 100 MHz) δ 157.65 (d, $J_{C,F}$=238 Hz), 149.11, 148.67, 148.01, 140.28, 139.20, 138.29, 137.09, 134.11, 133.64, 132.05, 131.61, 128.58, 127.93, 122.28, 114.60 (d, $J_{C,F}$=22.3 Hz), 114.13 (d, $J_{C,F}$=23.0 Hz), 113.22 (d, $J_{C,F}$=23.4 Hz), 51.07, 50.72, 47.18, 46.97, 46.09, 46.03, 43.18, 42.89, 42.68, 42.63, 38.59, 38.47, 37.89, 33.85, 33.73, 31.45, 31.27, 31.20, 31.09, 31.01, 30.89, 30.82, 30.70, 30.01, 29.96.

4-Fluoro-2-((3r,5r,7r)-3,5,7-trimethyladamantan-1-yl)phenol

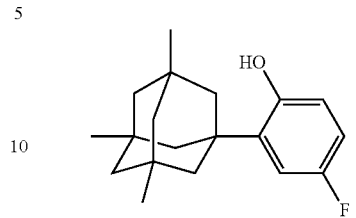

To a solution of 2.80 g (25.0 mmol) of 4-fluorophenol and 4.40 g (22.7 mmol) of 3,5,7-trimethyladamantan-1-ol in 30 mL of dichloromethane a solution of 1.60 mL (25.0 mmol) of methanesulfonic acid and 2 mL of acetic acid in 30 mL of dichloromethane was added dropwise for 1 hour at room temperature. The resulting mixture was stirred for 48 hours at room temperature and then carefully poured into 300 mL of 5% NaHCO$_3$. The crude product was extracted with dichloromethane (3×50 mL), the combined organic extract was dried over Na$_2$SO$_4$ and then evaporated to dryness. The residue was purified using Kugelrohr apparatus (1 mbar, 80° C.) yielding 3.9 g (60%) of the title product as a light-yellow oil. $^1$H NMR (CDCl$_3$, 400 MHz): δ 6.93 (dd, J=11.3, 3.1 Hz, 1H), 6.70-6.74 (m, 1H), 6.55 (dd, J=8.6, 5.0 Hz, 1H), 4.87 (br.s, 1H), 1.62 (br.s, 6H), 1.00-1.18 (m, 6H), 0.87 (s, 9H). $^{13}$C NMR (CDCl$_3$, 100 MHz): (158.44 (d, $J_{C,F}$=237 Hz), 150.28 (d, $J_{C,F}$=2.0 Hz), 137.44 (d, $J_{C,F}$=5.9 Hz), 117.10 (d, $J_{C,F}$=8.3 Hz), 114.13 (d, $J_{C,F}$=24.0 Hz), 112.56 (d, $J_{C,F}$=23.0 Hz), 50.28, 45.77, 39.34, 32.12, 30.46.

2-Bromo-4-fluoro-6-((3r,5r,7r)-3,5,7-trimethyladamantan-1-yl)phenol

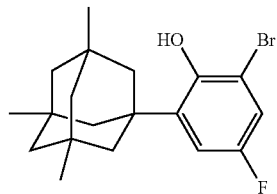 [SMILES: CC12CC3(C)CC(C)(C1)CC(c1cc(F)cc(Br)c1O)(C2)C3]

To a solution of 3.60 g (12.5 mmol) of 4-fluoro-2-((3r,5r,7r)-3,5,7-trimethyladamantan-1-yl)phenol in 20 mL of DMF 2.22 g (12.5 mmol) of NBS was added in one portion at room temperature. The resulting mixture was stirred for 48 hours at room temperature and then carefully poured into 200 mL of 5% NaHCO$_3$. The crude product was extracted with dichloromethane (3×50 mL), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 3.00 g (65%) of a white solid. $^1$H NMR (CDCl$_3$, 400 MHz): δ 7.06 (dd, J=6.9, 3.0 Hz, 1H), 6.94 (dd, J=10.8, 3.0 Hz, 1H), 5.60 (s, 1H), 1.61 (br.s, 6H), 1.06-1.18 (m, 6H), 0.87 (s, 9H). $^{13}$C NMR (CDCl$_3$, 100 MHz): (157.20 (d, $J_{C,F}$=241 Hz), 146.99 (d, $J_{C,F}$=3.0 Hz), 138.10 (d, $J_{C,F}$=6.0 Hz), 115.76 (d, $J_{C,F}$=26.0 Hz), 114.06 (d, $J_{C,F}$=23.6 Hz), 111.22 (d, $J_{C,F}$=10.9 Hz), 50.20, 45.45, 40.19, 32.14, 30.42.

(3r,5r,7r)-1-(3-Bromo-5-fluoro-2-(methoxymethoxy)phenyl)-3,5,7-trimethyladamantane

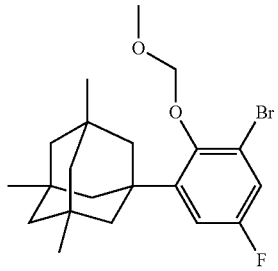 [SMILES: COCOc1c(Br)cc(F)cc1C12CC3(C)CC(C)(CC(C)(C3)C1)C2]

To a solution of 2.20 g (6.00 mmol) of 2-bromo-4-fluoro-6-((3r,5r,7r)-3,5,7-trimethyladamantan-1-yl)phenol in 20 mL of dry THF 270 mg (6.60 mmol, 60% wt. in mineral oil) of sodium hydride was added at room temperature. After that, 630 ul (7.80 mmol) of MOMCl was added in one portion. The reaction mixture was heated for 24 hours at 60° C. and then poured into 30 mL of cold water. The crude product was extracted with 3×20 mL of dichloromethane. The combined organic extract was dried over $Na_2SO_4$ and then evaporated to dryness. Yield 2.50 g (97%) of a white solid. $^1$H NMR ($CDCl_3$, 400 MHz): δ 7.14 (dd, J=6.9, 3.1 Hz, 1H), 6.99 (dd, J=10.9, 3.1 Hz, 1H), 5.19 (s, 2H), 3.67 (s, 3H), 1.62 (br.s, 6H), 1.06-1.17 (m, 6H), 0.88 (s, 9H). $^{13}$C NMR ($CDCl_3$, 100 MHz): δ 159.50 (d, $J_{C,F}$=245 Hz), 150.15, 146.11 (d, $J_{C,F}$=6.4 Hz), 118.17 (d, $J_{C,F}$=25.4 Hz), 117.67 (d, $J_{C,F}$=10.5 Hz), 114.05 (d, $J_{C,F}$=23.6 Hz), 100.08, 57.93, 50.07, 46.53, 40.65, 32.25, 30.46.

2-(5-Fluoro-2-(methoxymethoxy)-3-((3r,5r,7r)-3,5,7-trimethyladamantan-1-yl)phenyl)-4,4,5,5-tetramethyl-1,3,2-dioxaborolane

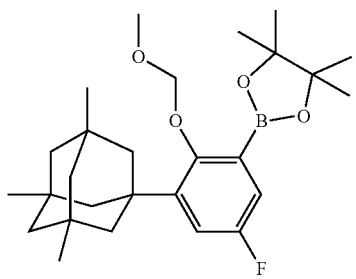

To a solution of 2.50 g (5.89 mmol) of (3r,5r,7r)-1-(3-bromo-5-fluoro-2-(methoxymethoxy)phenyl)-3,5,7-trimethyladamantane in 30 mL of dry THF 2.68 mL (6.70 mmol) of 2.5 M $^n$BuLi in hexanes was added dropwise for 20 minutes at −80° C. The reaction mixture was stirred at this temperature for 1 hour followed by addition of 1.84 mL (7.12 mmol) of 2-isopropoxy-4,4,5,5-tetramethyl-1,3,2-dioxaborolane. The obtained suspension was stirred for 1 hour at room temperature, then poured into 30 mL of water. The crude product was extracted with dichloromethane (3×40 mL), the combined organic extract was dried over $Na_2SO_4$ and then evaporated to dryness. Yield 2.70 g (96%) of a white solid. $^1$H NMR ($CDCl_3$, 400 MHz): δ 7.20 (dd, J=7.6, 3.2 Hz, 1H), 7.08 (dd, J=10.9, 3.3 Hz, 1H), 5.11 (s, 2H), 3.57 (s, 3H), 1.65 (br.s, 6H), 1.34 (s, 12H), 1.06-1.17 (m, 6H), 0.86 (s, 9H). $^{13}$C NMR ($CDCl_3$, 100 MHz): δ 159.39 (d, $J_{C,F}$=240 Hz), 157.71 (d, $J_{C,F}$=2.0 Hz), 143.38 (d, $J_{C,F}$=5.7 Hz), 119.59 (d, $J_{C,F}$=21.0 Hz), 117.46 (d, $J_{C,F}$=24.0 Hz), 101.29, 84.01, 57.92, 50.24, 46.51, 39.88, 32.20, 30.52, 24.77.

(3r,5r,7r)-1-(2'-Bromo-5-fluoro-2-(methoxymethoxy)-[1,1'-biphenyl]-3-yl)-3,5,7-trimethyladamantane

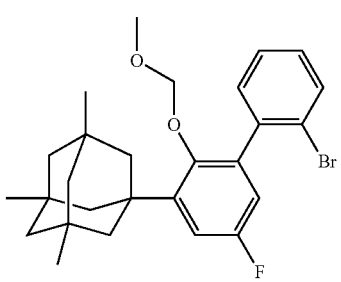 [SMILES: COCOc1c(-c2ccccc2Br)cc(F)cc1C12CC3(C)CC(C)(CC(C)(C3)C1)C2]

To a solution of 2.70 g (5.89 mmol) of 2-(5-fluoro-2-(methoxymethoxy)-3-((3r,5r,7r)-3,5,7-trimethyladamantan-1-yl)phenyl)-4,4,5,5-tetramethyl-1,3,2-dioxaborolane in 20 mL of 1,4-dioxane 2.24 g (7.90 mmol) of 2-bromoiodobenzene, 5.00 g (15.2 mmol) of cesium carbonate, and 10 mL of water were subsequently added. The mixture obtained was purged with argon for 10 minutes followed by addition of 350 mg (0.30 mmol) of $Pd(PPh_3)_4$. This mixture was stirred for 12 hours at 100° C., then cooled to room temperature, and diluted with 100 mL of water. The crude product was extracted with dichloromethane (3×50 mL), the combined organic extract was dried over $Na_2SO_4$ and then evaporated to dryness. The residue was purified by flash chromatography on silica gel 60 (40-63 um, eluent: hexane-dichloromethane=10:1, vol.). Yield 2.50 g (85%) of a white solid. $^1$H NMR ($CDCl_3$, 400 MHz): δ 7.73 (d, J=7.9 Hz, 1H), 7.40-7.42 (m, 2H), 7.26-7.30 (m, 1H), 7.10 (dd, J=11.1, 3.2 Hz, 1H), 6.83 (dd, J=7.8, 3.2 Hz, 1H), 4.53 (m, 1H), 4.42 (m, 1H), 3.27 (s, 3H), 1.73 (s, 6H), 1.14-1.25 (m, 6H), 0.95 (s, 9H). $^{13}$C NMR ($CDCl_3$, 100 MHz): δ 159.22 (d, $J_{C,F}$=241 Hz), 150.23 (d, $J_{C,F}$=2.7 Hz), 140.01 (d, $J_{C,F}$=1.84 Hz), 135.75 (d, $J_{C,F}$=8.5 Hz), 133.03, 132.12, 129.11, 127.24, 123.75, 115.69 (d, $J_{C,F}$=23.2 Hz), 114.14 (d, $J_{C,F}$=23.8 Hz), 99.24, 57.16, 50.21, 46.52, 40.13, 32.21, 30.55.

2-(5'-Fluoro-2'-(methoxymethoxy)-3'-((3r,5r,7r)-3,5,7-trimethyladamantan-1-yl)-[1,1'-biphenyl]-2-yl)-4,4,5,5-tetramethyl-1,3,2-dioxaborolane

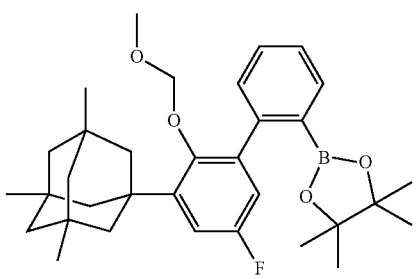

To a solution of 2.34 g (4.80 mmol) of (3r,5r,7r)-1-(2'-bromo-5-fluoro-2-(methoxymethoxy)-[1,1'-biphenyl]-3-yl)-

3,5,7-trimethyladamantane in 20 mL of dry THF 2.00 mL (5.04 mmol) of 2.5 M "BuLi in hexanes was added dropwise for 20 minutes at −80° C. The reaction mixture was stirred for 1 hour at this temperature followed by an addition of 1.34 mL (7.21 mmol) of 2-isopropoxy-4,4,5,5-tetramethyl-1,3,2-dioxaborolane. The obtained suspension was stirred for 1 hour at room temperature, then poured into 100 mL of water. The crude product was extracted with dichloromethane (3×100 mL), the combined organic extract was dried over $Na_2SO_4$ and then evaporated to dryness. The residue was purified by flash chromatography on silica gel 60 (40-63 um, eluent: hexane-diethyl ether=10:1, vol.). Yield 2.50 g (97%) of a colorless glassy solid. $^1H$ NMR ($CDCl_3$, 400 MHz): δ 7.76 (d, J=7.6 Hz, 1H), 7.43 (td, J=7.5, 1.5 Hz, 1H), 7.31-7.35 (m, 2H), 6.98 (dd, J=11.2, 3.2 Hz, 1H), 6.73 (dd, J=8.0, 3.2 Hz, 1H), 4.33 (s, 2H), 3.25 (s, 3H), 1.70 (br.s, 6H), 1.08-1.21 (m, 18H), 0.88 (s, 9H). $^{13}C$ NMR ($CDCl_3$, 100 MHz): δ 159.30 (d, $J_{C,F}$=240 Hz), 150.06 (d, $J_{C,F}$=2.4 Hz), 144.58, 143.70 (d, $J_{C,F}$=6.6 Hz), 138.28 (d, $J_{C,F}$=8.3 Hz), 134.75, 130.20, 130.11, 126.61, 115.78 (d, $J_{C,F}$=22.7 Hz), 112.86 (d, $J_{C,F}$=23.6 Hz), 98.97, 83.53, 57.26, 50.22, 46.71, 40.02, 32.24, 30.55, 25.20 (broad), 24.12 (broad).

2',2'''-(Pyridine-2,6-diyl)bis(5-fluoro-3-((3r,5r,7r)-3, 5,7-trimethyladamantan-1-yl)-[1,1'-biphenyl]-2-ol)

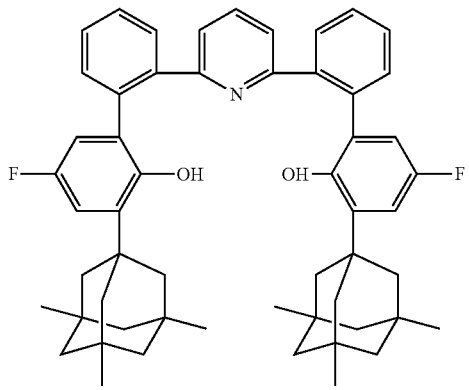 [SMILES: CC12CC3(C)CC(C)(C1)CC(c1cc(F)cc(-c4ccccc4-c4cccc(-c5ccccc5-c5cc(F)cc(C67CC8(C)CC(C)(CC(C)(C8)C6)C7)c5O)n4)c1O)(C2)C3]

To a solution of 2.50 g (4.80 mmol) of 2-(5'-fluoro-2'-(methoxymethoxy)-3'-((3r,5r,7r)-3,5,7-trimethyladamantan-1-yl)-[1,1'-biphenyl]-2-yl)-4,4,5,5-tetramethyl-1,3,2-dioxaborolane in 20 mL of 1,4-dioxane, 546 mg (2.30 mmol) of 2,6-dibromopyridine, 4.02 g (12.0 mmol) of cesium carbonate, and 10 mL of water were subsequently added. The mixture obtained was purged with argon for 10 minutes followed by addition of 304 mg (0.240 mmol) of $Pd(PPh_3)_4$. This mixture was stirred for 12 hours at 100° C., then cooled to room temperature, and diluted with 50 mL of water. The obtained mixture was extracted with dichloromethane (3×50 mL), the combined organic extract was dried over $Na_2SO_4$ and then evaporated to dryness. To the resulting oil 50 mL of THF, 50 mL of methanol, and 3 mL of 12 N HCl were subsequently added. The reaction mixture was stirred overnight at 60° C. and then poured into 200 mL of water. The crude product was extracted with dichloromethane (3×70 mL), the combined organic extract was washed with 5% $NaHCO_3$, dried over $Na_2SO_4$, and then evaporated to dryness. The residue was purified by flash chromatography on silica gel 60 (40-63 um, eluent: hexane-ethyl acetate=10:1, vol.). Yield 690 mg (37%) of a mixture of two isomers as a white foam. $^1H$ NMR ($CDCl_3$, 400 MHz): δ 7.37-7.54 (m, 8H), 6.65-7.04 and 6.29-6.32 (m, 9H), 1.43 (s, 6H), 1.22-1.40 (m, 6H), 0.95-1.15 (m, 12H), 0.78 (s, 9H), 0.72 (s, 9H). $^{13}C$ NMR ($CDCl_3$, 100 MHz) δ 157.71 (d, $J_{C,F}$=240 Hz), 157.68 (d, $J_{C,F}$=240 Hz), 148.03, 147.62 (d, $J_{C,F}$=2.0 Hz), 139.79, 138.99, 138.91, 138.70, 138.64, 136.92, 136.82, 135.82, 135.67, 132.05, 131.43, 130.60, 130.00, 129.82, 129.20, 128.57, 128.44, 122.41, 122.18, 114.26 (d, $J_{C,F}$=22.7 Hz), 113.84 (d, $J_{C,F}$=23.0 Hz), 113.51 (d, $J_{C,F}$=23.4 Hz), 113.12 (d, $J_{C,F}$=23.7 Hz), 50.30, 50.05, 45.71, 39.55, 39.49, 32.17, 32.00, 31.89, 30.60, 30.44.

Dimethylhafnium[2',2'''-(pyridine-2,6-diyl)bis(3-((3r, 5r,7r)-adamantan-1-yl)-5-methyl-[1,1'-biphenyl]-2-olate)] (Complex 1)

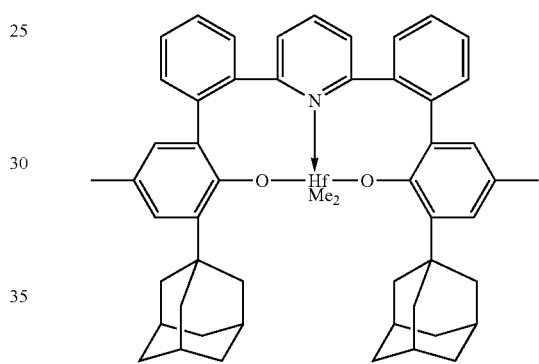

To a suspension of 225 mg (0.702 mmol) of hafnium tetrachloride (<0.5% Zr) in 50 mL of dry toluene 1.10 mL (3.16 mmol) of 2.9 M MeMgBr in diethyl ether was added in one portion via syringe at 0° C. To the resulting suspension 500 mg (0.702 mmol) of 2',2'''-(pyridine-2,6-diyl)bis (3-((3r,5r,7r)-adamantan-1-yl)-5-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 473 mg (73%) of a white-beige solid. Anal. Calc. for $C_{53}H_{57}HfNO_2$: C, 69.30; H, 6.26; N, 1.52. Found: C, 69.58; H, 6.39; N, 1.40. $^1H$ NMR ($CDCl_3$, 400 MHz): δ 7.69 (t, J=7.8 Hz, 1H), 7.54 (td, J=7.6, 1.4 Hz, 2H), 7.35 (td, J=7.5, 1.3 Hz, 2H), 7.30 (dd, J=7.8, 1.2 Hz, 2H), 7.10-7.14 (m, 4H), 7.02 (d, J=2.3 Hz, 2H), 6.69 (dd, J=2.3, 0.6 Hz, 2H), 2.23 (s, 6H), 2.18-2.24 (m, 6H), 2.04-2.14 (m, 12H), 1.68-1.85 (m, 12H), −0.78 (s, 6H). $^{13}C$ NMR ($CDCl_3$, 100 MHz) δ 158.78, 157.35, 142.53, 139.60, 138.26, 132.88, 132.34, 131.79, 130.83, 130.69, 128.66, 127.52, 127.40, 126.22, 124.77, 49.51, 40.85, 37.15, 37.00, 29.06, 20.76.

Dimethylzirconium[2',2'''-(pyridine-2,6-diyl)bis(3-((3r,5r,7r)-adamantan-1-yl)-5-methyl-[1,1'-biphenyl]-2-olate)] (Complex 3)

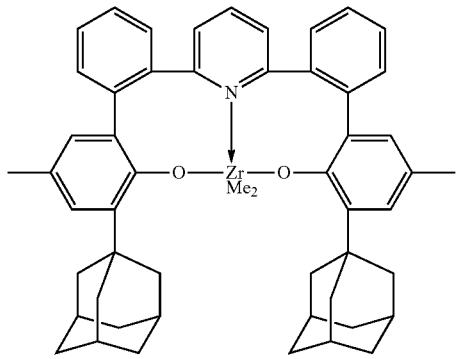

To a suspension of 131 mg (0.562 mmol) of zirconium tetrachloride in 50 mL of dry toluene 870 ul (2.53 mmol) of 2.9 M MeMgBr in diethyl ether was added in one portion via syringe at −30° C. To the resulting suspension 400 mg (0.562 mmol) of 2',2'''-(pyridine-2,6-diyl)bis(3-((3r,5r,7r)-adamantan-1-yl)-5-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 318 mg (68%) of a beige solid. Anal. Calc. for $C_{53}H_{57}ZrNO_2$: C, 76.58; H, 6.91; N, 1.69. Found: C, 76.89; H, 7.06; N, 1.52. $^1$H NMR ($C_6D_6$, 400 MHz): 7.11-7.20 (m, 8H), 7.02-7.04 (m, 2H), 6.76 (d, J=2.2 Hz, 2H), 6.39-6.50 (m, 3H), 2.45-2.54 (m, 6H), 2.32-2.37 (m, 6H), 2.23 (s, 6H), 2.17 (br.s, 6H), 1.94-2.03 (m, 6H), 1.80-1.89 (m, 6H), −0.10 (s, 6H). $^{13}$C NMR (CDCl$_3$, 100 MHz) δ 159.31, 158.31, 143.44, 139.58, 138.60, 133.65, 133.59, 133.18, 131.42, 131.13, 129.36, 128.54, 128.06, 127.20, 124.43, 42.89, 41.95, 38.18, 37.85, 30.01, 21.41.

Dimethylhafnium[2',2'''-(pyridine-2,6-diyl)bis(3-((3r,5r,7r)-adamantan-1-yl)-4',5-dimethyl-[1,1'-biphenyl]-2-olate)] (Complex 2)

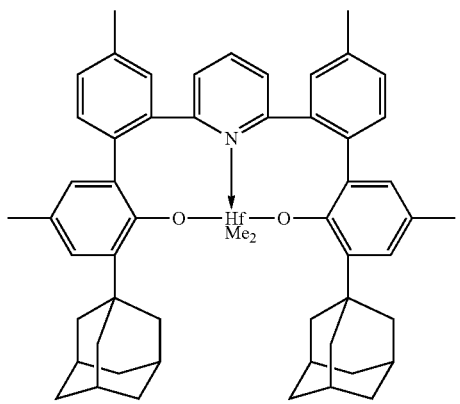

To a suspension of 118 mg (0.369 mmol) of hafnium tetrachloride (<0.5% Zr) in 50 mL of dry toluene 570 ul (1.66 mmol) of 2.9 M MeMgBr in diethyl ether was added in one portion via syringe at 0° C. To the resulting suspension 273 mg (0.369 mmol) of 2',2'''-(pyridine-2,6-diyl)bis(3-((3r,5r,7r)-adamantan-1-yl)-4',5-dimethyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 240 mg (69%) of a white-beige solid. Anal. Calc. for $C_{55}H_{61}HfNO_2$: C, 69.79; H, 6.50; N, 1.48. Found: C, 70.08; H, 6.73; N, 1.35. $^1$H NMR ($C_6D_6$, 400 MHz): δ 7.20 (d, J=2.4 Hz, 2H), 7.12 (d, J=8.0 Hz, 2H), 6.97 (dd, J=7.8, 1.8 Hz, 2H), 6.84 (m, 2H), 6.74-6.76 (m, 2H), 6.43-6.56 (m, 3H), 2.45-2.53 (m, 6H), 2.30-2.38 (m, 6H), 2.23 (s, 6H), 2.21 (s, 6H), 2.15 (br.s, 6H), 1.94-2.03 (m, 6H), 1.76-1.84 (m, 6H), −0.03 (s, 6H). $^{13}$C NMR ($C_6D_6$, 100 MHz) (159.99, 158.16, 140.99, 139.42, 139.03, 137.75, 133.71, 133.23, 133.14, 132.44, 131.03, 129.60, 128.29, 126.99, 125.20, 51.24, 41.67, 38.04, 37.81, 30.04, 21.41, 21.39.

Dimethylzirconium[2',2'''-(pyridine-2,6-diyl)bis(3-((3r,5r,7r)-adamantan-1-yl)-4',5-dimethyl-[1,1'-biphenyl]-2-olate)] (Complex 4)

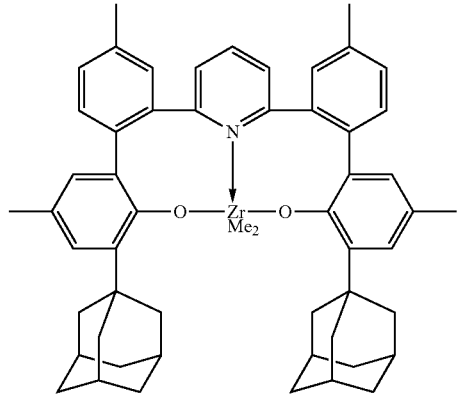

To a suspension of 83 mg (0.354 mmol) of zirconium tetrachloride in 30 mL of dry toluene 540 ul (1.59 mmol) of 2.9 M MeMgBr in diethyl ether was added in one portion via syringe at −30° C. To the resulting suspension 262 mg (0.354 mmol) of 2',2'''-(pyridine-2,6-diyl)bis(3-((3r,5r,7r)-adamantan-1-yl)-4',5-dimethyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 193 mg (63%) of a beige solid. Anal. Calc. for $C_{55}H_{61}ZrNO_2$: C, 76.88; H, 7.16; N, 1.63. Found: C, 77.06; H, 7.43; N, 1.51. $^1$H NMR ($C_6D_6$, 400 MHz): δ 7.19 (d, J=1.8 Hz, 2H), 7.13 (d, J=7.8 Hz, 2H), 6.96 (ddd, J=7.8, 1.8, 0.6 Hz, 2H), 6.82 (dd, J=1.2, 0.6 Hz, 2H), 6.76 (dd, J=2.4, 0.6 Hz, 2H), 6.42-6.57 (m, 3H), 2.48-2.55 (m, 6H), 2.34-2.42 (m, 6H), 2.22 (s, 6H), 2.20 (s, 6H), 2.15 (br.s, 6H), 1.95-2.02 (m, 6H), 1.77-1.84 (m, 6H), −0.20 (s, 6H). $^{13}$C NMR ($C_6D_6$, 100 MHz) δ 159.46, 158.49, 140.84, 139.40, 138.49, 137.69, 133.62, 133.59, 133.51, 132.31, 130.93, 129.66, 128.89, 128.22, 127.09, 126.03, 124.74, 42.91, 41.72, 38.14, 37.80, 30.04, 21.42, 21.38.

Dimethylhafnium[2',2'''-(4-methoxypyridine-2,6-diyl)bis(3-((3r,5r,7r)-adamantan-1-yl)-5-(tert-butyl)-[1,1'-biphenyl]-2-olate)] (Complex 7)

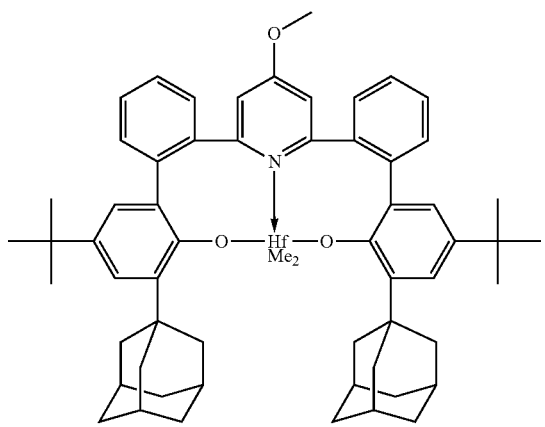

To a suspension of 155 mg (0.484 mmol) of hafnium tetrachloride (<0.5% Zr) in 50 mL of dry toluene 750 ul (2.18 mmol) of 2.9 M MeMgBr in diethyl ether was added in one portion via syringe at 0° C. To the resulting suspension 400 mg (0.484 mmol) of 2',2'''-(4-methoxypyridine-2,6-diyl)bis(3-((3r,5r,7r)-adamantan-1-yl)-5-(tert-butyl)-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 338 mg (68%) of a white-beige solid. Anal. Calc. for $C_{60}H_{71}HfNO_3$: C, 69.78; H, 6.93; N, 1.36. Found: C, 70.04; H, 7.16; N, 1.24. $^1$H NMR ($C_6D_6$, 400 MHz): δ 7.59 (d, J=2.6 Hz, 2H), 7.19-7.21 (m, 2H), 7.09-7.16 (m, 8H), 6.08 (s, 2H), 2.57-2.63 (m, 6H), 2.55 (s, 3H), 2.43-2.49 (m, 6H), 2.21 (br.s, 6H), 1.99-2.06 (m, 6H), 1.83-1.90 (m, 6H), 1.33 (s, 18H), −0.10 (s, 6H). $^{13}$C NMR ($C_6D_6$, 100 MHz) δ 167.56, 159.92, 159.70, 143.99, 140.37, 138.65, 133.99, 133.04, 132.78, 131.59, 131.32, 129.66, 128.90, 127.90, 125.85, 124.81, 111.17, 55.17, 50.99, 41.98, 38.57, 37.89, 34.79, 32.36, 30.08.

Dimethylhafnium[2',2'''-(4-(trifluoromethyl)pyridine-2,6-diyl)bis(3-((3r,5r,7r)-adamantan-1-yl)-5-(tert-butyl)-[1,1'-biphenyl]-2-olate)] (Complex 8)

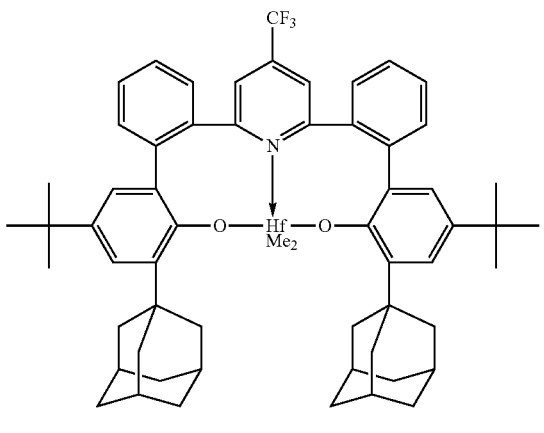

To a suspension of 148 mg (0.463 mmol) of hafnium tetrachloride (<0.5% Zr) in 50 mL of dry toluene 720 ul (2.10 mmol) of 2.9 M MeMgBr in diethyl ether was added in one portion via syringe at 0° C. To the resulting suspension 400 mg (0.463 mmol) of 2',2'''-(4-(trifluoromethyl)pyridine-2,6-diyl)bis(3-((3r,5r,7r)-adamantan-1-yl)-5-(tert-butyl)-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 342 mg (69%) of a yellow solid. Anal. Calc. for $C_{60}H_{68}F_3HfNO_2$: C, 67.31; H, 6.40; N, 1.31. Found: C, 67.65; H, 6.66; N, 1.20. $^1$H NMR ($C_6D_6$, 400 MHz): δ 7.55 (d, J=2.6 Hz, 2H), 7.07-7.18 (m, 4H), 7.03 (td, J=7.4, 1.6 Hz, 2H), 6.99 (d, J=2.5 Hz, 2H), 6.91 (dd, J=7.4, 1.1 Hz, 2H), 6.82 (s, 2H), 2.47-2.53 (m, 6H), 2.32-2.39 (m, 6H), 2.17 (br.s, 6H), 1.94-2.01 (m, 6H), 1.80-1.89 (m, 6H), 1.30 (s, 18H), −0.13 (s, 6H). $^{13}$C NMR ($C_6D_6$, 100 MHz) δ 160.03, 159.46, 143.80, 141.05, 138.65, 133.82, 132.47, 132.08, 131.72, 131.25, 125.67, 124.93, 121.29 (q, $J_{C,F}$=3.1 Hz), 51.49, 41.94, 38.49, 37.79, 34.78, 32.23, 29.98.

Dimethylhafnium[2',2'''-(pyridine-2,6-diyl)bis(3-((3r,5r,7r)-adamantan-1-yl)-5-(tert-butyl)-4'-methyl-[1,1'-biphenyl]-2-olate)] (Complex 9)

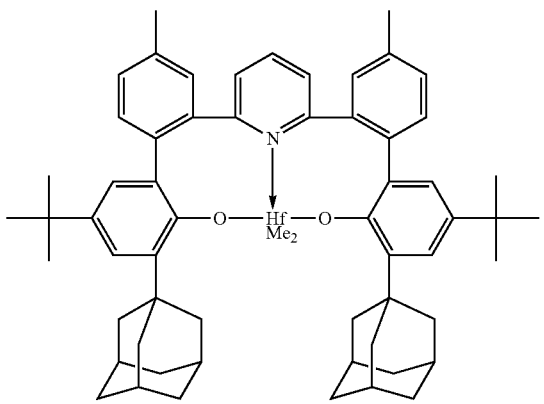

To a suspension of 155 mg (0.485 mmol) of hafnium tetrachloride (<0.5% Zr) in 50 mL of dry toluene 750 ul (2.20 mmol) of 2.9 M MeMgBr in diethyl ether was added in one portion via syringe at 0° C. To the resulting suspension 400 mg (0.485 mmol) of 2',2'''-(pyridine-2,6-diyl)bis(3-((3r,5r,7r)-adamantan-1-yl)-5-(tert-butyl)-4'-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 287 mg (57%) of a white-beige solid. Anal. Calc. for $C_{61}H_{73}HfNO_2$: C, 71.08; H, 7.14; N, 1.36. Found: C, 71.31; H, 7.32; N, 1.24. $^1$H NMR ($C_6D_6$, 400 MHz): δ 7.58 (d, J=2.6 Hz, 2H), 7.12 (d, J=7.8 Hz, 2H), 7.03 (d, J=2.6 Hz, 2H), 6.95 (dd, J=7.9, 1.3 Hz, 2H), 6.75 (d, J=0.7 Hz, 2H), 6.39-6.52 (m, 3H), 2.55-2.62 (m, 6H), 2.40-2.48 (m, 6H), 2.19 (s, 6H), 2.19 (br.s, 6H), 1.98-2.05 (m, 6H), 1.78-1.86 (m, 6H), 1.33 (s, 18H), −0.02 (s, 6H). $^{13}$C NMR ($C_6D_6$, 100 MHz) (159.90, 158.06, 141.34, 140.38, 139.30, 138.47, 137.64, 133.82, 133.12, 132.86, 132.49, 131.21, 129.66, 128.90, 126.00, 125.32, 124.41, 51.20, 41.77, 38.48, 37.81, 34.76, 32.35, 30.07, 21.31.

Dimethylhafnium[2',2'''-(4-(trifluoromethyl)pyridine-2,6-diyl)bis(3-((3r,5r,7r)-adamantan-1-yl)-5-(tert-butyl)-4'-isopropyl-[1,1'-biphenyl]-2-olate)] (Complex 10)

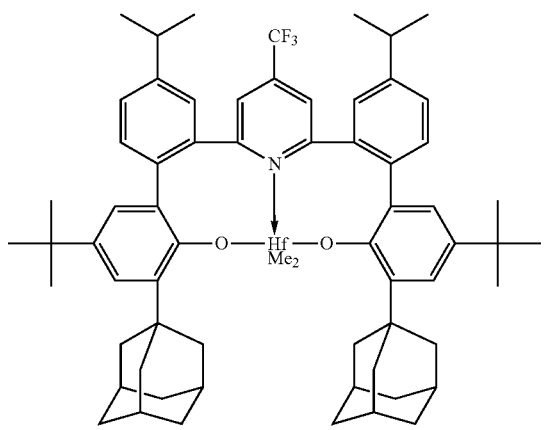

To a suspension of 135 mg (0.421 mmol) of hafnium tetrachloride (<0.5% Zr) in 50 mL of dry toluene 650 ul (1.89 mmol) of 2.9 M MeMgBr in diethyl ether was added in one portion via syringe at 0° C. To the resulting suspension 400 mg (0.421 mmol) of 2',2'''-(4-(trifluoromethyl)pyridine-2,6-diyl)bis(3-((3r,5r,7r)-adamantan-1-yl)-5-(tert-butyl)-4'-isopropyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 356 mg (73%) of a yellow solid. Anal. Calc. for $C_{66}H_{50}F_3HfNO_2$: C, 68.64; H, 6.98; N, 1.21. Found: C, 68.88; H, 7.16; N, 1.13. $^1$H NMR ($C_6D_6$, 400 MHz): δ 7.57 (d, J=2.6 Hz, 2H), 7.19-7.22 (m, 4H), 7.02 (s, 2H), 6.98 (d, J=2.5 Hz, 2H), 6.93 (d, J=1.7 Hz, 2H), 2.91 (sept, J=6.9 Hz, 2H), 2.53-2.60 (m, 6H), 2.40-2.47 (m, 6H), 2.15 (br.s, 6H), 1.96-2.03 (m, 6H), 1.77-1.85 (m, 6H), 1.28 (s, 18H), 1.23 (d, J=6.9 Hz, 6H), 1.07 (d, J=6.9 Hz, 6H), 0.00 (s, 6H). $^{13}$C NMR ($C_6D_6$, 100 MHz) δ 160.39, 159.75, 149.13, 141.82, 140.98, 138.51, 134.19, 132.28, 129.29, 125.96, 124.61, 121.84 (q, $J_{C,F}$=3.0 Hz), 51.54, 41.81, 38.53, 37.78, 34.77, 33.85, 32.24, 29.95, 26.57, 22.32.

Dimethylhafnium[2',2'''-(4-methoxypyridine-2,6-diyl)bis(3-((3r,5r,7r)-adamantan-1-yl)-5-(tert-butyl)-4'-isopropyl-[1,1'-biphenyl]-2-olate)] (Complex 11)

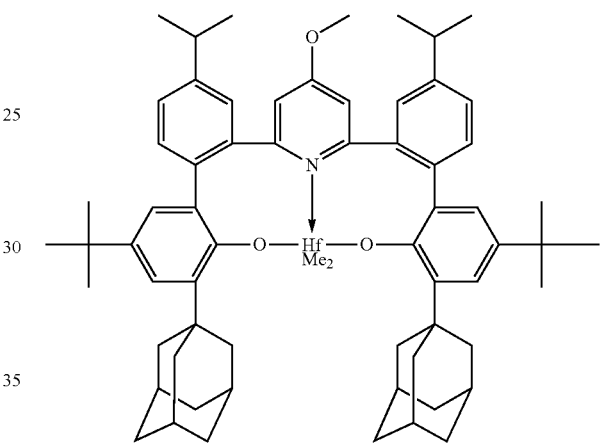

To a suspension of 140 mg (0.440 mmol) of hafnium tetrachloride (<0.5% Zr) in 50 mL of dry toluene 680 ul (1.98 mmol) of 2.9 M MeMgBr in diethyl ether was added in one portion via syringe at 0° C. To the resulting suspension 400 mg (0.440 mmol) of 2',2'''-(4-methoxypyridine-2,6-diyl)bis(3-((3r,5r,7r)-adamantan-1-yl)-5-(tert-butyl)-4'-isopropyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 310 mg (63%) of a white solid. Anal. Calc. for $C_{66}H_{83}HfNO_3$: C, 70.98; H, 7.49; N, 1.25. Found: C, 71.24; H, 7.52; N, 1.14. $^1$H NMR ($C_6D_6$, 400 MHz): δ 7.60 (d, J=2.6 Hz, 2H), 7.25 (d, J=8.1 Hz, 2H), 7.18 (m, 2H), 7.07 (d, J=2.5 Hz, 2H), 7.02 (d, J=1.8 Hz, 2H), 6.21 (s, 2H), 2.98 (sept, J=6.8 Hz, 2H), 2.60-2.67 (m, 6H), 2.61 (s, 3H), 2.48-2.56 (m, 6H), 2.18 (br.s, 6H), 2.01-2.08 (m, 6H), 1.80-1.87 (m, 6H), 1.31 (s, 18H), 1.25 (d, J=6.8 Hz, 6H), 1.12 (d, J=6.8 Hz, 6H), −0.02 (s, 6H). $^{13}$C NMR ($C_6D_6$, 100 MHz) (167.36, 160.15, 160.03, 148.56, 141.83, 140.28, 138.50, 134.24, 133.36, 132.93, 129.58, 128.24, 126.19, 124.50, 111.80, 55.16, 51.06, 41.85, 38.60, 37.87, 34.79, 33.77, 32.38, 30.03, 26.54, 22.31.

Dimethylhafnium[2',2'''-(4-(trifluoromethyl)pyridine-2,6-diyl)bis(3-((3r,5r,7r)-adamantan-1-yl)-5-(tert-butyl)-4'-methyl-[1,1'-biphenyl]-2-olate)] (Complex 12)

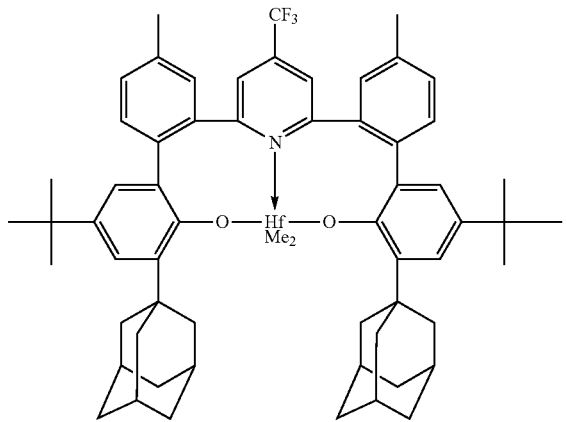

To a suspension of 144 mg (0.448 mmol) of hafnium tetrachloride (<0.5% Zr) in 50 mL of dry toluene 695 ul (2.02 mmol) of 2.9 M MeMgBr in diethyl ether was added in one portion via syringe at 0° C. To the resulting suspension 400 mg (0.448 mmol) of 2',2'''-(4-(trifluoromethyl)pyridine-2,6-diyl)bis(3-((3r,5r,7r)-adamantan-1-yl)-5-(tert-butyl)-4'-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 398 mg (81%) of a yellow solid. Anal. Calc. for $C_{62}H_{72}F_3HfNO_2$: C, 67.78; H, 6.61; N, 1.27. Found: C, 68.03; H, 6.74; N, 1.15. $^1$H NMR ($C_6D_6$, 400 MHz): δ 7.55 (d, J=2.6 Hz, 2H), 7.07 (d, J=7.9 Hz, 2H), 6.95 (d, J=2.6 Hz, 2H), 6.93 (dd, J=7.8, 1.2 Hz, 2H), 6.84 (s, 2H), 6.69 (d, J=0.7 Hz, 2H), 2.50-2.57 (m, 6H), 2.37-2.45 (m, 6H), 2.16 (s, 6H), 2.15 (br.s, 6H), 1.96-2.04 (m, 6H), 1.78-1.86 (m, 6H), 1.30 (s, 18H), −0.03 (s, 6H). $^{13}$C NMR ($C_6D_6$, 100 MHz) δ 160.17, 159.61, 141.22, 140.90, 138.47, 137.94, 133.72, 132.95, 132.29, 132.16, 130.86, 129.66, 128.90, 126.03, 125.92, 124.58, 121.56 (q, $J^F$=3.5 Hz), 51.51, 41.74, 38.48, 37.76, 34.76, 32.25, 30.04, 21.27.

Dimethylzirconium[2',2'''-(4-(trifluoromethyl)pyridine-2,6-diyl)bis(3-((3r,5r,7r)-adamantan-1-yl)-5-(tert-butyl)-4'-methyl-[1,1'-biphenyl]-2-olate)] (Complex 13)

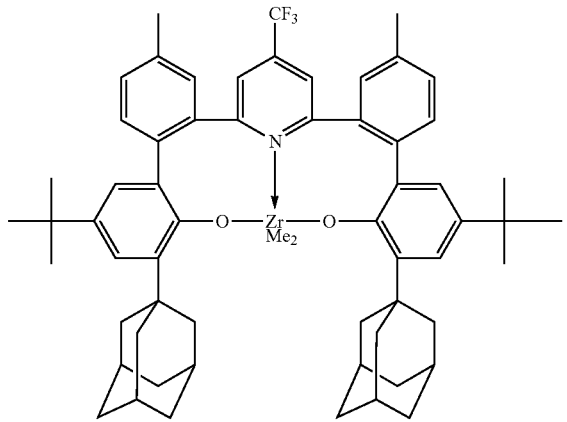

To a suspension of 105 mg (0.448 mmol) of zirconium tetrachloride in 50 mL of dry toluene 695 ul (2.02 mmol) of 2.9 M MeMgBr in diethyl ether was added in one portion via syringe at −30° C. To the resulting suspension 400 mg (0.448 mmol) of 2',2'''-(4-(trifluoromethyl)pyridine-2,6-diyl)bis(3-((3r,5r,7r)-adamantan-1-yl)-5-(tert-butyl)-4'-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 330 mg (73%) of a yellow solid. Anal. Calc. for $C_{62}H_{72}F_3ZrNO_2$: C, 73.62; H, 7.18; N, 1.38. Found: C, 73.90; H, 7.32; N, 1.21. $^1$H NMR ($C_6D_6$, 400 MHz): δ 7.54 (d, J=2.6 Hz, 2H), 7.07 (d, J=7.8 Hz, 2H), 6.95 (d, J=2.5 Hz, 2H), 6.91 (dd, J=7.8, 1.2 Hz, 2H), 6.83 (s, 2H), 6.67 (m, 2H), 2.52-2.59 (m, 6H), 2.39-2.47 (m, 6H), 2.15 (s, 6H), 2.15 (br.s, 6H), 1.96-2.04 (m, 6H), 1.79-1.86 (m, 6H), 1.30 (s, 18H), −0.20 (s, 6H). $^{13}$C NMR ($C_6D_6$, 100 MHz) (160.53, 159.08, 141.06, 141.00, 137.91, 137.88, 133.60, 132.81, 132.64, 132.55, 130.76, 129.66, 128.90, 125.99, 124.49, 121.05 (q, $J^F$=3.0 Hz), 43.38, 41.78, 38.58, 37.75, 34.79, 32.24, 30.04, 21.25.

Dimethylhafnium[2',2'''-(pyridine-2,6-diyl)bis(3-((3r,5r,7r)-adamantan-1-yl)-5-(tert-butyl)-4'-isopropyl-[1,1'-biphenyl]-2-olate)] (Complex 14)

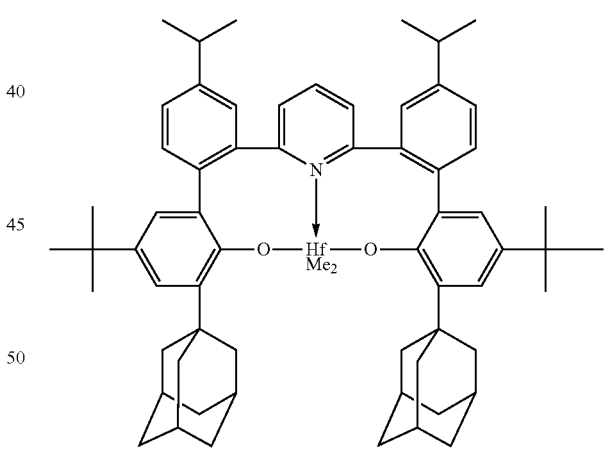

To a suspension of 145 mg (0.454 mmol) of hafnium tetrachloride (<0.5% Zr) in 50 mL of dry toluene 704 ul (2.04 mmol) of 2.9 M MeMgBr in diethyl ether was added in one portion via syringe at 0° C. To the resulting suspension 400 mg (0.454 mmol) of 2',2'''-(pyridine-2,6-diyl)bis(3-((3r,5r,7r)-adamantan-1-yl)-5-(tert-butyl)-4'-isopropyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 333 mg (67%) of a white solid. Anal. Calc. for $C_{65}H_{81}HfNO_2$: C, 71.83; H, 7.51; N, 1.29. Found: C, 72.09; H, 7.67; N, 1.20. $^1$H NMR ($C_6D_6$, 400 MHz): δ 7.58 (d, J=2.6 Hz, 2H), 7.25 (d, J=8.1 Hz, 2H), 7.17-7.19 (m, 2H), 7.04 (d, J=2.6 Hz, 2H), 6.92 (d, J=1.8 Hz, 2H), 6.43-6.55 (m, 3H), 2.95 (sept, J=6.9 Hz, 2H), 2.56-2.63 (m, 6H), 2.44-2.50 (m, 6H), 2.17 (br.s, 6H), 1.99-2.06 (m, 6H), 1.78-1.86 (m, 6H), 1.31 (s, 18H), 1.25 (d, J=6.9 Hz, 6H), 1.10 (d, J=6.9 Hz, 6H), 0.00 (s, 6H). $^{13}$C NMR ($C_6D_6$, 100 MHz) G 158.67, 157.62, 147.92, 140.68, 139.28, 138.93, 137.17, 133.04, 132.32, 131.59, 128.97, 127.37, 125.20, 125.15, 123.24, 49.62, 40.65, 37.42, 37.04, 34.15, 33.03, 31.72, 29.08, 26.02, 21.86.

Dimethylhafnium[2',2'''-(4-methoxypyridine-2,6-diyl)bis(3-((3r,5r,7r)-adamantan-1-yl)-5-(tert-butyl)-4'-methyl-[1,1'-biphenyl]-2-olate)] (Complex 15)

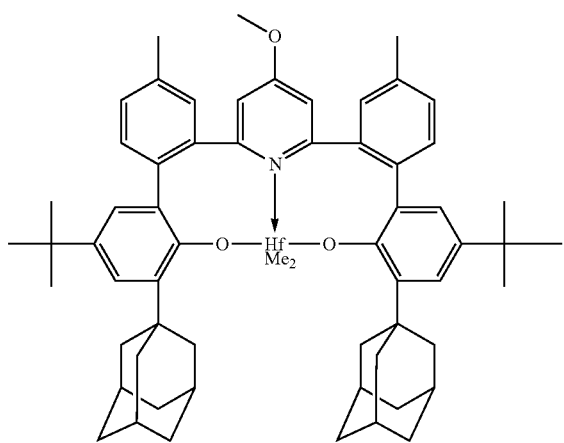

To a suspension of 112 mg (0.351 mmol) of hafnium tetrachloride (<0.5% Zr) in 50 mL of dry toluene 544 ul (1.56 mmol) of 2.9 M MeMgBr in diethyl ether was added in one portion via syringe at 0° C. To the resulting suspension 300 mg (0.351 mmol) of 2',2'''-(4-methoxypyridine-2,6-diyl)bis(3-((3r,5r,7r)-adamantan-1-yl)-5-(tert-butyl)-4'-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 284 mg (76%) of a white solid. Anal. Calc. for $C_{62}H_{75}HfNO_3$: C, 70.20; H, 7.13; N, 1.32. Found: C, 70.45; H, 7.33; N, 1.23. $^1$H NMR ($C_6D_6$, 400 MHz): δ 7.59 (d, J=2.6 Hz, 2H), 7.12-7.14 (m, 2H), 7.05 (d, J=2.6 Hz, 2H), 6.95 (dd, J=7.9, 1.2 Hz, 2H), 6.85 (m, 2H), 6.09 (s, 2H), 2.63 (s, 3H), 2.59-2.65 (m, 6H), 2.44-2.53 (m, 6H), 2.22 (s, 6H), 2.19 (br.s, 6H), 2.01-2.08 (m, 6H), 1.80-1.87 (m, 6H), 1.33 (s, 18H), 0.00 (s, 6H). $^{13}$C NMR ($C_6D_6$, 100 MHz) (166.82, 159.09, 158.73, 140.36, 139.21, 137.23, 137.08, 132.94, 132.42, 131.61, 131.51, 130.47, 123.29, 110.90, 55.69, 49.23, 40.68, 37.47, 37.02, 34.15, 31.72, 29.16, 21.01.

Dimethylhafnium[2',2'''-(4-methoxypyridine-2,6-diyl)bis(3-((3r,5r,7r)-adamantan-1-yl)-5-fluoro-4'-isopropyl-[1,1'-biphenyl]-2-olate)] (Complex 16)

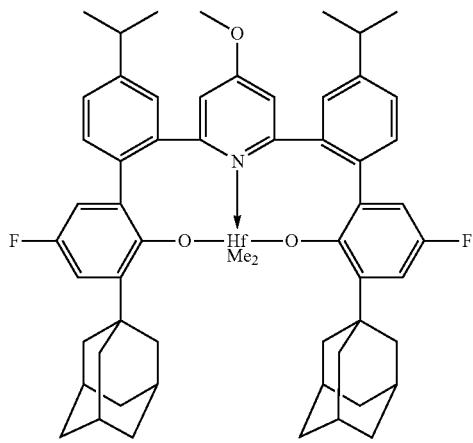

To a suspension of 153 mg (0.479 mmol) of hafnium tetrachloride (<0.05% Zr) in 50 mL of dry toluene 743 ul (2.16 mmol) of 2.9 M MeMgBr in diethyl ether was added in one portion via syringe at 0° C. To the resulting suspension 400 mg (0.479 mmol) of 2',2'''-(4-methoxypyridine-2,6-diyl)bis(3-((3r,5r,7r)-adamantan-1-yl)-5-fluoro-4'-isopropyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 286 mg (57%) of a white solid. Anal. Calc. for $C_{58}H_{65}F_2HfNO_3$: C, 66.94; H, 6.30; N, 1.35. Found: C, 67.23; H, 6.51; N, 1.25. $^1$H NMR ($C_6D_6$, 400 MHz): δ 7.11-7.20 (m, 6H), 7.02 (m, 2H), 6.72 (dd, J=7.8, 3.2 Hz, 2H), 6.21 (s, 2H), 2.94 (sept, J=6.8 Hz, 2H), 2.52 (s, 3H), 2.33-2.42 (m, 6H), 2.20-2.30 (m, 6H), 2.07 (br.s, 6H), 1.87-1.95 (m, 6H), 1.72-1.80 (m, 6H), 1.24 (d, J=6.8 Hz, 6H), 1.14 (d, J=6.8 Hz, 6H), −0.05 (s, 6H). $^{13}$C NMR ($C_6D_6$, 100 MHz) δ 167.75, 159.75, 158.49, 157.28 (d, $J_{C,F}$=235 Hz), 149.31, 141.11 (d, $J_{C,F}$=5.7 Hz), 140.05 (d, $J_{C,F}$=1.7 Hz), 133.81, 133.47 (d, $J_{C,F}$=7.7 Hz), 133.28, 129.32, 128.51, 115.00 (d, $J_{C,F}$=22.3 Hz), 114.58 (d, $J_{C,F}$=23.0 Hz), 111.65, 55.26, 51.57, 41.18, 38.28, 37.59, 33.99, 29.77, 26.37, 22.34.

Dimethylhafnium[2',2'''-(4-methoxypyridine-2,6-diyl)bis(3-((3r,5r,7r)-adamantan-1-yl)-4'-(tert-butyl)-5-methyl-[1,1'-biphenyl]-2-olate)] (Complex 17)

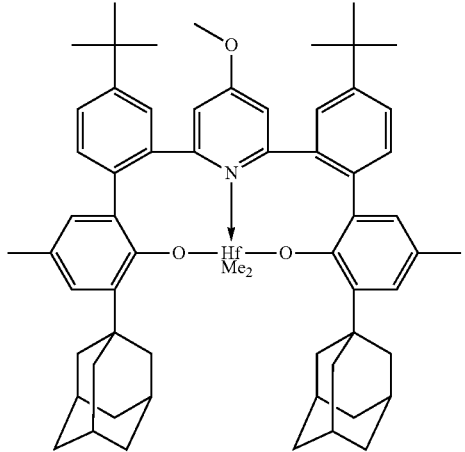

To a suspension of 165 mg (0.515 mmol) of hafnium tetrachloride (<0.05% Zr) in 50 mL of dry toluene 800 ul (2.32 mmol) of 2.9 M MeMgBr in diethyl ether was added in one portion via syringe at 0° C. To the resulting suspension 440 mg (0.515 mmol) of 2',2'''-(4-methoxypyridine-2,6-diyl)bis(3-((3r,5r,7r)-adamantan-1-yl)-4'-(tert-butyl)-5-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 380 mg (70%) of a white solid. Anal. Calc. for $C_{62}H_{75}HfNO_3$: C, 70.20; H, 7.13; N, 1.32. Found: C, 70.46; H, 7.29; N, 1.25. $^1$H NMR ($C_6D_6$, 400 MHz): δ 7.36 (dd, J=8.3, 2.0 Hz, 2H), 7.24 (m, 4H), 7.20 (d, J=2.0 Hz, 2H), 6.70 (d, J=2.0 Hz, 2H), 6.26 (s, 2H), 2.52-2.59 (m, 6H), 2.47 (s, 3H), 2.41-2.48 (m, 6H), 2.19 (s, 6H), 2.17 (br.s, 6H), 1.98-2.06 (m, 6H), 1.76-1.84 (m, 6H), 1.34 (s, 18H), −0.06 (s, 6H). $^{13}$C NMR ($C_6D_6$, 100 MHz) (167.46, 160.77, 160.29, 151.37, 141.42, 139.12, 134.02, 133.98, 133.05, 129.71, 129.56, 126.86, 125.47, 112.05, 55.00, 51.36, 41.67, 38.26, 37.81, 35.15, 31.74, 29.98, 21.34.

Dimethylhafnium[2',2'''-(pyridine-2,6-diyl)bis(3-((3r,5r,7r)-adamantan-1-yl)-4'-(tert-butyl)-5-methyl-[1,1'-biphenyl]-2-olate)] (Complex 18)

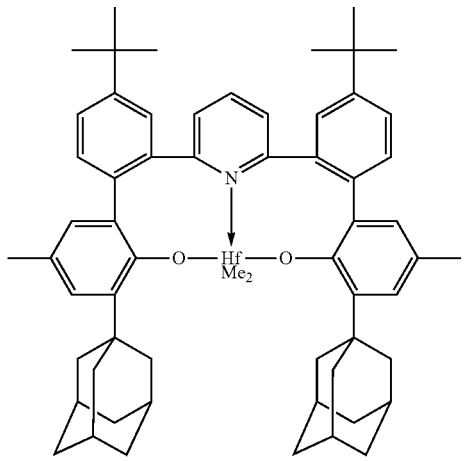

To a suspension of 124 mg (0.388 mmol) of hafnium tetrachloride (<0.05% Zr) in 50 mL of dry toluene 600 ul (1.75 mmol) of 2.9 M MeMgBr in diethyl ether was added in one portion via syringe at 0° C. To the resulting suspension 320 mg (0.388 mmol) of 2',2'''-(pyridine-2,6-diyl)bis(3-((3r,5r,7r)-adamantan-1-yl)-4'-(tert-butyl)-5-methyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 301 mg (75%) of a white solid. Anal. Calc. for $C_{61}H_{73}HfNO_2$: C, 71.08; H, 7.14; N, 1.32. Found: C, 71.39; H, 7.27; N, 1.22. $^1$H NMR ($C_6D_6$, 400 MHz): δ 7.35 (dd, J=8.3, 2.0 Hz, 2H), 7.22 (d, J=8.3 Hz, 2H), 7.19 (d, J=2.0 Hz, 2H), 7.14 (d, J=2.0 Hz, 2H), 6.66 (d, J=1.7 Hz, 2H), 6.45-6.53 (m, 3H), 2.48-2.56 (m, 6H), 2.37-2.45 (m, 6H), 2.19 (s, 6H), 2.16 (br.s, 6H), 1.96-2.05 (m, 6H), 1.75-1.84 (m, 6H), 1.32 (s, 18H), 0.07 (s, 6H). $^{13}$C NMR ($C_6D_6$, 100 MHz) (160.12, 158.83, 151.36, 141.36, 139.48, 139.01, 133.84, 132.99, 129.65, 129.57, 126.93, 125.76, 125.54, 51.54, 41.59, 38.17, 37.75, 35.12, 31.69, 29.92, 21.33.

Dimethylhafnium[2',2'''-(pyridine-2,6-diyl)bis(3-((1r,3R,5S,7r)-3,5-dimethyladamantan-1-yl)-5-fluoro-4'-isopropyl-[1,1'-biphenyl]-2-olate)] (Complex 19)

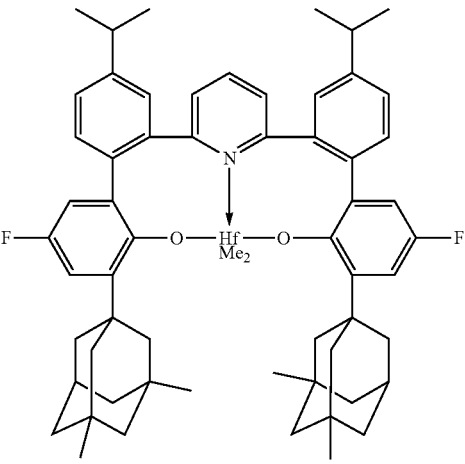

To a suspension of 210 mg (0.654 mmol) of hafnium tetrachloride (<0.05% Zr) in 50 mL of dry toluene 900 ul (2.61 mmol) of 2.9 M MeMgBr in diethyl ether was added in one portion via syringe at 0° C. To the resulting suspension 562 mg (0.654 mmol) of 2',2'''-(pyridine-2,6-diyl)bis(3-((1r,3R,5S,7r)-3,5-dimethyladamantan-1-yl)-5-fluoro-4'-isopropyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 530 mg (76%) of a white solid. Anal. Calc. for $C_{61}H_{71}F_2HfNO_2$: C, 68.68; H, 6.71; N, 1.31. Found: C, 68.81; H, 6.99; N, 1.23. $^1$H NMR ($CD_2Cl_2$, 400 MHz): δ 7.77 (t, J=7.7 Hz, 1H), 7.47 (dd, J=8.1, 1.8 Hz, 2H), 7.18 (d, J=8.1 Hz, 2H), 7.16 (d, J=7.7 Hz, 2H), 6.90-6.94 (m, 4H), 6.49 (dd, J=7.9, 3.2 Hz, 2H), 2.97 (sept, J=6.9 Hz, 2H), 2.60-2.67 (m, 2H), 2.45-2.52 (m, 2H), 2.00-2.05 (m, 2H), 1.52-1.63 (m, 6H), 1.33-1.42 (m, 4H), 1.33 (d, J=6.9 Hz, 6H), 1.30-1.34 (m, 2H), 1.22 (d, J=6.9 Hz, 6H), 1.11-1.24 (m, 6H), 1.02-1.09 (m, 2H), 0.91 (s, 6H), 0.77 (s, 6H), −0.68 (s, 6H). $^{13}$C NMR ($CD_2Cl_2$, 100 MHz) δ 157.97, 157.89, 156.47 (d, $J_{C,F}$=234 Hz), 149.58, 140.27, 140.15 (d, $J_{C,F}$=6.1 Hz), 139.42 (d d, $J_{C,F}$=1.7 Hz), 133.12, 133.03 (d, $J_{C,F}$=7.9 Hz), 132.88, 129.52, 129.43, 128.70, 128.49, 125.85, 125.78, 114.45 (d, $J_{C,F}$=22.3 Hz), 113.65 (d, $J_{C,F}$=23.2 Hz), 51.75, 50.95, 49.61, 45.53, 43.87, 42.50, 39.57, 38.24, 33.76, 32.22, 31.58, 31.56, 30.92, 30.37, 25.85, 22.39.

Dimethylzirconium[2',2'''-(pyridine-2,6-diyl)bis(3-((1r,3R,5S,7r)-3,5-dimethyladamantan-1-yl)-5-fluoro-4'-isopropyl-[1,1'-biphenyl]-2-olate)] (Complex 20)

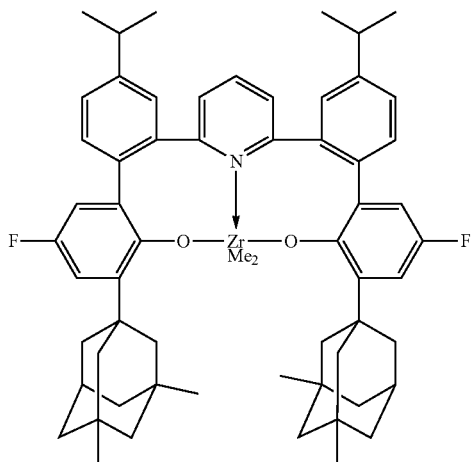

To a suspension of 135 mg (0.581 mmol) of zirconium tetrachloride in 50 mL of dry toluene 800 ul (2.32 mmol) of 2.9 M MeMgBr in diethyl ether was added in one portion via syringe at −30° C. To the resulting suspension 500 mg (0.581 mmol) of 2',2'''-(pyridine-2,6-diyl)bis(3-((1r,3R,5S,7r)-3,5-dimethyladamantan-1-yl)-5-fluoro-4'-isopropyl-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 390 mg (68%) of a white-beige solid. Anal. Calc. for $C_{61}H_{71}F_2ZrNO_2$: C, 74.80; H, 7.31; N, 1.43. Found: C, 75.06; H, 7.64; N, 1.19. $^1$H NMR ($CD_2Cl_2$, 400 MHz): δ 7.76 (t, J=7.8 Hz, 1H), 7.46 (dd, J=8.1, 1.8 Hz, 2H), 7.19 (d, J=8.0 Hz, 2H), 7.15 (d, J=7.8 Hz, 2H), 6.92 (dd, J=11.7, 3.3 Hz, 2H), 6.89 (d, J=1.8 Hz, 2H), 6.51 (dd, J=8.0, 3.3 Hz, 2H), 2.97 (sept, J=6.9 Hz, 2H), 2.65-2.73 (m, 2H), 2.48-2.56 (m, 2H), 2.00-2.06 (m, 2H), 1.52-1.65 (m, 6H), 1.33-1.43 (m, 6H), 1.33 (d, J=6.9 Hz, 6H), 1.22 (d, J=6.9 Hz, 6H), 1.15-1.23 (m, 6H), 1.06-1.14 (m, 2H), 0.92 (s, 6H), 0.79 (s, 6H), −0.42 (s, 6H). $^{13}$C NMR ($CD_2Cl_2$, 100 MHz) δ 158.29, 157.34, 156.51 (d, $J_{C,F}$=235 Hz), 149.53, 140.25, 139.61 (d, $J_{C,F}$=6.1 Hz), 139.29 (d, $J_{C,F}$=1.7 Hz), 133.42 (d, $J_{C,F}$=7.9 Hz), 133.26, 133.03, 129.53, 129.35, 128.72, 128.37, 125.79, 125.39, 114.57 (d, $J_{C,F}$=22.3 Hz), 113.61 (d, $J_{C,F}$=23.2 Hz), 51.76, 49.61, 45.66, 43.88, 42.81, 42.52, 39.67, 38.30, 33.77, 32.23, 31.59, 31.56, 30.94, 30.39.

Dimethylhafnium[2',2'''-(pyridine-2,6-diyl)bis(5-fluoro-3-((3r,5r,7r)-3,5,7-trimethyladamantan-1-yl)-[1,1'-biphenyl]-2-olate)] (Complex 21)

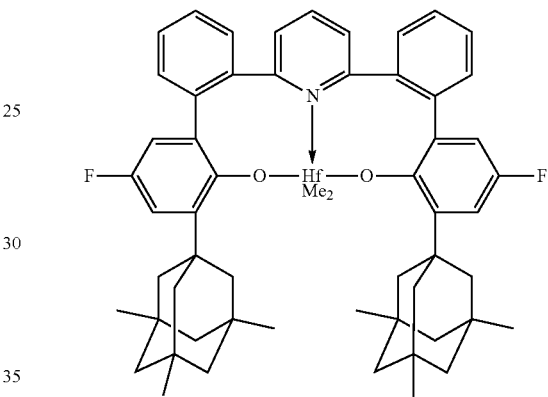

To a suspension of 119 mg (0.373 mmol) of hafnium tetrachloride (<0.05% Zr) in 50 mL of dry toluene 510 ul (1.49 mmol) of 2.9 M MeMgBr in diethyl ether was added in one portion via syringe at 0° C. To the resulting suspension 300 mg (0.373 mmol) of 2',2'''-(pyridine-2,6-diyl)bis(5-fluoro-3-((3r,5r,7r)-3,5,7-trimethyladamantan-1-yl)-[1,1'-biphenyl]-2-ol) was immediately added in one portion. The reaction mixture was stirred for 4 hours at room temperature and then evaporated to near dryness. The solid obtained was extracted with 2×20 mL of hot toluene, and the combined organic extract was filtered through a thin pad of Celite 503. Next, the filtrate was evaporated to dryness. The residue was triturated with 5 mL of n-hexane, the obtained precipitate was filtered off (G4), washed with 2×5 mL of n-hexane, and then dried in vacuo. Yield 271 mg (72%) of a white solid. Anal. Calc. for $C_{57}H_{63}F_2HfNO_2$: C, 67.74; H, 6.28; N, 1.39. Found: C, 67.98; H, 6.42; N, 1.37. $^1$H NMR ($CD_2Cl_2$, 400 MHz): δ 7.79 (t, J=7.7 Hz, 1H), 7.55 (td, J=7.5, 1.5 Hz, 2H), 7.49 (td, J=7.4, 1.3 Hz, 2H), 7.22 (dd, J=7.4, 0.9 Hz, 2H), 7.18 (d, J=7.8 Hz, 2H), 7.11 (dd, J=7.4, 0.9 Hz, 2H), 6.97 (dd, J=11.7, 3.3 Hz, 2H), 6.52 (dd, J=7.8, 3.3 Hz, 2H), 1.74-1.80 (m, 6H), 1.58-1.64 (m, 6H), 1.17-1.24 (m, 6H), 1.00-1.07 (m, 6H), 0.88 (s, 18H), −0.74 (s, 6H). $^{13}$C NMR ($CD_2Cl_2$, 100 MHz) δ 158.06, 158.04, 157.51, 156.37 (d, $J_{C,F}$=234 Hz), 141.79 (d, $J_{C,F}$=1.7 Hz), 140.46, 140.05 (d, $J_{C,F}$=5.9 Hz), 139.99, 132.98, 132.90, 132.79 (d, $J_{C,F}$=7.9 Hz), 131.28, 130.17, 130.08, 129.52, 128.71, 125.79, 125.52, 114.23 (d, $J_{C,F}$=23.2 Hz), 114.02 (d, $J_{C,F}$=22.4 Hz), 50.73, 46.62, 40.75, 32.64, 31.09.

Polymerization Examples

Solvents, polymerization grade toluene and/or isohexanes were supplied by ExxonMobil Chemical Company and were purified by passing through a series of columns: two 500 cm$^3$ Oxyclear cylinders in series from Labclear (Oakland, Calif.), followed by two 500 cm$^3$ columns in series packed with dried 3 Å molecular sieves (8 mesh-12 mesh; Aldrich Chemical Company), and two 500 cm$^3$ columns in series packed with dried 5 Å molecular sieves (8-12 mesh; Aldrich Chemical Company).

1-Octene (98%) (Aldrich Chemical Company) was dried by stirring over Na—K alloy overnight followed by filtration through basic alumina (Aldrich Chemical Company, Brockman Basic 1). Tri-(n-octyl)aluminum (TNOA) was purchased from either Aldrich Chemical Company or Akzo Nobel and used as received.

Polymerization grade ethylene was further purified by passing it through a series of columns: 500 cm$^3$ Oxyclear cylinder from Labclear (Oakland, Calif.) followed by a 500 cm$^3$ column packed with dried 3 Å molecular sieves (8 mesh-12 mesh; Aldrich Chemical Company), and a 500 cm$^3$ column packed with dried 5 Å molecular sieves (8 mesh-12 mesh; Aldrich Chemical Company).

Polymerization grade propylene was further purified by passing it through a series of columns: 2,250 cm$^3$ Oxyclear cylinder from Labclear followed by a 2,250 cm$^3$ column packed with 3 Å molecular sieves (8 mesh-12 mesh; Aldrich Chemical Company), then two 500 cm$^3$ columns in series packed with 5 Å molecular sieves (8 mesh-12 mesh; Aldrich Chemical Company), a 500 cm$^3$ column packed with Selexsorb CD (BASF), and finally a 500 cm$^3$ column packed with Selexsorb COS (BASF).

Methylalumoxane (MAO) was purchased from Albemarle Corporation as a 10 wt % in toluene. N,N-Dimethyanilinium tetrakis(pentafluorophenyl)borate was purchased from Albemarle Corporation. All complexes and the activators were added to the reactor as dilute solutions in toluene. The concentrations of the solutions of activator, scavenger, and complexes that were added to the reactor were chosen so that between 40 microliters-200 microliters of the solution were added to the reactor to ensure accurate delivery.

Reactor Description and Preparation. Polymerizations were conducted in an inert atmosphere (N$_2$) drybox using autoclaves equipped with an external heater for temperature control, glass inserts (internal volume of reactor=23.5 mL for C$_2$ and C$_2$/C$_8$ runs; 22.5 mL for C$_3$ runs), septum inlets, regulated supply of nitrogen, ethylene and propylene, and equipped with disposable polyether ether ketone mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-Octene Copolymerization (EO)

The reactor was prepared as described above, and then purged with ethylene. Toluene (solvent unless stated otherwise), optional 1-octene (0.1 mL when used), and optional MAO were added via syringe at room temperature and atmospheric pressure. The reactor was then brought to process temperature (typically 80° C.) and charged with ethylene to process pressure (typically 75 psig=618.5 kPa or 200 psig=1480.3 kPa) while stirring at 800 RPM. An optional scavenger solution (e.g., TNOA in isohexane) was then added via syringe to the reactor at process conditions. An optional non-coordinating activator (e.g., N,N-dimethylanilinium tetrakis(pentafluorophenyl)borate) solution (in toluene) was added via syringe to the reactor at process conditions, followed by a pre-catalyst (i.e., complex or catalyst) solution (in toluene) via syringe to the reactor at process conditions. Ethylene was allowed to enter (through the use of computer controlled solenoid valves) the autoclaves during polymerization to maintain reactor gauge pressure (+/−2 psi). Reactor temperature was monitored and typically maintained within +/−1° C. Polymerizations were halted by addition of approximately 50 psi O$_2$/Ar (5 mol % O$_2$) gas mixture to the autoclaves for approximately 30 seconds. The polymerizations were quenched after a predetermined cumulative amount of ethylene had been added or for a maximum of 30 minutes polymerization time. The reactors were cooled and vented. The polymer was isolated after the solvent was removed in-vacuo. Yields reported include total weight of polymer and residual catalyst. Catalyst activity is reported as grams of polymer per mmol transition metal compound per hour of reaction time (g/mmol/hr).

Propylene Polymerization

The reactor was prepared as described above, then heated to 40° C. and purged with propylene gas at atmospheric pressure. Toluene (solvent unless stated otherwise), optional MAO, and liquid propylene (1.0 mL) were added via syringe. The reactor was then heated to process temperature (70° C. or 100° C.) while stirring at 800 RPM. Then optional scavenger solution (e.g., TNOA in isohexane) was added via syringe to the reactor at process conditions. Optional non-coordinating activator (e.g., N,N-dimethylanilinium tetrakis (pentafluorophenyl)borate) solution (in toluene) was then added via syringe to the reactor at process conditions, followed by a pre-catalyst (i.e., complex or catalyst) solution (in toluene) via syringe to the reactor at process conditions. Reactor temperature was monitored and typically maintained within +/−1° C. Polymerizations were halted by addition of approximately 50 psi O$_2$/Ar (5 mol % O$_2$) gas mixture to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed in-vacuo. Yields reported include total weight of polymer and residual catalyst. Catalyst activities are typically reported as grams of polymer per mmol transition metal compound per hour of reaction time (g/mmol/hr).

Polymer Characterization

For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5,000 and 3,390,000). Samples (250 μL of a polymer solution in TCB were injected into the system) were run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards.

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

Table 1 illustrates ethylene polymerization results obtained using catalyst complexes 1 through 21 and 23 through 27. General conditions: catalyst complex=25 nmol, N,N-dimethylanilinium tetrakis(pentafluorophenyl)borate activator=1.1 equiv, 75 psig ethylene, Al(n-octyl)$_3$=500 nmol, temperature=80° C., total volume=5 mL.

TABLE 1

Ethylene polymerizations

| Run | Catalyst | Quench t (s) | Yield (g) | Activity (gP · mmolcat$^{-1}$ · h$^{-1}$) |
|---|---|---|---|---|
| 1 | 1 | 416 | 0.0769 | 26,619 |
| 2 | 1 | 1089 | 0.0781 | 10,327 |
| 3 | 1 | 460 | 0.0749 | 23,447 |
| 4 | 2 | 98 | 0.0686 | 100,800 |
| 5 | 2 | 263 | 0.0695 | 38,053 |
| 6 | 2 | 253 | 0.0724 | 41,208 |
| 7 | 3 | 31 | 0.0918 | 426,426 |
| 8 | 3 | 7 | 0.1054 | 2,168,229 |
| 9 | 3 | 26 | 0.0916 | 507,323 |
| 10 | 4 | 53 | 0.0902 | 245,072 |
| 11 | 4 | 54 | 0.0891 | 237,600 |
| 12 | 4 | 52 | 0.0889 | 246,185 |
| 13 | 5 | 32 | 0.0844 | 379,800 |
| 14 | 5 | 14 | 0.0834 | 857,829 |
| 15 | 5 | 24 | 0.0901 | 540,600 |
| 16 | 6 | 46 | 0.0869 | 272,035 |
| 17 | 6 | 36 | 0.0895 | 358,000 |
| 18 | 6 | 17 | 0.0922 | 780,988 |
| 19 | 7 | 82.4 | 0.0787 | 137,534 |
| 20 | 7 | 248.9 | 0.073 | 42,234 |
| 21 | 7 | 77.6 | 0.0879 | 163,113 |
| 22 | 8 | 111 | 0.0695 | 90,162 |
| 23 | 8 | 109 | 0.0781 | 103,178 |
| 24 | 8 | 115 | 0.0778 | 97,419 |
| 25 | 9 | 79.1 | 0.0804 | 146,367 |
| 26 | 9 | 95.7 | 0.0668 | 100,514 |
| 27 | 9 | 87.1 | 0.0729 | 120,524 |
| 28 | 10 | 54 | 0.0681 | 181,600 |
| 29 | 10 | 59 | 0.0796 | 194,278 |
| 30 | 10 | 49 | 0.0771 | 226,580 |
| 31 | 11 | 43.2 | 0.081 | 270,000 |
| 32 | 11 | 48.5 | 0.0826 | 245,245 |
| 33 | 11 | 46.4 | 0.0774 | 240,207 |
| 34 | 12 | 91 | 0.0708 | 112,035 |
| 35 | 12 | 78 | 0.0709 | 130,892 |
| 36 | 12 | 134 | 0.0665 | 71,463 |
| 37 | 13 | 50 | 0.0892 | 256,896 |
| 38 | 13 | 50 | 0.088 | 253,440 |
| 39 | 13 | 56 | 0.0879 | 226,029 |
| 40 | 14 | 46.9 | 0.0842 | 258,525 |
| 41 | 14 | 49.4 | 0.0831 | 242,235 |
| 42 | 14 | 46.7 | 0.0808 | 249,148 |

TABLE 1-continued

Ethylene polymerizations

| 43 | 15 | 203 | 0.0835 | 59,232 |
|---|---|---|---|---|
| 44 | 15 | 147.1 | 0.0822 | 80,468 |
| 45 | 15 | 207.7 | 0.0794 | 55,049 |
| 46 | 16 | 48 | 0.0855 | 256,500 |
| 47 | 16 | 46 | 0.0822 | 257,322 |
| 48 | 16 | 50 | 0.0877 | 252,576 |
| 49 | 17 | 333 | 0.0327 | 14,141 |
| 50 | 17 | 348 | 0.0371 | 15,352 |
| 51 | 17 | 321 | 0.0369 | 16,553 |
| 52 | 18 | 200 | 0.0474 | 34,128 |
| 53 | 18 | 163 | 0.0412 | 36,398 |
| 54 | 18 | 168 | 0.0409 | 35,057 |
| 55 | 19 | 65 | 0.0742 | 164,382 |
| 56 | 19 | 64 | 0.074 | 166,500 |
| 57 | 19 | 62 | 0.0783 | 181,858 |
| 58 | 20 | 43 | 0.0877 | 293,693 |
| 59 | 20 | 59 | 0.0902 | 220,149 |
| 60 | 20 | 38 | 0.0607 | 230,021 |
| 61 | 21 | 98 | 0.0836 | 122,841 |
| 62 | 21 | 135 | 0.0806 | 85,973 |
| 63 | 21 | 48 | 0.0876 | 262,800 |
| 64 | 23 | 50 | 0.066 | 190,080 |
| 65 | 23 | 48 | 0.0695 | 208,500 |
| 66 | 23 | 39 | 0.0693 | 255,877 |
| 67 | 24 | 69 | 0.0953 | 198,887 |
| 68 | 24 | 67 | 0.0885 | 190,209 |
| 69 | 24 | 63 | 0.0862 | 197,029 |
| 70 | 25 | 71 | 0.0725 | 147,042 |
| 71 | 25 | 68 | 0.0716 | 151,624 |
| 72 | 25 | 69 | 0.0663 | 138,365 |
| 73 | 26 | 222 | 0.085 | 55,135 |
| 74 | 26 | 147 | 0.0843 | 82,580 |
| 75 | 26 | 182 | 0.0824 | 65,196 |
| 76 | 27 | 59 | 0.0975 | 237,966 |
| 77 | 27 | 61 | 0.0971 | 229,220 |
| 78 | 27 | 70 | 0.0928 | 190,903 |

| Run | Mn (g/mol) | Mw (g/mol) | Mz (g/mol) | PDI | Tm (° C.) |
|---|---|---|---|---|---|
| 1 | 2,004,102 | 3,508,278 | 6,058,808 | 1.8 | 135 |
| 2 | 1,812,211 | 3,330,436 | 6,011,441 | 1.8 | 136 |
| 3 | 1,985,483 | 3,657,204 | 6,438,001 | 1.8 | 135 |
| 4 | 915,431 | 1,577,332 | 3,619,895 | 1.7 | 137 |
| 5 | 707,039 | 1,493,072 | 3,923,309 | 2.1 | 136 |
| 6 | 653,395 | 1,446,718 | 3,493,649 | 2.2 | 137 |
| 7 | | | | | 135 |
| 8 | 2,161,337 | 3,195,236 | 5,268,759 | 1.5 | |
| 9 | 879,099 | 2,860,284 | 5,513,768 | 3.3 | 135 |
| 10 | 943,934 | 1,857,405 | 4,176,064 | 2.0 | 136 |
| 11 | | | | | 136 |
| 12 | 739,206 | 1,684,302 | 4,499,649 | 2.3 | 137 |
| 13 | 1,145,262 | 2,917,976 | 5,439,049 | 2.6 | 135 |
| 14 | 1,021,364 | 2,697,262 | 6,248,907 | 2.6 | 135 |
| 15 | 1,684,279 | 2,897,994 | 5,189,147 | 1.7 | 134 |
| 16 | 1,102,965 | 2,807,009 | 5,465,690 | 2.5 | 136 |
| 17 | 18,761 | 2,317,736 | 6,752,743 | 123.5 | 136 |
| 18 | 27,051 | 2,149,810 | 6,142,423 | 79.5 | 136 |
| 19 | 1,375,402 | 2,733,343 | 5,180,063 | 2.0 | |
| 20 | 1,699,100 | 2,969,637 | 5,135,613 | 1.8 | |
| 21 | 2,067,265 | 3,240,013 | 5,277,174 | 1.6 | |
| 22 | 1,491,496 | 2,837,772 | 5,314,767 | 1.9 | 125 |
| 23 | 1,863,731 | 3,224,258 | 5,466,214 | 1.7 | 130 |
| 24 | 1,723,428 | 2,795,187 | 4,804,915 | 1.6 | 131 |
| 25 | 888,842 | 1,609,688 | 3,596,117 | 1.8 | |
| 26 | 821,525 | 1,530,616 | 3,585,066 | 1.9 | |
| 27 | 785,119 | 1,525,983 | 3,461,741 | 1.9 | |
| 28 | 241,214 | 431,495 | 881,437 | 1.8 | 133 |
| 29 | 227,326 | 419,407 | 906,656 | 1.8 | 133 |
| 30 | 258,136 | 435,592 | 867,799 | 1.7 | 132 |
| 31 | 194,980 | 330,811 | 683,995 | 1.7 | |
| 32 | 188,679 | 332,346 | 706,847 | 1.8 | |
| 33 | 181,036 | 314,940 | 649,154 | 1.7 | |
| 34 | 398,883 | 1,688,018 | 4,353,093 | 4.2 | 128 |
| 35 | 686,994 | 1,849,068 | 4,745,376 | 2.7 | 129 |
| 36 | 795,122 | 1,779,500 | 4,324,068 | 2.2 | 128 |
| 37 | 578,404 | 1,459,579 | 3,610,799 | 2.5 | 129 |
| 38 | 723,580 | 1,508,631 | 3,825,429 | 2.1 | 129 |

TABLE 1-continued

Ethylene polymerizations

| | | | | | |
|---|---|---|---|---|---|
| 39 | 898,548 | 1,597,999 | 3,918,676 | 1.8 | 129 |
| 40 | 232,750 | 403,003 | 1,064,533 | 1.7 | |
| 41 | 192,420 | 372,021 | 873,075 | 1.9 | |
| 42 | 209,254 | 380,174 | 884,629 | 1.8 | |
| 43 | 755,505 | 1,287,811 | 2,646,678 | 1.7 | |
| 44 | 736,928 | 1,442,786 | 3,681,511 | 2.0 | |
| 45 | 706,376 | 1,330,185 | 3,103,728 | 1.9 | |
| 46 | 180,810 | 337,273 | 669,758 | 1.9 | 137 |
| 47 | 185,039 | 337,950 | 659,538 | 1.8 | 137 |
| 48 | 195,198 | 346,400 | 666,159 | 1.8 | 137 |
| 49 | 61,619 | 100,137 | 203,992 | 1.6 | 136 |
| 50 | 69,128 | 104,651 | 200,220 | 1.5 | 136 |
| 51 | 60,298 | 100,735 | 214,652 | 1.7 | 136 |
| 52 | 74,372 | 113,507 | 214,257 | 1.5 | 136 |
| 53 | 72,775 | 111,201 | 215,998 | 1.5 | 136 |
| 54 | 70,405 | 112,236 | 225,100 | 1.6 | 136 |
| 55 | 155,630 | 261,775 | 463,162 | 1.7 | 138 |
| 56 | 152,529 | 254,231 | 445,894 | 1.7 | 138 |
| 57 | 153,352 | 257,506 | 444,811 | 1.7 | 137 |
| 58 | 440,463 | 720,611 | 1,296,627 | 1.6 | 134 |
| 59 | 332,535 | 686,705 | 1,370,931 | 2.1 | 133 |
| 60 | 412,435 | 709,777 | 1,340,257 | 1.7 | 134 |
| 61 | 1,062,199 | 2,318,102 | 4,987,805 | 2.2 | 134 |
| 62 | 2,099,850 | 3,124,630 | 5,150,972 | 1.5 | 135 |
| 63 | 1,064,835 | 2,246,776 | 4,688,318 | 2.1 | 135 |
| 64 | 191,430 | 347,774 | 736,708 | 1.8 | 135 |
| 65 | 175,904 | 330,521 | 748,185 | 1.9 | 134 |
| 66 | 213,549 | 356,034 | 784,577 | 1.7 | 134 |
| 67 | 356,395 | 827,139 | 3,348,111 | 2.3 | 135 |
| 68 | 352,136 | 582,674 | 1,157,705 | 1.7 | 135 |
| 69 | 342,453 | 562,926 | 1,107,568 | 1.6 | 136 |
| 70 | 130,779 | 209,205 | 374,870 | 1.6 | 137 |
| 71 | 128,023 | 210,315 | 384,186 | 1.6 | 137 |
| 72 | 137,004 | 206,144 | 360,049 | 1.5 | 137 |
| 73 | 424,576 | 738,862 | 1,501,676 | 1.7 | 135 |
| 74 | 384,811 | 716,872 | 1,520,234 | 1.9 | 136 |
| 75 | 362,746 | 683,326 | 1,499,750 | 1.9 | 135 |
| 76 | 482,351 | 1,630,381 | 5,817,836 | 3.4 | 135 |
| 77 | 403,487 | 1,139,043 | 4,215,676 | 2.8 | 135 |
| 78 | 363,411 | 1,043,056 | 3,990,190 | 2.9 | 135 |

Table 2 illustrates ethylene-octene copolymerization results obtained using Catalysts 1 through 21 and 23 through 27. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL, ethylene=75 psi.

TABLE 2

Ethylene-octene copolymerizations

| Run | Catalyst | Quench t (s) | Yield (g) | Activity (gP · mmolcat$^{-1}$ · h$^{-1}$) |
|---|---|---|---|---|
| 1 | 1 | 314 | 0.1376 | 63,103 |
| 2 | 1 | 414 | 0.1197 | 41,635 |
| 3 | 1 | 326 | 0.1374 | 60,692 |
| 4 | 2 | 443 | 0.0962 | 31,270 |
| 5 | 2 | 573 | 0.1069 | 26,865 |
| 6 | 2 | 612 | 0.1011 | 23,788 |
| 7 | 3 | 56 | 0.1368 | 351,771 |
| 8 | 3 | 50 | 0.1436 | 413,568 |
| 9 | 4 | 92 | 0.1285 | 201,130 |
| 10 | 4 | 67 | 0.1323 | 284,346 |
| 11 | 4 | 97 | 0.1331 | 197,592 |
| 12 | 5 | 368 | 0.135 | 52,826 |
| 13 | 5 | 349 | 0.1364 | 56,280 |
| 14 | 5 | 336 | 0.1287 | 55,157 |
| 15 | 6 | 60 | 0.1406 | 337,440 |
| 16 | 6 | 43 | 0.1331 | 445,730 |
| 17 | 6 | 58 | 0.1335 | 331,448 |
| 18 | 7 | 260 | 0.2198 | 121,923 |
| 19 | 7 | 294 | 0.1487 | 72,957 |
| 20 | 7 | 270 | 0.1482 | 79,040 |
| 21 | 8 | 377 | 0.1222 | 46,676 |
| 22 | 8 | 253 | 0.1194 | 67,959 |
| 23 | 8 | 379 | 0.1233 | 46,847 |
| 24 | 9 | 916 | 0.1276 | 20,068 |
| 25 | 9 | 410 | 0.1369 | 48,047 |
| 26 | 9 | 663 | 0.1363 | 29,626 |
| 27 | 10 | 41 | 0.1004 | 352,624 |
| 28 | 10 | 42 | 0.0935 | 320,571 |
| 29 | 10 | 39 | 0.0983 | 362,954 |
| 30 | 11 | 47 | 0.0905 | 276,102 |
| 31 | 11 | 47 | 0.086 | 263,489 |
| 32 | 11 | 47 | 0.0893 | 274,183 |
| 33 | 12 | 76 | 0.1286 | 243,663 |
| 34 | 12 | 75 | 0.1292 | 248,064 |
| 35 | 12 | 66 | 0.1212 | 264,436 |
| 36 | 13 | 35 | 0.1163 | 478,491 |
| 37 | 13 | 70 | 0.1184 | 243,566 |
| 38 | 13 | 47 | 0.1087 | 333,038 |
| 39 | 14 | 46 | 0.0963 | 298,862 |
| 40 | 14 | 42 | 0.0907 | 310,971 |
| 41 | 14 | 37 | 0.0884 | 346,856 |
| 42 | 15 | 313 | 0.1382 | 63,621 |
| 43 | 15 | 271 | 0.129 | 68,546 |
| 44 | 15 | 266 | 0.1409 | 76,305 |
| 45 | 16 | 45 | 0.0948 | 303,360 |
| 46 | 16 | 48 | 0.0957 | 287,100 |
| 47 | 16 | 45 | 0.096 | 307,200 |
| 48 | 17 | 320 | 0.034 | 15,300 |
| 49 | 17 | 293 | 0.0343 | 16,857 |
| 50 | 17 | 312 | 0.0352 | 16,246 |
| 51 | 18 | 139 | 0.0417 | 43,200 |
| 52 | 18 | 154 | 0.0397 | 37,122 |
| 53 | 18 | 143 | 0.0404 | 40,683 |
| 54 | 19 | 65 | 0.0844 | 186,978 |
| 55 | 19 | 63 | 0.088 | 201,143 |
| 56 | 19 | 65 | 0.0816 | 180,775 |
| 57 | 20 | 30 | 0.1497 | 718,560 |
| 58 | 20 | 29 | 0.1374 | 682,262 |
| 59 | 20 | 30 | 0.1489 | 714,720 |
| 60 | 21 | 266 | 0.1231 | 66,641 |
| 61 | 21 | 162 | 0.1195 | 106,222 |
| 62 | 21 | 149 | 0.117 | 113,074 |
| 63 | 23 | 44 | 0.0775 | 253,636 |
| 64 | 23 | 46 | 0.0802 | 251,061 |
| 65 | 23 | 41 | 0.0863 | 303,102 |
| 66 | 24 | 50 | 0.1387 | 399,456 |
| 67 | 24 | 30 | 0.1277 | 612,960 |
| 68 | 24 | 49 | 0.1372 | 403,200 |
| 69 | 25 | 55 | 0.0837 | 219,142 |
| 70 | 25 | 60 | 0.0806 | 193,440 |
| 71 | 25 | 51 | 0.0925 | 261,176 |
| 72 | 26 | 59 | 0.1443 | 352,190 |
| 73 | 26 | 78 | 0.1472 | 271,754 |
| 74 | 26 | 72 | 0.147 | 294,000 |
| 75 | 27 | 68 | 0.1534 | 324,847 |
| 76 | 27 | 64 | 0.1506 | 338,850 |
| 77 | 27 | 81 | 0.1522 | 270,578 |

| Run | Mn (g/mol) | Mw (g/mol) | Mz (g/mol) | PDI | Tm (° C.) |
|---|---|---|---|---|---|
| 1 | 161,997 | 955,709 | 4,739,567 | 5.9 | 95 |
| 2 | 205,441 | 1,069,949 | 5,083,639 | 5.2 | 93 |
| 3 | 178,156 | 929,140 | 4,525,214 | 5.2 | 93 |
| 4 | 147,955 | 629,288 | 1,822,682 | 4.3 | 103 |
| 5 | 121,245 | 566,125 | 1,875,004 | 4.7 | 102 |
| 6 | 124,292 | 571,111 | 1,986,338 | 4.6 | 102 |
| 7 | 115,700 | 1,432,761 | 5,128,072 | 12.4 | 115 |
| 8 | 84,323 | 1,216,026 | 5,071,317 | 14.4 | 102 |
| 9 | 18,223 | 660,036 | 3,393,646 | 36.2 | 113 |
| 10 | 30,989 | 511,916 | 2,150,128 | 16.5 | 107 |
| 11 | 31,702 | 537,738 | 2,526,986 | 17.0 | 108 |
| 12 | 196,740 | 978,942 | 3,929,325 | 5.0 | 91 |
| 13 | 193,210 | 837,801 | 3,792,106 | 4.3 | 96 |
| 14 | 167,519 | 831,730 | 3,751,209 | 5.0 | 97 |

TABLE 2-continued

Ethylene-octene copolymerizations

| | | | | |
|---|---|---|---|---|
| 15 | 58,389 | 1,079,209 | 4,418,742 | 18.5 | 87 |
| 16 | 64,061 | 1,269,277 | 4,293,191 | 19.8 | 106 |
| 17 | 96,352 | 1,414,065 | 4,829,213 | 14.7 | 111 |
| 18 | 175,559 | 1,277,761 | 4,760,522 | 7.3 | |
| 19 | 84,777 | 972,681 | 5,032,744 | 11.5 | |
| 20 | 139,691 | 972,787 | 3,817,190 | 7.0 | |
| 21 | 315,132 | 707,875 | 2,275,848 | 2.3 | 81 |
| 22 | 388,155 | 743,414 | 1,960,566 | 1.9 | 78 |
| 23 | 315,180 | 737,340 | 1,917,913 | 2.3 | 81 |
| 24 | 57,426 | 536,839 | 2,961,332 | 9.4 | |
| 25 | 43,670 | 485,287 | 2,632,049 | 11.1 | |
| 26 | 78,778 | 691,918 | 2,772,687 | 8.8 | |
| 27 | 110,419 | 203,140 | 476,397 | 1.8 | 101 |
| 28 | 118,053 | 228,700 | 586,178 | 1.9 | 101 |
| 29 | 107,700 | 220,261 | 666,863 | 2.1 | 102 |
| 30 | 148,492 | 244,848 | 455,165 | 1.7 | |
| 31 | 166,408 | 264,282 | 493,932 | 1.6 | |
| 32 | 135,576 | 240,526 | 465,563 | 1.8 | |
| 33 | 119,414 | 360,282 | 1,208,229 | 3.0 | 49 |
| 34 | 108,991 | 337,658 | 1,158,756 | 3.1 | 45 |
| 35 | 102,449 | 366,502 | 1,335,284 | 3.6 | 91 |
| 36 | 30,688 | 500,581 | 2,377,430 | 16.3 | 108 |
| 37 | 47,228 | 833,946 | 4,010,256 | 17.7 | 116 |
| 38 | 109,448 | 3,020,935 | 6,325,311 | 27.6 | 121 |
| 39 | 141,939 | 262,805 | 632,195 | 1.9 | |
| 40 | 143,467 | 262,538 | 591,870 | 1.8 | |
| 41 | 139,164 | 242,256 | 487,647 | 1.7 | |
| 42 | 39,853 | 452,196 | 2,239,364 | 11.4 | |
| 43 | 62,919 | 511,848 | 2,143,693 | 8.1 | |
| 44 | 62,472 | 567,233 | 2,755,101 | 9.1 | |
| 45 | 82,363 | 253,307 | 629,280 | 3.1 | 111 |
| 46 | 149,720 | 281,851 | 608,734 | 1.9 | 112 |
| 47 | 118,812 | 261,816 | 607,863 | 2.2 | 111 |
| 48 | 58,489 | 96,699 | 201,241 | 1.7 | 120 |
| 49 | 49,643 | 90,046 | 178,956 | 1.8 | 119 |
| 50 | 51,714 | 88,318 | 172,638 | 1.7 | 119 |
| 51 | 52,394 | 95,783 | 190,704 | 1.8 | 119 |
| 52 | 57,206 | 102,840 | 248,907 | 1.8 | 120 |
| 53 | 58,996 | 99,460 | 200,217 | 1.7 | 118 |
| 54 | 147,396 | 233,583 | 411,420 | 1.6 | 108 |
| 55 | 141,136 | 228,305 | 411,672 | 1.6 | 107 |
| 56 | 137,169 | 226,803 | 402,253 | 1.7 | 108 |
| 57 | 53,863 | 147,333 | 365,502 | 2.7 | 112 |
| 58 | 73,992 | 165,319 | 363,647 | 2.2 | 111 |
| 59 | 50,132 | 143,697 | 359,374 | 2.9 | 112 |
| 60 | 183,162 | 789,666 | 3,651,129 | 4.3 | 83 |
| 61 | 186,080 | 547,667 | 1,609,886 | 2.9 | 89 |
| 62 | 164,701 | 487,882 | 1,469,224 | 3.0 | 88 |
| 63 | 145,719 | 276,681 | 626,677 | 1.9 | 111 |
| 64 | 163,495 | 291,028 | 645,864 | 1.8 | 111 |
| 65 | 127,438 | 259,144 | 633,339 | 2.0 | 111 |
| 66 | 90,341 | 288,725 | 877,502 | 3.2 | 44 |
| 67 | 76,149 | 274,100 | 823,697 | 3.6 | 97 |
| 68 | 82,908 | 283,065 | 895,391 | 3.4 | 106 |
| 69 | 112,353 | 186,608 | 345,162 | 1.7 | 105 |
| 70 | 122,869 | 190,423 | 337,086 | 1.6 | 104 |
| 71 | 108,022 | 183,870 | 352,966 | 1.7 | 105 |
| 72 | 119,232 | 374,399 | 1,040,156 | 3.1 | 109 |
| 73 | 106,030 | 351,569 | 1,001,951 | 3.3 | 110 |
| 74 | 132,265 | 364,947 | 995,808 | 2.8 | 110 |
| 75 | 161,484 | 393,868 | 938,443 | 2.4 | 109 |
| 76 | 129,637 | 376,574 | 970,116 | 2.9 | 110 |
| 77 | 134,847 | 399,368 | 1,112,636 | 3.0 | 110 |

Table 3 illustrates ethylene-octene copolymerization results obtained using Catalysts 1 through 21 and 23 through 27. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL, ethylene=200 psi.

TABLE 3

Ethylene-octene copolymerizations

| Run | Catalyst | Quench t (s) | Yield (g) | Activity (gP · mmolcat$^{-1}$ · h$^{-1}$) |
|---|---|---|---|---|
| 1 | 1 | 63 | 0.2011 | 459,657 |
| 2 | 1 | 60 | 0.1906 | 457,440 |
| 3 | 1 | 57 | 0.1878 | 474,442 |
| 4 | 2 | 86 | 0.1672 | 279,963 |
| 5 | 2 | 92 | 0.1682 | 263,270 |
| 6 | 2 | 96 | 0.1761 | 264,150 |
| 7 | 3 | 11 | 0.1913 | 2,504,291 |
| 8 | 3 | 49 | 0.1835 | 539,265 |
| 9 | 3 | 8 | 0.1802 | 3,243,600 |
| 10 | 4 | 27 | 0.1824 | 972,800 |
| 11 | 4 | 32 | 0.1951 | 877,950 |
| 12 | 4 | 30 | 0.1995 | 957,600 |
| 13 | 5 | 12 | 0.1906 | 2,287,200 |
| 14 | 5 | 6 | 0.1767 | 4,240,800 |
| 15 | 5 | 20 | 0.2006 | 1,444,320 |
| 16 | 6 | 13 | 0.1896 | 2,100,185 |
| 17 | 6 | 10 | 0.2116 | 3,047,040 |
| 18 | 6 | 9 | 0.1964 | 3,142,400 |
| 19 | 7 | 30 | 0.1762 | 857,189 |
| 20 | 7 | 6 | 0.1848 | 4,292,129 |
| 21 | 7 | 34 | 0.1801 | 769,567 |
| 22 | 8 | 59 | 0.1854 | 452,502 |
| 23 | 8 | 40 | 0.1901 | 684,360 |
| 24 | 8 | 35 | 0.1859 | 764,846 |
| 25 | 9 | 66 | 0.2086 | 456,511 |
| 26 | 9 | 60 | 0.1993 | 475,940 |
| 27 | 9 | 59 | 0.1984 | 485,878 |
| 28 | 10 | 32 | 0.1749 | 787,050 |
| 29 | 10 | 27 | 0.17 | 906,667 |
| 30 | 10 | 30 | 0.1739 | 834,720 |
| 31 | 11 | 32 | 0.1542 | 696,075 |
| 32 | 11 | 37 | 0.1448 | 571,266 |
| 33 | 11 | 39 | 0.1618 | 592,855 |
| 34 | 12 | 107 | 0.1896 | 255,163 |
| 35 | 12 | 114 | 0.1882 | 237,726 |
| 36 | 12 | 89 | 0.1913 | 309,519 |
| 37 | 13 | 40 | 0.2127 | 765,720 |
| 38 | 13 | 24 | 0.2036 | 1,221,600 |
| 39 | 13 | 31 | 0.2021 | 938,787 |
| 40 | 14 | 48 | 0.1627 | 487,085 |
| 41 | 14 | 44 | 0.1646 | 543,633 |
| 42 | 14 | 44 | 0.1669 | 543,747 |
| 43 | 15 | 45 | 0.2018 | 644,328 |
| 44 | 15 | 47 | 0.1985 | 613,391 |
| 45 | 15 | 53 | 0.1897 | 516,386 |
| 46 | 16 | 45 | 0.1773 | 567,360 |
| 47 | 16 | 43 | 0.1767 | 591,740 |
| 48 | 16 | 41 | 0.1772 | 622,361 |
| 49 | 17 | 108 | 0.0323 | 43,067 |
| 50 | 17 | 108 | 0.0312 | 41,600 |
| 51 | 17 | 114 | 0.0332 | 41,937 |
| 52 | 18 | 61 | 0.0442 | 104,341 |
| 53 | 18 | 62 | 0.0432 | 100,335 |
| 54 | 18 | 59 | 0.0419 | 102,264 |
| 55 | 19 | 41 | 0.1449 | 508,917 |
| 56 | 19 | 38 | 0.1422 | 538,863 |
| 57 | 19 | 39 | 0.1364 | 503,631 |
| 58 | 20 | 18 | 0.2182 | 1,745,600 |
| 59 | 20 | 15 | 0.2093 | 2,009,280 |
| 60 | 20 | 15 | 0.211 | 2,025,600 |
| 61 | 21 | 64 | 0.1979 | 445,275 |
| 62 | 21 | 70 | 0.2044 | 420,480 |
| 63 | 21 | 72 | 0.2077 | 415,400 |
| 64 | 23 | 84 | 0.1614 | 276,686 |
| 65 | 23 | 50 | 0.1557 | 448,416 |
| 66 | 23 | 52 | 0.1529 | 423,415 |
| 67 | 24 | 25 | 0.2019 | 1,162,944 |
| 68 | 24 | 19 | 0.1909 | 1,446,821 |
| 69 | 24 | 18 | 0.1946 | 1,556,800 |
| 70 | 25 | 35 | 0.1376 | 566,126 |
| 71 | 25 | 32 | 0.1423 | 640,350 |
| 72 | 25 | 35 | 0.1512 | 622,080 |
| 73 | 26 | 45 | 0.2215 | 708,800 |
| 74 | 26 | 43 | 0.2162 | 724,019 |
| 75 | 27 | 23 | 0.2078 | 1,301,009 |

TABLE 3-continued

Ethylene-octene copolymerizations

| 76 | 27 | 21 | 0.2131 | 1,461,257 |
| 77 | 27 | 17 | 0.2106 | 1,783,906 |

| Run | Mn (g/mol) | Mw (g/mol) | Mz (g/mol) | PDI | Tm (° C.) |
|---|---|---|---|---|---|
| 1 | 85,401 | 1,485,453 | 6,355,326 | 17.4 | 101 |
| 2 | 180,860 | 1,668,124 | 5,601,126 | 9.2 | 104 |
| 3 | 236,581 | 1,637,737 | 5,656,677 | 6.9 | 102 |
| 4 | 341,563 | 936,687 | 2,901,398 | 2.7 | 114 |
| 5 | 376,309 | 941,200 | 2,592,050 | 2.5 | 114 |
| 6 | 469,738 | 1,075,532 | 2,943,419 | 2.3 | 115 |
| 7 | 360,049 | 1,593,060 | 4,658,669 | 4.4 | 107 |
| 8 | 181,413 | 1,818,545 | 5,258,186 | 10.0 | 104 |
| 9 | 530,776 | 1,946,618 | 5,423,261 | 3.7 | 112 |
| 10 | 140,030 | 910,929 | 3,364,397 | 6.5 | 117 |
| 11 | 44,006 | 580,387 | 2,290,085 | 13.2 | 116 |
| 12 | 110,628 | 856,406 | 2,725,790 | 7.7 | 118 |
| 13 | 185,667 | 1,465,572 | 6,887,083 | 7.9 | 105 |
| 14 | 203,556 | 1,383,705 | 4,746,359 | 6.8 | 103 |
| 15 | 369,885 | 1,706,602 | 4,840,739 | 4.6 | 100 |
| 16 | 173,492 | 1,697,638 | 4,780,399 | 9.8 | 118 |
| 17 | 274,177 | 1,595,198 | 5,114,168 | 5.8 | 116 |
| 18 | 277,610 | 1,879,652 | 6,137,205 | 6.8 | 109 |
| 19 | 500,623 | 1,766,457 | 4,640,325 | 3.5 | |
| 20 | 308,085 | 1,388,633 | 4,176,051 | 4.5 | |
| 21 | 292,254 | 1,485,896 | 4,349,242 | 5.1 | |
| 22 | 362,076 | 1,153,603 | 4,114,232 | 3.2 | 96 |
| 23 | 436,756 | 1,347,977 | 4,017,596 | 3.1 | 92 |
| 24 | 354,747 | 1,247,681 | 4,148,314 | 3.5 | 92 |
| 25 | 79,236 | 809,610 | 2,829,093 | 10.2 | |
| 26 | 40,170 | 750,673 | 2,900,422 | 18.7 | |
| 27 | 84,743 | 840,000 | 3,213,682 | 9.9 | |
| 28 | 132,102 | 251,512 | 578,430 | 1.9 | 116 |
| 29 | 134,605 | 245,986 | 546,940 | 1.8 | 117 |
| 30 | 124,229 | 237,800 | 524,744 | 1.9 | 116 |
| 31 | 151,380 | 283,526 | 670,080 | 1.9 | |
| 32 | 176,380 | 307,742 | 844,612 | 1.7 | |
| 33 | 149,502 | 280,963 | 658,141 | 1.9 | |
| 34 | 172,197 | 725,395 | 2,365,079 | 4.2 | 106 |
| 35 | 172,704 | 734,109 | 2,282,891 | 4.3 | 105 |
| 36 | 135,436 | 720,066 | 2,086,851 | 5.3 | 105 |
| 37 | 107,278 | 599,466 | 1,669,191 | 5.6 | 109 |
| 38 | 28,277 | 532,284 | 2,645,799 | 18.8 | 109 |
| 39 | 79,681 | 881,521 | 4,158,764 | 11.1 | 119 |
| 40 | 151,723 | 303,322 | 837,091 | 2.0 | |
| 41 | 148,038 | 276,539 | 580,589 | 1.9 | |
| 42 | 147,112 | 279,459 | 637,111 | 1.9 | |
| 43 | 49,484 | 707,025 | 2,599,229 | 14.3 | |
| 44 | 125,921 | 849,967 | 2,507,527 | 6.8 | |
| 45 | 59,297 | 695,247 | 2,869,724 | 11.7 | |
| 46 | 145,865 | 274,830 | 569,106 | 1.9 | 121 |
| 47 | 139,228 | 274,426 | 603,713 | 2.0 | 121 |
| 48 | 122,654 | 274,081 | 608,076 | 2.2 | 121 |
| 49 | 61,528 | 104,630 | 228,160 | 1.7 | 127 |
| 50 | 58,343 | 97,568 | 175,894 | 1.7 | 127 |
| 51 | 62,128 | 100,718 | 195,510 | 1.6 | 127 |
| 52 | 59,950 | 107,817 | 219,574 | 1.8 | 127 |
| 53 | 69,862 | 106,218 | 192,777 | 1.5 | 127 |
| 54 | 69,428 | 109,841 | 208,302 | 1.6 | 127 |
| 55 | 138,388 | 225,477 | 404,513 | 1.6 | 120 |
| 56 | 135,674 | 223,304 | 403,911 | 1.7 | 120 |
| 57 | 136,672 | 218,721 | 381,057 | 1.6 | 120 |
| 58 | 112,359 | 195,655 | 371,424 | 1.7 | 121 |
| 59 | 74,247 | 173,444 | 363,325 | 2.3 | 121 |
| 60 | 81,740 | 173,984 | 363,936 | 2.1 | 121 |
| 61 | 187,594 | 845,744 | 3,309,842 | 4.5 | 103 |
| 62 | 151,568 | 654,377 | 2,310,686 | 4.3 | 102 |
| 63 | 116,325 | 658,679 | 2,367,821 | 5.7 | 102 |
| 64 | 166,164 | 328,692 | 777,508 | 2.0 | 120 |
| 65 | 174,412 | 313,826 | 662,335 | 1.8 | 120 |
| 66 | 159,468 | 303,314 | 630,772 | 1.9 | 120 |
| 67 | 121,920 | 282,922 | 681,440 | 2.3 | 98 |
| 68 | 114,740 | 289,844 | 748,004 | 2.5 | 101 |
| 69 | 109,413 | 274,702 | 683,229 | 2.5 | 104 |
| 70 | 106,097 | 180,804 | 347,692 | 1.7 | 118 |
| 71 | 110,549 | 174,930 | 314,673 | 1.6 | 117 |
| 72 | 107,376 | 172,039 | 312,699 | 1.6 | 118 |
| 73 | 80,368 | 378,371 | 924,364 | 4.7 | 118 |
| 74 | 43,979 | 344,982 | 1,043,893 | 7.8 | 119 |
| 75 | 254,753 | 437,223 | 943,982 | 1.7 | 119 |
| 76 | 238,741 | 444,457 | 1,030,413 | 1.9 | 120 |
| 77 | 208,367 | 409,932 | 900,141 | 2.0 | 119 |

Table 4 illustrates propylene polymerization results obtained for Catalysts 1 through 28. General conditions: catalyst complex=15 nmol (exceptions are 25 nmol for catalyst 26; 20 nmol for catalyst 22 and 28), N,N-dimethylanilinium tetrakis(pentafluorophenyl)borate activator=1.1 molar equivalent relative to catalyst complex, propylene=1 mL, Al(n-octyl)$_3$=500 nmol, total volume=5 mL.

TABLE 4

Propylene polymerizations

| Run | Catalyst | Temperature (° C.) | Quench t (s) | Yield (g) | Activity (gP · mmolcat$^{-1}$ · h$^{-1}$) |
|---|---|---|---|---|---|
| 1 | 1 | 70 | 73 | 0.4563 | 1,500,164 |
| 2 | 1 | 70 | 107 | 0.4111 | 922,093 |
| 3 | 1 | 70 | 85 | 0.3556 | 1,004,047 |
| 4 | 2 | 70 | 80 | 0.3253 | 975,900 |
| 5 | 2 | 70 | 75 | 0.3729 | 1,193,280 |
| 6 | 2 | 70 | 75 | 0.3297 | 1,055,040 |
| 7 | 3 | 70 | 15 | 0.3543 | 5,668,800 |
| 8 | 3 | 70 | 13 | 0.4127 | 7,619,077 |
| 9 | 3 | 70 | 14 | 0.4037 | 6,920,571 |
| 10 | 4 | 70 | 23 | 0.3712 | 3,873,391 |
| 11 | 4 | 70 | 24 | 0.4204 | 4,204,000 |
| 12 | 4 | 70 | 29 | 0.3914 | 3,239,172 |
| 13 | 5 | 70 | 59 | 0.3295 | 1,340,339 |
| 14 | 5 | 70 | 70 | 0.3701 | 1,268,914 |
| 15 | 5 | 70 | 58 | 0.3412 | 1,411,862 |
| 16 | 6 | 70 | 7 | 0.3795 | 13,011,429 |
| 17 | 6 | 70 | 11 | 0.4079 | 8,899,636 |
| 18 | 6 | 70 | 21 | 0.395 | 4,514,286 |
| 19 | 7 | 70 | 65 | 0.3707 | 1,368,738 |
| 20 | 7 | 70 | 58 | 0.3728 | 1,542,621 |
| 21 | 7 | 70 | 55 | 0.375 | 1,636,364 |
| 22 | 8 | 70 | 117 | 0.1833 | 376,000 |

TABLE 4-continued

| | | Propylene polymerizations | | | |
|---|---|---|---|---|---|
| 23 | 8 | 70 | 69 | 0.1396 | 485,565 |
| 24 | 8 | 70 | 132 | 0.2025 | 368,182 |
| 25 | 9 | 70 | 50 | 0.3469 | 1,665,120 |
| 26 | 9 | 70 | 51 | 0.3773 | 1,775,529 |
| 27 | 9 | 70 | 60 | 0.4035 | 1,614,000 |
| 28 | 10 | 70 | 59 | 0.2298 | 934,780 |
| 29 | 10 | 70 | 56 | 0.2461 | 1,054,714 |
| 30 | 12 | 70 | 38 | 0.2896 | 1,829,053 |
| 31 | 12 | 70 | 41 | 0.3211 | 1,879,610 |
| 32 | 12 | 70 | 44 | 0.2789 | 1,521,273 |
| 33 | 13 | 70 | 16 | 0.3878 | 5,817,000 |
| 34 | 13 | 70 | 17 | 0.4334 | 6,118,588 |
| 35 | 13 | 70 | 20 | 0.4131 | 4,957,200 |
| 36 | 14 | 70 | 129 | 0.1889 | 351,442 |
| 37 | 14 | 70 | 127 | 0.2059 | 389,102 |
| 38 | 14 | 70 | 129 | 0.1976 | 367,628 |
| 39 | 15 | 70 | 74 | 0.3575 | 1,159,459 |
| 40 | 15 | 70 | 77 | 0.386 | 1,203,117 |
| 41 | 15 | 70 | 77 | 0.3735 | 1,164,156 |
| 42 | 16 | 70 | 168 | 0.1514 | 216,286 |
| 43 | 16 | 70 | 166 | 0.162 | 234,217 |
| 44 | 16 | 70 | 174 | 0.1427 | 196,828 |
| 45 | 17 | 70 | 1800 | 0.0075 | 1,000 |
| 46 | 17 | 70 | 1802 | 0.0078 | 1,039 |
| 47 | 17 | 70 | 1801 | 0.0056 | 746 |
| 48 | 18 | 70 | 1800 | 0.0277 | 3,693 |
| 49 | 18 | 70 | 1801 | 0.0289 | 3,851 |
| 50 | 18 | 70 | 1800 | 0.0194 | 2,587 |
| 51 | 19 | 70 | 197 | 0.1291 | 157,279 |
| 52 | 19 | 70 | 213 | 0.1351 | 152,225 |
| 53 | 19 | 70 | 219 | 0.1268 | 138,959 |
| 54 | 20 | 70 | 51 | 0.2961 | 1,393,412 |
| 55 | 20 | 70 | 57 | 0.3251 | 1,368,842 |
| 56 | 20 | 70 | 59 | 0.2944 | 1,197,559 |
| 57 | 21 | 70 | 103 | 0.2777 | 647,068 |
| 58 | 21 | 70 | 89 | 0.2498 | 673,618 |
| 59 | 21 | 70 | 123 | 0.2502 | 488,195 |
| 60 | 22 | 70 | 12 | 0.4126 | 6,087,541 |
| 61 | 22 | 70 | 12 | 0.4715 | 7,380,000 |
| 62 | 22 | 70 | 4 | 0.3113 | 15,144,324 |
| 63 | 23 | 70 | 131 | 0.155 | 283,969 |
| 64 | 23 | 70 | 104 | 0.1861 | 429,462 |
| 65 | 23 | 70 | 112 | 0.1871 | 400,929 |
| 66 | 24 | 70 | 54 | 0.2594 | 1,152,889 |
| 67 | 24 | 70 | 40 | 0.3031 | 1,818,600 |
| 68 | 24 | 70 | 68 | 0.2214 | 781,412 |
| 69 | 25 | 70 | 1800 | 0.0526 | 7,013 |
| 70 | 25 | 70 | 1803 | 0.0582 | 7,747 |
| 71 | 25 | 70 | 1801 | 0.0495 | 6,596 |
| 72 | 26 | 70 | 24 | 0.3654 | 2,192,400 |
| 73 | 26 | 70 | 23 | 0.3858 | 2,415,443 |
| 74 | 26 | 70 | 22 | 0.3841 | 2,514,109 |
| 75 | 27 | 70 | 23 | 0.6217 | 6,487,304 |
| 76 | 27 | 70 | 17 | 0.4999 | 7,057,412 |
| 77 | 27 | 70 | 22 | 0.6582 | 7,180,364 |
| 78 | 28 | 70 | 1201 | −0.0003 | −45 |
| 79 | 28 | 70 | 1201 | −0.0008 | −120 |
| 80 | 28 | 70 | 1201 | −0.0013 | −210 |

| run # | Mn (g/mol) | Mw (g/mol) | Mz (g/mol) | PDI | Tm (° C.) |
|---|---|---|---|---|---|
| 1 | 114,466 | 489,547 | 1,650,145 | 4.3 | 159 |
| 2 | 24,847 | 442,963 | 1,925,442 | 17.8 | 159 |
| 3 | 140,909 | 430,206 | 1,428,541 | 3.1 | 159 |
| 4 | 165,597 | 334,380 | 903,938 | 2.0 | 161 |
| 5 | 125,777 | 334,087 | 1,073,656 | 2.7 | 161 |
| 6 | 114,722 | 316,540 | 1,030,692 | 2.8 | 160 |
| 7 | 57,753 | 372,797 | 1,464,190 | 6.5 | 148 |
| 8 | 64,376 | 502,821 | 2,141,863 | 7.8 | 147 |
| 9 | 67,290 | 428,075 | 1,753,319 | 6.4 | 148 |
| 10 | 17,744 | 126,712 | 777,632 | 7.1 | 150 |
| 11 | 27,138 | 162,274 | 909,810 | 6.0 | 151 |
| 12 | 18,561 | 174,783 | 1,116,895 | 9.4 | 151 |
| 13 | 155,932 | 393,075 | 1,312,570 | 2.5 | 159 |
| 14 | 115,043 | 360,466 | 1,191,971 | 3.1 | 158 |
| 15 | 145,110 | 381,122 | 1,231,459 | 2.6 | 158 |
| 16 | 118,914 | 474,918 | 1,790,054 | 4.0 | 149 |

TABLE 4-continued

| | Propylene polymerizations | | | | |
|---|---|---|---|---|---|
| 17 | 158,183 | 461,138 | 1,272,034 | 2.9 | 148 |
| 18 | 103,834 | 456,352 | 1,650,050 | 4.4 | 148 |
| 19 | 96,491 | 420,800 | 2,185,151 | 4.4 | 160 |
| 20 | 104,115 | 408,527 | 2,023,472 | 3.9 | 159 |
| 21 | 73,631 | 416,915 | 2,300,681 | 5.7 | 159 |
| 22 | 219,456 | 388,248 | 912,947 | 1.8 | 153 |
| 23 | 221,954 | 414,051 | 948,937 | 1.9 | 153 |
| 24 | 217,410 | 410,493 | 969,131 | 1.9 | 153 |
| 25 | 124,917 | 330,194 | 1,050,495 | 2.6 | 160 |
| 26 | 117,874 | 310,304 | 915,337 | 2.6 | 160 |
| 27 | 96,278 | 345,774 | 1,434,803 | 3.6 | 159 |
| 28 | 84,383 | 132,546 | 247,855 | 1.6 | 160 |
| 29 | 71,943 | 126,703 | 289,153 | 1.8 | 160 |
| 30 | 139,309 | 282,465 | 778,339 | 2.0 | 158 |
| 31 | 115,357 | 249,864 | 664,624 | 2.2 | 158 |
| 32 | 146,270 | 290,344 | 703,139 | 2.0 | 159 |
| 33 | 49,236 | 161,383 | 648,392 | 3.3 | 146 |
| 34 | 40,362 | 150,799 | 619,430 | 3.7 | 145 |
| 35 | 45,927 | 159,308 | 617,869 | 3.5 | 146 |
| 36 | 167,562 | 276,114 | 554,940 | 1.7 | 161 |
| 37 | 180,217 | 294,473 | 612,269 | 1.6 | 161 |
| 38 | 135,871 | 278,711 | 597,323 | 2.1 | 162 |
| 39 | 119,886 | 290,039 | 942,218 | 2.4 | 162 |
| 40 | 107,158 | 320,828 | 1,122,488 | 3.0 | 162 |
| 41 | 110,748 | 310,245 | 984,005 | 2.8 | 161 |
| 42 | 211,948 | 353,711 | 695,938 | 1.7 | 162 |
| 43 | 220,371 | 363,530 | 706,255 | 1.7 | 162 |
| 44 | 232,443 | 383,689 | 752,363 | 1.7 | 161 |
| 45 | | | | | |
| 46 | | | | | |
| 47 | | | | | |
| 48 | 89,484 | 141,777 | 275,634 | 1.6 | 161 |
| 49 | 94,741 | 157,074 | 318,366 | 1.7 | 162 |
| 50 | 104,985 | 168,698 | 355,199 | 1.6 | 160 |
| 51 | 389,178 | 534,771 | 895,536 | 1.4 | 165 |
| 52 | 366,407 | 556,215 | 1,064,994 | 1.5 | 164 |
| 53 | 313,864 | 504,232 | 930,019 | 1.6 | 164 |
| 54 | 91,504 | 180,050 | 482,488 | 2.0 | 157 |
| 55 | 106,054 | 191,739 | 441,346 | 1.8 | 156 |
| 56 | 111,683 | 224,774 | 579,509 | 2.0 | 156 |
| 57 | 265,095 | 467,578 | 1,005,189 | 1.8 | 160 |
| 58 | 290,087 | 522,788 | 1,256,300 | 1.8 | 161 |
| 59 | 254,920 | 520,019 | 1,153,915 | 2.0 | 160 |
| 60 | 113,845 | 442,847 | 1,318,498 | 3.9 | 148 |
| 61 | 114,737 | 472,426 | 1,495,833 | 4.1 | 148 |
| 62 | 148,262 | 556,887 | 1,788,572 | 3.8 | 149 |
| 63 | 236,065 | 379,539 | 787,141 | 1.6 | 163 |
| 64 | 241,281 | 369,976 | 707,824 | 1.5 | 163 |
| 65 | 213,875 | 345,238 | 656,339 | 1.6 | 162 |
| 66 | 122,299 | 265,834 | 638,521 | 2.2 | 156 |
| 67 | 143,976 | 283,789 | 696,323 | 2.0 | 154 |
| 68 | 225,712 | 382,889 | 790,054 | 1.7 | 155 |
| 69 | 359,476 | 628,998 | 1,229,198 | 1.8 | 165 |
| 70 | 481,757 | 696,025 | 1,266,140 | 1.4 | 165 |
| 71 | 473,707 | 664,232 | 1,140,439 | 1.4 | 167 |
| 72 | 47,408 | 90,386 | 201,296 | 1.9 | 151 |
| 73 | 45,291 | 92,784 | 221,513 | 2.1 | 151 |
| 74 | 50,123 | 92,438 | 210,009 | 1.8 | 151 |
| 75 | 57,344 | 91,990 | 166,659 | 1.6 | 144 |
| 76 | 49,320 | 80,825 | 156,835 | 1.6 | 141 |
| 77 | 41,329 | 86,747 | 176,312 | 2.1 | 143 |

Table 5 illustrates propylene polymerization results obtained for Catalysts 1 through 28. General conditions: catalyst complex=15 nmol (exceptions are 25 nmol for catalyst 26; exceptions are 20 nmol for catalyst 22 and 28), N,N-dimethylanilinium tetrakis(pentafluorophenyl)borate activator=1.1 molar equivalent relative to catalyst complex, propylene=1 mL, Al(n-octyl)$_3$=500 nmol, total volume=5 mL.

TABLE 5

Propylene polymerizations

| Run | Catalyst | Temperature (° C.) | Quench t (s) | Yield (g) | Activity (gP · mmolcat$^{-1}$ · h$^{-1}$) |
|---|---|---|---|---|---|
| 1 | 1 | 100 | 46 | 0.2208 | 1,152,000 |
| 2 | 1 | 100 | 55 | 0.2204 | 961,745 |
| 3 | 1 | 100 | 44 | 0.2229 | 1,215,818 |
| 4 | 2 | 100 | 54 | 0.2062 | 916,444 |
| 5 | 2 | 100 | 59 | 0.2047 | 832,678 |
| 6 | 2 | 100 | 62 | 0.1908 | 738,581 |
| 7 | 3 | 100 | 16 | 0.2621 | 3,931,500 |
| 8 | 3 | 100 | 17 | 0.3151 | 4,448,471 |
| 9 | 3 | 100 | 20 | 0.2204 | 2,644,800 |
| 10 | 4 | 100 | 16 | 0.2991 | 4,486,500 |
| 11 | 4 | 100 | 25 | 0.2921 | 2,804,160 |
| 12 | 4 | 100 | 23 | 0.2986 | 3,115,826 |
| 13 | 5 | 100 | 33 | 0.2318 | 1,685,818 |
| 14 | 5 | 100 | 36 | 0.2135 | 1,423,333 |
| 15 | 5 | 100 | 32 | 0.2554 | 1,915,500 |
| 16 | 6 | 100 | 13 | 0.1692 | 3,123,692 |
| 17 | 6 | 100 | 19 | 0.3026 | 3,822,316 |
| 18 | 6 | 100 | 21 | 0.2996 | 3,424,000 |
| 19 | 7 | 100 | 34 | 0.2756 | 1,945,412 |
| 20 | 7 | 100 | 31 | 0.2734 | 2,116,645 |
| 21 | 7 | 100 | 29 | 0.2755 | 2,280,000 |
| 22 | 8 | 100 | 155 | 0.1025 | 158,710 |
| 23 | 8 | 100 | 102 | 0.1334 | 313,882 |
| 24 | 8 | 100 | 80 | 0.1523 | 456,900 |
| 25 | 9 | 100 | 31 | 0.1557 | 1,205,419 |
| 26 | 9 | 100 | 55 | 0.2251 | 982,255 |
| 27 | 9 | 100 | 40 | 0.2391 | 1,434,600 |
| 28 | 10 | 100 | 56 | 0.1086 | 465,429 |
| 29 | 10 | 100 | 80 | 0.1018 | 305,400 |
| 30 | 10 | 100 | 60 | 0.1099 | 439,600 |
| 31 | 12 | 100 | 38 | 0.1515 | 956,842 |
| 32 | 12 | 100 | 44 | 0.1443 | 787,091 |
| 33 | 12 | 100 | 37 | 0.1451 | 941,189 |
| 34 | 13 | 100 | 19 | 0.2893 | 3,654,316 |
| 35 | 13 | 100 | 17 | 0.2765 | 3,903,529 |
| 36 | 13 | 100 | 20 | 0.2807 | 3,368,400 |
| 37 | 14 | 100 | 116 | 0.1415 | 292,759 |
| 38 | 14 | 100 | 114 | 0.1465 | 308,421 |
| 39 | 14 | 100 | 113 | 0.1296 | 275,257 |
| 40 | 15 | 100 | 45 | 0.2523 | 1,345,600 |
| 41 | 15 | 100 | 43 | 0.2332 | 1,301,581 |
| 42 | 15 | 100 | 56 | 0.2208 | 946,286 |
| 43 | 16 | 100 | 226 | 0.0744 | 79,009 |
| 44 | 16 | 100 | 1801 | 0.037 | 4,931 |
| 45 | 16 | 100 | 1801 | 0.0147 | 1,959 |
| 46 | 17 | 100 | 1800 | 0.0002 | 27 |
| 47 | 17 | 100 | 1801 | −0.0006 | −80 |
| 48 | 17 | 100 | 1801 | 0.001 | 133 |
| 49 | 18 | 100 | 1801 | 0.0002 | 27 |
| 50 | 18 | 100 | 1800 | −0.0006 | −80 |
| 51 | 18 | 100 | 1801 | −0.0006 | −80 |
| 52 | 19 | 100 | 1800 | 0.0598 | 7,973 |
| 53 | 19 | 100 | 1354 | 0.0603 | 10,688 |
| 54 | 19 | 100 | 1800 | 0.0579 | 7,720 |
| 55 | 20 | 100 | 45 | 0.2041 | 1,088,533 |
| 56 | 20 | 100 | 49 | 0.2147 | 1,051,592 |
| 57 | 20 | 100 | 76 | 0.1811 | 571,895 |
| 58 | 21 | 100 | 75 | 0.1306 | 417,920 |
| 59 | 21 | 100 | 77 | 0.1493 | 465,351 |
| 60 | 21 | 100 | 63 | 0.1537 | 585,524 |
| 61 | 22 | 100 | 17 | 0.3162 | 3,328,421 |
| 62 | 22 | 100 | 18 | 0.3054 | 3,020,440 |
| 63 | 22 | 100 | 11 | 0.2004 | 3,192,212 |
| 64 | 23 | 100 | 148 | 0.0833 | 135,081 |
| 65 | 23 | 100 | 1801 | 0.0566 | 7,542 |
| 66 | 23 | 100 | 1105 | 0.0769 | 16,702 |
| 67 | 24 | 100 | 1801 | 0.0287 | 3,825 |
| 68 | 24 | 100 | 1801 | 0.0693 | 9,235 |
| 69 | 25 | 100 | 1801 | 0.0181 | 2,412 |

TABLE 5-continued

Propylene polymerizations

| | | | | | |
|---|---|---|---|---|---|
| 70 | 25 | 100 | 1801 | 0.0171 | 2,279 |
| 71 | 25 | 100 | 1801 | 0.0165 | 2,199 |
| 72 | 26 | 100 | 24 | 0.2007 | 1,204,200 |
| 73 | 26 | 100 | 26 | 0.1983 | 1,098,277 |
| 74 | 26 | 100 | 20 | 0.215 | 1,548,000 |
| 75 | 27 | 100 | 31 | 0.3777 | 2,924,129 |
| 76 | 27 | 100 | 23 | 0.3991 | 4,164,522 |
| 77 | 27 | 100 | 30 | 0.4022 | 3,217,600 |
| 78 | 28 | 100 | 1201 | −0.0001 | −15 |
| 79 | 28 | 100 | 1201 | −0.0003 | −45 |
| 80 | 28 | 100 | 1201 | −0.0012 | −180 |

| run # | Mn (g/mol) | Mw (g/mol) | Mz (g/mol) | PDI | Tm (° C.) |
|---|---|---|---|---|---|
| 1 | 80,499 | 164,360 | 471,700 | 2.0 | 158 |
| 2 | 75,757 | 153,238 | 419,844 | 2.0 | 158 |
| 3 | 75,647 | 169,707 | 606,761 | 2.2 | 158 |
| 4 | 62,140 | 120,721 | 248,648 | 1.9 | 161 |
| 5 | 61,125 | 122,674 | 253,423 | 2.0 | 161 |
| 6 | 68,611 | 129,273 | 256,101 | 1.9 | 160 |
| 7 | 28,762 | 152,087 | 646,646 | 5.3 | 146 |
| 8 | 34,553 | 155,815 | 665,846 | 4.5 | 146 |
| 9 | 48,560 | 169,007 | 624,200 | 3.5 | 147 |
| 10 | 12,695 | 47,275 | 167,729 | 3.7 | 147 |
| 11 | 15,617 | 49,959 | 158,779 | 3.2 | 149 |
| 12 | 14,340 | 52,166 | 182,311 | 3.6 | 149 |
| 13 | 65,743 | 137,626 | 413,504 | 2.1 | 158 |
| 14 | 61,349 | 119,262 | 288,955 | 1.9 | 158 |
| 15 | 53,455 | 132,919 | 459,818 | 2.5 | 157 |
| 16 | 78,532 | 191,558 | 622,897 | 2.4 | 149 |
| 17 | 47,864 | 176,148 | 650,186 | 3.7 | 147 |
| 18 | 59,868 | 185,038 | 608,943 | 3.1 | 148 |
| 19 | 30,104 | 91,877 | 246,715 | 3.1 | 158 |
| 20 | 41,093 | 102,267 | 254,470 | 2.5 | 157 |
| 21 | 33,147 | 109,233 | 357,333 | 3.3 | 158 |
| 22 | 92,421 | 157,438 | 357,993 | 1.7 | 153 |
| 23 | 89,843 | 150,781 | 334,179 | 1.7 | 153 |
| 24 | 76,265 | 141,310 | 337,323 | 1.9 | 153 |
| 25 | 74,814 | 150,248 | 399,543 | 2.0 | 160 |
| 26 | 64,509 | 147,679 | 437,771 | 2.3 | 159 |
| 27 | 58,972 | 139,520 | 443,404 | 2.4 | 160 |
| 28 | 50,500 | 82,800 | 146,533 | 1.6 | 157 |
| 29 | 51,447 | 85,250 | 150,973 | 1.7 | 157 |
| 30 | 49,474 | 81,942 | 144,672 | 1.7 | 157 |
| 31 | 58,429 | 144,936 | 423,058 | 2.5 | 157 |
| 32 | 89,441 | 166,845 | 523,735 | 1.9 | 158 |
| 33 | 90,435 | 152,608 | 349,816 | 1.7 | 157 |
| 34 | 34,679 | 77,908 | 205,082 | 2.3 | 144 |
| 35 | 31,341 | 70,550 | 160,080 | 2.3 | 144 |
| 36 | 35,649 | 82,850 | 252,359 | 2.3 | 144 |
| 37 | 76,166 | 132,161 | 241,002 | 1.7 | 160 |
| 38 | 76,807 | 129,124 | 232,401 | 1.7 | 161 |
| 39 | 94,439 | 144,461 | 254,721 | 1.5 | 160 |
| 40 | 48,008 | 115,829 | 402,984 | 2.4 | 161 |
| 41 | 59,080 | 111,122 | 235,729 | 1.9 | 161 |
| 42 | 62,463 | 118,588 | 253,690 | 1.9 | 161 |
| 43 | 100,327 | 170,565 | 343,646 | 1.7 | 161 |
| 44 | 112,191 | 186,280 | 378,163 | 1.7 | 163 |
| 45 | 113,776 | 188,756 | 372,742 | 1.7 | 161 |
| 46 | | | | | |
| 47 | | | | | |
| 48 | | | | | |
| 49 | | | | | |
| 50 | | | | | |
| 51 | | | | | |
| 52 | 134,805 | 220,588 | 404,685 | 1.6 | 161 |
| 53 | 154,903 | 254,230 | 538,930 | 1.6 | 160 |
| 54 | 173,584 | 279,481 | 550,649 | 1.6 | 162 |
| 55 | 36,396 | 69,386 | 173,368 | 1.9 | 153 |
| 56 | 38,212 | 64,507 | 151,954 | 1.7 | 154 |
| 57 | 46,262 | 85,694 | 200,460 | 1.9 | 154 |
| 58 | 129,205 | 229,975 | 512,124 | 1.8 | 159 |
| 59 | 116,895 | 213,507 | 455,527 | 1.8 | 160 |
| 60 | 143,333 | 252,722 | 564,805 | 1.8 | 159 |
| 61 | 71,571 | 175,419 | 480,970 | 2.5 | 147 |
| 62 | 38,849 | 156,529 | 535,448 | 4.0 | 147 |
| 63 | 43,774 | 156,966 | 525,748 | 3.6 | 147 |

TABLE 5-continued

| | | Propylene polymerizations | | | |
|---|---|---|---|---|---|
| 64 | 74,952 | 145,111 | 280,595 | 1.9 | 161 |
| 65 | 90,558 | 160,712 | 432,645 | 1.8 | 161 |
| 66 | 101,096 | 165,958 | 324,701 | 1.6 | 161 |
| 67 | 57,058 | 162,395 | 391,985 | 2.9 | 152 |
| 68 | 109,183 | 183,055 | 379,218 | 1.7 | 154 |
| 69 | 220,076 | 331,240 | 609,515 | 1.5 | 163 |
| 70 | 190,283 | 316,542 | 631,651 | 1.7 | 164 |
| 71 | 181,601 | 303,158 | 627,729 | 1.7 | 162 |
| 72 | 35,206 | 64,314 | 127,614 | 1.8 | 149 |
| 73 | 36,868 | 67,959 | 152,188 | 1.8 | 149 |
| 74 | 41,257 | 72,399 | 159,327 | 1.8 | 149 |
| 75 | 34,608 | 69,709 | 144,535 | 2.0 | 139 |
| 76 | 35,351 | 70,752 | 154,141 | 2.0 | 138 |
| 77 | 22,700 | 66,289 | 146,317 | 2.9 | 138 |
| 78 | | | | | |
| 79 | | | | | |
| 80 | | | | | |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

What is claimed is:

1. A catalyst compound represented by the Formula (I):

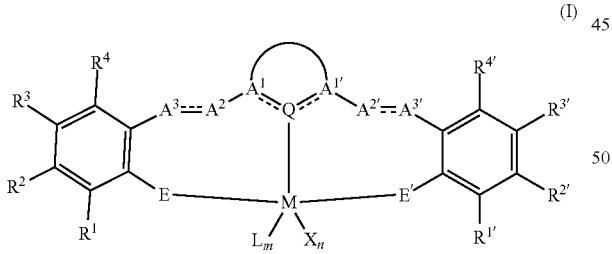

wherein:
M is a group 3, 4, 5, or 6 transition metal or a Lanthanide;
E and E' are each independently O, S, or $NR^9$ where $R^9$ is independently hydrogen, a $C_1$-$C_{40}$ hydrocarbyl, a $C_1$-$C_{40}$ substituted hydrocarbyl or a heteroatom-containing group;
Q is group 14, 15, or 16 atom that forms a dative bond to metal M;
$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is hydrogen, $C_1$-$C_{20}$ hydrocarbyl, or $C_1$-$C_{20}$ substituted hydrocarbyl;

$$A^3 \equiv A^2$$

is a divalent group containing 2 to 40 non-hydrogen atoms that links $A^1$ to the E-bonded aryl group via a 2-atom bridge;

$$A^{2'} \equiv A^{3'}$$

is a divalent group containing 2 to 40 non-hydrogen atoms that links $A^{1'}$ to the E'-bonded aryl group via a 2-atom bridge;
L is a Lewis base;
X is an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, a $C_1$-$C_{40}$ hydrocarbyl, a $C_1$-$C_{40}$ substituted hydrocarbyl, a heteroatom or a heteroatom-containing group,
and one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;
any two X groups may be joined together to form a dianionic ligand group.

2. The catalyst compound of formula 1 where the catalyst compound represented by the Formula (II):

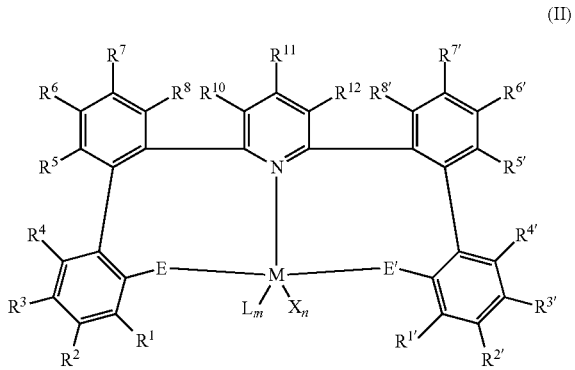

(II)

wherein:
M is a group 3, 4, 5, or 6 transition metal or a Lanthanide;
E and E' are each independently O, S, or $NR^9$, where $R^9$ is independently hydrogen, a $C_1$-$C_{40}$ hydrocarbyl, a $C_1$-$C_{40}$ substituted hydrocarbyl, or a heteroatom-containing group;
each L is independently a Lewis base;
each X is independently an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$, may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; any two L groups may be joined together to form a bidentate Lewis base;
an X group may be joined to an L group to form a monoanionic bidentate group;
any two X groups may be joined together to form a dianionic ligand group;
each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, a $C_1$-$C_{40}$ hydrocarbyl, a $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

3. The catalyst compound of claim 1, wherein the M is Hf, Zr or Ti.

4. The catalyst compound of claim 1, wherein E and E' are each O.

5. The catalyst compound of claim 1, wherein $R^1$ and $R^{1'}$ is independently a $C_4$-$C_{40}$ tertiary hydrocarbyl group.

6. The catalyst compound of claim 1, wherein $R^1$ and $R^{1'}$ is independently a $C_4$-$C_{40}$ cyclic tertiary hydrocarbyl group.

7. The catalyst compound of claim 2, wherein $R^1$ and $R^{1'}$ is independently a $C_4$-$C_{40}$ polycyclic tertiary hydrocarbyl group.

8. The catalyst compound claim 1, wherein each X is, independently, selected from the group consisting of substituted or unsubstituted hydrocarbyl radicals having from 1 to 20 carbon atoms, hydrides, amides, alkoxides, sulfides, phosphides, halides, and a combination thereof, (two X's may form a part of a fused ring or a ring system).

9. The catalyst compound claim 1, wherein each L is, independently, selected from the group consisting of: ethers, thioethers, amines, phosphines, ethyl ether, tetrahydrofuran, dimethylsulfide, triethylamine, pyridine, alkenes, alkynes, alenes, and carbenes and a combinations thereof, optionally two or more L's may form a part of a fused ring or a ring system).

10. The catalyst compound of claim 1, wherein M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

11. The catalyst compound of claim 1, wherein M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

12. The catalyst compound of claim 1, wherein M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

13. The catalyst compound of claim 1, wherein Q is nitrogen, $A^1$ and $A^{1'}$ are both carbon, both $R^1$ and $R^{1'}$ are hydrogen, both E and E' are $NR^9$, where $R^9$ is a $C_1$-$C_{40}$ hydrocarbyl, a $C_1$-$C_{40}$ substituted hydrocarbyl, or a heteroatom-containing group.

14. The catalyst compound of claim 1, wherein Q is carbon, $A^1$ and $A^{1'}$ are both nitrogen, and both E and E' are oxygen.

15. The catalyst compound of claim 1, wherein Q is carbon, $A^1$ is nitrogen, $A^{1'}$ is $C(R^{22})$, and both E and E' are oxygen, where $R^{22}$ is hydrogen, $C_1$-$C_{20}$ hydrocarbyl, or $C_1$-$C_{20}$ substituted hydrocarbyl.

16. The catalyst compound of claim 1, wherein the heterocyclic Lewis base is represented by one of the following formulas:

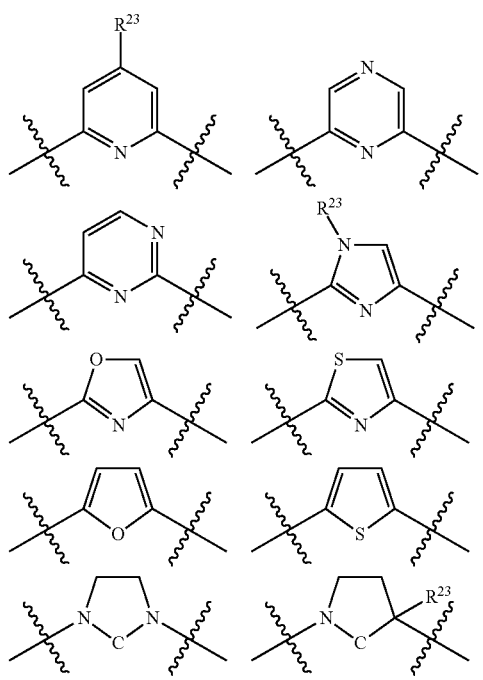

-continued

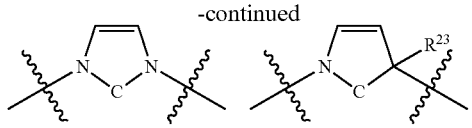

where each $R^{23}$ is independently hydrogen, $C_1$-$C_{20}$ alkyls, or $C_1$-$C_{20}$ substituted alkyls.

17. The catalyst compound of claim 2, wherein M is Zr or Hf, both E and E' are oxygen, and both $R^1$ and $R^{1'}$ are $C_4$-$C_{20}$ cyclic tertiary alkyls.

18. The catalyst compound of claim 2, wherein M is Zr or Hf, both E and E' are oxygen, and both $R^1$ and $R^{1'}$ are adamantan-1-yl or substituted adamantan-1-yl.

19. The catalyst compound of claim 2, wherein M is Zr or Hf, both E and E' are oxygen, and each of $R^1$, $R^{1'}$, $R^3$ and $R^{3'}$ are adamantan-1-yl or substituted adamantan-1-yl.

20. The catalyst compound of claim 2, wherein M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

21. The catalyst compound of claim 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_{20}$ alkyls.

22. The catalyst compound of claim 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_3$ alkyls.

23. The catalyst compound of claim 1 wherein the catalyst compound is represented by one or more of the following formulas:

Complex 1

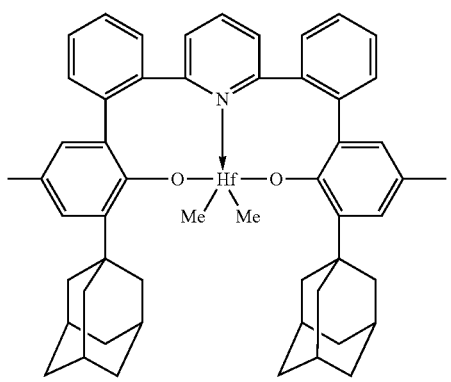

Complex 2

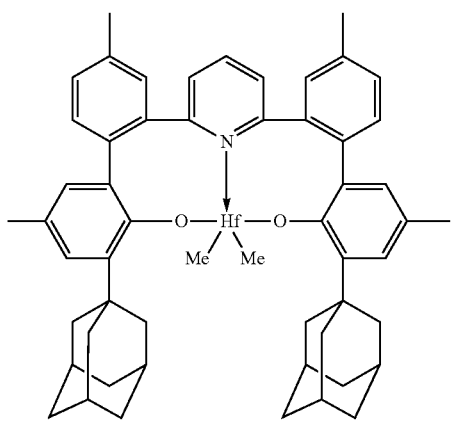

Complex 3

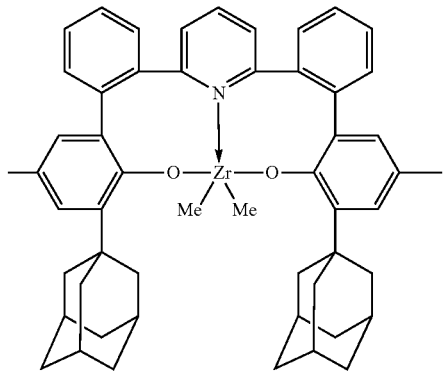

Complex 4

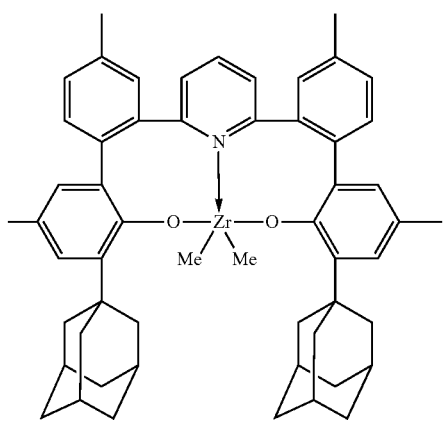

Complex 5

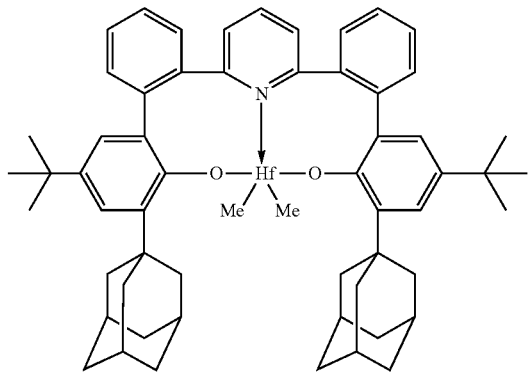

Complex 6

Complex 7
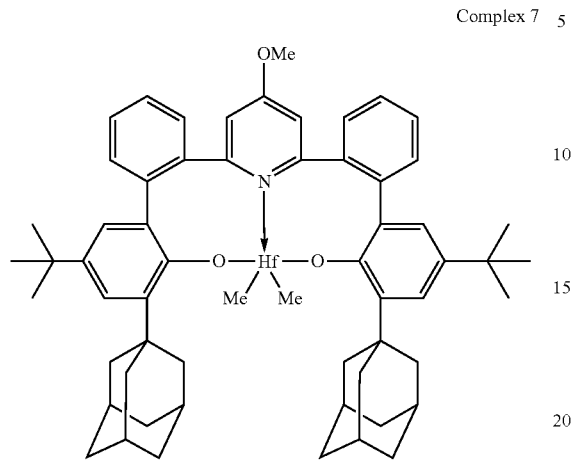
Complex 8
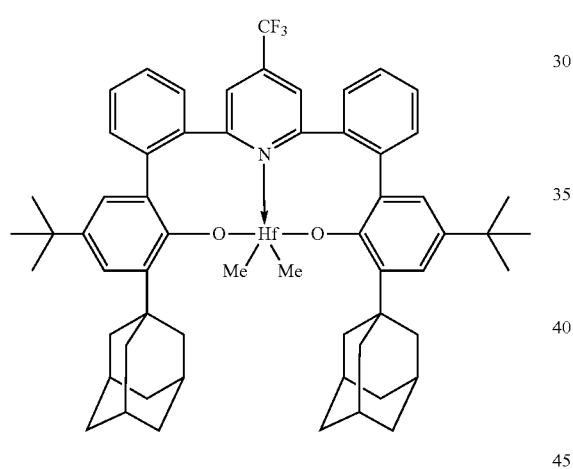
Complex 9
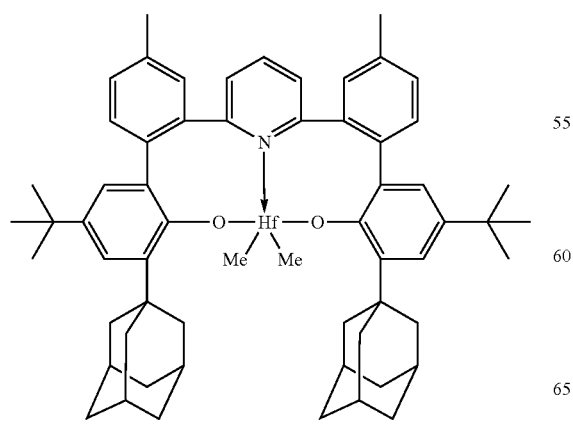
Complex 10
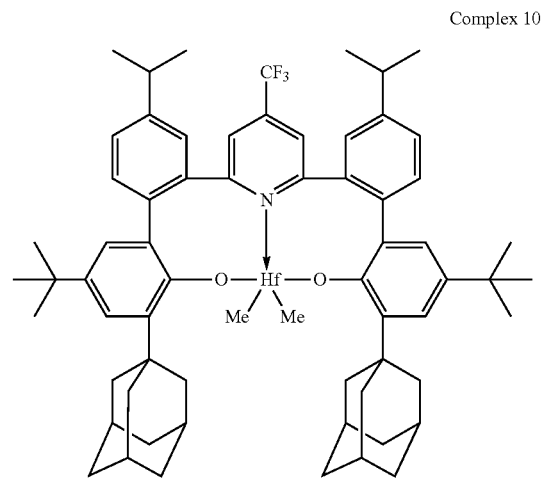
Complex 11
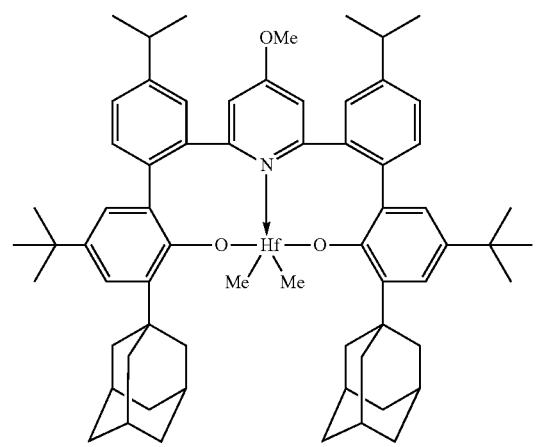
Complex 12
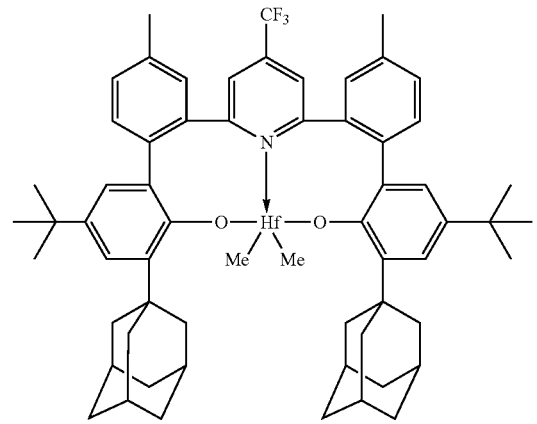

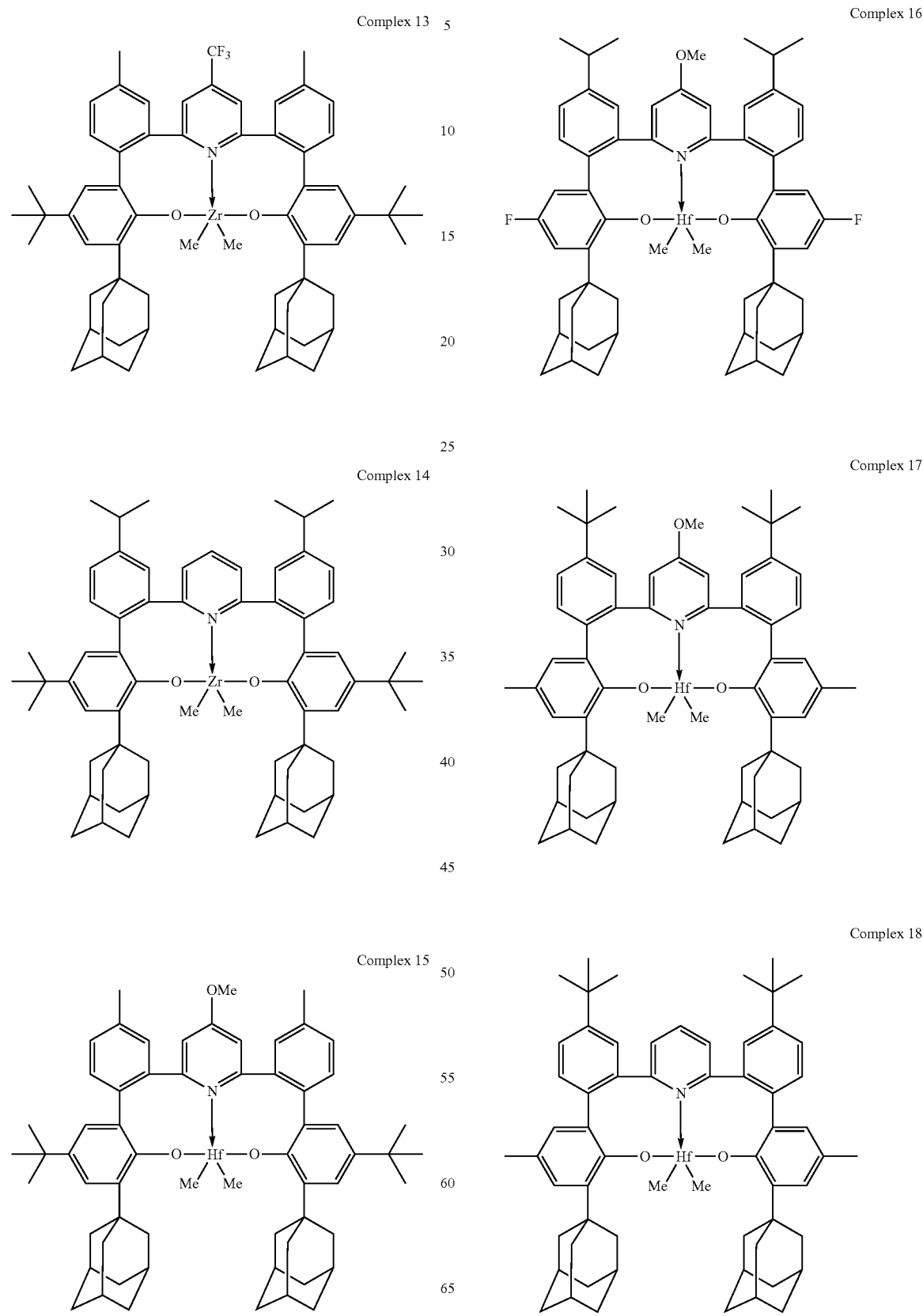

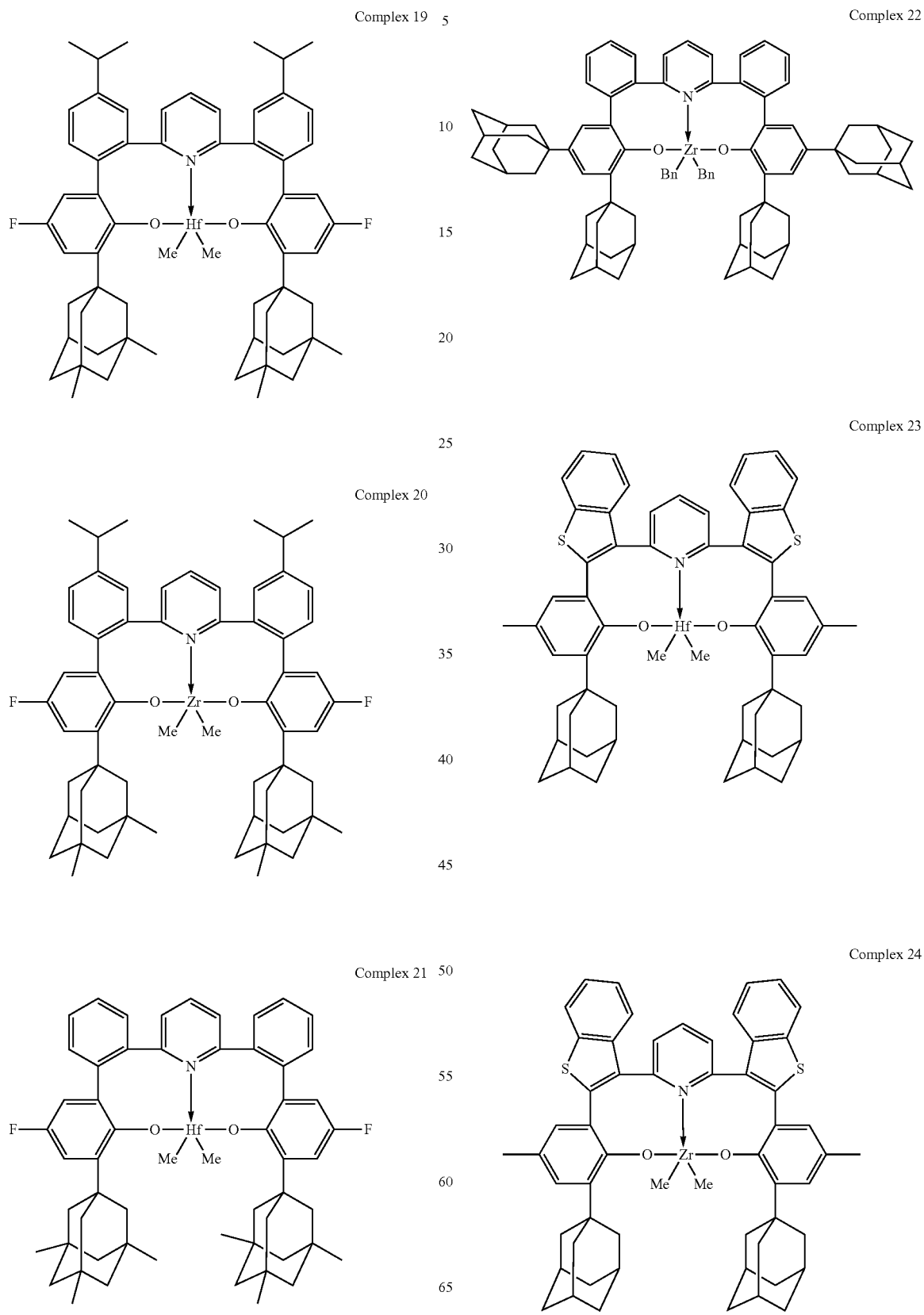

-continued

Complex 25
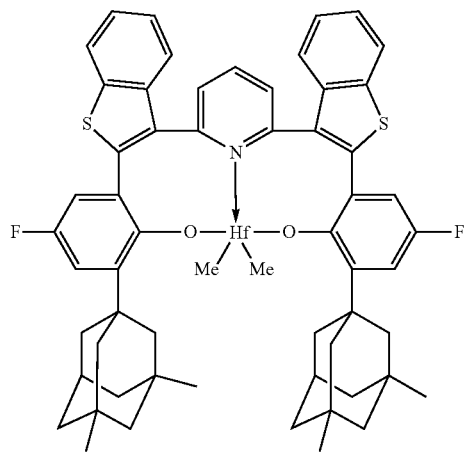

Complex 26
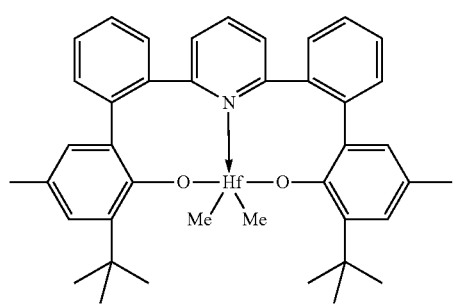

Complex 27
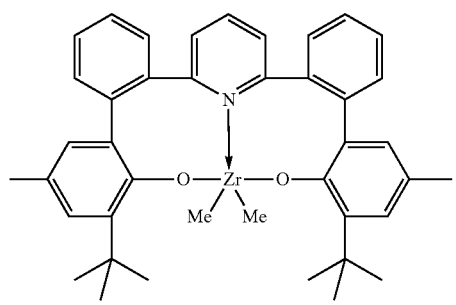

Complex 29
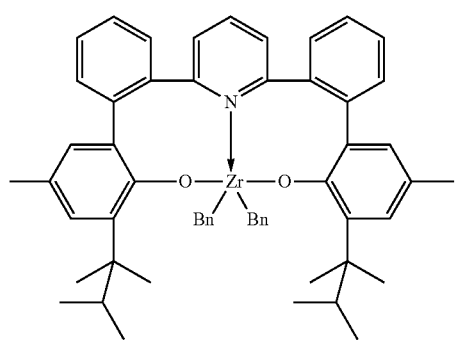

-continued

Complex 30
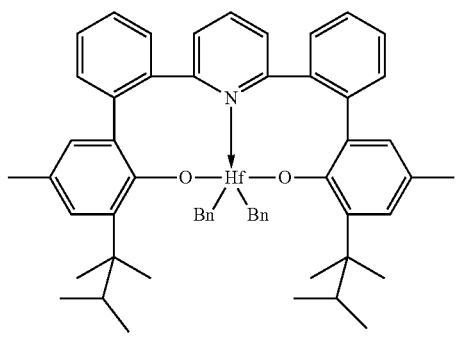

Complex 31
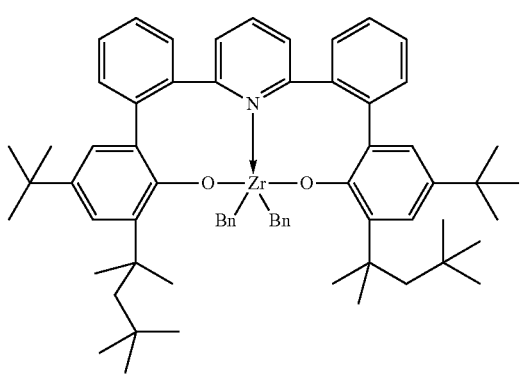

Complex 32
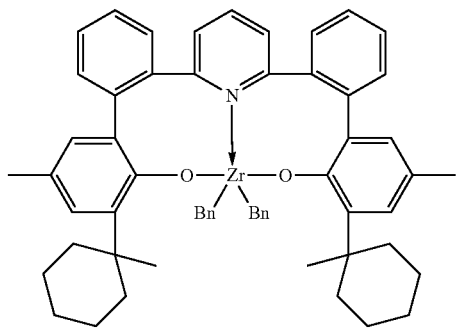

24. A catalyst system comprising activator and the catalyst compound of claim 1.

25. The catalyst system of claim 24, wherein the activator comprises an alumoxane or a non-coordinating anion.

26. The catalyst system of claim 24, wherein the activator is soluble in non-aromatic-hydrocarbon solvent.

27. The catalyst system of claim 24, wherein the catalyst system is free of aromatic solvent.

28. The catalyst system of claim 24, wherein the activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3.

29. The catalyst system of claim 24, wherein the activator is represented by the formula:

$$[R^{1'}R^{2'}R^{3'}EH]_{d+}[M t^{k+}Q_n]^{d-} \qquad (V)$$

wherein:
E is nitrogen or phosphorous;
d is 1, 2 or 3; k is 1, 2, or 3; n is 1, 2, 3, 4, 5, or 6; n−k=d;
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups,
wherein $R^{1'}$, $R^{2'}$, and $R^{3'}$ together comprise 15 or more carbon atoms;
Mt is an element from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

30. The catalyst system of claim 24, wherein the activator is represented by the formula:

$(Z)_d^+(A^{d-})$ wherein $A^{d-}$ is a non-coordinating anion having the charge d−; and d is an integer from 1 to 3 and $(Z)_d^+$ is represented by one or more of:

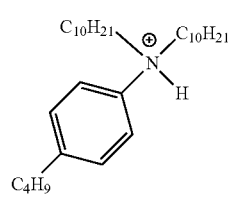

10

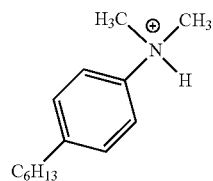

11

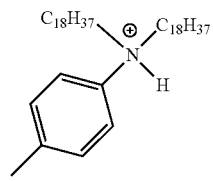

12

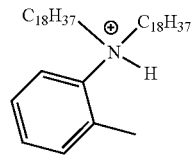

13

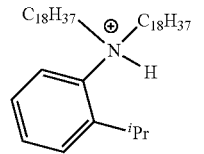

14

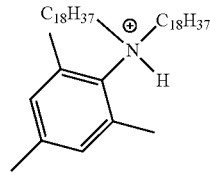

15

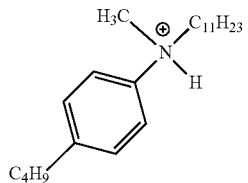

16

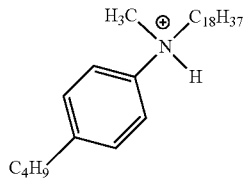

17

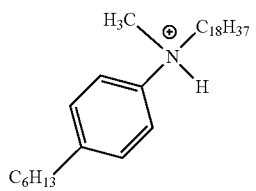

18

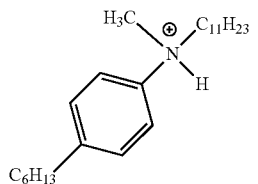

19

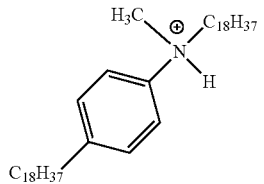

20

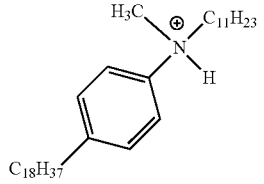

21

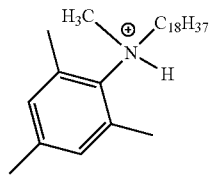

22

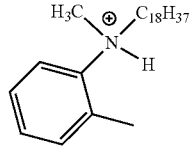

23

-continued

24
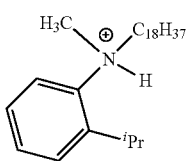

25

26
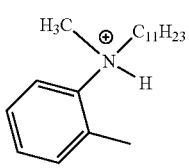

27
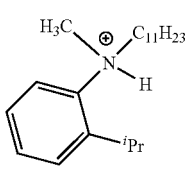

29
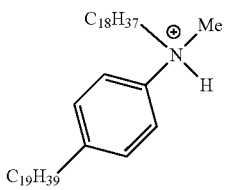

28
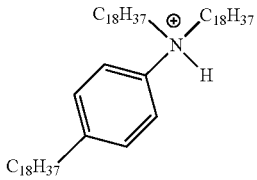

30
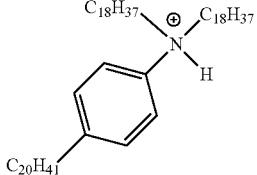

31
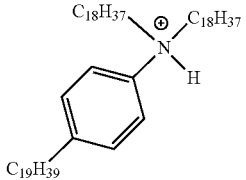

-continued

32
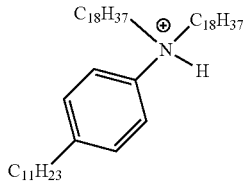

33
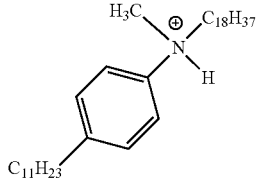

34
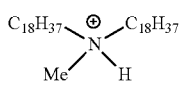

35
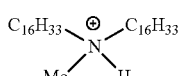

36
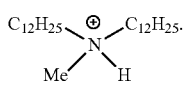

31. The catalyst system of claim 24, wherein the activator is one or more of:
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
dioctadecylmethylammonium tetrakis(pentafluorophenyl)borate,
dioctadecylmethylammonium tetrakis(perfluoronaphthalenyl)borate,
N,N-dimethylanilinium tetrakis(pentafluorophenyl)borate,
triphenylcarbenium tetrakis(pentafluorophenyl)borate,
trimethylammonium tetrakis(perfluoronaphthalenyl)borate,
triethylammonium tetrakis(perfluoronaphthalenyl)borate,
tripropylammonium tetrakis(perfluoronaphthalenyl)borate,
tri(n-butyl)ammonium tetrakis(perfluoronaphthalenyl)borate,
tri(t-butyl)ammonium tetrakis(perfluoronaphthalenyl)borate,
N,N-dimethylanilinium tetrakis(perfluoronaphthalenyl)borate,
N,N-diethylanilinium tetrakis(perfluoronaphthalenyl)borate,
N,N-dimethyl-(2,4,6-trimethylanilinium) tetrakis(perfluoronaphthalenyl)borate,
tropillium tetrakis(perfluoronaphthalenyl)borate,
triphenylcarbenium tetrakis(perfluoronaphthalenyl)borate,
triphenylphosphonium tetrakis(perfluoronaphthalenyl)borate,
triethylsilylium tetrakis(perfluoronaphthalenyl)borate,
benzene(diazonium) tetrakis(perfluoronaphthalenyl)borate,
trimethylammonium tetrakis(perfluorobiphenyl)borate,
triethylammonium tetrakis(perfluorobiphenyl)borate, tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

32. A process to polymerize olefins comprising contacting one or more olefins with the catalyst system of claim 23.

33. The process of claim 32 wherein the process occurs at a temperature of from about 0° C. to about 300° C., at a pressure in the range of from about 0.35 MPa to about 10 MPa, and at a time up to 300 minutes.

34. The process of claim 32 further comprising obtaining polymer.

35. The process of claim 32 wherein the olefins comprise one or more substituted or unsubstituted $C_2$ to $C_{40}$ alpha olefins.

* * * * *